(12) United States Patent
Peterson et al.

(10) Patent No.: US 12,521,236 B2
(45) Date of Patent: Jan. 13, 2026

(54) DEVICES AND METHODS FOR MULTI-ALIGNMENT OF IMPLANTABLE MEDICAL DEVICES

(71) Applicant: MEDTRONIC, INC., Minneapolis, MN (US)

(72) Inventors: Justin R. Peterson, Santa Rosa, CA (US); Syed J. Askari, San Jose, CA (US); Shahnaz Javani, Santa Rosa, CA (US); Stuart E. Kari, Windsor, CA (US); Genevieve E. Farrar, Novato, CA (US)

(73) Assignee: Medtronic, Inc., Minneapolis, MN (US)

( * ) Notice: Subject to any disclaimer, the term of this patent is extended or adjusted under 35 U.S.C. 154(b) by 567 days.

(21) Appl. No.: 17/408,356

(22) Filed: Aug. 20, 2021

(65) Prior Publication Data

US 2022/0061985 A1    Mar. 3, 2022

Related U.S. Application Data

(60) Provisional application No. 63/071,634, filed on Aug. 28, 2020, provisional application No. 63/069,796, filed on Aug. 25, 2020.

(51) Int. Cl.
*A61F 2/24* (2006.01)

(52) U.S. Cl.
CPC .......... *A61F 2/2418* (2013.01); *A61F 2/2412* (2013.01); *A61F 2220/0033* (2013.01);
(Continued)

(58) Field of Classification Search
CPC ............ A61F 2/2418; A61F 2250/0098; A61F 2/2433; A61F 2002/3008; A61F 2/24;
(Continued)

(56) References Cited

U.S. PATENT DOCUMENTS 6,361,557 B1 * 3/2002 Gittings .................... A61F 2/07
                                                              606/151
6,893,460 B2 * 5/2005 Spenser ................ A61F 2/2412
                                                              623/2.14
(Continued)

FOREIGN PATENT DOCUMENTS

EP          2055266 B1      2/2012
JP      2012081136 A   *   4/2012
(Continued)

OTHER PUBLICATIONS

International Search Report and Written Opinion, Application No. PCT/US2021/020676, mailed Jun. 2, 2021.
(Continued)

*Primary Examiner* — Rebecca S Preston
(74) *Attorney, Agent, or Firm* — Medler Ferro Woodhouse & Mills PLLC

(57) ABSTRACT

A transcatheter valve prosthesis includes a stent having a crimped configuration for delivery within a vasculature and an expanded configuration for deployment within a native heart valve. The stent includes an inflow portion, an outflow portion, and at least one commissure post positioned at least partially in the outflow portion of the stent. The transcatheter valve prosthesis includes an inflow marker positioned within the inflow portion of the stent, the inflow marker including a first radiopaque material. The transcatheter valve prosthesis includes an outflow marker positioned on the at least one commissure post, the outflow marker including a second radiopaque material. The first radiopaque material and the second radiopaque material cause the inflow marker and the outflow marker to be visible relative to the stent in one or more images captured during the installation at the implant location.

16 Claims, 66 Drawing Sheets

(52) U.S. Cl.
CPC ................ *A61F 2250/0096* (2013.01); *A61F 2250/0098* (2013.01)

(58) Field of Classification Search
CPC ............ A61F 2/2409; A61F 2250/0097; A61F 2250/0096–0098; A61B 2090/376; A61B 2090/3966
See application file for complete search history.

(56) References Cited

U.S. PATENT DOCUMENTS

| | | | |
|---|---|---|---|
| 6,935,404 B2* | 8/2005 | Duerig | A61F 2/915 623/901 |
| 7,972,378 B2 | 7/2011 | Tabor et al. | |
| 9,839,513 B2 | 12/2017 | Essinger et al. | |
| 2003/0114913 A1 | 6/2003 | Spenser et al. | |
| 2006/0235505 A1 | 10/2006 | Oepen | |
| 2008/0065194 A1* | 3/2008 | Dakin | A61F 2/915 623/1.16 |
| 2008/0275540 A1 | 11/2008 | Wen | |
| 2009/0076594 A1* | 3/2009 | Sabaria | A61L 31/148 623/1.34 |
| 2009/0192591 A1 | 7/2009 | Ryan et al. | |
| 2010/0249908 A1* | 9/2010 | Chau | A61F 2/243 623/1.26 |
| 2011/0022157 A1* | 1/2011 | Essinger | A61F 2/2436 623/1.11 |
| 2013/0058556 A1 | 3/2013 | Ohishi | |
| 2013/0325107 A1* | 12/2013 | Wu | A61F 2/844 623/1.34 |
| 2014/0188219 A1 | 7/2014 | Conklin et al. | |
| 2014/0277389 A1* | 9/2014 | Braido | A61F 2/2418 623/1.26 |
| 2014/0330366 A1* | 11/2014 | Dehdashtian | A61F 2/2433 623/2.11 |
| 2015/0230923 A1 | 8/2015 | Levi | |
| 2016/0296324 A1 | 10/2016 | Bapat et al. | |
| 2018/0185182 A1* | 7/2018 | Zhuang | A61L 31/022 |
| 2018/0221181 A1* | 8/2018 | Fischer | A61F 2/915 |
| 2018/0344458 A1 | 12/2018 | Spenser et al. | |
| 2019/0117424 A1 | 4/2019 | Berra | |
| 2019/0192275 A1 | 6/2019 | Kim et al. | |
| 2019/0247177 A1 | 8/2019 | Kim | |
| 2019/0262507 A1* | 8/2019 | Adamek-Bowers | A61F 2/2418 |
| 2019/0365957 A1* | 12/2019 | Paquin | A61L 31/022 |
| 2020/0268535 A1* | 8/2020 | Carpenter | A61F 2/915 |
| 2020/0390575 A1* | 12/2020 | Guo | A61F 2/915 |
| 2023/0172709 A1* | 6/2023 | Iyer | A61L 27/36 623/2.18 |

FOREIGN PATENT DOCUMENTS

| | | | | |
|---|---|---|---|---|
| WO | WO-2009106545 A1 * | 9/2009 | ........... | A61F 2/2418 |
| WO | 2011137531 A1 | 11/2011 | | |
| WO | WO-2014171183 A1 * | 10/2014 | ............ | A61F 2/915 |
| WO | 2017103830 A1 | 6/2017 | | |
| WO | WO-2021040547 A1 * | 3/2021 | ........... | A61F 2/2418 |

OTHER PUBLICATIONS

International Search Report and Written Opinion, Application No. PCT/2021/047427, mailed Nov. 30, 2021.
Non-final Office Action, U.S. Appl. No. 17/187,261, filed Oct. 18, 2022.
Final Office Action, U.S. Appl. No. 17/187,261, filed Feb. 13, 2023.
Office action, U.S. Appl. No. 17/187,261, mailed Jun. 14, 2023.
Office action, U.S. Appl. No. 17/187,261, filed Jan. 24, 2024.

* cited by examiner

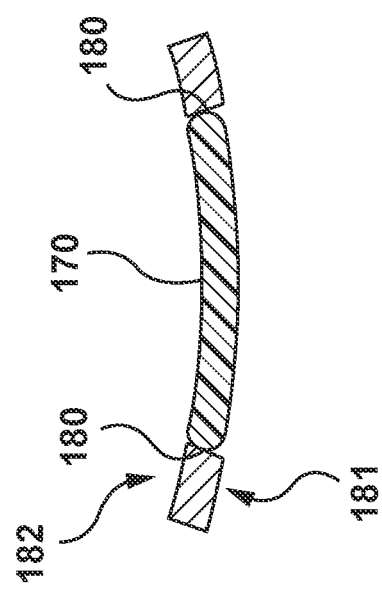
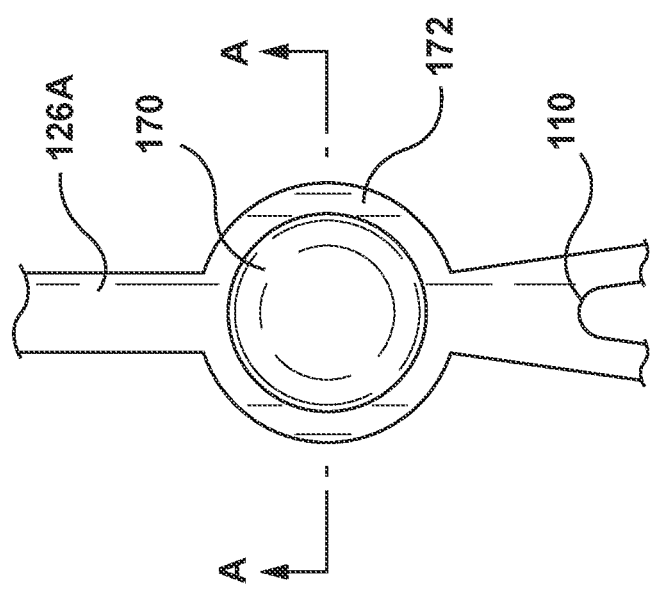
FIG. 1E
FIG. 1F

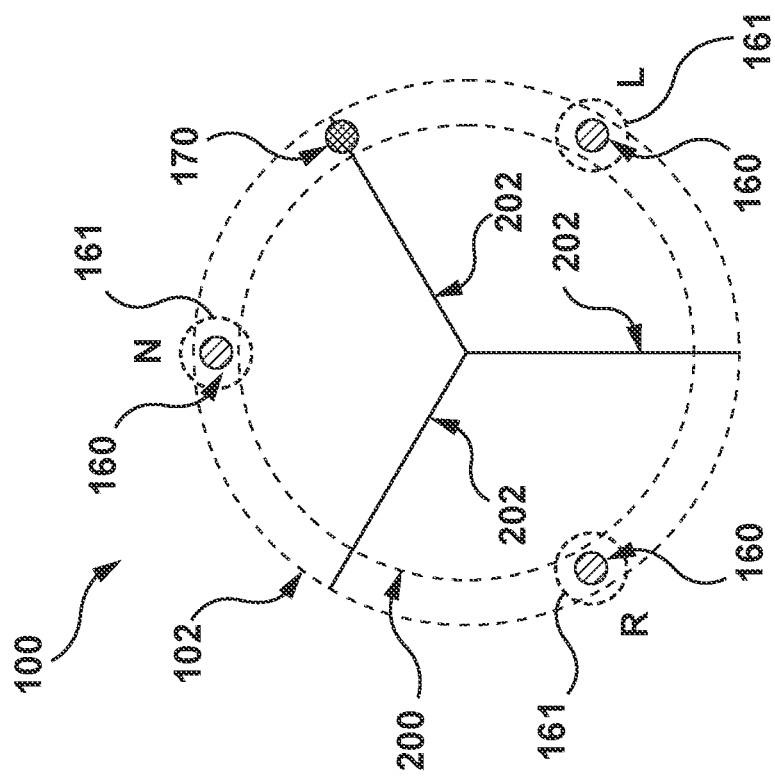
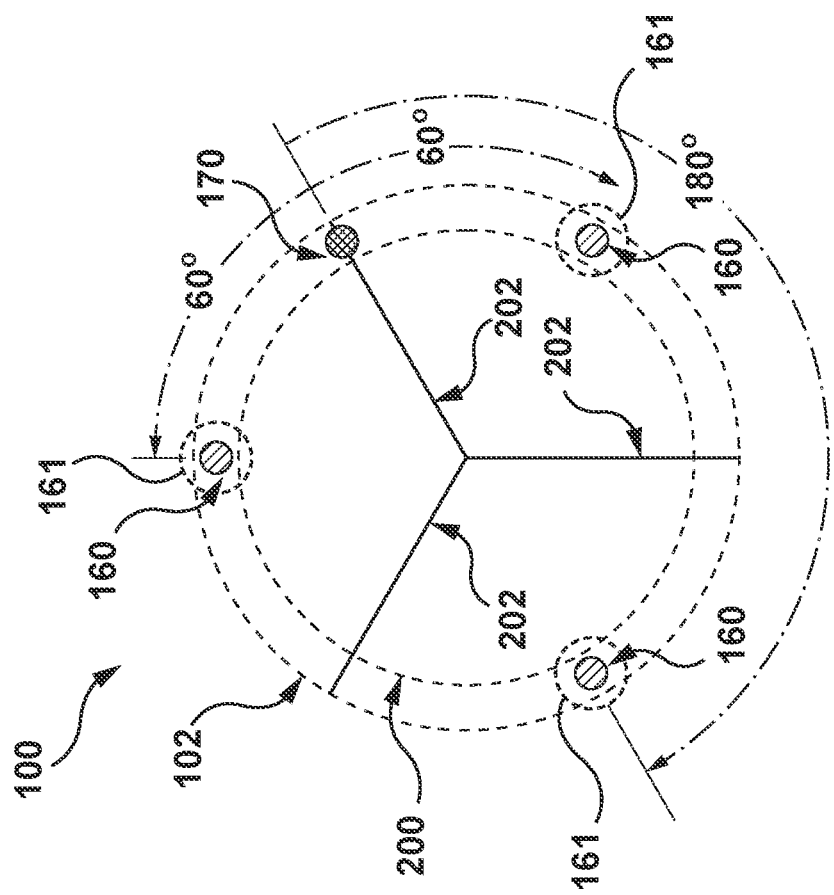
FIG. 2A
FIG. 2B

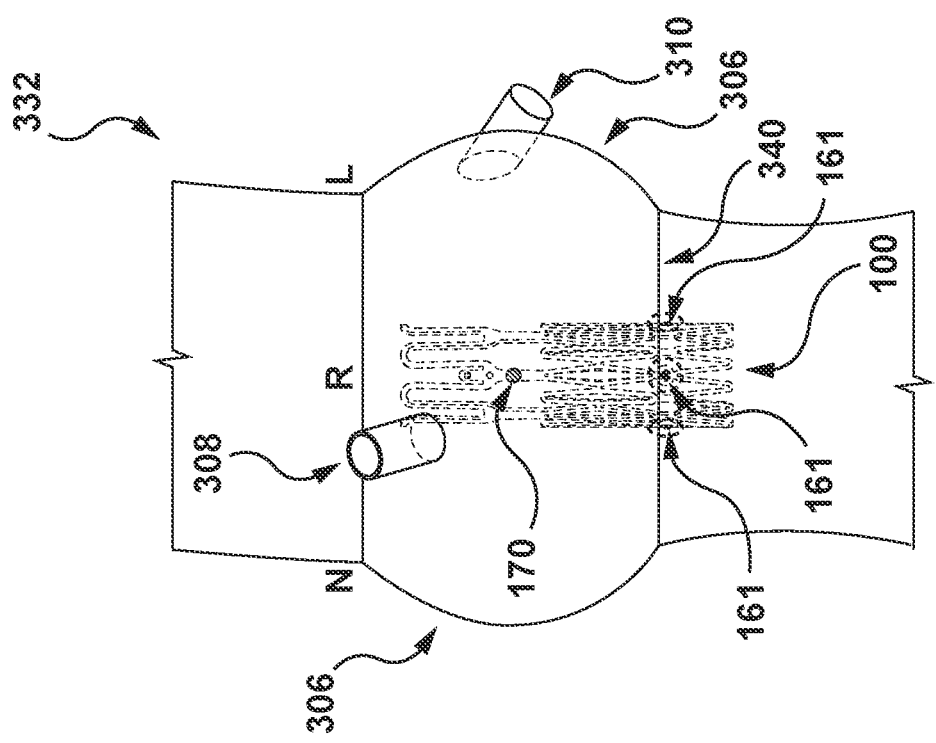
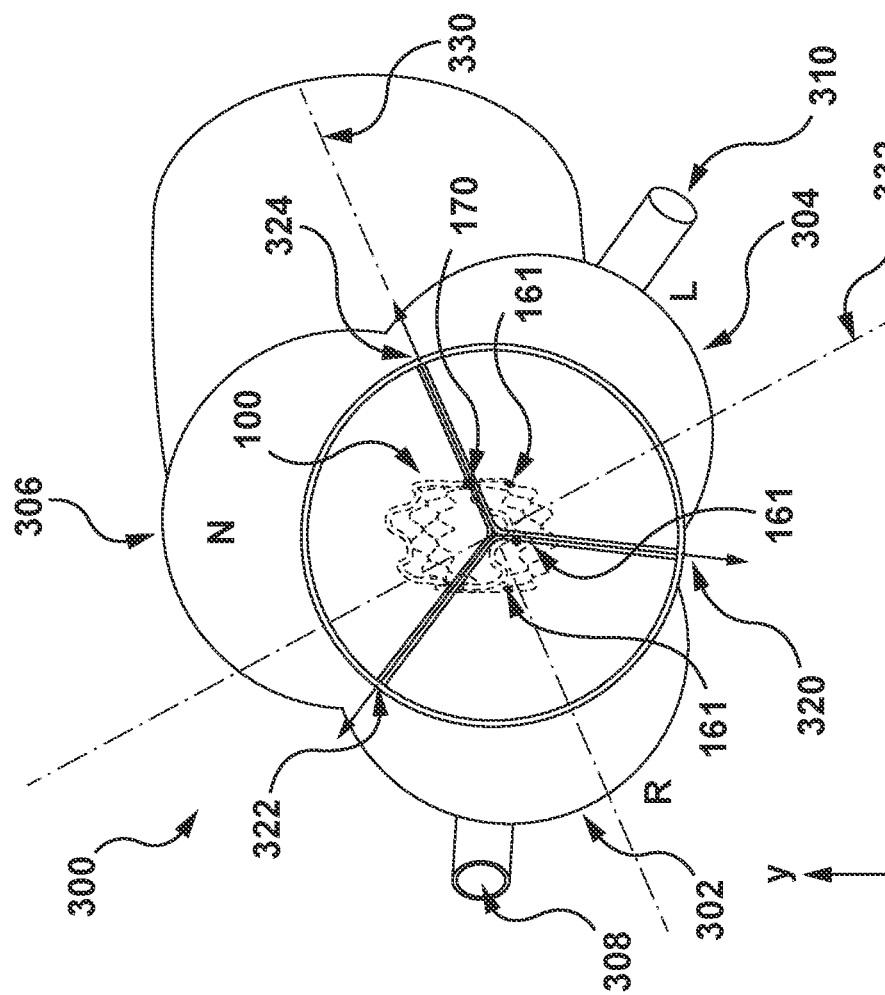
FIG. 3B
FIG. 3A

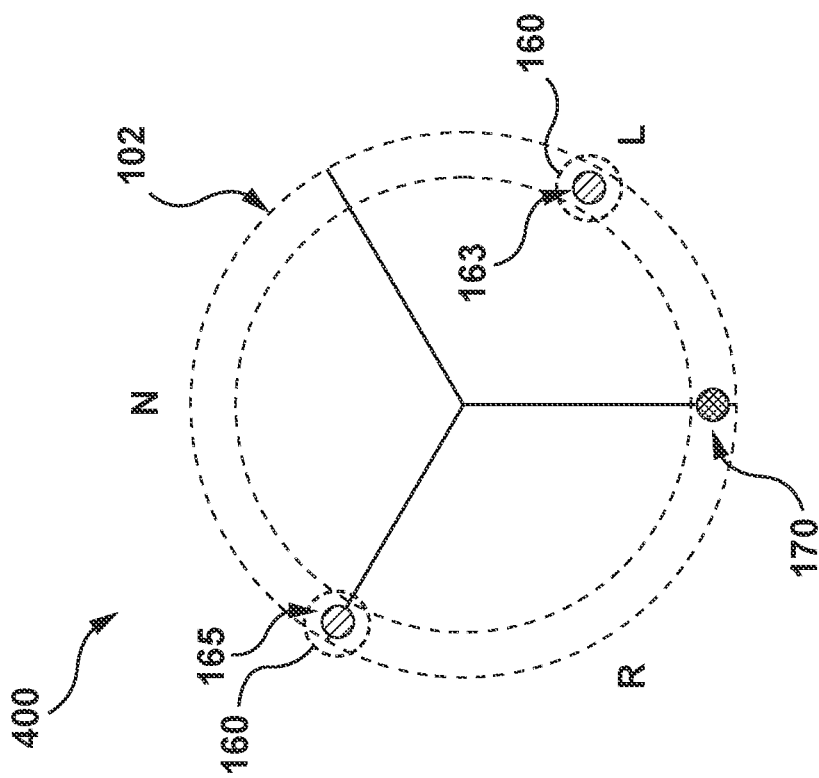
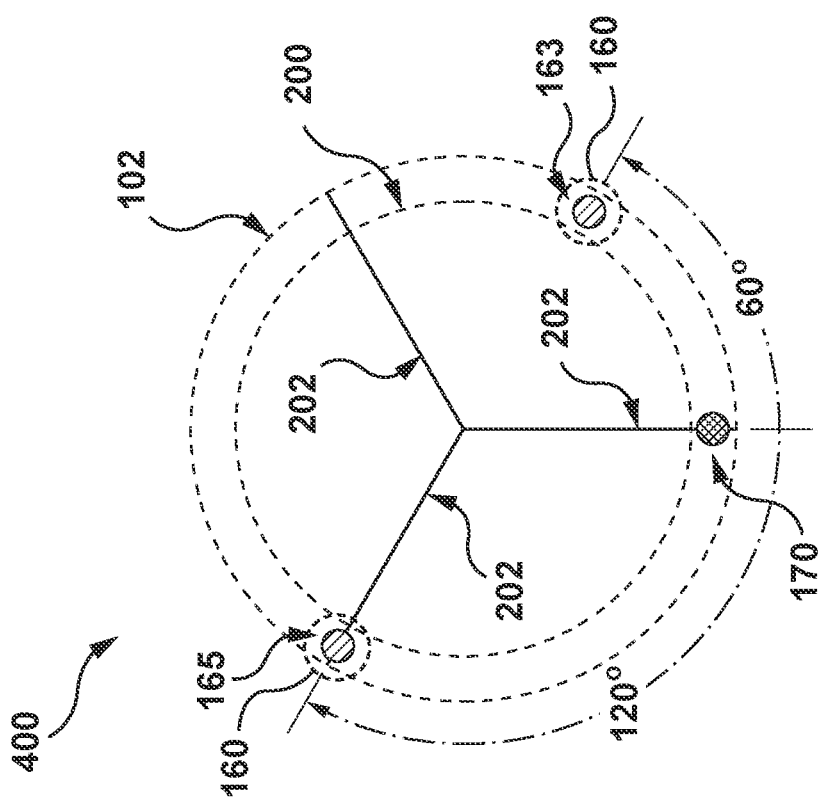
FIG. 5A
FIG. 5B

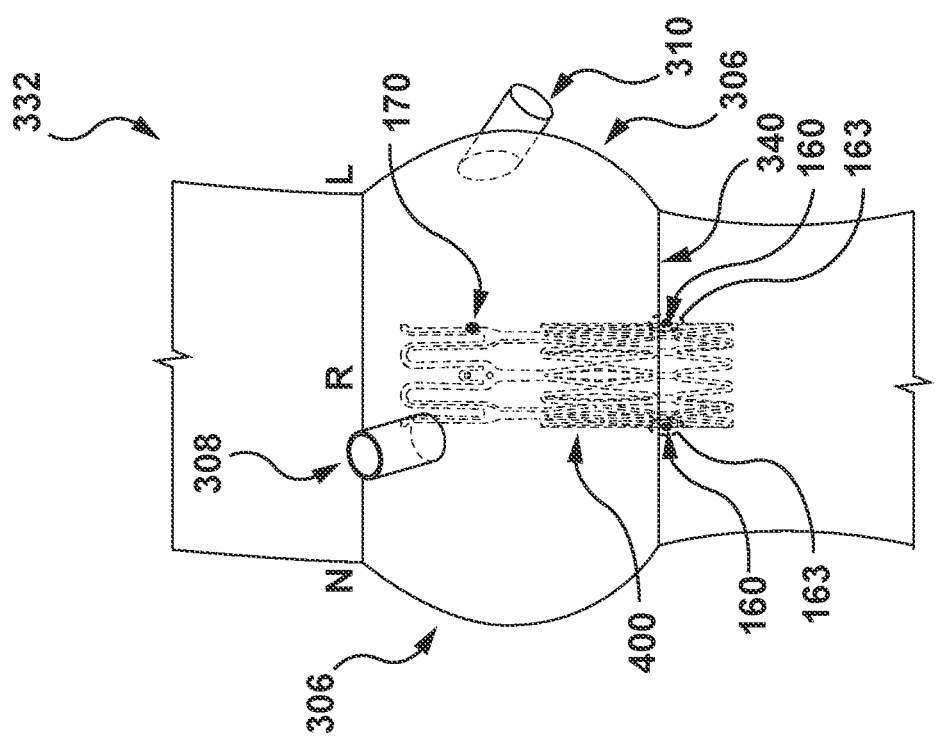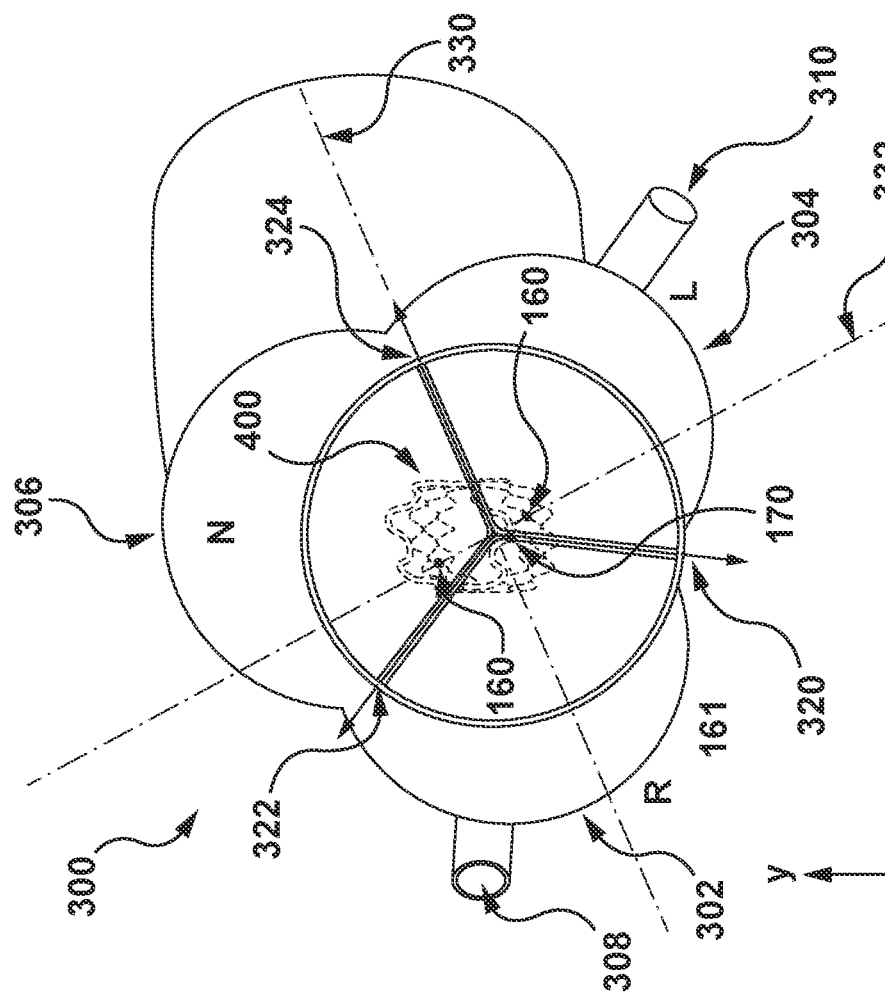
FIG. 6B
FIG. 6A

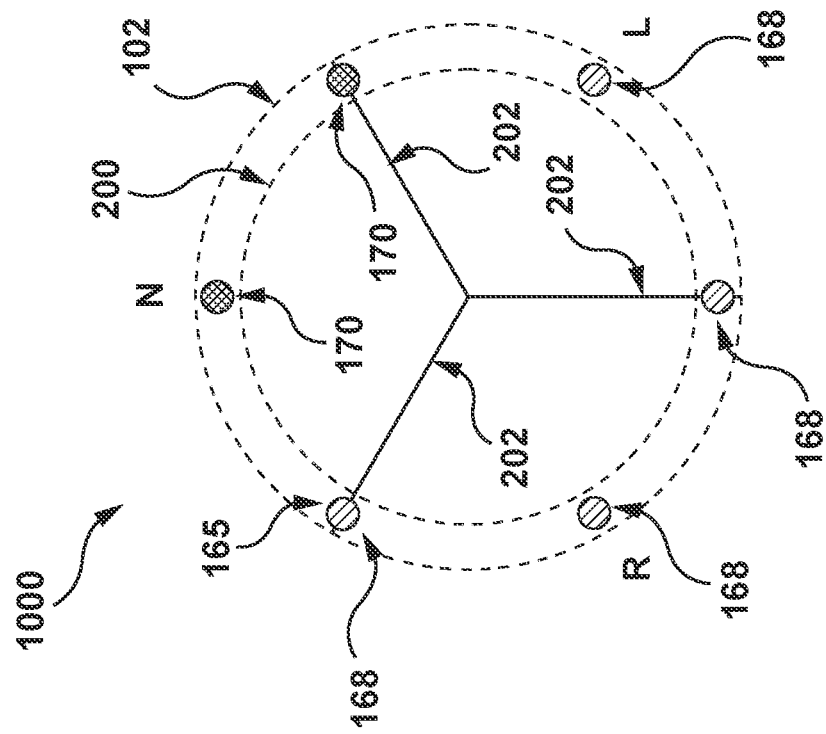
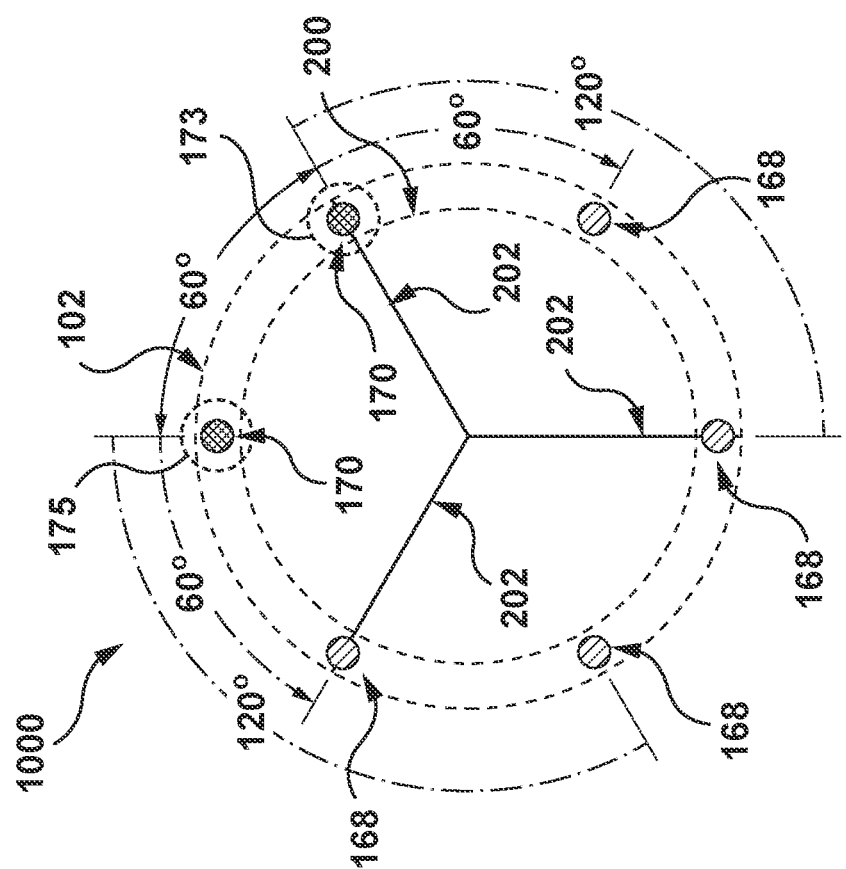
FIG. 11B
FIG. 11A

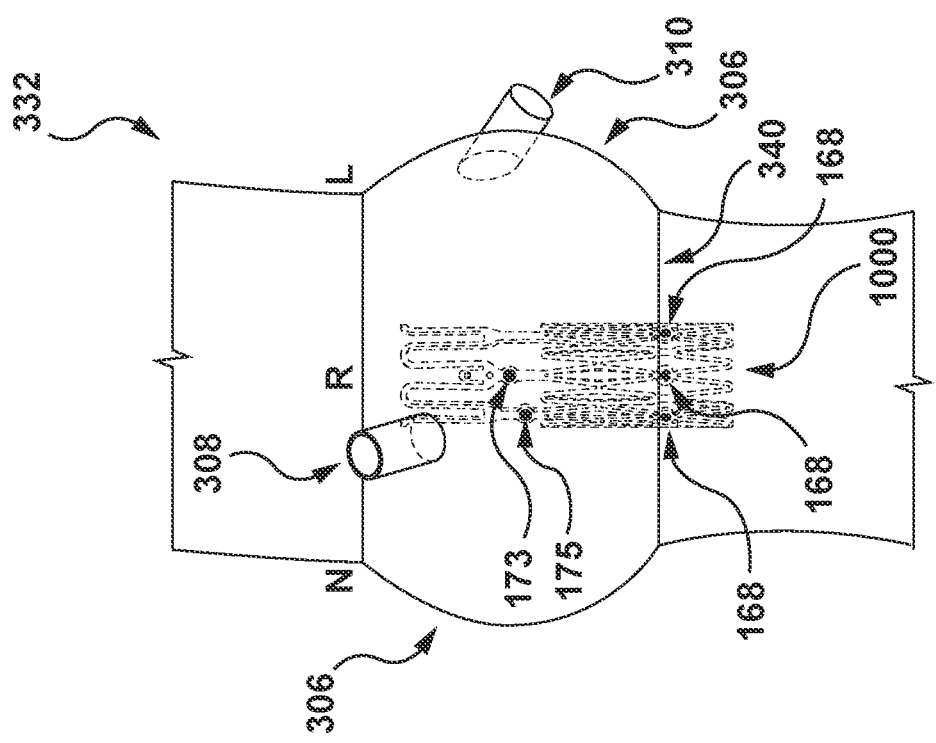
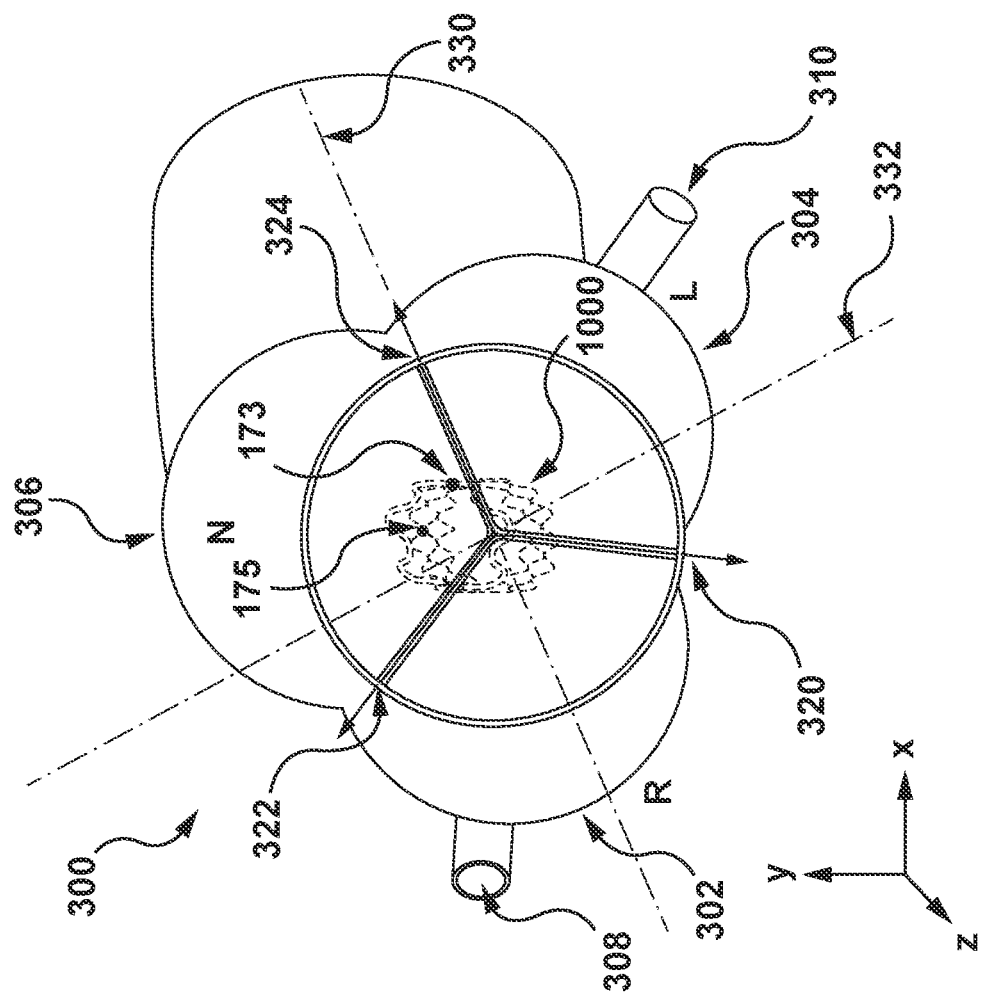
FIG. 12A
FIG. 12B

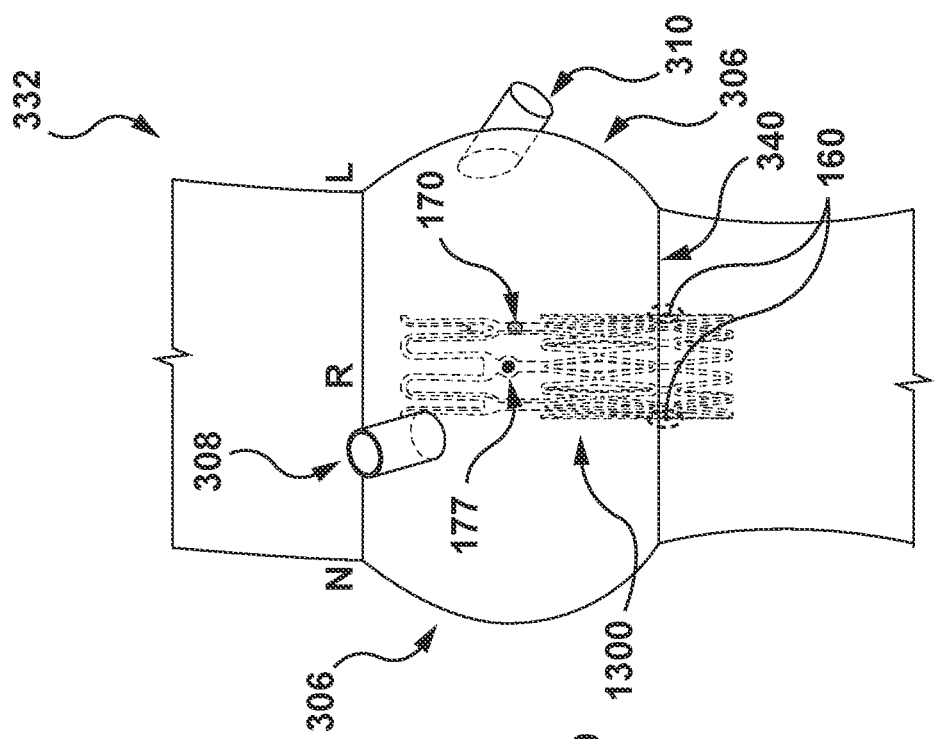
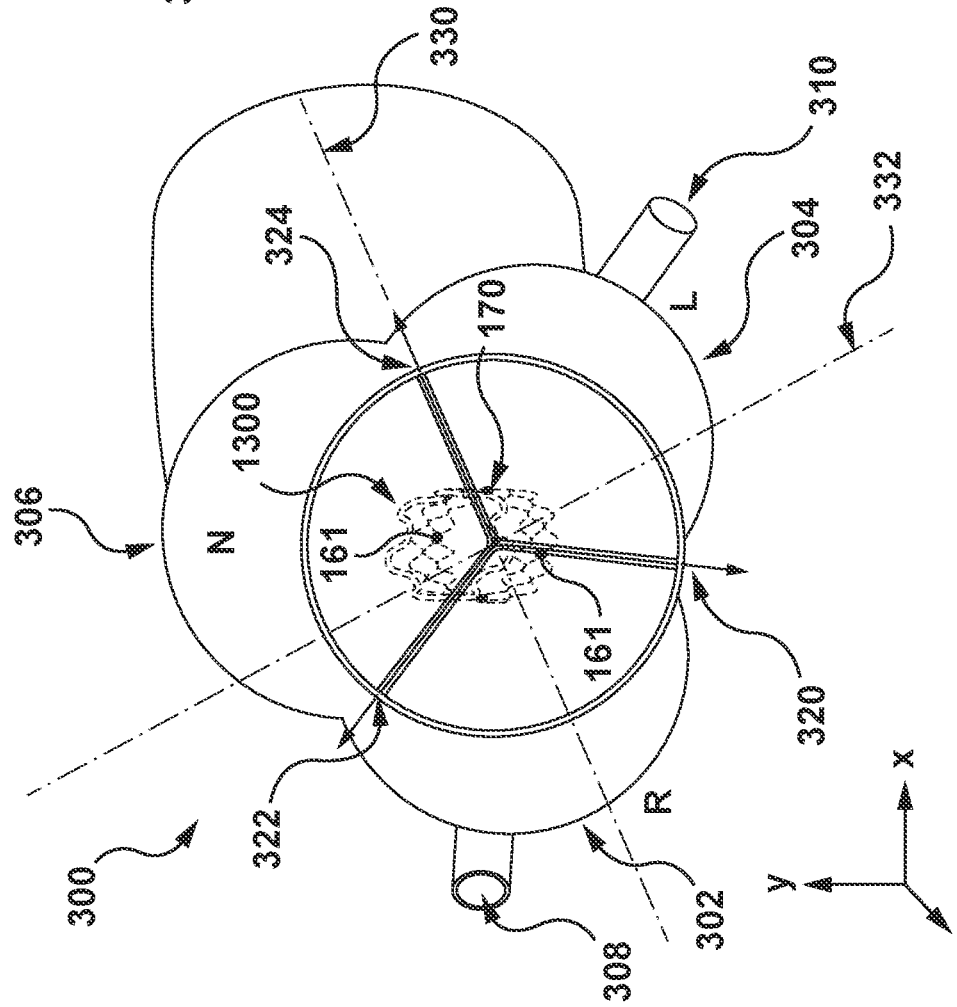
FIG. 15B
FIG. 15A

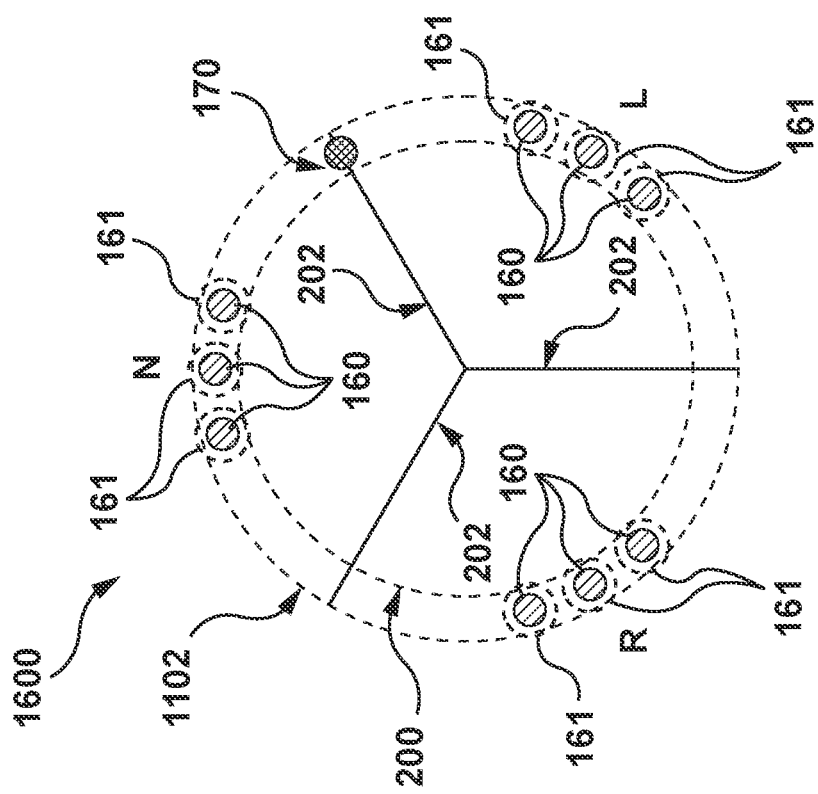
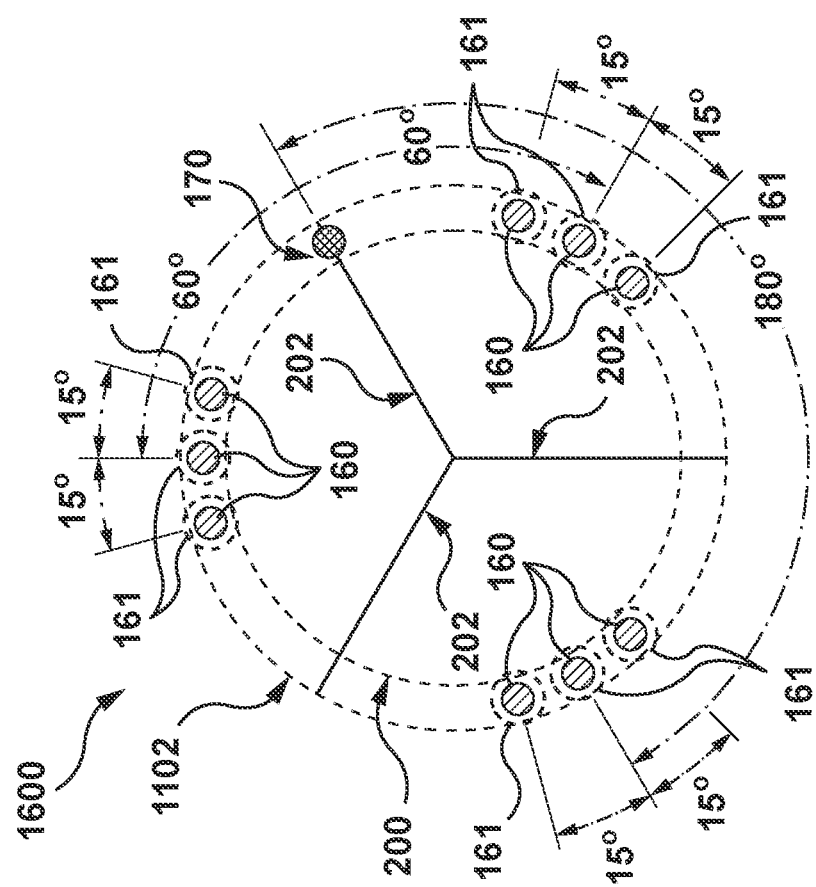
FIG. 17A
FIG. 17B

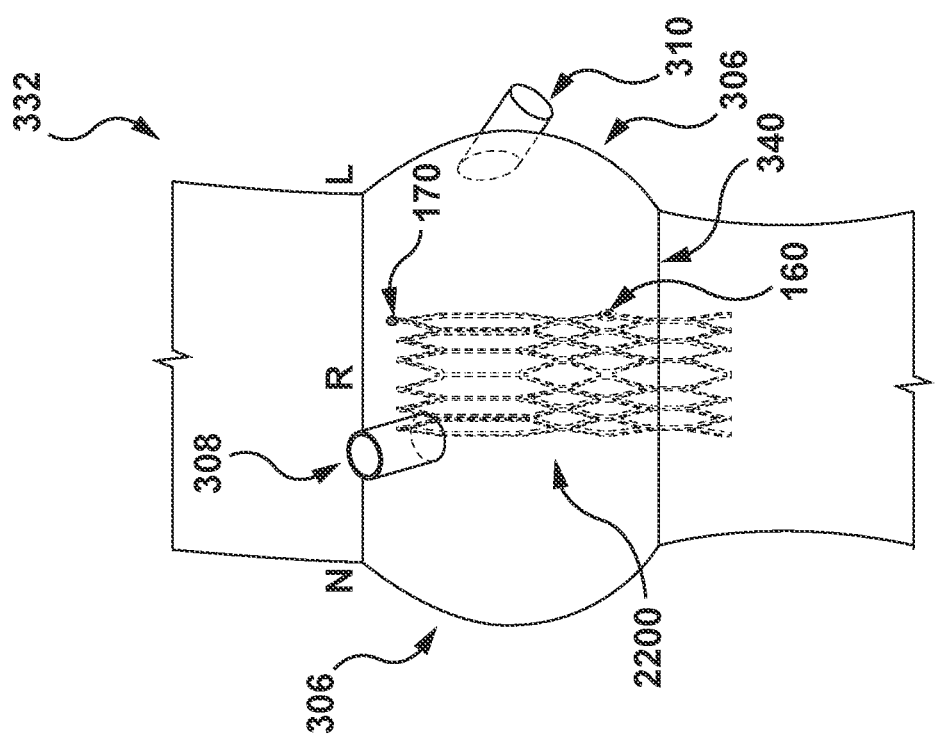
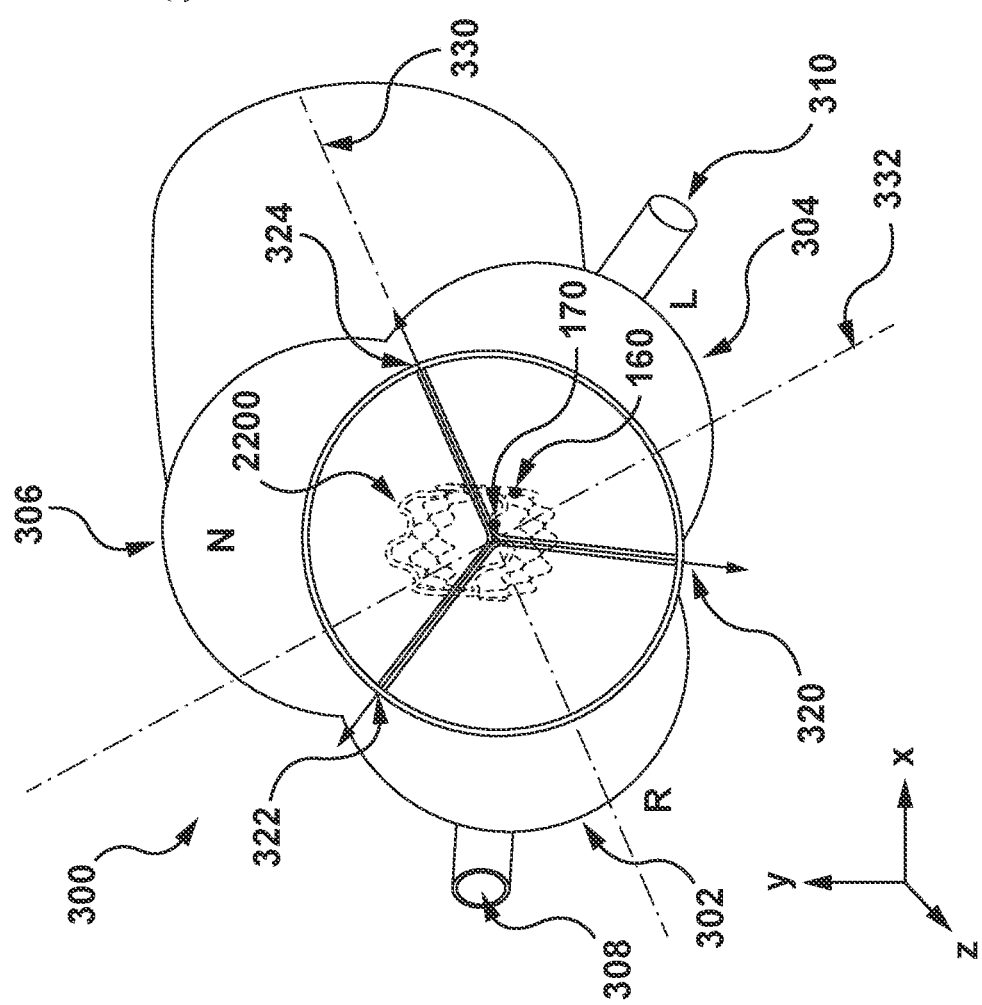
FIG. 24B
FIG. 24A

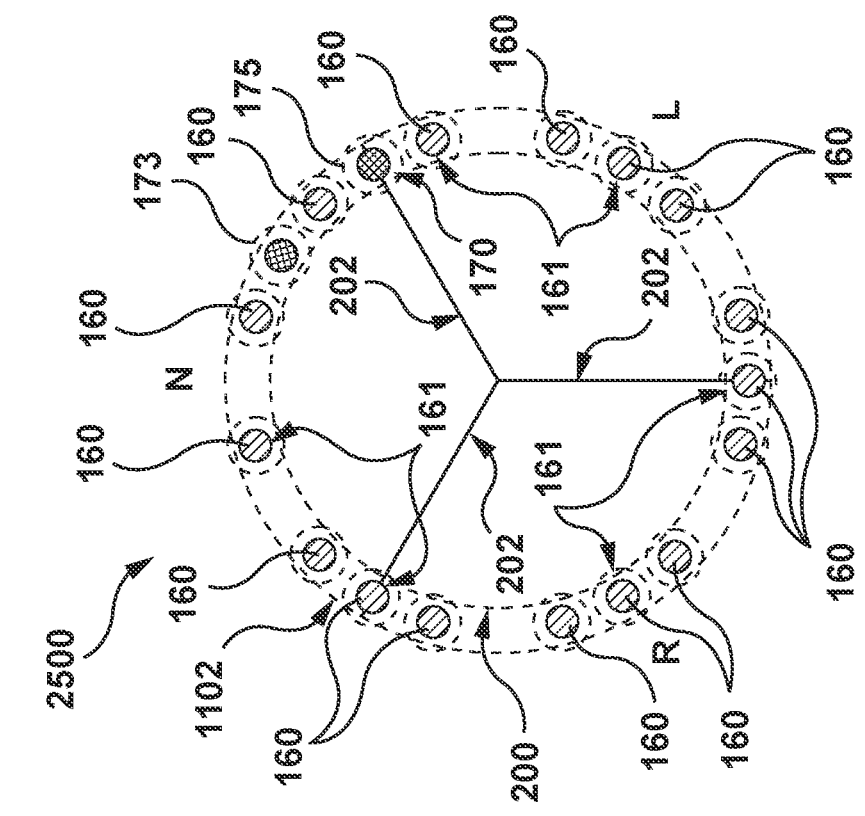
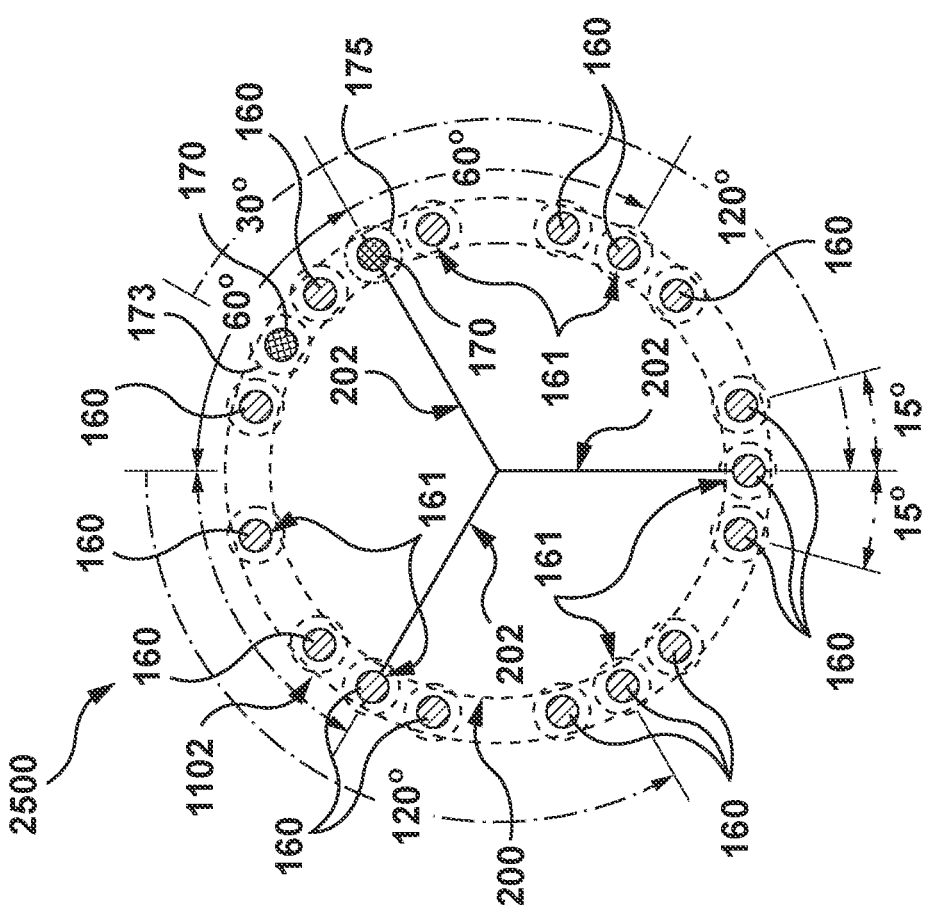

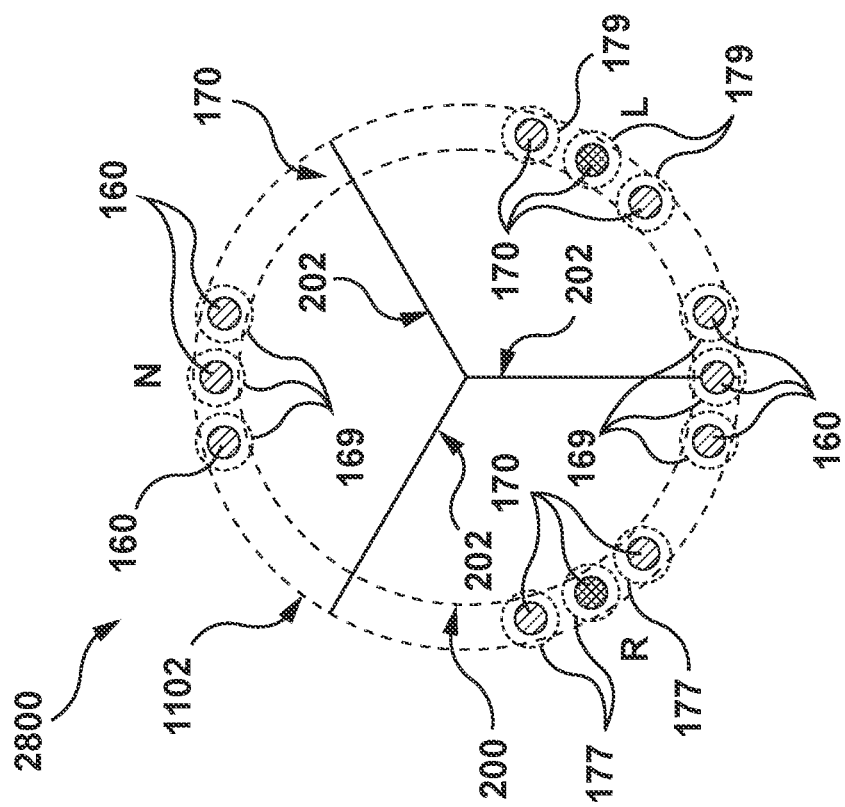
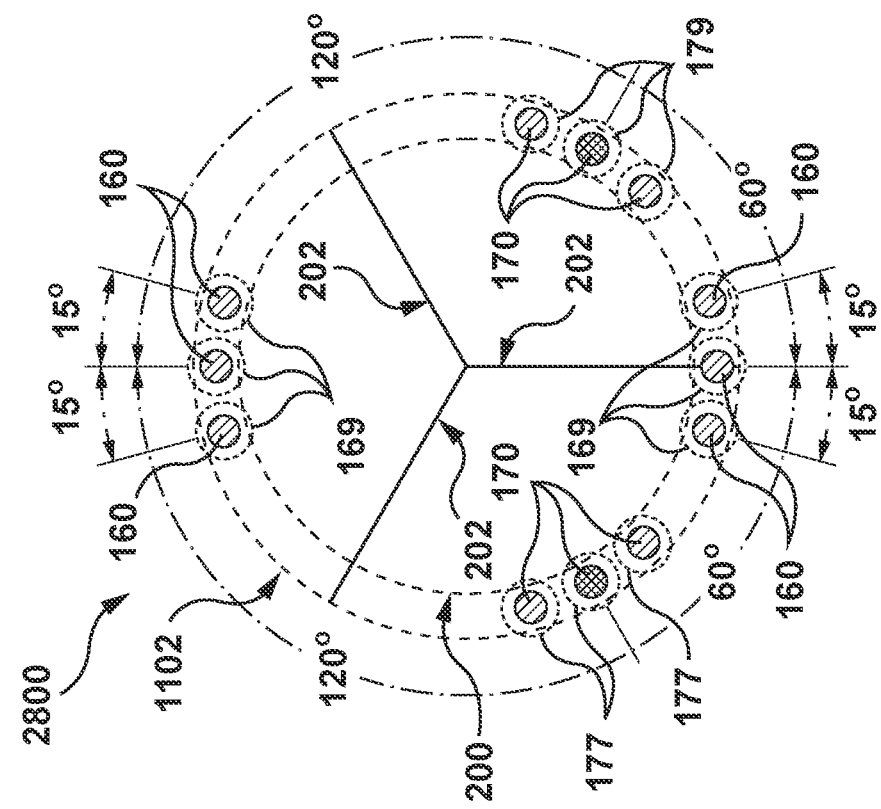

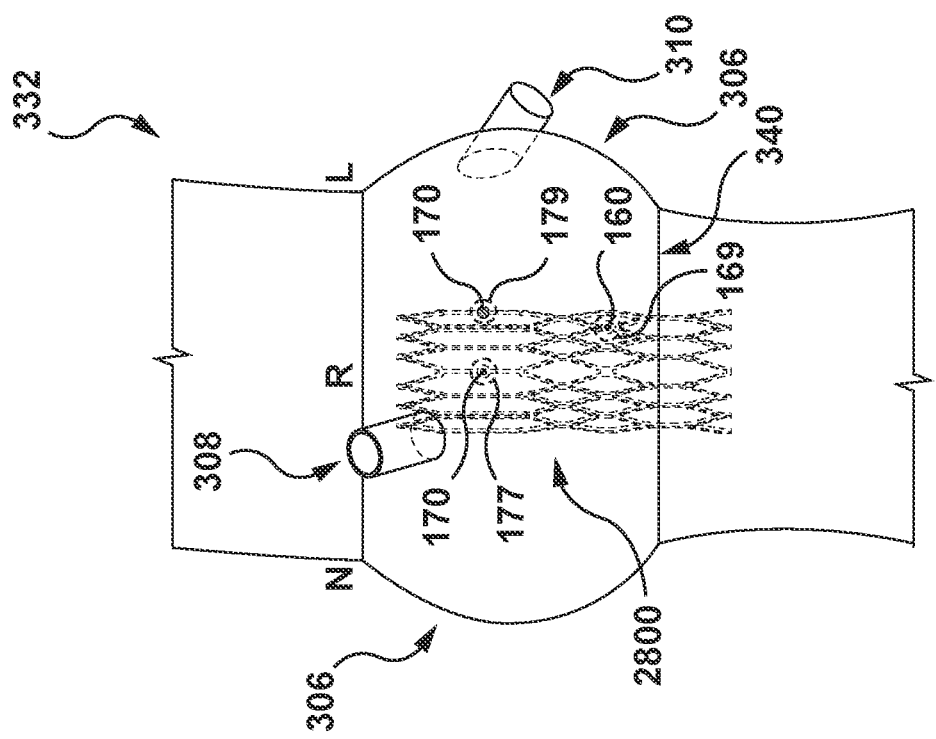
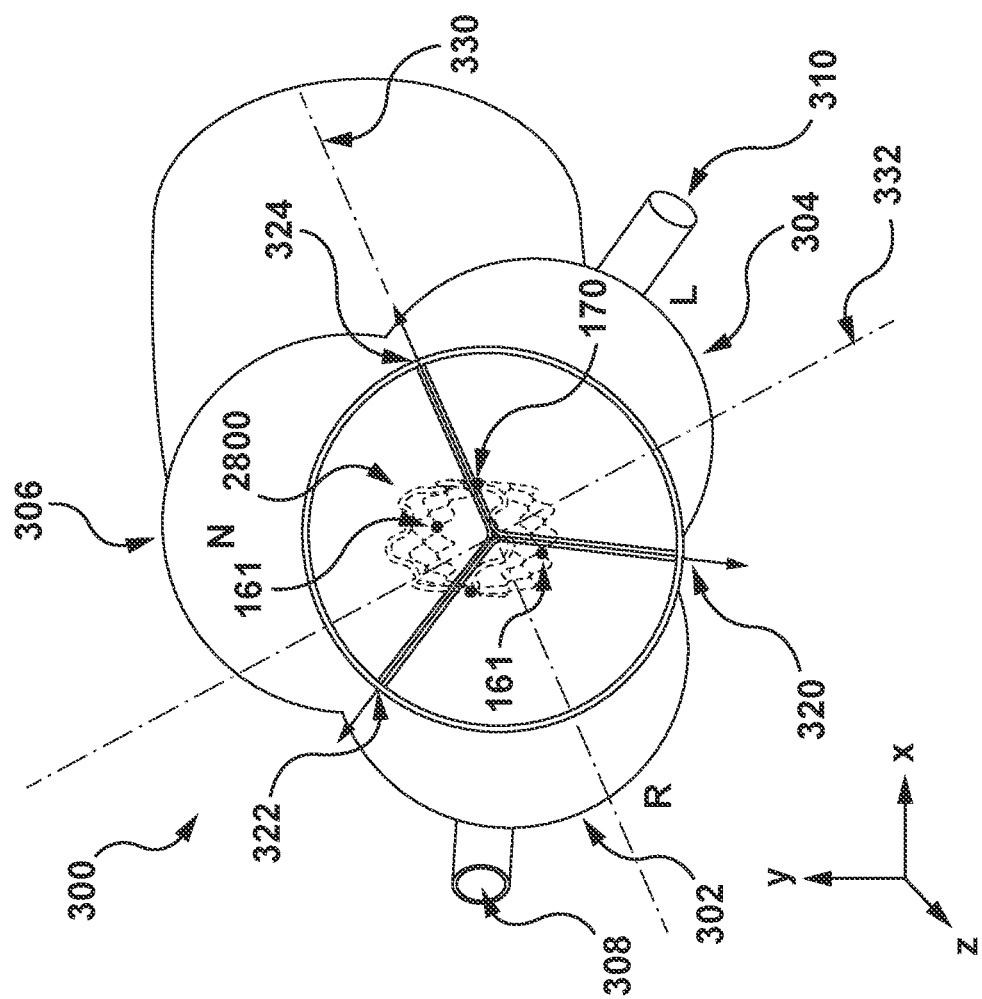
FIG. 30B
FIG. 30A

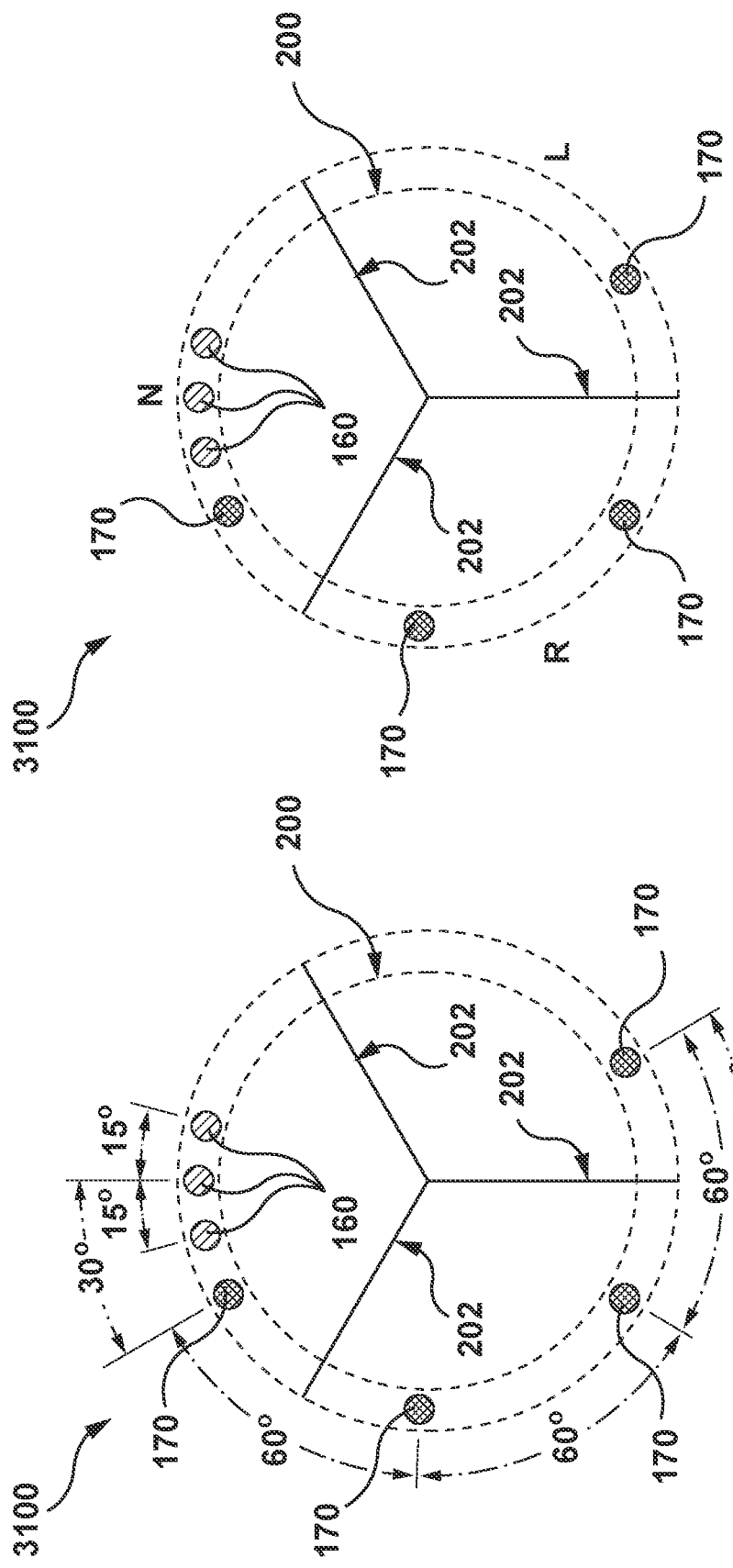

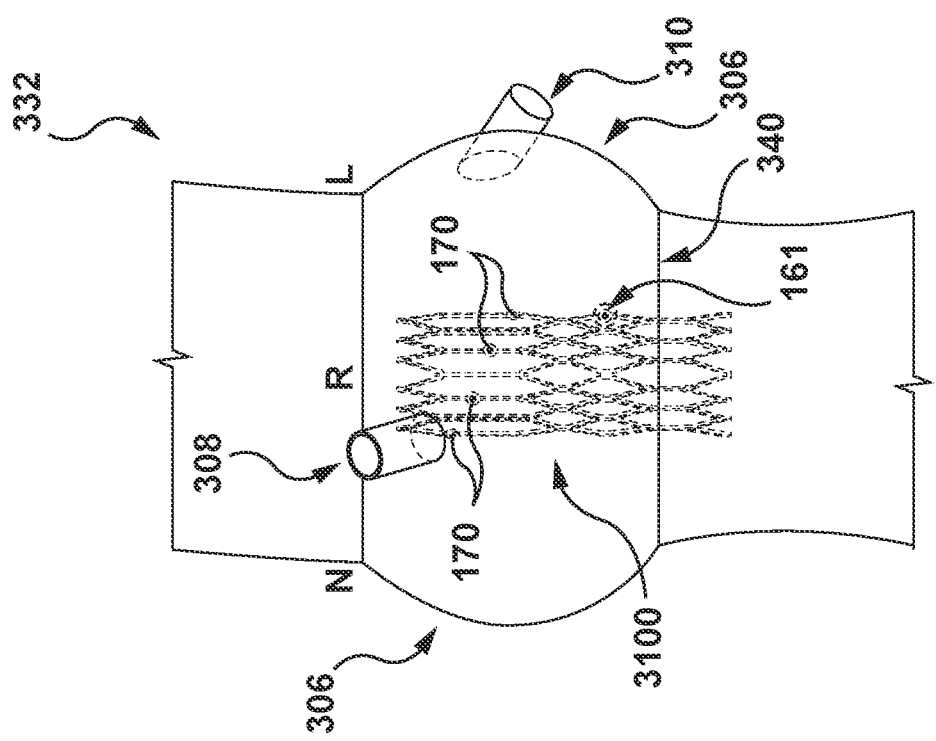
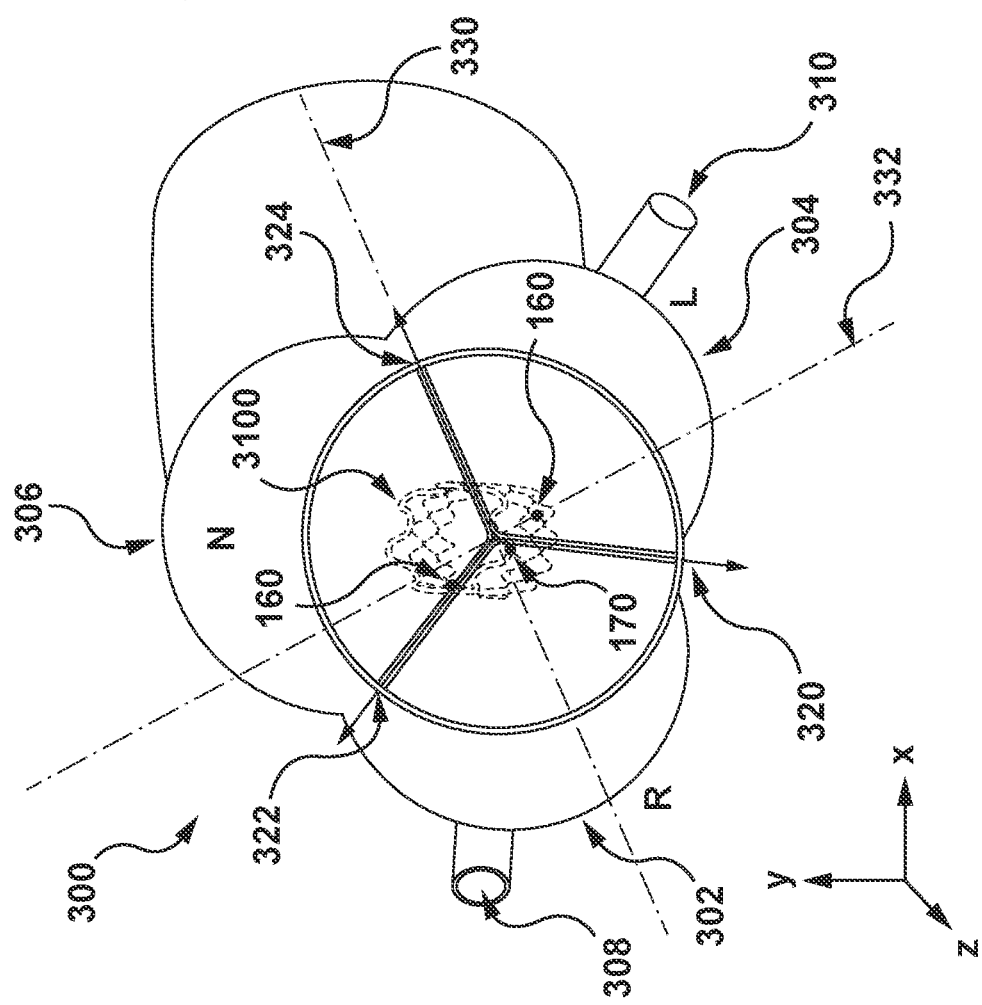
FIG. 33B
FIG. 33A

DEVICES AND METHODS FOR MULTI-ALIGNMENT OF IMPLANTABLE MEDICAL DEVICES

CROSS-REFERENCE TO RELATED APPLICATIONS

This application claims the benefit of the filing date of U.S. Provisional Application No. 63/069,796, filed Aug. 25, 2020 and U.S. Provisional Application No. 63/071,634, filed Aug. 28, 2020, both of which are incorporated herein by reference in their entirety.

FIELD

The present technology is generally related to medical devices and, in particular, to transcatheter heart valve prostheses.

BACKGROUND

Currently, implantable medical devices, such as stents, scaffolds, and other cardiac intervention devices are utilized to repair or replace problem native biological systems. For example, heart valve replacement in patients with severe valve disease is a common surgical procedure. The replacement can conventionally be performed by open heart surgery, in which the heart is usually arrested and the patient is placed on a heart bypass machine. In recent years, a heart valve prosthesis has been developed which are implanted using minimally invasive procedures such as transapical or percutaneous approaches. These procedures involve compressing the heart valve prosthesis radially to reduce its diameter, inserting the heart valve prosthesis into a delivery device, such as a catheter, and advancing the delivery device to the correct anatomical position in the heart. Once properly positioned, the heart valve prosthesis is deployed by radial expansion within the native valve annulus.

While these procedures are substantially less invasive than open heart surgery, the lack of line-of-sight visualization of the heart valve prosthesis and the native valve presents challenges, because the physician cannot see the actual orientation of the heart valve prosthesis during the implantation procedure. Correct positioning of the heart valve prosthesis is achieved using radiographic imaging, which yields a two-dimensional image of the viewed area. The physician must interpret the image correctly in order to properly place the prosthetic heart valve in the desired position. Failure to properly position the heart valve prosthesis sometimes leads to migration of the prosthetic heart valve or to improper functioning. Proper placement of the heart valve prosthesis using radiographic imaging is thus critical to the success of the implantation.

SUMMARY

The techniques of this disclosure generally relate to a delivery system for delivering and installing an implantable medical device at an implant location (e.g., target site). The delivery system utilizes implant markers that provide a visual indication of both an axial position of the implantable medical device and an orientation of the implantable medical device (e.g., tilt, rotation, etc.) The implant markers allow an operator of the delivery system to pinpoint the deployed location of the implantable medical device at the target site.

In one aspect, the present disclosure provides a transcatheter valve prosthesis. The transcatheter valve prosthesis includes a stent having a crimped configuration for delivery within a vasculature and an expanded configuration for deployment within a native heart valve. The stent includes an inflow portion, an outflow portion, and at least one commissure post positioned at least partially in the outflow portion of the stent. The transcatheter valve prosthesis includes an inflow marker positioned within the inflow portion of the stent, the inflow marker including a first radiopaque material. The transcatheter valve prosthesis includes an outflow marker positioned on the at least one commissure post, the outflow marker including a second radiopaque material. The first radiopaque material and the second radiopaque material cause the inflow marker and the outflow marker to be visible relative to the stent in one or more images captured during the installation at the implant location.

In another aspect, in combination with any of the other aspects, the outflow marker is utilized to align the at least one commissure post with a commissure of a non-coronary cusp and a left coronary cusp of the native heart valve.

In another aspect, in combination with any of the other aspects, the inflow marker is positioned at a location of the inflow portion of the stent that does not bend, and the outflow marker is located at a location of the outflow portion that does not bend.

In another aspect, in combination with any of the other aspects, the inflow marker and the outflow marker are circumferentially offset by approximately sixty degrees.

In another aspect, in combination with any of the other aspects, the inflow marker and the outflow marker are circumferentially offset by a range of approximately forty-five degrees to approximately seventy-five degrees.

In another aspect, in combination with any of the other aspects, the inflow marker and the outflow marker are circumferentially offset by approximately one-hundred eighty degrees.

In another aspect, in combination with any of the other aspects, the inflow marker and the outflow marker are circumferentially offset by a range of approximately one-hundred sixty-five degrees to approximately one-hundred ninety-five degrees.

In another aspect, the present disclosure provides a transcatheter valve prosthesis including a stent having a crimped configuration for delivery within a vasculature and an expanded configuration for deployment within a native heart valve, wherein the stent includes an inflow portion, an outflow portion, and at least one commissure post positioned at least partially in the outflow portion of the stent. The transcatheter valve prosthesis further includes a first inflow marker and a second inflow marker positioned within the inflow portion of the stent, the first inflow marker and the second inflow marker comprising a first radiopaque material. The transcatheter valve prosthesis further includes an outflow marker positioned on the at least one commissure post, the outflow marker comprising a second radiopaque material. The first radiopaque material and the second radiopaque material cause the first inflow marker, the second inflow marker, and the outflow marker to be visible relative to the stent in one or more images captured during the installation at the native heart valve.

In another aspect, in combination with any of the other aspects, the outflow marker is utilized to align the at least one commissure post with a commissure of a right coronary cusp and a left coronary cusp the native heart valve.

In another aspect, in combination with any of the other aspects, at least one of the first inflow marker or the second inflow marker is positioned at a location of the inflow portion of the stent that does not bend, the outflow marker is located at a location of the outflow portion that does not bend.

In another aspect, in combination with any of the other aspects, the first inflow marker and the outflow marker are circumferentially offset by approximately sixty degrees, and wherein the second inflow marker and the outflow marker are circumferentially offset by approximately one-hundred twenty degrees.

In another aspect, in combination with any of the other aspects, the first inflow marker and the outflow marker are circumferentially offset by a range of approximately forty-five degrees to approximately seventy-five degrees, and wherein the second inflow marker and the outflow marker are circumferentially offset by a range of approximately one-hundred five degrees to approximately one-hundred thirty-five degrees.

In another aspect, the present disclosure provides a transcatheter valve prosthesis including a stent having a crimped configuration for delivery within a vasculature and an expanded configuration for deployment within a native heart valve, wherein the stent includes an inflow portion, an outflow portion, and at least one commissure post positioned at least partially in the outflow portion of the stent. The transcatheter valve prosthesis further includes one or more inflow markers positioned within the inflow portion of the stent, the inflow marker comprising a first radiopaque material, and one or more outflow markers, the outflow marker comprising a second radiopaque material. At least one of the one or more outflow markers is positioned on the at least one commissure post, and the first radiopaque material and the second radiopaque material cause the one or more inflow markers and the one or more outflow markers to be visible relative to the stent in one or more images captured during the installation at the native heart valve.

In another aspect, in combination with any of the other aspects, at least one the one or more outflow markers is utilized to align the at least one commissure post with a commissure of a non-coronary cusp and a left coronary cusp of the native heart valve.

In another aspect, in combination with any of the other aspects, at least one of the one or more the inflow markers is positioned at a location of the inflow portion of the stent that does not bend, and at least one of the one or more outflow markers is located at a location of the outflow portion that does not bend.

In another aspect, in combination with any of the other aspects, the one or more inflow markers and the one or more outflow markers are circumferentially offset by approximately sixty degrees.

In another aspect, in combination with any of the other aspects, the one or more inflow markers and the one or more outflow markers are circumferentially offset by a range of approximately forty-five degrees to approximately seventy-five degrees.

In another aspect, in combination with any of the other aspects, the one or more inflow markers and the one or more outflow markers are circumferentially offset by approximately one-hundred eighty degrees.

In another aspect, in combination with any of the other aspects, the one or more inflow markers and the one or more outflow markers are circumferentially offset by a range of approximately one-hundred sixty-five degrees to approximately one-hundred ninety-five degrees.

In another aspect, in combination with any of the other aspects, the one or more inflow markers comprises at least two inflow markers.

In another aspect, in combination with any of the other aspects, the one or more outflow markers comprises at least two outflow markers that are positioned on the stent being offset in an axial direction.

In another aspect, in combination with any of the other aspects, the one or more outflow markers comprises at least three outflow markers, where each of the at least three outflow markers are positioned on the stent at a location that is offset in an axial direction relative to other outflow markers.

In another aspect, in combination with any of the other aspects, the stent comprises at least four circumferentially extending rows of angled struts, and a plurality of axial frame members bridging two of the circumferentially extending rows of angled struts that are closest to an outflow end. Each axial frame member has a first end closer to an inflow end and a second end closer to the outflow end, and the plurality of axial frame members comprises the at least one commissure post and a plurality of axial struts in a 1:1 ratio. Further, there is exactly one row of angled struts linking the second ends of the axial frame members and no more than one row of angled struts between the second ends of the plurality of axial frame members and the outflow end, and there are at least three rows of angled struts between the first ends of the plurality of axial frame members and the inflow end.

In another aspect, the present disclosure provides a transcatheter valve prosthesis including a stent having a crimped configuration for delivery within a vasculature and an expanded configuration for deployment within a native heart valve, wherein the stent includes an inflow portion, an outflow portion, at least one commissure post positioned at least partially in the outflow portion of the stent, a plurality of struts positioned at least partially in the outflow portion of the stent, and a plurality of crowns, each of the plurality of crowns being coupled between a pair of struts form the plurality of struts. The transcatheter valve prosthesis further includes one or more inflow markers positioned within the inflow portion of the stent, the one or more inflow markers comprising a first radiopaque material. The transcatheter valve prosthesis further includes one or more outflow markers positioned within the outflow portion, the one or more outflow markers comprising a second radiopaque material. The first radiopaque material and the second radiopaque material cause the one or more inflow markers and the one or more outflow markers to be visible relative to the stent in one or more images captured during the installation at the native heart valve.

In another aspect, in combination with any of the other aspects, at least one of the one or more outflow markers is utilized to align the at least one commissure post with a commissure a right coronary cusp and a left coronary cusp of the native heart valve.

In another aspect, in combination with any of the other aspects, at least one of the one or more inflow markers is positioned at a location of the inflow portion of the stent that does not bend, and at least one of the one or more outflow markers is located at a location of the outflow portion that does not bend.

In another aspect, in combination with any of the other aspects, the one or more inflow markers and the one or more outflow markers are circumferentially offset by approximately sixty degrees.

In another aspect, in combination with any of the other aspects, the one or more inflow markers and the one or more outflow markers are circumferentially offset by a range of approximately forty-five degrees to approximately seventy-five degrees.

In another aspect, in combination with any of the other aspects, the one or more inflow markers and the one or more outflow markers are circumferentially offset by approximately one-hundred eighty degrees.

In another aspect, in combination with any of the other aspects, the one or more inflow markers and the one or more outflow markers are circumferentially offset by a range of approximately one-hundred sixty-five degrees to approximately one-hundred ninety-five degrees.

In another aspect, in combination with any of the other aspects, the one or more inflow markers comprises at least two inflow markers.

In another aspect, in combination with any of the other aspects, the one or more outflow markers comprises at least two outflow markers that are positioned on the stent being offset in an axial direction.

In another aspect, in combination with any of the other aspects, the one or more outflow markers comprises at least three outflow markers, where each of the at least three outflow markers are positioned on the stent at a location that is offset in an axial direction relative to other outflow markers.

In another aspect, the present disclosure provides a stent for supporting a valve prosthesis. The stent includes a plurality of struts; a plurality of axial frame members; and a first containment member positioned on a first of the plurality of axial frame members. The first containment member is positioned on the first of the plurality of axial frame members at a location that is mechanically isolated from bending occurring in the stent. The first containment member is configured to house a first marker that comprises a first radiopaque material.

In another aspect, in combination with any of the other aspects, the first of the plurality of axial frame members is a commissure post.

In another aspect, in combination with any of the other aspects, the first marker is configured to align the commissure post with a commissure of a native heart valve during implantation of the stent.

In another aspect, in combination with any of the other aspects, the stent further includes a second containment member positioned on a second of the plurality of axial frame members, wherein the second containment member is positioned on the second of the plurality of axial frame members at a location that is mechanically isolated from bending occurring in the stent. The stent further includes a second marker housed in the second containment member, the second marker comprising a second radiopaque material.

In another aspect, in combination with any of the other aspects, the first of the plurality of axial frame members is a commissure post and the second of the plurality of axial frame members is an axial strut.

In another aspect, in combination with any of the other aspects, the first containment member and the second containment member are offset in an axial direction.

In another aspect, in combination with any of the other aspects, the stent further includes, at least one second containment member positioned on at least one of the plurality of struts, wherein the at least one second containment member is positioned in an inflow portion of the stent, and at least one second marker housed in the at least one second containment member, the second marker comprising a second radiopaque material.

In another aspect, in combination with any of the other aspects, one of the at least one second containment member is circumferentially offset by approximately sixty degrees from the first containment member.

In another aspect, in combination with any of the other aspects, one of the at least one second containment member is circumferentially offset by a range of approximately forty-five degrees to approximately seventy-five degrees from the first containment member.

In another aspect, in combination with any of the other aspects, one of the at least one second containment member is circumferentially offset by approximately one-hundred eighty degrees from the first containment member.

In another aspect, in combination with any of the other aspects, one of the at least one second containment member is circumferentially offset by a range of approximately one-hundred sixty-five degrees to approximately one-hundred ninety-five degrees from the first containment member.

In another aspect, in combination with any of the other aspects, the first marker is compression fit within the first containment member.

In another aspect, in combination with any of the other aspects, the first marker is recessed within the first containment member and has a spherical outer surface shape.

In another aspect, the present disclosure provides a stent for supporting a valve prosthesis, the stent including a plurality of struts, and a first containment member positioned on an outflow crown joining a first of the plurality of struts and a second of the plurality of struts. The first containment member is positioned on the outflow crown at a location that is mechanically isolated from bending occurring in the stent, and the first containment member is configured to house a first marker that comprises a first radiopaque material.

In another aspect, in combination with any of the other aspects, the first containment member extends axially outward from the outflow crown.

In another aspect, in combination with any of the other aspects, the stent further includes at least one second containment member positioned on at least one of the plurality of struts located in an inflow portion of the stent, and at least one second marker housed in the at least one second containment member, the second marker comprising a second radiopaque material.

In another aspect, in combination with any of the other aspects, one of the at least one second containment member is circumferentially offset by approximately sixty degrees from the first containment member.

In another aspect, in combination with any of the other aspects, one of the at least one second containment member is circumferentially offset by a range of approximately forty-five degrees to approximately seventy-five degrees from the first containment member.

In another aspect, in combination with any of the other aspects, one of the at least one second containment member is circumferentially offset by approximately one-hundred eighty degrees from the first containment member.

In another aspect, in combination with any of the other aspects, one of the at least one second containment member is circumferentially offset by a range of approximately one-hundred sixty-five degrees to approximately one-hundred ninety-five degrees from the first containment member.

In another aspect, in combination with any of the other aspects, the first marker is compression fit within the first containment member.

In another aspect, in combination with any of the other aspects, the first marker is recessed within the first containment member and has a spherical outer surface shape.

In another aspect, the present disclosure provides a frame for supporting a valve structure. The frame includes a plurality of rows of angled struts, wherein each row of the plurality of rows of angled struts extends circumferentially around the frame, and each row of the plurality of rows of angled struts is arranged in an axial direction along a longitudinal axis extending between an inflow end and an outflow end of the frame. The frame further includes a plurality of window frame portions coupled between a first row of the plurality of rows of angled struts and a second row of the plurality of rows of angled struts, wherein each of the plurality of window frame portions comprises a commissure window. The frame further includes a first outflow marker positioned on a first of the plurality of window frame portions, wherein the first outflow marker comprises a first radiopaque material that is visible relative to the first of the plurality of window frame portions in one or more images captured during implantation.

In another aspect, in combination with any of the other aspects, commissures of the valve structure are coupled to the commissure windows of the plurality of window frame portions.

In another aspect, in combination with any of the other aspects, the plurality of rows of angled struts comprises four rows of the plurality of rows of angled struts arranged, in the axial direction, between the inflow end and the plurality of window frame portions, wherein the four rows of the plurality of rows of angled struts includes the second row of the plurality of rows of angled struts.

In another aspect, in combination with any of the other aspects, the first outflow marker is positioned at an intersection of the first of the plurality of window frame portions and two angled struts from the second row of the plurality of rows of angled struts.

In another aspect, in combination with any of the other aspects, the frame further includes an axial strut coupled between the first row and the second row of the plurality of rows of angled struts and positioned circumferentially adjacent to the first of the plurality of window frame portions, and a second outflow marker positioned on the axial strut, wherein the second outflow marker comprises a second radiopaque material that is visible relative to the axial strut during the one or more image captured during the implantation.

In another aspect, in combination with any of the other aspects, the first outflow marker is positioned at an intersection of the first of the plurality of window frame portions and two angled struts from the first row of the plurality of rows of angled struts, and the second outflow marker is positioned on the axial strut adjacent to an intersection of the axial strut and two angled struts from the second row of the plurality of rows of angled struts.

In another aspect, in combination with any of the other aspects, the frame further includes at least one outflow marker positioned between adjacent rows of the plurality of rows of angled struts, wherein the at least one outflow marker comprises a second radiopaque material.

In another aspect, in combination with any of the other aspects, the at least one outflow marker is positioned on an axial strut coupled between the adjacent rows of the plurality of rows of angled struts.

In another aspect, in combination with any of the other aspects, one of the at least one outflow marker is circumferentially offset by a range of approximately forty-five degrees to approximately seventy-five degrees from the first outflow marker.

In another aspect, in combination with any of the other aspects, one of the at least one outflow marker is circumferentially offset by a range of approximately one-hundred sixty-five degrees to approximately one-hundred ninety-five degrees from the first outflow marker.

In another aspect, the present disclosure provides a frame for supporting a valve structure. The frame includes a plurality of rows of angled struts, wherein each row of the plurality of rows of angled struts extends circumferentially around the frame, and each row of the plurality of rows of angled struts is arranged in an axial direction along a longitudinal axis extending between an inflow end and an outflow end of the frame. The frame further includes a plurality of window frame portions coupled between a first row of the plurality of rows of angled struts and a second row of the plurality of rows of angled struts, wherein each of the plurality of window frame portions comprises a commissure window, one or more axial struts coupled between the first row of the plurality of rows of angled struts and the second row of the plurality of rows of angled struts and positioned circumferentially between two of the plurality of window frame portions, and at least one outflow marker positioned on the one or more axial struts, wherein the at least one outflow marker comprises a first radiopaque material that is visible relative to the first of the one or more axial struts in one or more images captured during implantation.

In another aspect, in combination with any of the other aspects, commissures of the valve structure are coupled to the commissure windows of the plurality of window frame portions.

In another aspect, in combination with any of the other aspects, the plurality of rows of angled struts includes four rows of the plurality of rows of angled struts arranged, in the axial direction, between the inflow end and the plurality of window frame portions, wherein the four rows of the plurality of rows of angled struts includes the second row of the plurality of rows of angled struts.

In another aspect, in combination with any of the other aspects, the at least one outflow marker comprises a first outflow marker and a second outflow marker, and the first outflow marker and the second outflow marker are offset in the axial direction.

In another aspect, in combination with any of the other aspects, the first outflow marker and the second outflow marker are positioned on a first of the one or more axial struts.

In another aspect, in combination with any of the other aspects, the at least one outflow marker comprises a third outflow marker and a fourth outflow marker, and the first outflow marker, the second outflow marker, the third outflow marker and the fourth outflow marker are offset in the axial direction.

In another aspect, in combination with any of the other aspects, the first outflow marker, the second outflow marker, the third outflow marker and the fourth outflow marker are positioned on a first of the one or more axial struts, a second of the one or more axial struts, a third of the one or more axial struts, and a fourth of the one or more axial struts, respectively.

In another aspect, in combination with any of the other aspects, frame further includes at least one outflow marker positioned between adjacent rows of the plurality of rows of angled struts, wherein the at least one outflow marker comprises a second radiopaque material.

In another aspect, in combination with any of the other aspects, the at least one outflow marker is positioned on an axial strut coupled between the adjacent rows of the plurality of rows of angled struts.

In another aspect, in combination with any of the other aspects, one of the at least one outflow marker is circumferentially offset by a range of approximately forty-five degrees to approximately seventy-five degrees from the first outflow marker.

In another aspect, in combination with any of the other aspects, one of the at least one outflow marker is circumferentially offset by a range of approximately one-hundred sixty-five degrees to approximately one-hundred ninety-five degrees from the first outflow marker.

In another aspect, the present disclosure provides transcatheter valve prosthesis including a stent having a crimped configuration for delivery within a vasculature and an expanded configuration for deployment within a native heart valve, wherein the stent comprises an inflow portion comprising a plurality of rows of angled struts, an outflow portion including at least one row of angled struts, at least one commissure post extending between the inflow portion and the outflow portion, and at least one axial strut extending between the inflow portion and the outflow portion. The transcatheter prosthesis further includes an inflow marker positioned within the inflow portion of the stent, and a first outflow marker positioned on the at least one commissure post or the at least one axial strut. The inflow marker and the first outflow marker are configured to be visible relative to the stent in one or more images captured during installation at the native heart valve.

In another aspect, in combination with any of the other aspects, the first outflow marker is positioned on the at least one commissure post, and wherein inflow marker comprises three inflow markers aligned such that the three inflow markers are each spaced a first distance from an inflow end of the stent.

In another aspect, in combination with any of the other aspects, each of the three inflow markers are circumferentially offset from the first outflow marker such that none of the three inflow markers is axially aligned with the outflow marker.

In another aspect, in combination with any of the other aspects, the first outflow marker is positioned on the at least one commissure post, and wherein the inflow marker and the first outflow marker are circumferentially offset by approximately sixty degrees.

In another aspect, in combination with any of the other aspects, the inflow marker and the outflow marker are circumferentially offset by a range of approximately forty-five degrees to approximately seventy-five degrees.

In another aspect, in combination with any of the other aspects, wherein the inflow marker comprises two inflow markers aligned such that the two inflow markers are each spaced a first distance from an inflow end of the stent.

In another aspect, in combination with any of the other aspects, each of the two inflow markers are circumferentially offset from the inflow marker such that none of the two inflow markers is axially aligned with the first outflow marker.

In another aspect, in combination with any of the other aspects, the two inflow markers are circumferentially offset from each other by 180 degrees.

In another aspect, in combination with any of the other aspects, a first one of the two inflow markers is circumferentially offset from the first outflow marker by approximately sixty degrees.

In another aspect, in combination with any of the other aspects, a second one of the two inflow markers is circumferentially offset from the first outflow marker by approximately one hundred twenty degrees.

In another aspect, in combination with any of the other aspects, the first outflow marker is positioned on the at least one axial strut, wherein the stent further includes a second axial strut extending axially from a distal end of the inflow portion to a proximal end of the outflow portion, wherein the transcatheter valve prosthesis further comprises a second outflow marker positioned on second axial, wherein the second outflow marker is circumferentially and radially offset from the first outflow marker.

In another aspect, in combination with any of the other aspects, the second outflow marker is circumferentially offset from the first outflow marker by approximately sixty degrees.

In another aspect, in combination with any of the other aspects, the at least one inflow marker comprises two inflow markers, wherein each of the two inflow markers is circumferentially offset from each of the first and second outflow markers.

In another aspect, in combination with any of the other aspects, the at least one inflow marker is positioned between a first row of the plurality of rows of angled struts of the inflow portion adjacent an inflow end of the stent and a second row of the plurality of rows of angled struts of the inflow portion adjacent the first row, or between the second row and a third row of the plurality of rows of angled struts of the inflow portion adjacent the second row.

In another aspect, in combination with any of the other aspects, the first outflow marker is positioned on the at least one axial strut, further comprising a second outflow marker positioned on the at least one axial strut axially offset from the first outflow marker.

In another aspect, the present disclosure provides a transcatheter valve prosthesis including a stent having a crimped configuration for delivery within a vasculature and an expanded configuration for deployment within a native heart valve, wherein the stent comprises an inflow portion comprising a plurality of rows of angled struts, an outflow portion including at least one row of angled struts, at least one commissure post extending between the inflow portion and the outflow portion, and at least one axial strut extending between the inflow portion and the outflow portion. The transcatheter prosthesis further includes an inflow marker positioned within the inflow portion of the stent, and a first outflow marker positioned on a distal-most crown of the outflow portion. The inflow marker and the first outflow marker are configured to be visible relative to the stent in one or more images captured during installation at the native heart valve.

In another aspect, in combination with any of the other aspects, the first outflow marker is attached to the distal-most crown via a bar to mechanically isolate the first outflow marker from bending stresses on the stent.

In another aspect, in combination with any of the other aspects, the stent further includes a second outflow marker positioned on the at least one axial strut, wherein the first outflow marker and the second outflow marker are circumferentially offset.

In another aspect, in combination with any of the other aspects, the stent further includes a third outflow marker, wherein the third outflow marker is positioned on the at least one strut and is circumferentially aligned with the second outflow marker.

In another aspect, in combination with any of the other aspects, the distal-most crown is disposed between the at least one commissure post and the at least one axial strut.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The foregoing and other features and advantages of the present disclosure will be apparent from the following description of embodiments hereof as illustrated in the accompanying drawings. The accompanying drawings, which are incorporated herein and form a part of the specification, further serve to explain the principles of the present disclosure and to enable a person skilled in the pertinent art to make and use the embodiments of the present disclosure. The drawings are not to scale.

FIGS. 1A-1F illustrate several views of a transcatheter valve prosthesis in accordance with an embodiment hereof.

FIGS. 2A and 2B illustrate simplified top views of the transcatheter valve prosthesis of FIGS. 1A-1C in accordance with an embodiment hereof.

FIGS. 3A-3D illustrate various views of a target site for the transcatheter valve prosthesis of FIGS. 1A-1C in accordance with an embodiment hereof.

FIGS. 5A and 5B illustrate simplified top views of the transcatheter valve prosthesis of FIGS. 4A-4C in accordance with an embodiment hereof.

FIGS. 6A-6C illustrate various views of a target site for the transcatheter valve prosthesis of FIGS. 4A-4C in accordance with an embodiment hereof.

FIGS. 11A and 11B illustrate simplified top views of the transcatheter valve prosthesis of FIGS. 10A-10C in accordance with an embodiment hereof.

FIGS. 12A-12C illustrate various views of a target site for the transcatheter valve prosthesis of FIGS. 10A-10C in accordance with an embodiment hereof.

FIGS. 15A-15C illustrate various views of a target site for the transcatheter valve prosthesis of FIGS. 13A-13C in accordance with an embodiment hereof.

FIGS. 17A and 17B illustrate simplified top views of the valve prosthesis of FIGS. 16A and 16B in accordance with an embodiment hereof.

FIGS. 24A-24C illustrate various views of a target site for the valve prosthesis of FIGS. 22A and 22B in accordance with an embodiment hereof.

FIGS. 26A and 26B illustrate a simplified top view of the valve prosthesis of FIGS. 25A and 25B in accordance with an embodiment hereof.

FIGS. 29A and 29B illustrate a simplified top view of the valve prosthesis of FIGS. 28A and 28B in accordance with an embodiment hereof.

FIGS. 30A-30C illustrate various views of a target site for the valve prosthesis of FIGS. 28A and 28B in accordance with an embodiment hereof.

FIGS. 32A and 32B illustrate a simplified top view of the valve prosthesis of FIGS. 31A and 31B in accordance with an embodiment hereof.

FIGS. 33A-33C illustrate various views of a target site for the valve prosthesis of FIGS. 31A and 31B in accordance with an embodiment hereof.

DETAILED DESCRIPTION

Figure 1A:
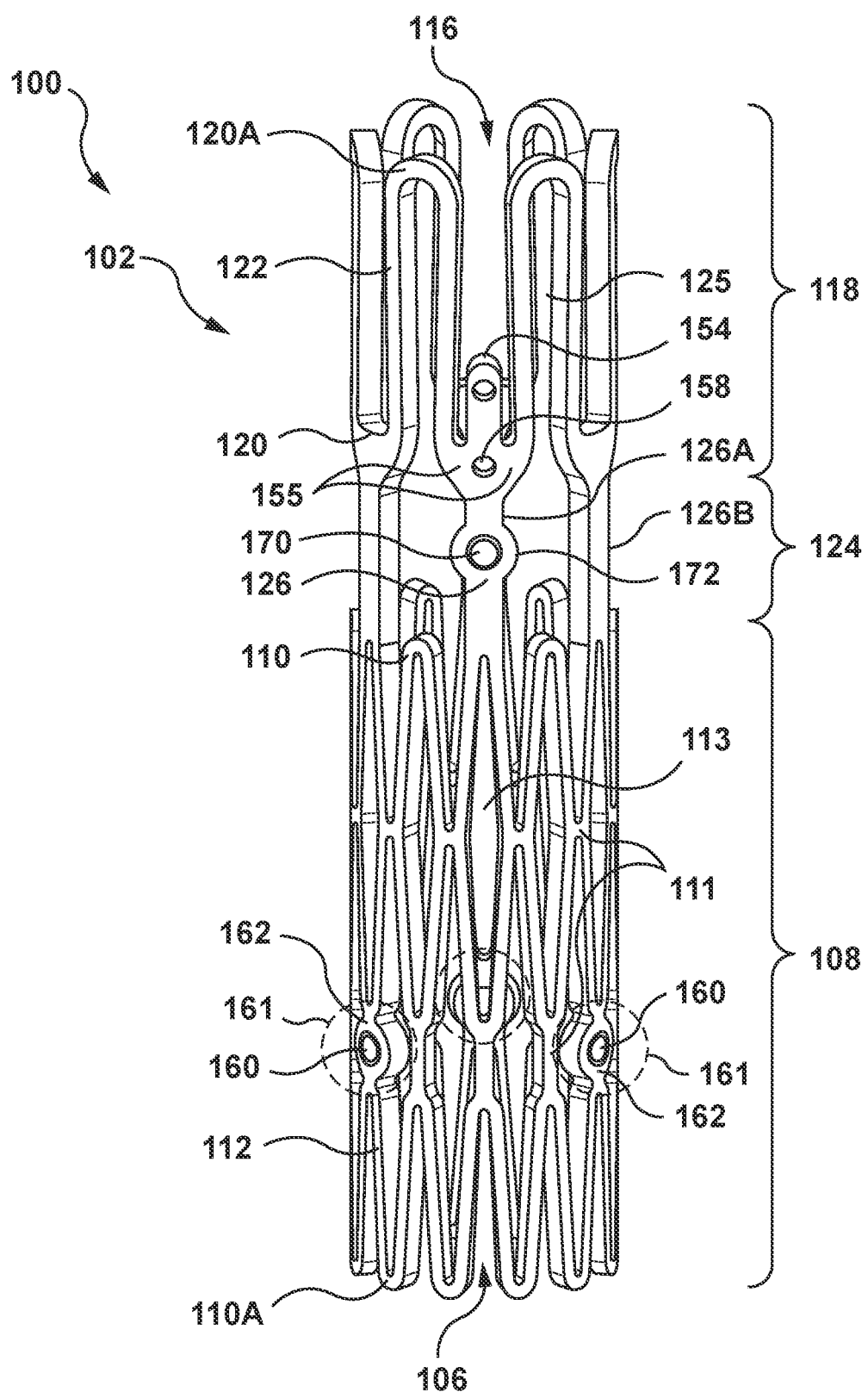

Specific embodiments of the present disclosure are now described with reference to the figures, wherein like reference numbers indicate identical or functionally similar elements.

The following detailed description describes examples of embodiments and is not intended to limit the present technology or the application and uses of the present technology. Although the description of embodiments hereof is in the context of transcatheter heart valve prosthesis, the present technology may also be used in other devices. Furthermore, there is no intention to be bound by any expressed or implied theory presented in the preceding technical field, background, brief summary or the following detailed description.

The terms "distal" and "proximal", when used in the following description to refer to a delivery system or catheter are with respect to a position or direction relative to the treating clinician. Thus, "distal" and "distally" refer to positions distant from, or in a direction away from the treating clinician, and the terms "proximal" and "proximally" refer to positions near, or in a direction toward the clinician. The terms "distal" and "proximal", when used in the following description to refer to a device to be implanted into a vessel, such as a heart valve prosthesis, are used with reference to the direction of blood flow. Thus, "distal" and "distally" refer to positions in a downstream direction with respect to the direction of blood flow, and the terms "proximal" and "proximally" refer to positions in an upstream direction with respect to the direction of blood flow.

Embodiments of disclosed herein are directed to a delivery system for delivering and implanting an implantable medical device at an implantation location. In embodiments, the delivery system utilizes multiple implant markers for positioning and orienting the implantable medical device. The delivery system utilizes the implant markers that assist in the orientation of the implantable medical device. The implant markers are positioned on the implantable medical device such that the implant markers provide a visual indication that the implantable medical device is properly oriented. The implant markers can include radiopaque materials that are visible on radiographic imaging systems.

FIGS. 1A-1F illustrate a transcatheter valve prosthesis 100 in which a radially-expandable frame or stent 102 thereof includes a single inflow marker 160 that is located at one of several potential locations 161 and an outflow marker 170, according to embodiment hereof. In embodiments, the inflow marker 160 and the outflow marker 170 can be utilized in orientation (e.g., axial alignment, tilt alignment, circumferential (rotational) alignment, etc.) of the transcatheter valve prosthesis 100, in situ, as discussed in detail below.

One skilled in the art will realize that FIGS. 1A-1F illustrate one example of an implantable medical device and that existing components illustrated in FIGS. 1A-1F may be removed and/or additional components may be added. Additionally, while the transcatheter valve prosthesis 100 is described below as including the single inflow marker 160 and the outflow marker 170, one skilled in the art will realize that the transcatheter valve prosthesis 100 can include additional markers, for example, any of the markers described herein. Moreover, while examples of operations and advantages of the transcatheter valve prosthesis 100, the inflow marker 160 and the outflow marker 170 are discussed below, one skilled in the art will realize any of the operations and processes described herein can be performed using the transcatheter valve prosthesis 100.

Figure 1B:
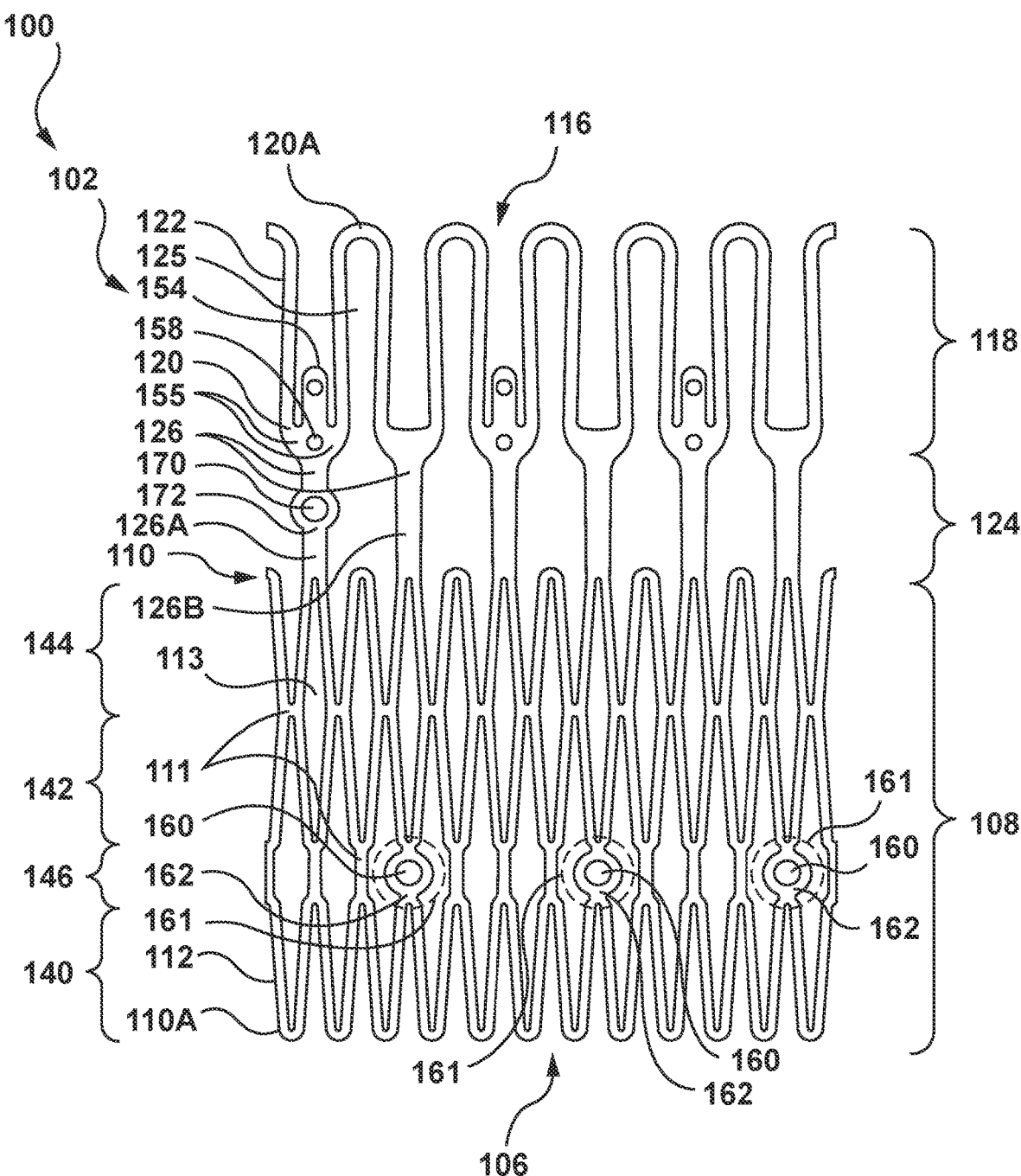
Figure 1C:
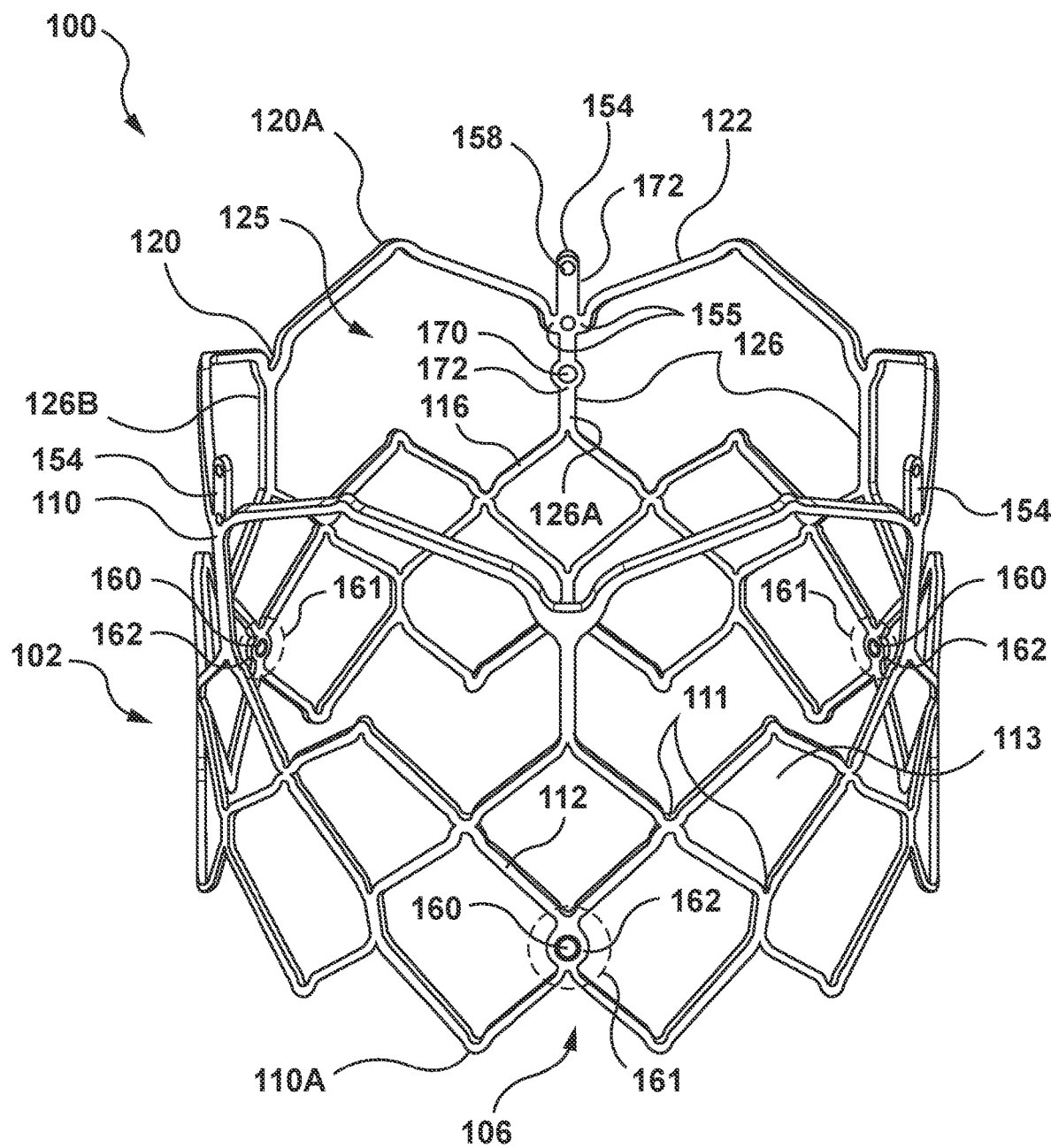

The stent 102 has a non-expanded or crimped configuration, which is shown in a side view of FIG. 1A, and an expanded configuration, which is shown FIG. 1C. "Non-expanded" or "crimped" configuration as used herein refers to the configuration of the stent 102 after crimping. For example, the stent 102 can be crimped onto a balloon of a balloon catheter for delivery. In some embodiments, the stent 102 can be mechanically or balloon expandable. As such, the stent 102 can be made from a plastically deformable material such that, when expanded by a dilatation balloon, the stent 102 maintains its radially expanded configuration after balloon deflation. The stent 102 can be formed from stainless steel or other suitable metal, such as platinum iridium, cobalt chromium alloys such as MP35N, or various types of polymers or other materials known to those skilled in the art, including said materials coated with various surface deposits to improve clinical functionality. In some embodiments, the stent 102 can be self-expanding.

In embodiments, the stent 102 includes an inflow portion 108, an outflow portion 118, and a transition portion 124 bridging, connecting, or otherwise extending between the inflow portion 108 and the outflow portion 118. The stent 102 can be a generally tubular component defining a central lumen or passageway and can have an inflow or proximal end 106 and an outflow or distal end 116. In some embodiments, when expanded, a diameter of the inflow end 106 of the stent 102 can be the same as a diameter of the outflow end 116 of the stent 102. The stent 102 can be formed by a laser-cut manufacturing method and/or another conventional stent forming method as would be understood by one of ordinary skill in the art. The cross-section of the stent 102 can be trapezoidal, circular, ellipsoidal, rectangular, hexagonal, square, or other polygonal shape, although at present it is believed that trapezoidal, circular or ellipsoidal may be preferable when utilized with the replacement of an aortic valve. FIG. 1B shows an open, flat view of an example of the stent 102.

The stent 102 can be configured to be rigid such that it does not deflect or move when subjected to in-vivo forces, or such that deflection or movement is minimized when subjected to in-vivo forces. In an embodiment, the radial stiffness (i.e., a measurement of how much the stent 102 deflects when subjected to in-vivo forces) of the stent 102 can be between 80 N/m and 120 N/m, and the radial stiffness of the stent 102 scaled across the deployed height thereof is approximately 5 N/mm$^2$. In an embodiment, the radial stiffness of the stent 102 can be greater than 100 N/m. Further, in an embodiment, the device recoil (i.e., a measurement of how much the stent 102 relaxes after balloon deployment) can below 15% and the approximate recoil after deployment is between 0.5 mm and 2 mm. Further, in an embodiment, the device crush or yield (i.e., the radial force at which the stent 102 yields) can be approximately 200 N. While the above describes examples of radial stiffness for the stent 102, one skilled in the art will realize that the stent 102 may have any radial stiffness as required by a given application and/or governed by the design and construction of the stent 102.

Figure 1D:
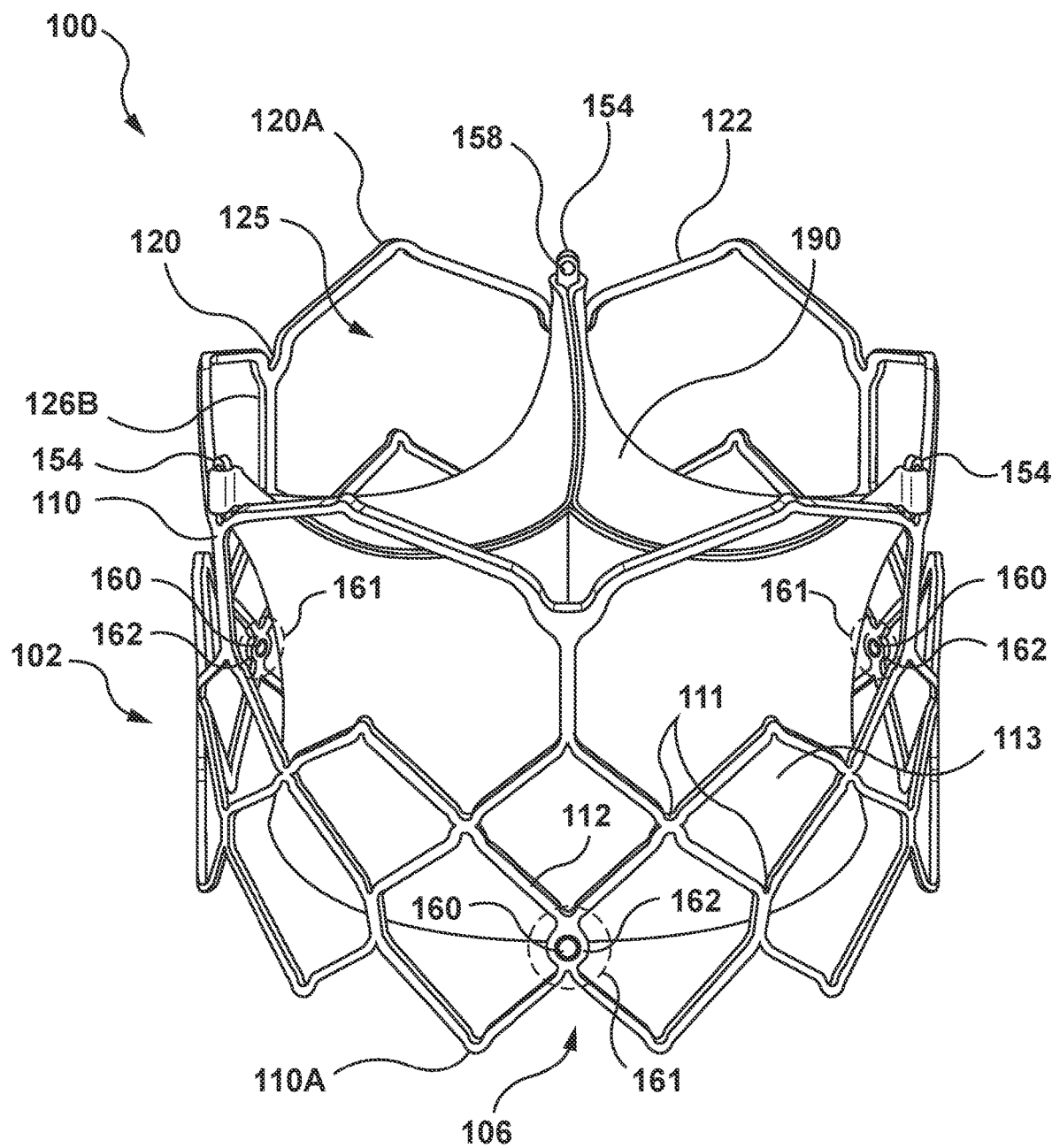

A prosthetic valve 190 is disposed within and secured to at least the transition portion 124 of the stent 102, as illustrated in FIG. 1D. In addition, the prosthetic valve 190 can also be disposed within and secured to the inflow portion 108 of the stent 102 and/or the outflow portion 118 of the stent 102. One skilled in the art will realize that the prosthetic valve 190 can be disposed within and secured to one or more of the inflow portion 108, outflow portion 118, or the transition portion 124, for example, depending on the design and construction of the prosthetic valve 190 and/or the design and construction of the stent 102.

The inflow portion 108 can be formed proximate to the inflow end 106 of the stent 102. The inflow portion 108 of the stent 102 may be formed with crowns 110, struts 112, and nodes 111 formed at an intersection of pairs of struts 112. In some embodiments, the inflow end 106 of the stent 102 can include a total of twelve endmost inflow crowns 110A. Pairs of the struts 112, coupled at the nodes 111, form a cell 113 that define an open space in the stent 102.

The outflow portion 118 can be formed proximate to the outflow end 116 of the stent 102. The outflow portion 118 can be configured in a shape that forms a central lumen or passageway, for example, a ring. The outflow portion 118 can include a plurality of crowns 120 and a plurality of struts 122 with each crown 120 being formed between a pair of opposing struts 122. Each crown 120 can be a curved segment or bend extending between opposing struts 122. A series of endmost outflow crowns 120A are formed at the outflow end 116 of the stent 102. In some embodiments, the outflow end 116 of the stent 102 can have a total of six endmost outflow crowns 120A.

The transition portion 124 bridges, connects, or otherwise extends between the inflow portion 108 and the outflow portion 118. In some embodiments, the transition portion 124 can include a minimum of three axial frame members 126, each axial frame member 126 extending between a crown 120 of the outflow portion 118 and a crown 110 of the inflow portion 108. Each axial frame member 126 can be connected to a crown 120 of the outflow portion 118 and connected to a crown 110 of the inflow portion 108. The axial frame members 126 can be substantially parallel to the central longitudinal axis of the stent 102. Each axial frame member 126 can be disposed approximately halfway between a pair of adjacent endmost outflow crowns 120A. While the stent 124 has been described as including a transition portion 124, one skilled in the art will realize that the transition portion 124 may form a portion of the inflow portion 108 and/or the outflow portion 118

In an embodiment, the transition portion 124 can include up to six axial frame members 126, with three of the axial frame members 126 being commissure posts 126A and three of the axial frame members 126 being axial struts 126B. The commissure posts 126A and the axial struts 126B can be being alternatingly positioned, as illustrated, for example, in FIG. 1B. The commissure posts 126A can be circumferentially spaced apart and aligned with and attached to a respective commissure of three leaflets of the prosthetic valve, and the axial struts 126B can be disposed between adjacent commissure posts 126A. The axial frame members 126 may aid in valve alignment and coaptation. More particularly, the axial frame members 126 reinforce or strengthen the commissure region of the prosthetic valve by shaping the leaflets and supporting the leaflets during opening and closing thereof, and thus provide more reliable leaflet coaptation. In addition, the axial frame members 126 maximize symmetrical cell expansion.

In an embodiment, the endmost outflow crowns 120A are not connected to the axial frame members 126 but rather may be considered to be free or unattached while the remaining outflow crowns 120 of the outflow portion 118 are connected to the axial frame members 126 and disposed closer to the inflow end 106 than the endmost outflow crowns 120A. In the embodiment shown, the stent 102 includes a single row of struts 122 and crowns 120 coupled to the axial frame members 126 and defining the outflow end 116 of the stent 102. Further, in the embodiment shown, exactly two struts 122 and a single crown 120 of the outflow portion 118 are disposed between adjacent axial frame members 126. Such an arrangement can provide a series of six endmost cells 125 formed at the outflow portion 118 of the stent 102.

In embodiments, each endmost cell 125 can define an open space in the stent 102, which is formed in any type of shape, in the radially expanded configuration, for example, as shown in FIG. 1C. Each endmost cell 125 can be defined by two adjacent struts 122 of the outflow portion 118, four adjacent struts 112 of the inflow portion 108, and two adjacent axial frame members 126 of the transition portion 124. The endmost cells 125 of the outflow portion 118 can be relatively larger than the cells 113 of the inflow portion 108 to improve access to the coronary arteries when used for aortic valve replacement. More particularly, the endmost cells 125 of the outflow portion 118 can be configured to be of sufficient size to be easily crossed with a coronary guide catheter into either the right coronary artery or the left main coronary artery once the transcatheter valve prosthesis 100 is deployed, in situ.

In an embodiment, the inflow portion 108 can include exactly three rows of struts 112 and crowns 110 between the axial frame members 126 and the inflow end 106 of the stent 102. Further, in this embodiment, the four struts 112 and three crowns 110 can be disposed circumferentially between adjacent axial frame members 126. One skilled in the art will realize that the above configuration of the inflow portion 108 is one example of a configuration of the inflow portion 108 and that the inflow portion 108 can include fewer or additional rows of struts 112 and crowns 110. Likewise, one skilled in the art will realize that each row can include fewer or additional numbers of struts 112 and crowns 110.

In an embodiment, a height or length of the stent 102 in the expanded configuration can be between 14 and 23 mm, the height being measured from the most proximal part thereof to the most distal part thereof, and a diameter of the stent 102 in the expanded configuration can be between 18 and 31 mm. For example, an expanded 21 mm diameter device would be 15 mm in height. An expanded 30 mm diameter device would have a 21 mm height. Additionally, one skilled in the art will realize that the ranges of the height and diameter of the stent 102 are examples and that the height and diameter of the stent 102 may vary based on an amount of expansion of the stent 102, for example, as required by a given application and/or governed by the design and construction of the stent 102.

In an embodiment, the axial frame members 126 can include commissure posts 126A that are formed to have an axial length greater than the axial struts 126B. In this embodiment, a first end of each of the axial struts 126B, which is closer to the inflow end 106, can be coupled to a pair of struts 112 of the inflow portion 108 or a crown 110 of the inflow portion 108. A second end of each of the axial struts 126B, which is closer to the outflow end 116, can be coupled to a pair of the struts 122 of the outflow portion 118. A first end of each of the commissure posts 126A, which is closer to the inflow end 106, can be coupled to a pair of the struts 112 of the inflow portion or a crown 110 of the inflow portion. Because the commissure posts 126A are longer than the axial struts 126B, pairs of struts 122 of the outflow portion 118 are coupled to the commissure posts 126A at side portions 155 of the commissure posts 126A (e.g., an intersection of the commissure posts 126A and struts 122). The location of the connection to the side portions 155 is spaced a distance, in the direction of the inflow end 106, from the second end of the commissure posts 126A, which is closer to the outflow end 116. In other words, each commissure posts 126A can be a relatively stiff, axial segment or planar bar having the first end connected to a pair of struts 112 at a crown 120 of the inflow portion 108 and having an unattached or free second end distal of the side portions 155. As such, the connection of the struts 122 to the side portions 155 defines an outflow portion 154 of each commissure post 126A, which is positioned in the outflow portion 118.

The outflow portions 154 can be configured as support features that allow for lengthened commissure posts 126A to further reinforce or strengthen the commissure region of the transcatheter valve prosthesis 100. Each of the outflow portions 154 can extend into the outflow portion 118 of the stent 102 to allow for lengthened commissure posts 126A without increasing the overall height of the transcatheter valve prosthesis 100. In an embodiment, the stent 102 can include a total of three commissure posts 126A, which include three outflow portions 154. The commissure posts 126A, which include the outflow portions 154, one for each commissure post 126A, can extend substantially parallel to the central longitudinal axis of the stent 102 and are circumferentially spaced apart from each other. The commissure posts 126A, which include the outflow portions 154, can include holes or openings 158 formed therein configured to attach a respective commissure of the three leaflets of the prosthetic valve to the stent 102. Additionally, in some embodiments, the commissure posts 126A, which include the outflow portions 154, can include one or more holes or openings to support alignment markers, as described further below. One skilled in the art will realize that the above configuration of the outflow portions 154 is one example of a configuration and that the stent 102 can include additional outflow portions 154 based on the design or configuration of the stent 102.

As discussed above, the commissure posts 126A can be formed to be lengthened relative to the axial struts 126B. The commissure posts 126A can reduce stresses observed at the commissure region during valve loading by spreading out such stresses across a larger area. More particularly, as compared to self-expanding valve stents, balloon expandable valves stents are stiffer and stronger but therefore may place more stress on the valve leaflets attached thereto attached to the stent 102. The valve leaflets, which are often formed from tissue, are more durable when the portion of the stent to which they are attached is more flexible, but such stent flexibility may be detrimental to stent fatigue. As such, the commissure posts 126A achieve a balance between stent durability and tissue durability because the stent 102 maintains its strength and durability while the lengthened commissure supports improve or increase tissue durability of the valve leaflets by stress relief due to the lengthened commissure supports.

Further, the performance of the transcatheter valve prosthesis 100 may be enhanced by the lengthened commissure posts 126A without increasing the overall height of the transcatheter valve prosthesis 100. For example, in the unexpanded or compressed configuration, as illustrated in FIG. 1A, the outflow portions 154 of the commissure posts 126A extend into the outflow portion 118, but do not extend beyond the endmost outflow crowns 120A. In the expanded or uncompressed configuration, as illustrated in FIG. 1C, the outflow portions 154 of the commissure posts 126A extend into the outflow portion 118, but do not extend beyond the endmost outflow crowns 120A. In other words, the length of the commissure post 126A is increased without increasing the length of the transition portion 124 and the overall height of the transcatheter valve prosthesis 100. A relatively short or minimized overall height can be desirable to increase coronary access and improve system deliverability. In another embodiment hereof (not shown), the stent 100 can include additional commissure posts 126A, which include the outflow portions 154. Inclusion of additional commissure posts 126A, which include the outflow portions 154, may aid in valve alignment and coaptation.

In embodiments, the transcatheter valve prosthesis 100 can be configured to allow the cells 113 to expand symmetrically. Symmetrical cell expansion may ensure that the stent 102 crimps well onto a balloon of a balloon catheter for delivery. This can address poor crimp quality that may lead to portions of the stent 102 overlapping when crimped, which in turn may cause tissue damage to the valve leaflets of the prosthetic valve during the crimping process.

In embodiments, to ensure the proper placement in the native anatomy of a subject, the transcatheter valve prosthesis 100 can include the inflow marker 160 that is located at one of the potential locations 161 and the outflow marker 170. The outflow marker 170 can operate to assist in rotational orientation of the stent 102, as described below. Additionally, the outflow marker 170 can operate as a guide for determining a front or rear location the outflow marker 170 in 2D image during implantation, as described below. In embodiments, the outflow marker 170 can be positioned on one of the commissure posts 126A, for example, in the outflow portion 118 or the transition portion 124.

In an embodiment, the outflow marker 170 can be positioned on the outflow portion 118 of a commissure post 126A in the outflow portion 118. In another embodiment, the outflow marker 170 can be positioned on a commissure posts 126A proximal of the outflow portion 118 of the commissure post 126A. In any embodiment, the outflow marker 170 can be attached to the stent 102 within a containment member 172 formed in a commissure post 126A. The containment member 172 can be positioned at any location along the commissure post 126A, for example, proximal to the outflow portion 118, in the center of the commissure post 126, biased towards the inflow end 106, or at any location with the transition portion 124, and the like. For example, as illustrated in FIGS. 1A-1D, the containment member 172 can be positioned on the commissure post 126A between the side portions 155 and the proximal or first end of the commissure post 126A connected to the struts 112 and crown 110 of the inflow portion 108.

FIGS. 1E and 1F illustrate enlarged views on a containment member 172 located on the commissure post 126A. In embodiments, as illustrated in FIG. 1E, which is a side view of the containment member 172, the containment member 172 is positioned on the commissure post 162A between a crown 110 of the inflow portion 108 and the side portion 155. The containment member 172 can be configured as a hollow structure or opening in the outflow portion 118 having an approximate ring shape, which can receive the outflow marker 170. In another embodiment (not shown), the outflow marker 170 can be attached to an exterior surface of the commissure post 126A at a location that does not affect the operation of the transcatheter valve prosthesis 100. For example, the outflow marker 170 can be attached to a top surface of the outflow portion 118, e.g., on an endmost crown 120A, proximal to the outflow end 116. In this example, the outflow marker 170 can be configured not to extend beyond the exterior diameter of the stent 102 or extend into the central lumen of the stent 102, e.g., having a radial depth that is equal to or less than the radial depth of the outflow portion 118.

In any embodiment, the containment member 172 can be configured in a shape that matches a shape of the outflow marker 170. For example, as illustrated in FIGS. 1A-1C and 1E, if the outflow marker 170 has a circular cross-sectional shape, the containment member 172 can define a cavity that is circular, e.g., a hollow ring. For example, FIG. 1F illustrates a cross-sectional view of the containment member 172 of FIG. 1E taken along line A. As illustrated in FIG. 1F, the hollow ring structure of the containment member 172 can include an interior sidewall 180 that reduces in diameter from an exterior surface 181 of the commissure post 126A to an interior surface 182 of the commissure post 126A. In some embodiments, the containment member 172 need not extend from an exterior or an interior of the outflow portion 118 and/or the commissure post 126A such that the containment member 172 includes a surface aligned with or recessed from (as illustrated) the exterior surface or interior surface of the stent 102. For example, as illustrated in FIG. 1F, the outflow marker 170 can be pressed fit into the containment member 172 such that the outflow marker 170 is formed having a curved shaped that extends from the interior sidewall 180 towards the exterior surface 181 of the commissure post 126A.

In some embodiments, the containment member 172 may extend from an exterior or an interior surface of the outflow portion 118 and/or the commissure post 126A. In some embodiments, the containment member 172 can be open to the interior and exterior of the stent 102, thereby allowing the outflow marker 170 to be exposed to the interior and exterior of the stent 102 and increasing visibility at multiple angles, for example, as illustrated in FIGS. 1E and 1F. In some embodiments, the containment member 172 can be open only to the interior or exterior of the stent 102, thereby forming a cavity or depression in the outflow portion 118 and/or the commissure post 126A.

In some embodiments, when placed in the containment member 172, the outflow marker 170 may be contained within the containment member 172 and may be recessed from an exterior and/or an interior surface of the outflow portion 118 and/or the commissure post 126A. In some embodiments, when placed in the containment member 172, the outflow marker 170 may be contained within the containment member 172 and may be flush with an exterior and/or an interior surface of the outflow portion 118 and/or the commissure post 126A. In some embodiments, when placed in the containment member 172, the outflow marker 170 may extend from the containment member 172 and may extend from an exterior and/or an interior surface of the outflow portion 118 and/or the commissure post 126A.

In any embodiment, the outflow marker 170 can be attached to, positioned in, and/or formed in the containment member 172 utilizing any type of processes and/or procedure. In an embodiment, radiopaque beads or spheres (or lines of radiopaque beads or spheres) may be press fit, swaged, interference fit, etc. into the containment member 172. In any embodiment, the stent 102 may not include a containment member 172. In such an embodiment, the outflow marker 170 may be attached and/or applied to the outflow portion 118 and/or the commissure post 126A. For example, the outflow marker 170 may comprise radiopaque bands that are attached to the outflow portion 118 and/or the commissure post 126A. Likewise, for example, the outflow marker 170 may be formed by applying radiopaque materials to the outflow portion 118 and/or the commissure post 126A in any shape. One skilled in the art will realize that the outflow marker 170 may be attached to or formed on the stent 102 utilizing any processes as required by the design of the stent 102 and/or application of the transcatheter valve prosthesis 100.

In any embodiment, the outflow marker 170 can be formed to dimensions such that the outflow marker 170 does not affect the operation of the transcatheter valve prosthesis 100. For example, the outflow marker 170 can be formed to not extend beyond the exterior diameter of the stent 102 or extend into the central lumen of the stent 102, e.g., having a radial depth that is equal to or less than the radial depth of the commissure post 126A. In an embodiment, the outflow marker 170 can have a circular cross-sectional shape with a diameter ranging between approximately 0.5 mm and 1.0 mm, for example, approximately 0.8 mm. In such an embodiment, the containment member 172 can have a circular cross-sectional shape with a diameter ranging between approximately 0.5 mm and 1.0 mm, for example, approximately 0.8 mm. In another embodiment, the outflow marker 170 can have an elliptical cross-sectional shape with an axial diameter ranging between approximately 0.5 mm and 1.0 mm, for example, approximately 0.8 mm, and a circumferential diameter ranging between approximately 0.5 mm and 1.0 mm, for example, approximately 0.9 mm. In this embodiment, the containment member 172 can have an elliptical cross-sectional shape with an axial diameter ranging between approximately 0.5 mm and 1.0 mm, for example, approximately 0.8 mm, and a circumferential diameter ranging between approximately 0.5 mm and 1.0 mm, for example, approximately 0.9 mm.

In an embodiment, the stent 102 includes a single inflow marker 160. The inflow marker 160 can be positioned towards the inflow end 106 of the stent 102 in the inflow portion 108. In an embodiment, as illustrated in FIGS. 1A-1D, the inflow marker 160 can be positioned at one of the potential locations 161. In an embodiment, as illustrated in FIG. 1B, the stent 102 can include three rows of the struts 112: a first row 140 of the struts 112 formed proximate to the inflow end 106, a second row 142 of the struts 112 formed between the first row 142 and a third row 144, and the third row 144 of struts 112 formed proximate to the transition portion 124. In embodiments, the potential locations 161 of the inflow marker 160 can be positioned at various locations, axially, in the inflow portion 108. The potential locations 161 of the inflow marker 160 can be at an intersection of the first row 140 and the second row 142. For example, as illustrated in FIG. 1B, the potential locations 161 of the inflow marker 160 can be positioned at an intersection 146 of a pair of the struts 112 of the first row 140 and the second row 142.

While FIGS. 1A-1D illustrate one example of the positioning and number of inflow markers 160, one skilled in the art will realize that the stent 102 can include any number of inflow markers 160, positioned at any location within the inflow portion 108. For example, the inflow marker 160 can be positioned on the struts 112. Additionally, for example, the inflow marker 160 can be positioned at different distances from the inflow end 106. In any embodiment, the inflow marker 160 may be preferably located at a lengthwise location of the stent 102 that is desired to be aligned with the annulus of the native heart valve when the transcatheter valve prosthesis 100 is deployed at the native heart valve. For example, inflow marker 160 allows for better depth positioning of the transcatheter valve prosthesis 100, in a crimped or compressed configuration, such that it can be more accurately deployed and reduce the incidence rate of requiring a permanent pacemaker (PPM) post-implantation. While FIGS. 1A-1D illustrate the stent 102 including a single inflow marker 160, one skilled in the art will realize that the stent 102 may include any number of the inflow markers 160, which are positioned at any of the potential locations 161.

As discussed above, the single inflow marker 160 can be positioned at one of the potential locations 161. FIGS. 2A and 2B illustrate simplified top views of the stent 102 from the outflow end 116, which illustrate relative positioning of the single inflow marker 160 and the outflow marker 170. In particular, FIG. 2A illustrates the stent 102 (shown as dotted lines) that includes a prosthetic valve 200 having valve leaflets with commissures 202 positioned at the commissure posts 126A. Further, FIG. 2A illustrates the circumferential positioning of the outflow marker 170 on the stent 102 relative to the potential locations 161 of the inflow marker 160 on the stent 102. FIG. 2B illustrates a potential alignment of the stent 102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 3A-3D. One skilled in the art will realize that FIGS. 2A and 2B illustrate a simplified view of the transcatheter valve prosthesis 100 and that the transcatheter valve prosthesis 100 can include additional components, for example, components described with reference to FIGS. 1A-1D.

As illustrated in FIG. 2A, when positioned on the commissure post 126A, the outflow marker 170 is positioned at a circumferential location of a commissure 202 of the valve leaflets of the prosthetic valve 200. The potential locations 161 of the inflow marker 160 can be positioned circumferentially around the stent 102 at different rotational angles relative to the outflow marker 170. For example, the potential locations 161 of the inflow marker 160 can be at sixty degrees clockwise, sixty degrees counter-clockwise, and one-hundred eighty degrees clockwise (or counter-clockwise), relative to the position of the outflow marker 170, e.g., the position of one of the commissure posts 126A.

As illustrated in FIG. 2B and discussed in further detail below with reference to FIGS. 3A-3D, the outflow marker 170 can be utilized to align circumferential or rotational orientation of the transcatheter valve prosthesis 100. More particularly, the outflow marker 170 can allow a physician to correctly interpret the circumferential orientation of the transcatheter valve prosthesis 100 and rotate the transcatheter valve prosthesis 100 relative to the anatomy to correct the circumferential or rotational orientation, if necessary, to avoid blocking native anatomy at a deployment location of the transcatheter valve prosthesis 100 (e.g., target site). For example, as illustrated in FIG. 2B, the outflow marker 170 rotationally aligns the commissures 202 of the prosthetic valve 200 of the transcatheter valve prosthesis 100 with the native valve commissures. Commissure to commissure alignment (prosthetic valve 200 commissure to native valve commissure) may improve transcatheter valve prosthesis 100 hemodynamics and leaflet durability. In an embodiment, as illustrated in FIG. 2B, the outflow marker can be utilized to align the commissure post 126A to a commissure of a left coronary cusp ("L") and non-coronary cusp ("N") of the native valve, and opposing a right coronary cusp ("R"). To align the transcatheter valve prosthesis 100, the stent 102 can rotated, in situ, by a delivery system to be positioned in a desired circumferential or rotational alignment. Additionally, by aligning the commissure post 126A to left/non-coronary commissure of the left coronary cusp and the non-coronary cusp, the commissure post 126A will avoid blocking the ostium of the left main coronary artery.

Returning to FIGS. 1A-1C, in embodiments, the inflow marker 160 can be attached to the stent 102 within a containment member 162. The containment member 162 can be configured as a hollow structure or opening in the stent 102 which can receive the inflow marker 160. In an embodiment, the containment member 162 can be open to the interior and exterior of the stent 102, thereby allowing the inflow marker 160 to be exposed to the interior and exterior of the stent 102 and increasing visibility at multiple angles. In some embodiments, the containment member 162 can be open only to the interior or exterior of the stent 102, thereby forming a cavity or depression in the stent 102.

The containment member 162 can be configured in a shape that matches a shape of the inflow marker 160. For example, as illustrated in FIGS. 1A-1C, if the inflow marker 160 have a circular cross-sectional shape, the containment member 162 can define a cavity that is circular, e.g., a hollow ring. In some embodiments, the containment member 162 need not extend from an exterior or an interior of the stent 102 such that the containment member 162 includes a surface aligned with the exterior surface or interior surface of the stent 102. In some embodiments, the containment member 162 may extend from an exterior or an interior surface of the stent 102.

In some embodiments, when placed in the containment member 162, the inflow marker 160 may be contained within the containment member 162 and may be recessed from an exterior and/or an interior surface of the stent 102. In some embodiments, when placed in the containment member 162, the inflow marker 160 may be contained within the containment member 162 and may be flush with an exterior and/or an interior surface of the stent 102. In some embodiments, when placed in the containment member 162, one or more the inflow marker 160 may be extend from the containment member 162 and may be extend from an exterior and/or an interior surface of the stent 102.

In embodiments, the inflow marker 160 can be attached to, positioned in, and/or formed in the containment member 162 utilizing any type of processes and/or procedure. In an embodiment, radiopaque beads or spheres (or lines of radiopaque beads or spheres) may be press fit, swaged, interference fit, etc. into the containment member 162. In an embodiment, the stent 102 may not include a containment member 162. In such an embodiment, the inflow marker 160 may be attached and/or applied to the stent 102. For example, the inflow marker 160 may comprise radiopaque bands that are attached to the stent 102. Likewise, for example, the inflow marker 160 may be formed by applying radiopaque materials to the stent 102 in any shape. One skilled in the art will realize that the inflow marker 160 may be attached to or formed on the stent 102 utilizing any processes as required by the design of the stent 102 and/or application of the transcatheter valve prosthesis 100.

In embodiments, the inflow marker 160 can be formed to dimensions such that the inflow markers 160 do not affect the operation of the transcatheter valve prosthesis 100. For example, the inflow marker 160 can be formed to not extend beyond the exterior diameter of the stent 102 or extend into the central lumen of the stent 102, e.g., having a radial depth that is equal to or less than the radial depth of the struts 112. In an embodiment, the inflow marker 160 can have a circular cross-sectional shape with a diameter ranging between approximately 0.5 mm and 1.0 mm, for example, approximately 0.8 mm. In this embodiment, the containment member 162 can have a circular cross-sectional shape with a diameter ranging between approximately 0.5 mm and 1.0 mm, for example, approximately 0.8 mm. In another embodiment, the inflow marker 160 can have an elliptical cross-sectional shape with an axial diameter ranging between approximately 0.5 mm and 1.0 mm, for example, approximately 0.8 mm, and a circumferential diameter ranging between approximately 0.5 mm and 1.0 mm, for example, approximately 0.9 mm. In this embodiment, the containment member 162 can have an elliptical cross-sectional shape with an axial diameter ranging between approximately 0.5 mm and 1.0 mm, for example, approximately 0.8 mm, and a circumferential diameter ranging between approximately 0.5 mm and 1.0 mm, for example, approximately 0.9 mm.

In any embodiment, the inflow marker 160 and/or the outflow marker 170 can be formed in any shape to assist in the alignment of the transcatheter valve prosthesis 100. In embodiments, as illustrated in FIGS. 1A-1C, the inflow marker 160 or the outflow marker 170 can be formed having a circular cross-sectional shape. In other embodiments, the inflow marker 160 or the outflow marker 170 can be formed in any other 2D or 3D shape, which has any type of 2D or 3D cross-sectional shape, such as pins, dots, ovals, spheres, triangles, cones, squares, cubes, bars, crosses, bands, rings, letters, and combination thereof. One skilled in the art will realize that other configurations and shapes of the inflow marker 160 or the outflow marker 170 may be provided to provide a benefit for a given application.

In any embodiment, the inflow marker 160 and/or the outflow marker 170 includes radiopaque or other material that allow the inflow marker 160 and the outflow marker 170 to be detected and/or viewed during the installation of the transcatheter valve prosthesis 100. Examples of radiopaque materials include metals, e.g., stainless steel, titanium, tungsten, tantalum, gold, platinum, platinum-iridium, and/or other polymeric materials, e.g., nylon, polyurethane, silicone, pebax, PET, polyethylene, that have been mixed or compounded with compounds of barium, bismuth and/or zirconium, e.g., barium sulfate, zirconium oxide, bismuth sub-carbonate, etc.

Figure 3C:
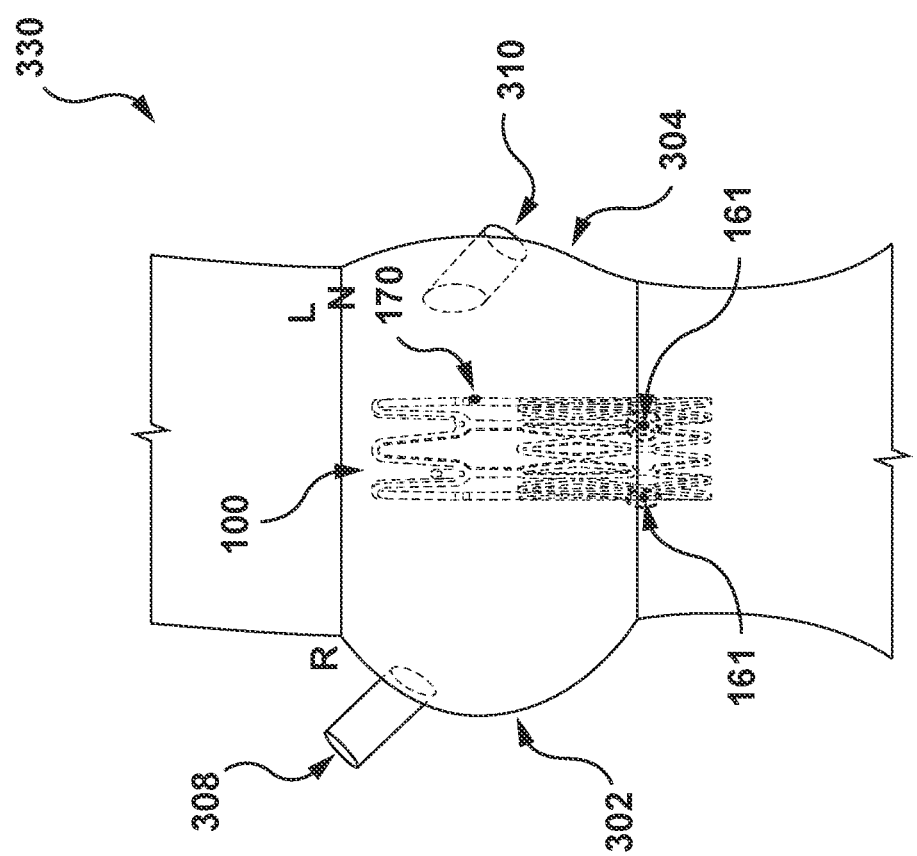

In embodiments, the inflow marker 160 and the outflow marker 170 can be utilized to orient (e.g., axial alignment, tilt alignment, circumferential (rotational) alignment, etc.) the transcatheter valve prosthesis 100, in situ, during installation as described below with reference to FIGS. 3A-3D. FIGS. 3A-3C illustrate various views of a target site 300, e.g., an aortic heart valve, of the transcatheter valve prosthesis 100. As illustrated in FIG. 3A, which is a 2-D annular view of the target site 300 taken normal to an annulus 301, the target site 300 includes three valve cusps of the aortic root, the right coronary cusp 302, the left coronary cusp 304 and the non-coronary cusp 306. The region of the right coronary cusp 302 includes the ostium of the right coronary artery 308. Likewise, the region of the left coronary cusp 304 includes the ostium of the left main coronary artery 310.

When installing the transcatheter valve prosthesis 100, it is desirable to properly align the stent 102 within the target site 300. For example, the transcatheter valve prosthesis 100 needs to be properly aligned, axially, so that the transcatheter valve prosthesis 100 properly engages the native leaflets/tissue of the target site 300, e.g., the aortic annulus, without causing conduction blockages by implanting too deep or causing an embolization of the transcatheter valve prosthesis 100 by implanting too high. Likewise, the transcatheter valve prosthesis 100 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 reduces the risk of blocking coronary access.

As illustrated in FIG. 3A, the right coronary cusp 302, the left coronary cusp 304, and the non-coronary cusp 306 include commissure regions: right/left commissure 320, right/non-coronary commissure 322, and left/non-coronary commissure 324. FIG. 3B illustrates a 2-D side view of the target site 300 taken in an image plane 332 (represented as a line in FIG. 3A). The image plane 332 is approximately perpendicular to an image plane 330 (represented as a line in FIG. 3A) in an x-direction and y-direction, and the image plane 332 extends in the z-direction (a direction normal to the 2D view of FIG. 3A). FIG. 3C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

Figure 3D:
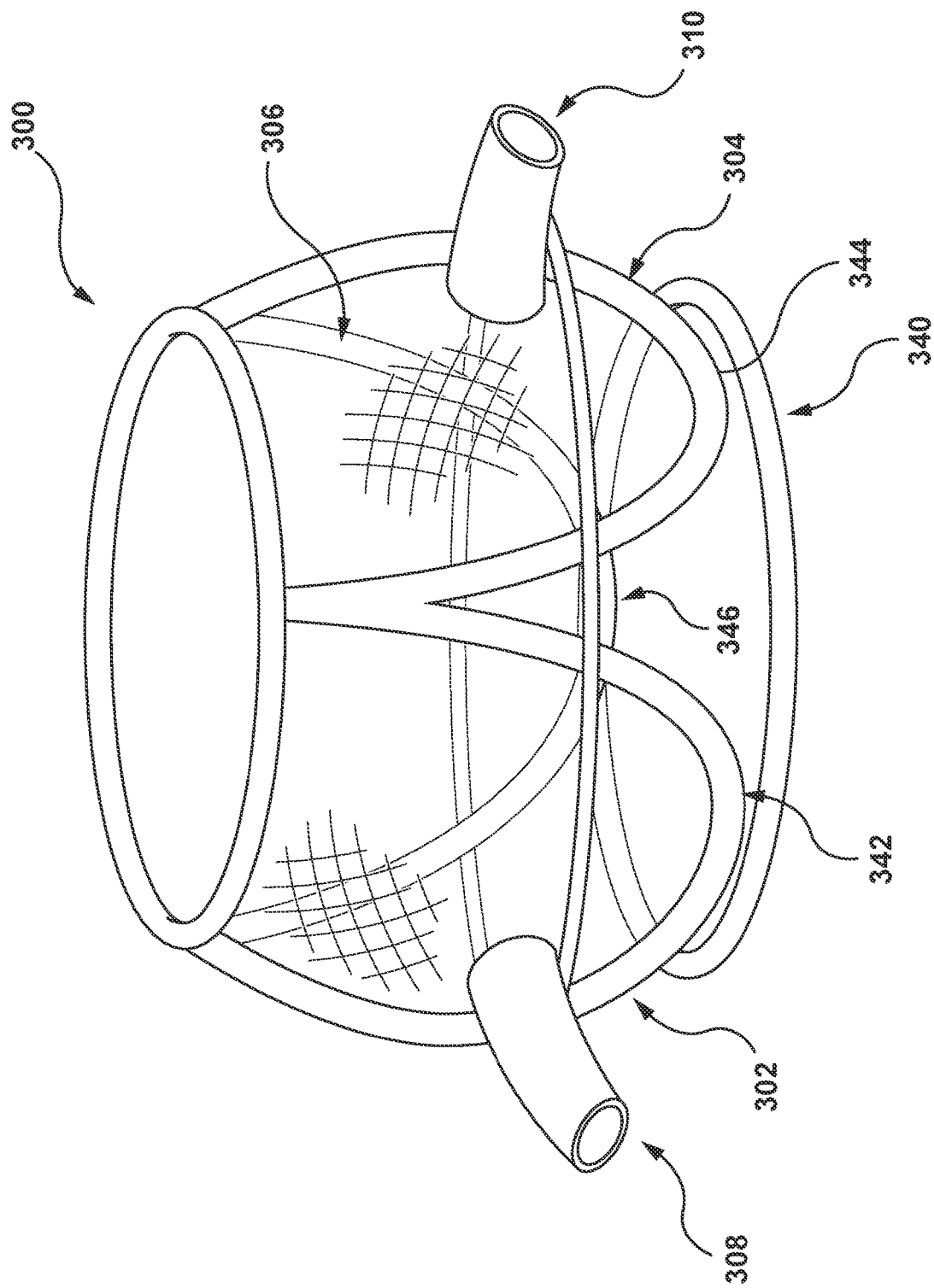

As illustrated in FIG. 3B, the inflow marker 160 can be utilized to axially align the stent 102 with features in the target site 300, e.g., basal plane 340 of the right coronary cusp 302, the left coronary cusp 304 and the non-coronary cusp 306. For example, as illustrated in FIG. 3D, which is a three dimension view of the target site 300, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 100, the stent 102, via a delivery system can be manipulated (e.g., advanced, retracted, etc.) until the inflow marker 160 aligns with the basal plane 340, as illustrated in FIG. 3B. As such, the transcatheter valve prosthesis 100 can be positioned at a proper depth within the target site 300, thereby ensuring proper engagement with the native tissue.

In embodiments, the outflow marker 170 can be utilized to align circumferential or rotational orientation of the transcatheter valve prosthesis 100. More particularly, the outflow marker 170 can allow a physician to correctly interpret the circumferential orientation of the transcatheter valve prosthesis 100 and to rotate the transcatheter valve prosthesis 100 relative to the anatomy to correct the circumferential or rotational orientation, if necessary, to avoid blocking the ostia of the right coronary artery 308 and/or the left main coronary artery 310. In addition, the outflow marker 170 enables the commissures of the valve prosthesis 190 of the transcatheter valve prosthesis 100 to be rotationally aligned with the native valve commissures. This alignment may improve transcatheter valve prosthesis 100 hemodynamics and leaflet durability. To align the transcatheter valve prosthesis 100, the stent 102 can be rotated, in situ, by a delivery system to be positioned in a desired circumferential or rotational alignment.

For example, to avoid blocking the ostium of the left main coronary artery 310, the outflow marker 170 can be positioned on the stent 102 such that for proper rotational orientation of the stent 102, the outflow marker 170 is aligned with the left/non-coronary commissure 324 of the left coronary cusp 304 and the non-coronary cusp 306. As illustrated in FIG. 3B, if viewed in the image plane 332, the outflow marker 170 can be rotated until the outflow marker 170 is centered in the image (in the rear of the stent 102), thereby indicating alignment of the commissure post 126A, which has the outflow marker 170, with the left/non-coronary commissure 324. Likewise, for example, as illustrated in FIG. 3C, if viewed in the image plane 330, the outflow marker 170 can be rotated until the outflow marker 170 appears in the right of the image, thereby indicating alignment with the left/non-coronary commissure 324. This alignment ensures that the commissure post 126A does not block the ostium of the left main coronary artery 310. Likewise, this alignment can allow the other commissure posts 126A (i.e., those without the outflow marker 170) to be aligned with the right/left commissure 320 and the right/non-coronary commissure 322, respectively. While the above describes the outflow marker 170 being aligned with the left/non-coronary commissure 324, the outflow marker 170 can be aligned with other structure at the target site 300, e.g., right/left commissure 320, right/non-coronary commissure 322, etc.

In embodiments, the outflow marker 170 can also be used as a guide to a front or rear location of the outflow marker 170 appearing in 2D image. That is, the outflow marker 170 can be utilized to determine whether the outflow marker 170 is positioned on a side of the stent 102 closest to the imaging apparatus (front location) or positioned on a side of the stent 102 furthest from the imaging apparatus (rear location). As the stent 102 is rotated, the outflow marker 170 moves right or left in the 2D images of the target site 300 depending on the front or rear location of the outflow marker 170 and the approach to the target site 300. For example, based on the transcatheter femoral approach over the aortic arch and to the target site 300, a tip of the delivery system may point in a direction opposite the direction of the handle used to rotate the stent 102 (e.g., in a direction back towards the handle), thereby causing the stent 102 to rotate in a direction opposite a direction of rotation of the handle, when viewed in a 2D image. In this example, as the handle is rotated clockwise (thereby rotating the stent 102 counter-clockwise), the outflow marker 170 may move from right to left in 2D images taken in, for example, image plane 332 (FIG. 3B), thereby indicating that the outflow marker 170 is in the front (where an emitter of the imaging device is positioned on the front side of the stent 102 and the detector is on a back side of the stent 102). As the handle is rotated clockwise (thereby rotating the stent 102 counter-clockwise), the outflow marker 170 moves from left to right in 2D images taken in the image plane 332, thereby indicating that the outflow marker 170 is in the rear (on the back side of the stent 102 relative to positioning of the imaging device). If the handle is rotated counter-clockwise (thereby rotating the stent 102 clockwise), the above movements would be reversed, e.g., left to right movement in the images would indicate front and right to left would indicate rear. While the particular movement of the outflow marker 170 is discussed above in reference to transcatheter femoral approach over the aortic arch, one skilled in the art will realize that the relative movement of the outflow marker 170 may change based on a different approach.

Figure 4A:
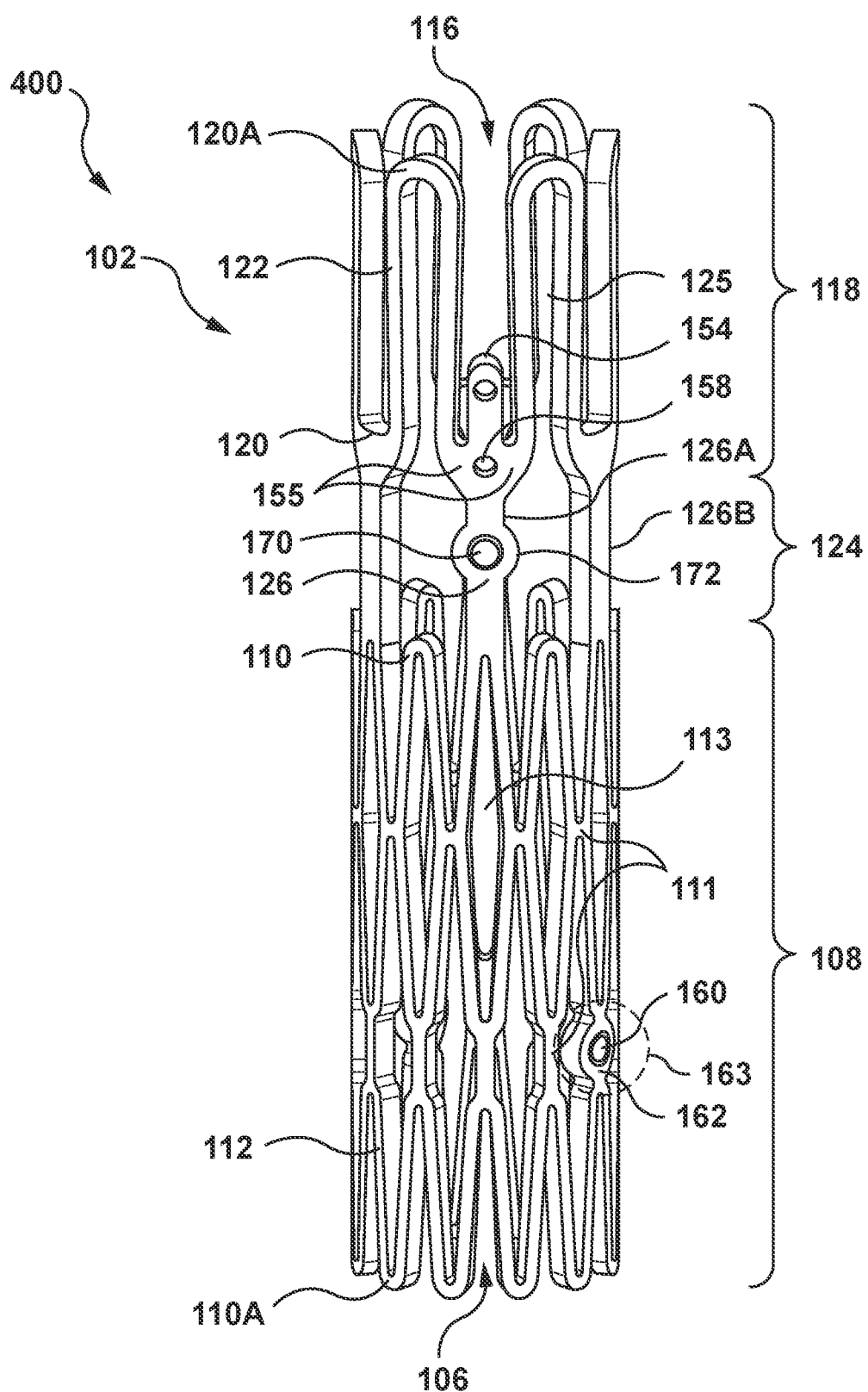
FIGS. 4A-4C illustrate several views of another transcatheter valve prosthesis in accordance with an embodiment hereof.
Figure 4B:
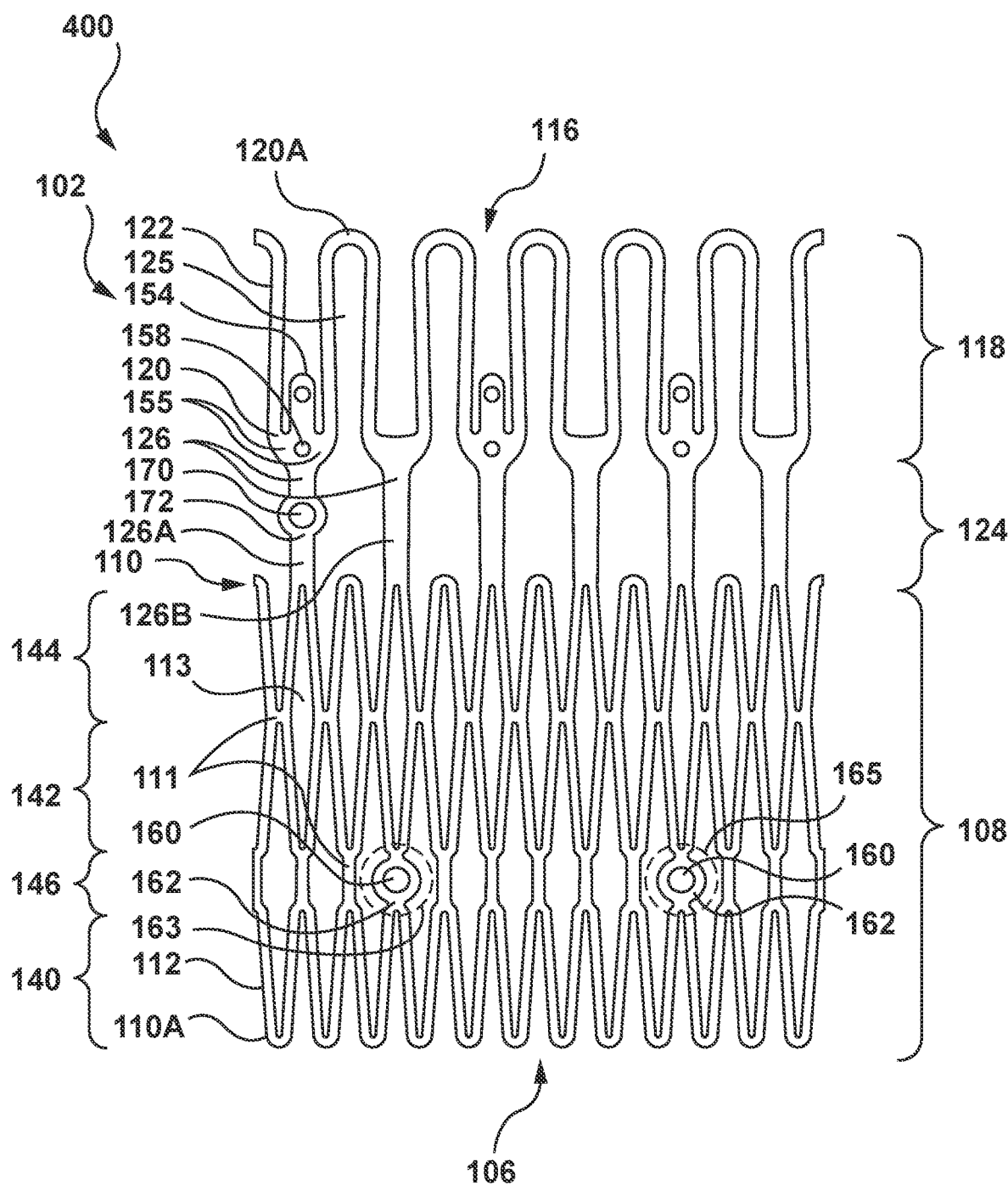
Figure 4C:
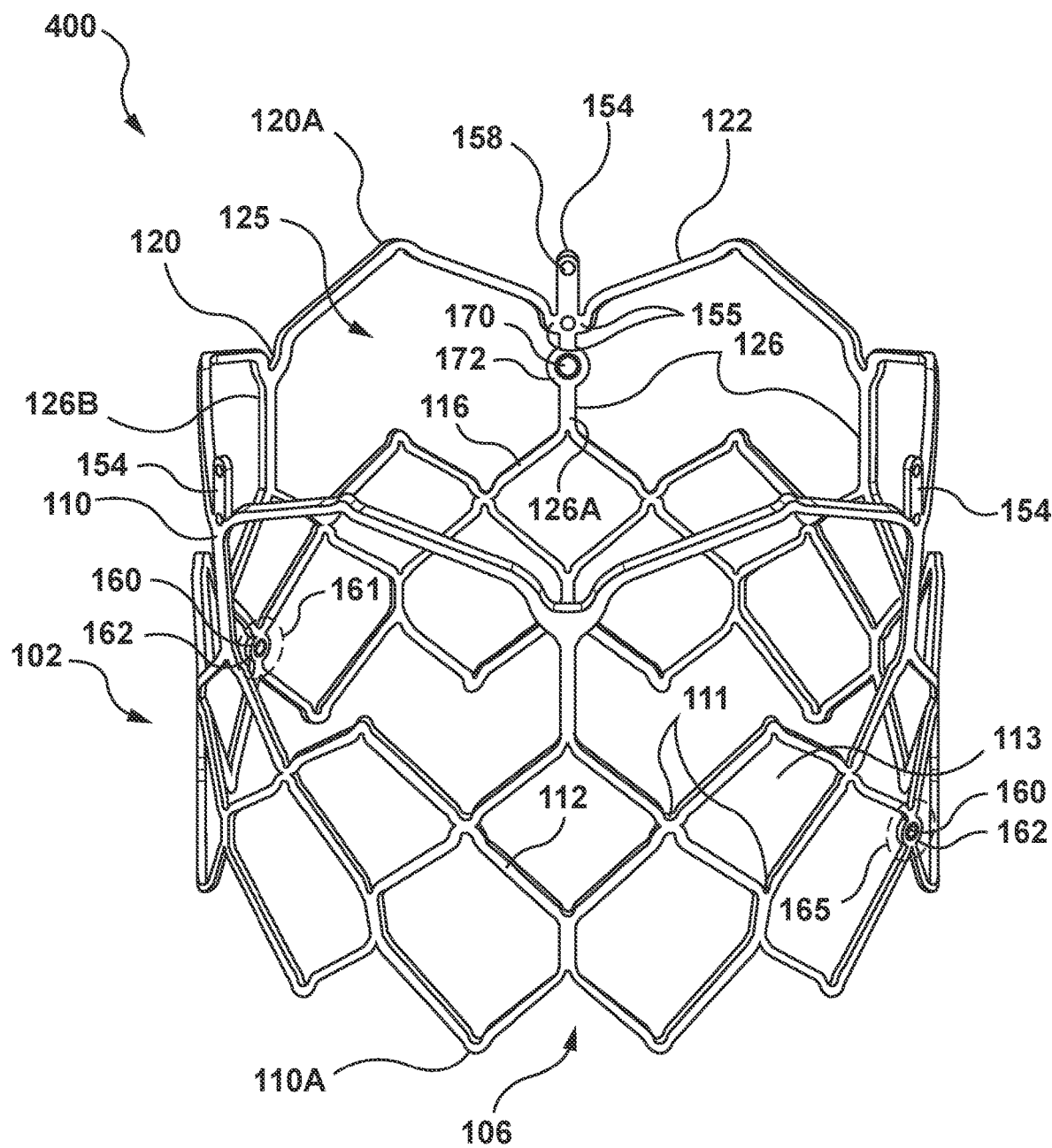

FIGS. 4A-4C illustrate a transcatheter valve prosthesis 400 in which the radially-expandable stent 102 thereof incudes an inflow marker 160 positioned at a location 163, an inflow marker 160 positioned at a location 165, and an outflow marker 170, according to another embodiment hereof. In embodiments, the two inflow markers 160 and the outflow marker 170 can be utilized in orientation (e.g., axial alignment, tilt alignment, circumferential (rotational) alignment, etc.) of the transcatheter valve prosthesis 400, in situ, as discussed in detail below.

One skilled in the art will realize that FIGS. 4A-4C illustrate one example of an implantable medical device and that existing components illustrated in FIGS. 4A-4C may be removed and/or additional components may be added. Additionally, while the transcatheter valve prosthesis 400 is described below as including two inflow markers 160 and the outflow marker 170, one skilled in the art will realize that the transcatheter valve prosthesis 400 can include additional markers, for example, any of the markers described herein. Moreover, while examples of operations and advantages of the transcatheter valve prosthesis 400, the inflow markers 160, and the outflow marker 170 are discussed below, one skilled in the art will realize any of the operations and processes described above can be performed using the transcatheter valve prosthesis 400.

As discussed above, the stent 102 of the transcatheter valve prosthesis 400 has a non-expanded or crimped configuration, which is shown in a side view of FIG. 4A, and an expanded configuration, which is shown FIG. 4C. FIG. 4B shows an open, flat view of an example of the stent 102. As illustrated in FIGS. 4A-4C, the transcatheter valve prosthesis 400 can include similar components to the transcatheter valve prosthesis 100, a description of which can be found above in the discussion of FIGS. 1A-1C.

In embodiments, to ensure the proper placement in the native anatomy of a subject, the transcatheter valve prosthesis 400 can include the inflow marker 160 that is positioned at the locations 163, the inflow marker 160 that is positioned at the location 165, and the outflow marker 170. The outflow marker 170 can operate to assist in rotational orientation of the stent 102, as described below. Additionally, the outflow marker 170 can operate as a guide for determining a front or rear location the outflow marker 170 in 2D image during implantation, as described below. In embodiments, the outflow marker 170 can be positioned on one of the commissure post 126A, for example, in the outflow portion 118 or the transition portion 124.

In an embodiment, the outflow marker 170 can be positioned on the outflow portion 154 of a commissure post 126A. In another embodiment, the outflow marker 170 can be positioned on a commissure post 126A proximal of the outflow portion 154 of the commissure post 126A. In any embodiment, the outflow marker 170 can be attached to the stent 102 within the containment member 172 formed in a commissure post 126A. A description of the containment member 172 can be found above in the discussion of FIGS. 1A-1C. Likewise, a description of a configuration of the outflow marker 170 (e.g., size, dimensions, shape, materials, etc.) can be found above in the discussion of FIGS. 1A-1C.

In an embodiment, the stent 102 includes the inflow marker 160 that is positioned at the location 163 and the inflow marker 160 that is positioned at the location 165. Either of the inflow markers 160 can be positioned towards the inflow end 106 of the stent 102 in the inflow portion 108. In an embodiment, as illustrated in FIG. 4B, the stent 102 can include three rows of the struts 112: a first row 140 of the struts 112 formed proximate to the inflow end 106, a second row 142 of the struts 112 formed between the first row 142 and a third row 144, and the third row 144 of struts 112 formed proximate to the transition portion 124. In embodiments, the location 163 and the location 165 of the inflow markers 160 can be positioned at various locations, axially, in the inflow portion 108. The location 163 and the location 165 of the inflow markers 160 can be at an intersection of the first row 140 and the second row 142. For example, as illustrated in FIG. 4B, the location 163 and the location 165 of the inflow markers 160 can be positioned at the intersection 146 of a pair of the struts 112 of the first row 140 and the second row 142. In an embodiment, the location 163 and the location 165 of the inflow markers 160 are circumferentially aligned with each other around a circumference of the stent 102.

In embodiments, the inflow markers 160 can be attached to the stent 102 within containment members 162. A description of the containment member 162 can be found above in the discussion of FIGS. 1A-1C. Likewise, a description of a configuration of the inflow markers 160 (e.g., size, dimensions, shape, materials, etc.) can be found above in the discussion of FIGS. 1A-1C.

While FIGS. 4A-4C illustrates one example of the positioning and number of inflow markers 160, one skilled in the art will realize that the stent 102 can include any number of inflow markers 160, positioned at any location within the inflow portion 108. For example, the inflow markers 160 can be positioned on the struts 112. Likewise, for example, the inflow markers 160 can be asymmetrically aligned, circumferentially, around a circumference of the stent 102, e.g., with different circumferential distances between the inflow markers 160. Additionally, for example, the inflow markers 160 can be positioned at different distances from the inflow end 106. In any embodiment, the inflow markers 160 may be preferably located at a lengthwise location of the stent 102 that is desired to be aligned with the annulus of the native heart valve when the transcatheter valve prosthesis 100 is deployed at the native heart valve. For example, the inflow markers 160 allow for better depth positioning of the transcatheter valve prosthesis 400, in a crimped or compressed configuration, such that it can be more accurately deployed and reduce the incidence rate of requiring a permanent pacemaker (PPM) post-implantation. While FIGS. 4A-4C illustrate the stent 102 including two inflow markers 160, one skilled in the art will realize that the stent 102 may include any number of the inflow markers 160, which are positioned at any location.

As discussed above, one of the inflow markers 160 can be positioned at the location 163, and one of the inflow markers 160 can be positioned at the location 165. FIGS. 5A and 5B illustrate simplified top views of the stent 102 from the outflow end 116, which illustrates relative positioning of the location 163 and the location 165 of the inflow markers 160 and the outflow marker 170. In particular, FIG. 5A illustrates the stent 102 (shown as dotted lines) that includes a prosthetic valve 200 having valve leaflets with commissures 202 positioned at the commissure posts 126A. Further, FIG. 5A illustrates the circumferential positioning of the outflow marker 170 on the stent 102 relative to the potential locations 163 and 165 of the inflow markers 160 on the stent 102. FIG. 5B illustrates a potential alignment of the stent 102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 6A-6C. One skilled in the art will realize that FIGS. 5A and 5B illustrate a simplified view of the transcatheter valve prosthesis 400 and that the transcatheter valve prosthesis 400 can include additional components, for example, components described with reference to FIGS. 4A-4C.

As illustrated in FIG. 5A, when positioned on the commissure post 126A, the outflow marker 170 is positioned at a circumferential location of a commissure 202 of the valve leaflets of the prosthetic valve 200. The location 163 and the location 165 of the inflow markers 160 can be positioned circumferentially around the stent 102 at different rotational angles relative to the outflow marker 170. For example, the location 163 of one of the inflow markers 160 can be at sixty degrees counter-clockwise relative to the position of the outflow marker 170, i.e., the position of the commissure post 126A with the outflow marker 170. Likewise, for example, the location 165 of the other inflow marker 160 can be at one-hundred twenty degrees clockwise relative to the position of the outflow marker 170, i.e., the position of the commissure post 126A with the outflow marker 170.

As illustrated in FIG. 5B and discussed in further detail below with reference to FIGS. 6A-6C, the outflow marker 170 can be utilized to align circumferential or rotational orientation of the transcatheter valve prosthesis 400. More particularly, the outflow marker 170 can allow a physician to correctly interpret the circumferential orientation of the transcatheter valve prosthesis 400 and to rotate the transcatheter valve prosthesis 400 relative to the anatomy to correct the circumferential or rotational orientation, if necessary, to avoid blocking native anatomy at a deployment location of the transcatheter valve prosthesis 400 (e.g., target site). For example, as illustrated in FIG. 5B, the outflow marker 170 rotationally aligns the commissures 202 of the prosthetic valve 200 of the transcatheter valve prosthesis 400 with the native valve commissures. Commissure to commissure alignment (prosthetic valve 200 commissure to native valve commissure) may improve transcatheter valve prosthesis 400 hemodynamics and leaflet durability. In an embodiment, as illustrated in FIG. 5B, the outflow marker 170 can be utilized to align the commissure post 126A to a commissure of a left coronary cusp ("L") and right coronary cusp ("R") of the native valve, and opposing a non-coronary cusp ("N"). To align the transcatheter valve prosthesis 400, the stent 102 can rotated, in situ, by a delivery system to be positioned in a desired circumferential or rotational alignment. Additionally, by aligning the commissure post 126A to left/right commissure of the left coronary cusp and the right coronary cusp, the commissure post 126A may avoid blocking the ostium of the left main coronary artery.

As discussed above, in embodiments, the inflow markers 160 and the outflow marker 170 can be utilized to orient (e.g., axial alignment, tilt alignment, circumferential (rotational) alignment, etc.) the transcatheter valve prosthesis 400, in situ, during installation as described below with reference to FIGS. 6A-6C. FIGS. 6A-6C illustrate various views of a target site 300, e.g., an aortic heart valve, of the transcatheter valve prosthesis 400. As illustrated in FIG. 6A, which is a 2-D annular view of the target site 300 taken normal to an annulus plane 301, the target site 300 includes three valve cusps of the aortic root, the right coronary cusp 302, the left coronary cusp 304 and the non-coronary cusp 306. The region of the right coronary cusp 302 includes the ostium of the right coronary artery 308. Likewise, the region of the left coronary cusp 304 includes the ostium of the left main coronary artery 310.

When installing the transcatheter valve prosthesis 400, it is desirable to properly align the stent 102 within the target site 300. For example, the transcatheter valve prosthesis 400 needs to be properly aligned, axially, so that the transcatheter valve prosthesis 400 properly engages the native leaflets/tissue of the target site 300, e.g., the aortic annulus without causing conduction blockages by implanting too deep or causing an embolization of the transcatheter valve prosthesis 400 by implanting too high. Likewise, the transcatheter valve prosthesis 400 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 reduces the risk of blocking coronary access.

Figure 6C:
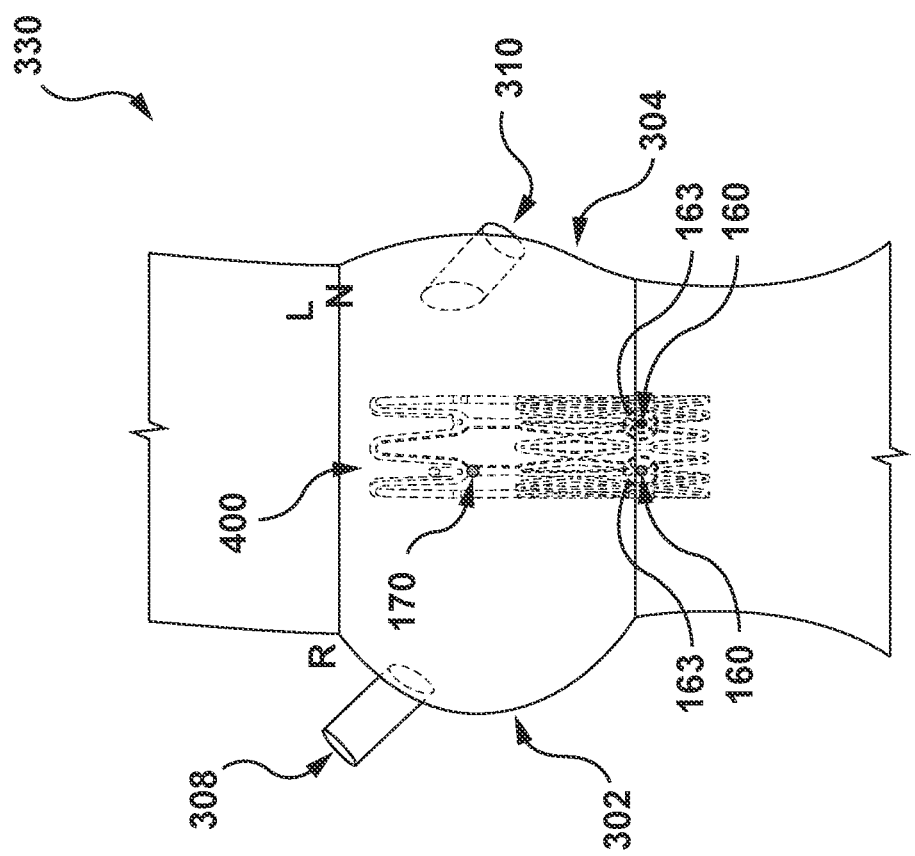

As illustrated in FIG. 6A, the right coronary cusp 302, the left coronary cusp 304, and the non-coronary cusp 306 include commissure regions: right/left commissure 320, right/non-coronary commissure 322, and left/non-coronary commissure 324. FIG. 6B illustrates a 2-D side view of the target site 300 taken in an image plane 332 (represented as a line in FIG. 6A). The image plane 332 is approximately perpendicular to an image plane 330 (represented as a line in FIG. 6A) in an x-direction and y-direction, and the image plane 332 extends in the z-direction (a direction normal to the 2D view of FIG. 6A). FIG. 6C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

As illustrated in FIG. 6B, the inflow markers 160 can be utilized to axially align the stent 102 with features in the target site 300, e.g., basal plane 340 of the right coronary cusp 302, the left coronary cusp 304 and the non-coronary cusp 306. As discussed above with reference to FIG. 3D, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 400, the stent 102, via a delivery system, can be manipulated (e.g., advanced, retracted, etc.) until the inflow markers 160 align with the basal plane 340, as illustrated in FIG. 6B. As such, the transcatheter valve prosthesis 400 can be positioned at a proper depth within the target site 300, thereby ensuring proper engagement with the native tissue.

In embodiments, the outflow marker 170 can be utilized to align circumferential or rotational orientation of the transcatheter valve prosthesis 400. More particularly, the outflow marker 170 can allow a physician to correctly interpret the circumferential orientation of the transcatheter valve prosthesis 400 and to clock or rotate the transcatheter valve prosthesis 400 relative to the anatomy to correct the circumferential or rotational orientation, if necessary, to avoid blocking the ostia of the right coronary artery 308 and/or the left main coronary artery 310. In addition, the outflow marker 170 enables the commissures of the valve prosthesis 190 of the transcatheter valve prosthesis 400 to be rotationally aligned with the native valve commissures. This alignment may improve transcatheter valve prosthesis 400 hemodynamics and leaflet durability. To align the transcatheter valve prosthesis 400, the stent 102 can be rotated, in situ, by a delivery system to be positioned in a desired circumferential or rotational alignment.

In embodiments, the outflow marker 170, alone, can be utilized to align circumferential or rotational orientation of the transcatheter valve prosthesis 400. For example, the outflow marker 170 can be aligned to the right/left commissure 320 thereby aligning the commissure post 126A to the right/left commissure 320. Likewise, for example, the outflow marker 170 can be aligned to right/non-coronary commissure 322, or left/non-coronary commissure 324, thereby aligning the commissure post 126A to the right/non-coronary commissure 322, or left/non-coronary commissure 324, respectively.

In embodiments, the combination of the outflow marker 170 and the inflow marker 160 that is positioned at the location 163 can be utilized to circumferentially or rotationally orient the transcatheter valve prosthesis 400. That is, the relative appearance and/or location in a 2D image can be utilized to circumferentially or rotationally orient the transcatheter valve prosthesis 400. In particular, the relative radial appearance in 2D image can indicate the relative positioning of the outflow marker 170 when an image plane is aligned to a desired feature at the target site 300. For example, to avoid blocking the ostium of the left main coronary artery 310, the commissure post 126A, containing the outflow marker 170, can be aligned with the right/left commissure 320 of the right coronary cusp 302 and the left coronary cusp 304, as illustrated in FIG. 6A. To ensure alignment, the outflow marker 170 and the inflow marker 160 that is positioned at the location 163 can be utilized in combination for circumferential or rotational alignment by setting up an image plane to be aligned with the features as illustrated in FIG. 6A and rotating the stent 102 until the outflow marker 170 and the inflow marker 160 that is positioned at the location 163 appear with no radial offset. For example, when viewed in a 2D image from the image plane 332, the relative radial appearance of the outflow marker 170 and the inflow marker 160 that is positioned at the location 163 can be utilized to indicate proper alignment. That is, proper alignment can be indicated by both the outflow marker 170 and the inflow marker 160 that is positioned at the location 163 appearing on the right side of the image, as illustrated in FIG. 6B. For example, the placement of the outflow marker 170 and the inflow markers 160 at locations 163 and 165 generates a "patterned" image, as illustrated in FIGS. 6B and 6C in which, the inflow marker 160 at location 163 points towards the left main coronary artery 310, the inflow marker 160 at location 165 sits at the right/non-coronary commissure 322, and the outflow marker 170 is at the right/left commissure 320.

In embodiments, the outflow marker 170 can also be used as a guide to a front or rear location of the outflow marker 170 appearing in 2D image. That is, the outflow marker 170 can be utilized to determine whether the outflow marker 170 is positioned on a side of the stent 102 closest to the imaging apparatus (front location) or positioned on a side of the stent 102 furthest from the imaging apparatus (rear location). As the stent 102 is rotated, the outflow marker 170 moves right or left in the 2D images of the target site 300 depending on the front or rear location of the outflow marker 170 and the approach to the target site 300. For example, based on the transcatheter femoral approach over the aortic arch to the target site 300, a tip of the delivery system may point in a direction opposite the direction of the handle used to rotate the stent 102 (e.g., in a direction back towards the handle), thereby causing the stent 102 to rotate in a direction opposite a direction of rotation of the handle, when viewed in a 2D image. In such an example, as the handle is rotated clockwise (thereby rotating the stent 102 counter-clockwise), the outflow marker 170 may move from right to left in 2D images taken in, for example, image plane 332 (FIG. 6B), thereby indicating that the outflow marker 170 is in the front (where an emitter of the imaging device is positioned on the front side of the stent 102 and the detector being is on a back side of the stent 102). As the handle is rotated clockwise (thereby rotating the stent 102 counter-clockwise), the outflow marker 170 moves from left to right in 2D images taken in the image plane 332, thereby indicating that the outflow marker 170 is in the rear (on the back side of the stent 102 relative to positioning of the imaging device). If the handle is rotated counter-clockwise (thereby rotating the stent 102 clockwise), the above movements would be reversed, e.g., left to right movement in the images would indicate front and right to left would indicate rear. While the particular movement of the outflow marker 170 is discussed above in reference to transcatheter femoral approach over the aortic arch, one skilled in the art will realize that the relative movement of the outflow marker 170 may change based on a different approach.

Figure 7A:
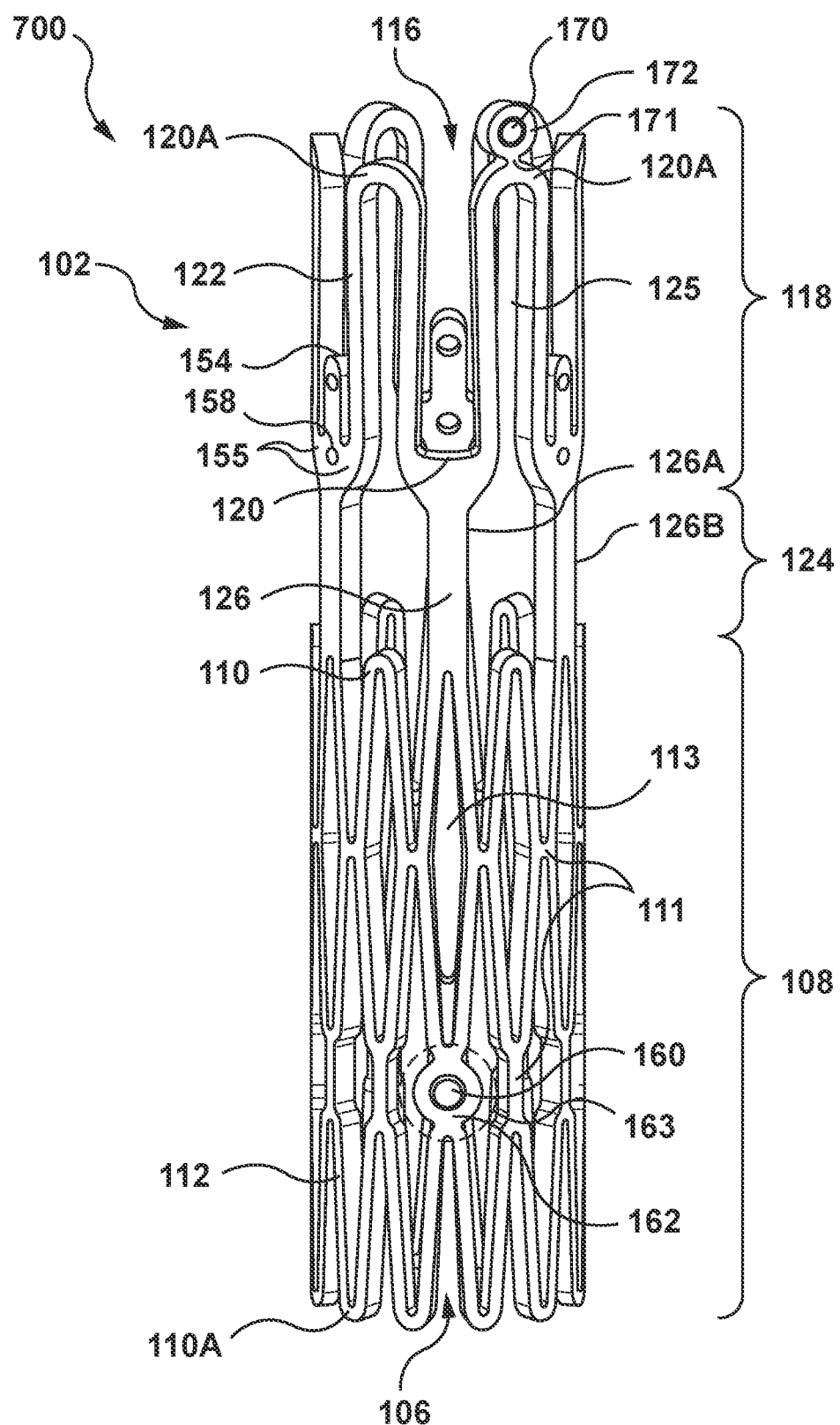
FIGS. 7A-7C illustrate several views of another transcatheter valve prosthesis in accordance with an embodiment hereof.
Figure 7B:
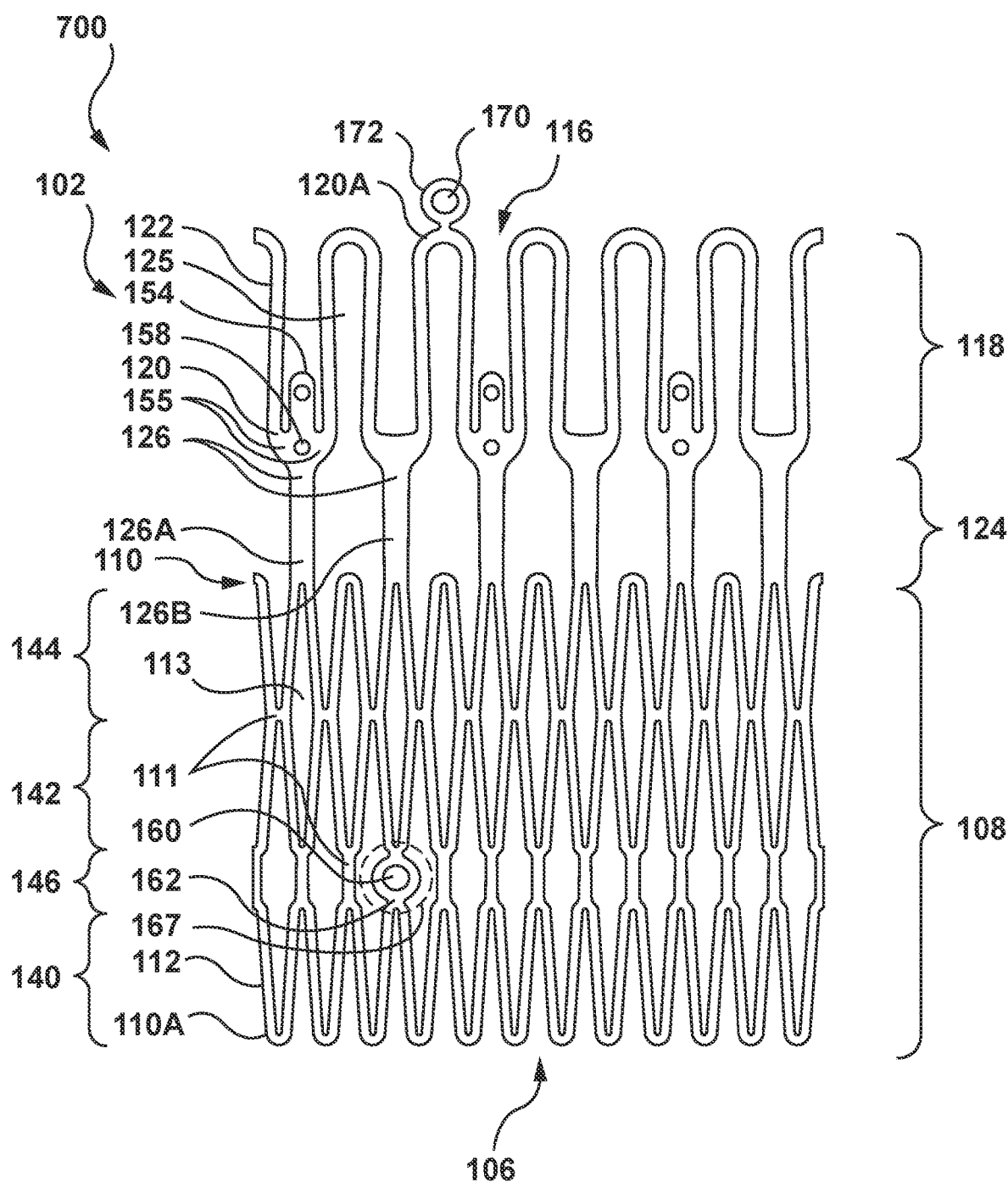
Figure 7C:
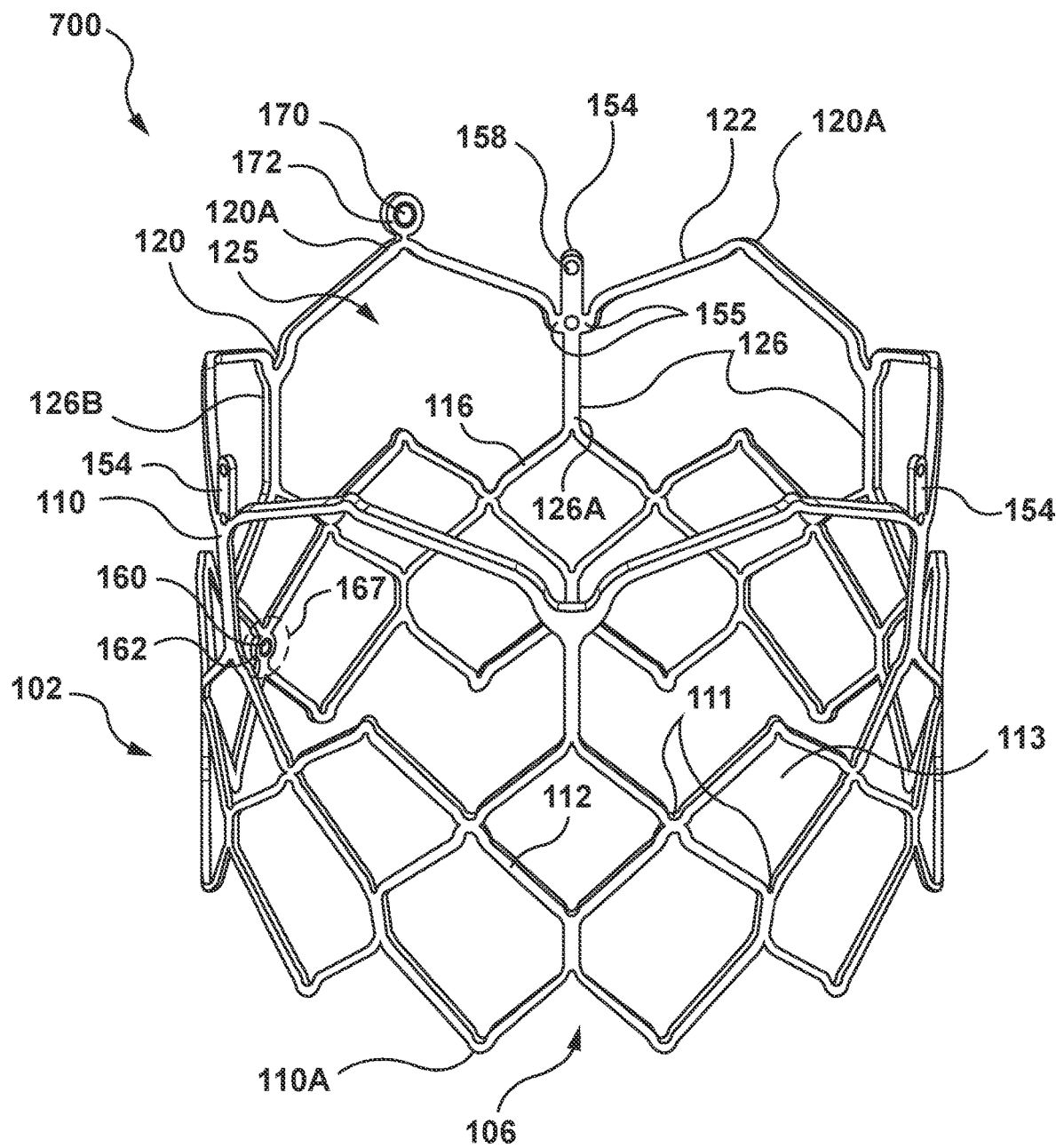

FIGS. 7A-7C illustrate a transcatheter valve prosthesis 700 in which the radially-expandable stent 102 thereof incudes an outflow marker 170 positioned on a crown of the stent 102 and the inflow markers 160 that is positioned at a location 167, according to another embodiment hereof. In embodiments, the inflow markers 160 and the outflow marker 170 can be utilized in orientation (e.g., axial alignment, tilt alignment, circumferential (rotational) alignment, etc.) of the transcatheter valve prosthesis 700, in situ, as discussed in detail below.

One skilled in the art will realize that FIGS. 7A-7C illustrate one example of an implantable medical device and that existing components illustrated in FIGS. 7A-7C may be removed and/or additional components may be added. Additionally, while the transcatheter valve prosthesis 700 is described below as including the inflow markers 160 and the outflow marker 170, one skilled in the art will realize that the transcatheter valve prosthesis 700 can include additional markers, for example, any of the markers described herein. Moreover, while examples of operations and advantages of the transcatheter valve prosthesis 700, the inflow markers 160 and the outflow marker 170 are discussed below, one skilled in the art will realize any of the operations and processes described above can be performed using the transcatheter valve prosthesis 700.

As discussed above, the stent 102 of the transcatheter valve prosthesis 700 has a non-expanded or crimped, which is shown in a side view of FIG. 7A, and an expanded configuration, which is shown FIG. 7C. FIG. 7B shows an open, flat view of an example of the stent 102. As illustrated in FIGS. 7A-7C, the transcatheter valve prosthesis 700 can include similar components to the transcatheter valve prosthesis 100, a description of which can be found above in the discussion of FIGS. 1A-1C.

In embodiments, to ensure the proper placement in the native anatomy of a subject, the transcatheter valve prosthesis 400 can include the outflow marker 170 and one or more inflow markers 160. The outflow marker 170 can operate to assist in rotational orientation of the stent 102, as described below. Additionally, the outflow marker 170 can operate as a guide for determining a front or rear location of the outflow marker 170 in 2D image during implantation, as described below. In embodiments, the outflow marker 170 can be positioned on one of the endmost crowns 120A in the outflow portion 118. For example, as illustrated in FIG. 7A, the outflow marker 170 can be positioned on the endmost crown 120A that is adjacent to one of the commissure posts 126A.

To accommodate the outflow marker 170, the endmost crown 120A can be constructed to include the containment member 172. In an embodiment, the containment member 172 can extend from the endmost crown 120A in the direction of the outflow end 116. The outflow marker 170 can be attached to the stent 102 within the containment member 172 formed as an extension of the endmost crown 120A. A description of the containment member 172 can be found above in the discussion of FIGS. 1A-1C. Likewise, a description of a configuration of the outflow marker 170 (e.g., size, dimensions, shape, materials, etc.) can be found above in the discussion of FIGS. 1A-1C, 1E, and 1F.

In embodiments, as illustrated in FIG. 7A, the containment member 172 is attached to the endmost crown 120A by a bar 172 that extends from the endmost crown 120A. As such, the containment member 172 is positioned to be mechanically isolated from the bending (e.g., the stresses and strains) that occurs during the life cycle of the stent 102. Therefore, the outflow marker 170 can be prevented from decoupling from the containment member 172 and causing injury to a patient, e.g., embolization.

In an embodiment, the stent 102 includes the inflow marker 160 that is positioned at the location 167. The inflow marker 160 can be positioned towards the inflow end 106 of the stent 102 in the inflow portion 108. In an embodiment, as illustrated in FIG. 7B, the stent 102 can include three rows of the struts 112: a first row 140 of the struts 112 formed proximate to the inflow end 106, a second row 142 of the struts 112 formed between the first row 142 and a third row 144, and the third row 144 of struts 112 formed proximate to the transition portion 124. In embodiments, the location 167 of the inflow markers 160 can be positioned at various locations, axially, in the inflow portion 108. The location 167 the inflow marker 160 can be at an intersection of the first row 140 and the second row 142. In an embodiment, as illustrated in FIG. 7B, the location 167 of the inflow marker 160 can be positioned at the intersection 146 of a pair of the struts 112 of the first row 140 and the second row 142. In this embodiment, the location 167 of the inflow marker 160 can be at the intersection 146 that is circumferentially adjacent to the endmost crown 120A with the outflow marker 170, e.g., radially aligned with the axial strut 126B that is adjacent to the endmost crown 120A with the outflow marker 170.

In embodiments, the inflow markers 160 can be attached to the stent 102 within containment members 162. A description of the containment member 162 can be found above in the discussion of FIGS. 1A-1C. Likewise, a description of a configuration of the inflow markers 160 (e.g., size, dimensions, shape, materials, etc.) can be found above in the discussion of FIGS. 1A-1C.

While FIGS. 7A-7C illustrates one example of the positioning and number of inflow markers 160, one skilled in the art will realize that the stent 102 can include any number of inflow markers 160, positioned at any location within the inflow portion 108. For example, the inflow markers 160 can be positioned on the struts 112. Likewise, for example, the inflow markers 160 can be asymmetrically aligned, circumferentially, around a circumference of the stent 102, e.g., with different circumferential distances between the inflow markers 160. Additionally, for example, the inflow markers 160 can be positioned at different distances from the inflow end 106. In any embodiment, the inflow marker 160 may be preferably located at a lengthwise location of the stent 102 that is desired to be aligned with the annulus of the native heart valve when the transcatheter valve prosthesis 100 is deployed at the native heart valve. For example, the inflow markers 160 allow for better depth positioning of the transcatheter valve prosthesis 700, in a crimped or compressed configuration, such that it can be more accurately deployed and reduce the incidence rate of requiring a permanent pacemaker (PPM) post-implantation. While FIGS. 7A-7C illustrate the stent 102 including six of the inflow markers 160, one skilled in the art will realize that the stent 102 may include any number of the inflow markers 160, which are positioned at any location.

Figure 8B:
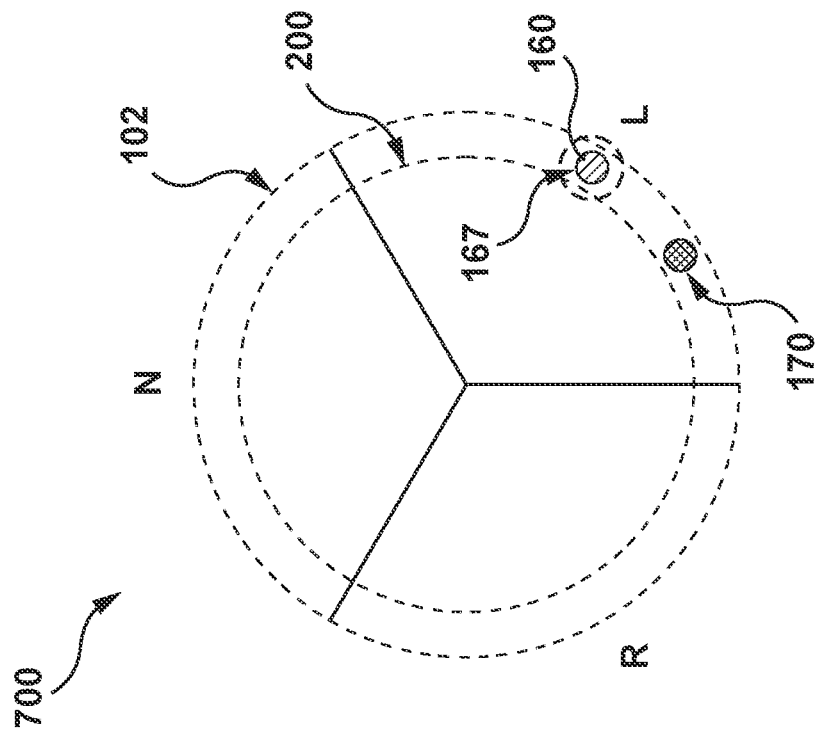
FIGS. 8A and 8B illustrate simplified top views of the transcatheter valve prosthesis of FIGS. 7A-74C in accordance with an embodiment hereof.
Figure 8A:
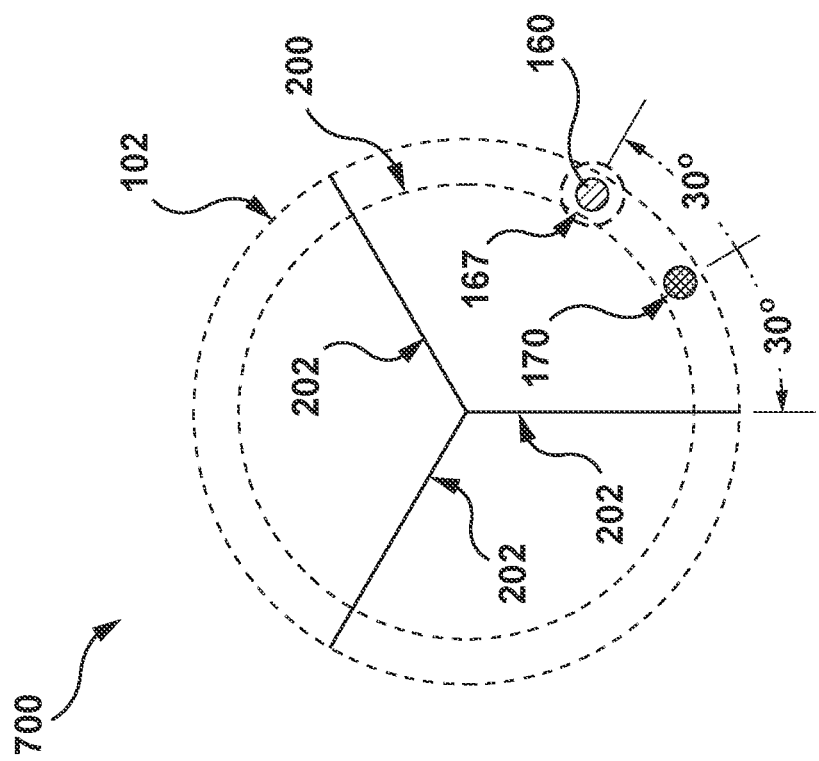

FIGS. 8A and 8B illustrate a simplified top view of the stent 102 from the outflow end 116, which illustrates relative positioning of the outflow marker 170 and the location 167 of the inflow marker 160. In particular, FIG. 8A illustrates the stent 102 (shown as dotted lines) that includes a prosthetic valve 200 having valve leaflets with commissures 202 positioned at the commissure posts 126A. Further, FIG. 8A illustrates the circumferential positioning of the outflow marker 170 on the stent 102 relative to the potential location 167 of the inflow marker 160 on the stent 102. FIG. 8B illustrates a potential alignment of the stent 102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 9A-9C. One skilled in the art will realize that FIGS. 8A and 8B illustrate a simplified view of the transcatheter valve prosthesis 700 and that the transcatheter valve prosthesis 700 can include additional components, for example, components described with reference to FIGS. 7A-7C.

As illustrated in FIG. 8A, when positioned near the commissure post 126A, the outflow marker 170 is positioned near a circumferential location of a commissure 202 of the valve leaflets of the prosthetic valve 200. That is, the outflow marker 170 can be displaced thirty degrees circumferentially from the commissure 202 of the valve leaflets.

The location 167 of the inflow marker 160 can be positioned circumferentially around the stent 102. For example, the location 167 of the inflow marker 160 can be at thirty degrees counter-clockwise relative to the position of the outflow marker 170, e.g., the approximate position of the commissure post 126A.

Figure 9B:
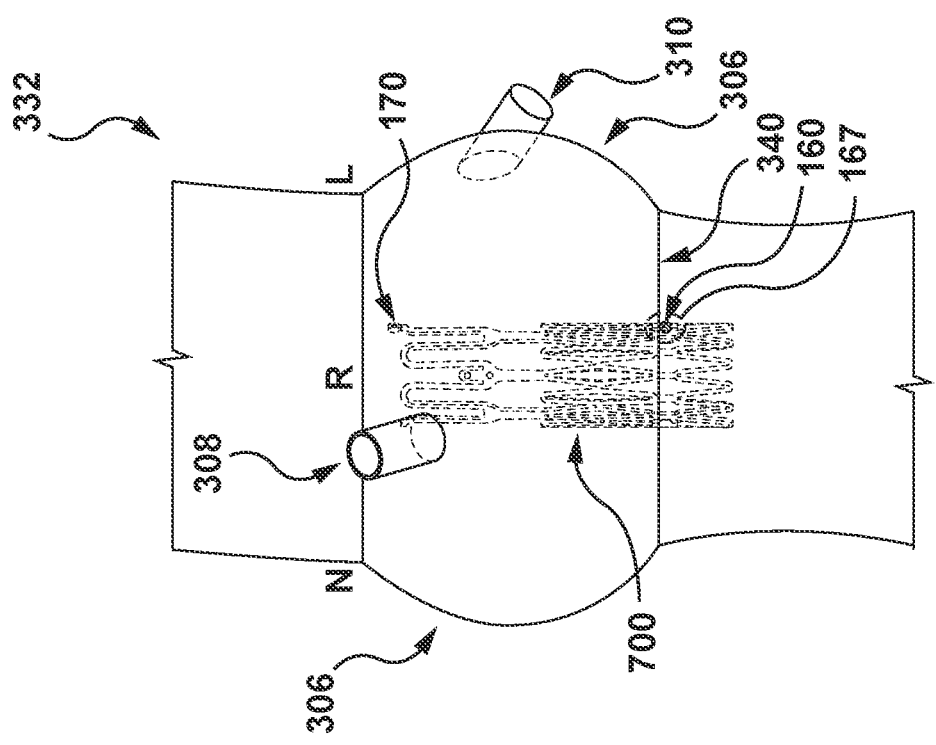
FIGS. 9A-9C illustrate various views of a target site for the transcatheter valve prosthesis of FIGS. 7A-7C in accordance with an embodiment hereof.

As illustrated in FIG. 8B and discussed in further detail below with reference to FIGS. 9A-9C, the outflow marker 170 can be utilized to align circumferential or rotational orientation of the transcatheter valve prosthesis 700. More particularly, the outflow marker 170 can allow a physician to correctly interpret the circumferential orientation of the transcatheter valve prosthesis 700 and to rotate the transcatheter valve prosthesis 700 relative to the anatomy to correct the circumferential or rotational orientation, if necessary, to avoid blocking native anatomy at a deployment location of the transcatheter valve prosthesis 700 (e.g., target site). For example, as illustrated in FIG. 8B, the outflow marker 170 rotationally aligns the commissures 202 of the prosthetic valve 200 of the transcatheter valve prosthesis 700 with the native valve commissures. Commissure to commissure alignment (prosthetic valve 200 commissure to native valve commissure) may improve transcatheter valve prosthesis 700 hemodynamics and leaflet durability. In an embodiment, as illustrated in FIG. 8B, the outflow marker 170 can be utilized to align the commissure post 126A to a commissure of a left coronary cusp ("L") and right coronary cusp ("R") of the native valve, and opposing a non-coronary cusp ("N"). To align the transcatheter valve prosthesis 400, the stent 102 can rotated, in situ, by a delivery system to be positioned in a desired circumferential or rotational alignment. Additionally, by aligning the commissure post 126A to left/right commissure of the left coronary cusp and the right coronary cusp, the commissure post 126A may avoid blocking the ostium of the left main coronary artery.

As discussed above, in embodiments, the inflow marker 160 and the outflow marker 170 can be utilized in orientation (e.g., axial alignment, tilt alignment, circumferential (rotational) alignment, etc.) of the transcatheter valve prosthesis 400, in situ, during installation as described below with reference to FIGS. 9A-9C. FIGS. 9A-9C illustrate various views of a target site 300, e.g., an aortic heart valve, of the transcatheter valve prosthesis 700. As illustrated in FIG. 9A, which is a 2-D annular view of the target site 300 taken normal to an annulus 301, the target site 300 includes three valve cusps of the aortic root, the right coronary cusp 302, the left coronary cusp 304 and the non-coronary cusp 306. The region of the right coronary cusp 302 includes ostium of the right coronary artery 308. Likewise, the region of the left coronary cusp 304 includes ostium of the left main coronary artery 310.

When installing the transcatheter valve prosthesis 700, it is desirable to properly align the stent 102 within the target site 300. For example, the transcatheter valve prosthesis 700 needs to be properly aligned, axially, so that the transcatheter valve prosthesis 700 properly engages the native leaflets/tissue of the target site 300, e.g., the aortic annulus without causing conduction blockages by implanting too deep or causing an embolization of the transcatheter valve prosthesis 700 because it was implanted too high. Likewise, the transcatheter valve prosthesis 700 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 reduces the risk of blocking coronary access.

Figure 9A:
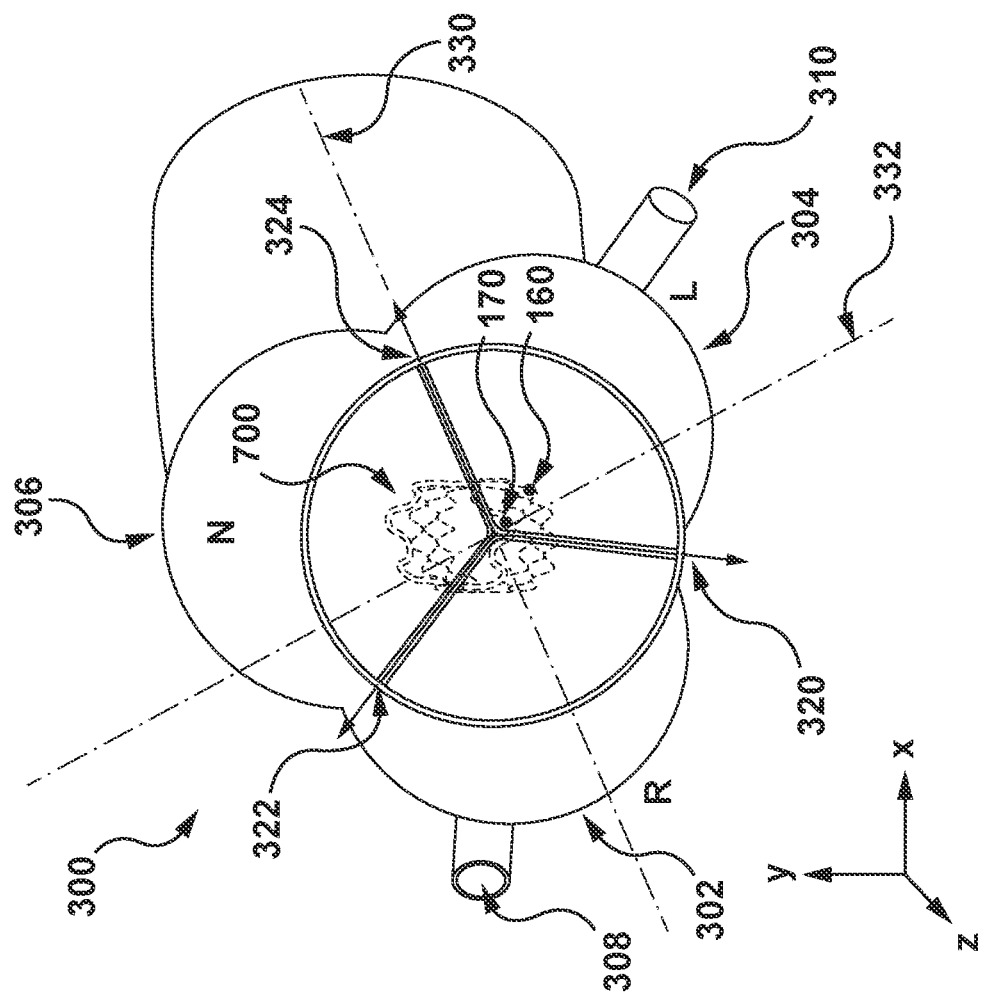
Figure 9C:
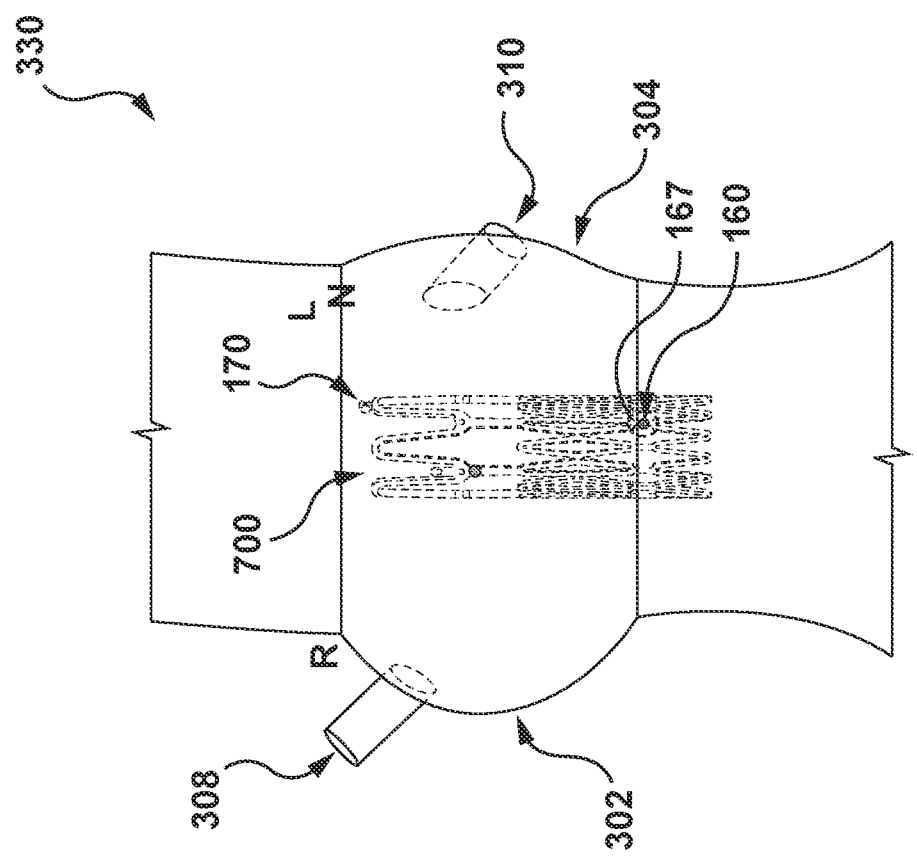

As illustrated in FIG. 9A, the right coronary cusp 302, the left coronary cusp 304, and the non-coronary cusp 306 include commissure regions: right/left commissure 320, right/non-coronary commissure 322, and left/non-coronary commissure 324. FIG. 9B illustrates a 2-D side view of the target site 300 taken in an image plane 332 (represented as a line in FIG. 9A). The image plane 332 is approximately perpendicular to an image plane 330 (represented as a line in FIG. 9A) in an x-direction and y-direction, and the image plane 332 extends in the z-direction (a direction normal to the 2D view of FIG. 9A). FIG. 9C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

As illustrated in FIG. 9B, the inflow marker 160 can be utilized to axially align the stent 102 with features in the target site 300, e.g., basal plane 340 of the right coronary cusp 302, the left coronary cusp 304 and the non-coronary cusp 306. As discussed above with reference to FIG. 3D, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 700, the stent 102, via a delivery system can be manipulated (e.g., advanced, retracted, etc.) until the inflow marker 160 aligns with the basal plane 340, as illustrated in FIG. 9B. As such, the transcatheter valve prosthesis 700 can be positioned at a proper depth within the target site 300, thereby ensuring proper engagement with the native tissue.

In embodiments, the outflow marker 170 can be utilized to align circumferential or rotational orientation of the transcatheter valve prosthesis 700. More particularly, the outflow marker 170 can allow a physician to correctly interpret the circumferential orientation of the transcatheter valve prosthesis 700 and to clock or rotate the transcatheter valve prosthesis 700 relative to the anatomy to correct the circumferential or rotational orientation, if necessary, to avoid blocking the ostia of the right coronary artery 308 and/or the left main coronary artery 310. In addition, the outflow marker 170 enables the commissures of the valve prosthesis 190 of the transcatheter valve prosthesis 700 to be rotationally aligned with the native valve commissures. This alignment may improve transcatheter valve prosthesis 700 hemodynamics and leaflet durability. To align the transcatheter valve prosthesis 700, the stent 102 can be rotated, in situ, by a delivery system to be positioned in a desired circumferential or rotational alignment.

In embodiments, the outflow marker 170, alone, can be utilized to align circumferential or rotational orientation of the transcatheter valve prosthesis 700. For example, the outflow marker 170 can be approximately aligned to the right/left commissure 320 thereby aligning the commissure post 126A to the right/left commissure 320. Likewise, for example, the outflow marker 170 can be approximately aligned to right/non-coronary commissure 322, or left/non-coronary commissure 324, thereby aligning the commissure post 126A to the right/non-coronary commissure 322, or left/non-coronary commissure 324, respectively.

In embodiments, the combination of the outflow marker 170 and the inflow marker 160 that is positioned at the location 167 can be utilized to align circumferential or rotational orientation of the transcatheter valve prosthesis 700. That is, the relative appearance and/or location in a 2D image can be utilized to align circumferential or rotational orientation of the transcatheter valve prosthesis 700. In particular, the relative radial appearance in 2D image can indicate the relative positioning of the outflow marker 170 and the inflow marker 160 that is positioned at the location 167 when an image plane is aligned to a desired feature at the target site 300. For example, to avoid blocking the ostium of the left main coronary artery 310, the commissure post 126A, containing the outflow marker 170, can be aligned with the right/left commissure 320 of the right coronary cusp 302 and the left coronary cusp 304, as illustrated in FIG. 9A. To ensure alignment, the outflow marker 170 and the inflow marker 160 that is positioned at the location 167 can be utilized in combination for circumferential or rotational alignment by setting up an image plane to be approximately parallel to the desired alignment feature and rotating the stent 102 until the outflow marker 170 and the inflow marker 160 that is positioned at the location 167 appear with no radial offset. For example, when viewed in a 2D image form the image plane 332, the relative radial appearance of the outflow marker 170 and the inflow marker 160 that is positioned at the location 163 can be utilized to indicate proper alignment. That is, proper alignment can be indicated by both the outflow marker 170 and the inflow marker 160 that is positioned at the location 167 appearing on the right side of the image, as illustrated in FIG. 9B.

In embodiments, the outflow marker 170 can also be used as a guide to a front or rear location of the outflow marker 170 appearing in 2D image. That is, the outflow marker 170 can be utilized to determine whether the outflow marker 170 is positioned on a side of the stent 102 closest to the imaging apparatus (front location) or positioned on a side of the stent 102 furthest from the imaging apparatus (rear location). As the stent 102 is rotated, the outflow marker 170 moves right or left in the 2D images of the target site 300 depending on the front or rear location of the outflow marker 170 and the approach to the target site 300. For example, based on the transcatheter approach to the target site 300, a tip of the delivery system may be point in a direction opposite the direction of the handle used to rotate the stent 102 (e.g., in a direction back towards the handle), thereby causing the stent 102 to rotate in a direction opposite a direction of rotation of the handle, when viewed in a 2D image. In this example, as the handle is rotated clockwise (thereby rotating the stent 102 counter-clockwise), the outflow marker 170 may move from right to left in 2D images taken in, for example, image plane 332 (FIG. 9B), thereby indicating that the outflow marker 170 is in the front (where an emitter of the imaging device is positioned on the front side of the stent 102 and the detector being is on a back side of the stent 102). As the handle is rotated clockwise (thereby rotating the stent 102 counter-clockwise), the outflow marker 170 moves from left to right in 2D images taken in the image plane 332, thereby indicating that the outflow marker 170 is in the rear (on the back side of the stent 102 relative to positioning of the imaging device). If the handle is rotated counter-clockwise (thereby rotating the stent 102 clockwise), the above movements would be reversed, e.g., left to right movement in the images would indicate front and right to left would indicate rear. While the particular movement of the outflow marker 170 is discussed above in reference to transcatheter approach, one skilled in the art will realize that the relative movement of the outflow marker 170 may change based on a different approach.

Figure 10A:
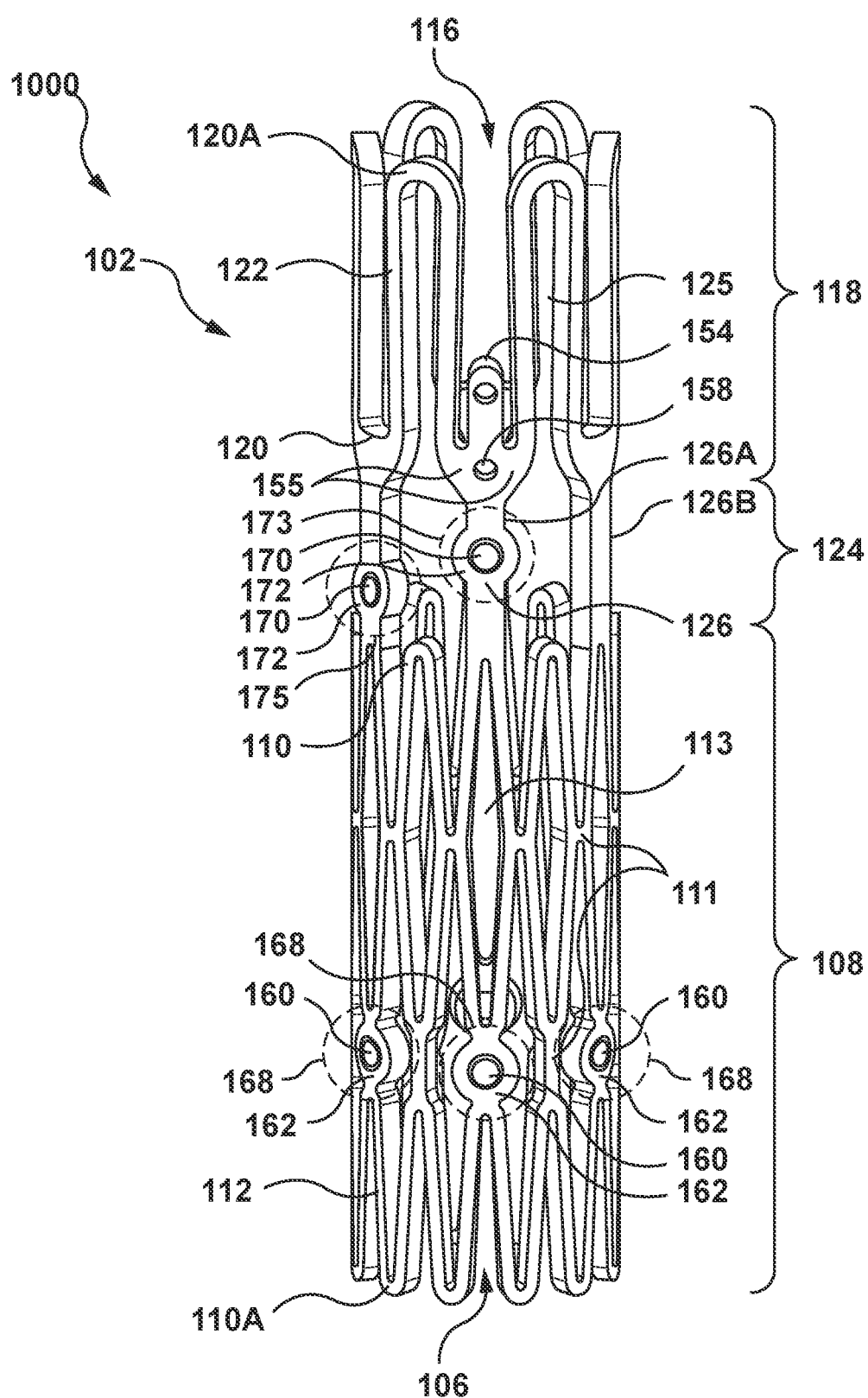
FIGS. 10A-10C illustrate several views of another transcatheter valve prosthesis in accordance with an embodiment hereof.
Figure 10B:
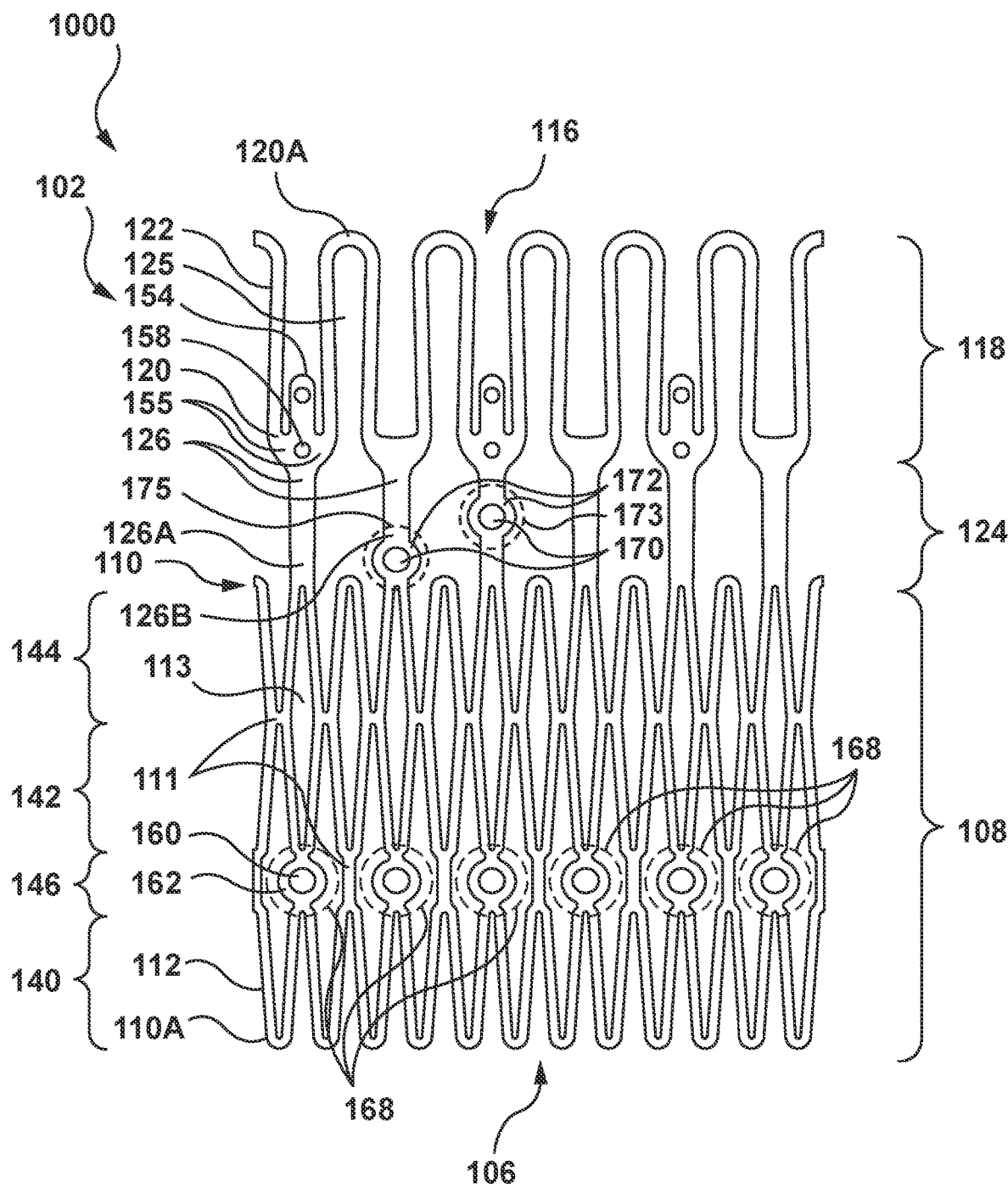
Figure 10C:
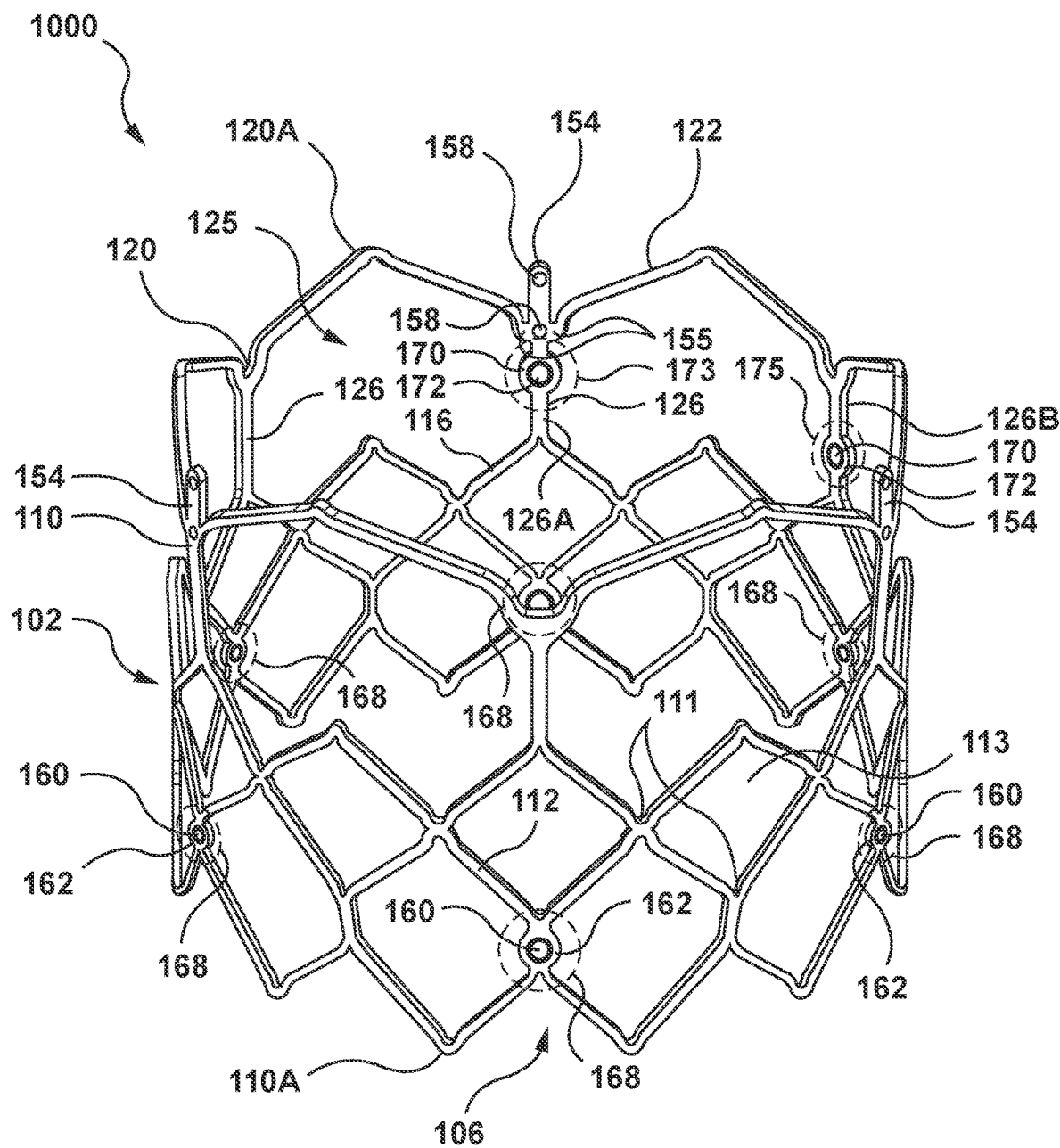

FIGS. 10A-10C illustrate a transcatheter valve prosthesis 1000 in which the radially-expandable stent 102 one or more inflow markers 160 that are positioned at one or more locations 168, one outflow marker 170 that is positioned at a location 173, and one outflow marker 170 that is positioned at a location 175, according to another embodiment hereof. In embodiments, the inflow markers 160 and the outflow markers 170 can be utilized in orientation (e.g., axial alignment, tilt alignment, circumferential (rotational) alignment, etc.) of the transcatheter valve prosthesis 1000, in situ, as discussed in detail below.

One skilled in the art will realize that FIGS. 10A-10C illustrate one example of an implantable medical device and that existing components illustrated in FIGS. 10A-10C may be removed and/or additional components may be added. Additionally, while the transcatheter valve prosthesis 1000 is described below as including the inflow markers 160 and the outflow markers 170, one skilled in the art will realize that the transcatheter valve prosthesis 1000 can include additional markers, for example, any of the markers described herein. Moreover, while examples of operations and advantages of the transcatheter valve prosthesis 1000, the inflow markers 160 and the outflow markers 170 are discussed below, one skilled in the art will realize any of the operations and processes described above can be performed using the transcatheter valve prosthesis 1000.

As discussed above, the stent 102 of the transcatheter valve prosthesis 1000 has a non-expanded or crimped, which is shown in a side view of FIG. 10A, and an expanded configuration, which is shown FIG. 10C. FIG. 10B shows an open, flat view of an example of the stent 102. As illustrated in FIGS. 10A-10C, the transcatheter valve prosthesis 1000 can include similar components to the transcatheter valve prosthesis 100, a description of which can be found above in the discussion of FIGS. 1A-1C.

In embodiments, to ensure the proper placement in the native anatomy of a subject, the transcatheter valve prosthesis 1000 can include the inflow markers 160 that are positioned at the locations 168 and two of the outflow markers 170 that are positioned at a location 173 and a location 175. The outflow markers 170 can operate to assist in rotational orientation of the stent 102, as described below. Additionally, the outflow markers 170 can operate as a guide for determining a front or rear location the outflow marker 170 in 2D image during implantation, as described below.

In embodiments, the location 173 of the outflow marker 170 can be positioned on one of the commissure post 126A, for example, in the outflow portion 118 or the transition portion 124. In embodiments, the location 173 of the outflow marker 170 can correspond to the location of the outflow marker described above with reference to FIGS. 1A-1C. In an embodiment, the location 173 of the outflow marker 170 can be on the outflow portion 118 of a commissure post 126A in the outflow portion 118. In another embodiment, the location 173 of the outflow marker 170 can be on a commissure posts 126A below the outflow portion 118 of the commissure post 126A.

In embodiments, the location 175 of the outflow marker 170 can be on an axial strut 126B. In an embodiment, the location 175 of the outflow marker 170 can be positioned on an axial strut 126B that is adjacent (e.g., adjacent in a clockwise direction or adjacent in a counter clockwise direction) to the commissure post 126A containing the outflow marker 170 that is positioned at the location 173. As illustrated in FIG. 10B, the location 173 of the outflow marker 170 is axially positioned closer to the outflow end 116 and the location 175 of the outflow marker 170 is axially positioned closer to the inflow end 116.

In any embodiment, the outflow markers 170 can be attached to the stent 102 within the containment member 172 formed in a commissure post 126A and/or the axial strut 126B. A description of the containment member 172 can be found above in the discussion of FIGS. 1A-1C. Likewise, a description of a configuration of the outflow marker 170 (e.g., size, dimensions, shape, materials, etc.) can be found above in the discussion of FIGS. 1A-1C.

In an embodiment, the stent 102 includes one or more the inflow markers 160 that is positioned at one or more locations 168. The inflow markers 160 can be positioned towards the inflow end 106 of the stent 102 in the inflow portion 108. In an embodiment, as illustrated in FIG. 10B, the stent 102 can include three rows of the struts 112: a first row 140 of the struts 112 formed proximate to the inflow end 106, a second row 142 of the struts 112 formed between the first row 142 and a third row 144, and the third row 144 of struts 112 formed proximate to the transition portion 124. In embodiments, the one or more locations 168 of the inflow markers 160 can be positioned at various locations, axially, in the inflow portion 108. The one or more locations 168 of the inflow markers 160 can be at an intersection of the first row 140 and the second row 142. For example, as illustrated in FIG. 10B, the one or more locations 168 of the inflow markers 160 can be positioned at the intersection 146 of a pair of the struts 112 of the first row 140 and the second row 142. In an embodiment, the one or more locations 168 of the inflow markers 160 are circumferentially aligned with each other around a circumference of the stent 102. In an embodiment, the stent 102 can include six (6) of the inflow marker 160.

In embodiments, the inflow markers 160 can be attached to the stent 102 within containment members 162. A description of the containment members 162 can be found above in the discussion of FIGS. 1A-1C. Likewise, a description of a configuration of the inflow markers 160 (e.g., size, dimensions, shape, materials, etc.) can be found above in the discussion of FIGS. 1A-1C.

While FIGS. 10A-10C illustrates one example of the positioning and number of inflow markers 160, one skilled in the art will realize that the stent 102 can include any number of inflow markers 160, positioned at any location within the inflow portion 108. For example, the inflow markers 160 can be positioned on the struts 112. Likewise, for example, the inflow markers 160 can be asymmetrically aligned, circumferentially, around a circumference of the stent 102, e.g., with different circumferential distances between the inflow markers 160. Additionally, for example, the inflow markers 160 can be positioned at different distances from the inflow end 106. In any embodiment, the inflow markers 160 may be preferably located at a lengthwise location of the stent 102 that is desired to be aligned with the annulus of the native heart valve when the transcatheter valve prosthesis 100 is deployed at the native heart valve. For example, the inflow markers 160 allow for better depth positioning of the transcatheter valve prosthesis 1000, in a crimped or compressed configuration, such that it can be more accurately deployed and reduce the incidence rate of requiring a permanent pacemaker (PPM) post-implantation. While FIGS. 10A-10C illustrate the stent 102 including six of the inflow markers 160, one skilled in the art will realize that the stent 102 may include any number of the inflow markers 160, which are positioned at any location.

As discussed above, the stent 102 can include two of the outflow markers 170 and one or more inflow markers 160, which can be used to align the stent 102. FIGS. 11A and 11B illustrate simplified top views of the stent 102 from the outflow end 116, which illustrates relative positioning of the locations 168 of the inflow markers 160 and the outflow markers 170. In particular, FIG. 11A illustrates the stent 102 (shown as dotted lines) that includes a prosthetic valve 200 having valve leaflets with commissures 202 positioned at the commissure posts 126A. Further, FIG. 11A illustrates the circumferential positioning of the outflow markers 170 on the stent 102 relative to the potential locations 168 of the inflow markers 160 on the stent 102. FIG. 11B illustrates a potential alignment of the stent 102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 12A-12C. One skilled in the art will realize that FIGS. 11A and 11B illustrate a simplified view of the transcatheter valve prosthesis 1000 and that the transcatheter valve prosthesis 1000 can include additional components, for example, components described with reference to FIGS. 11A-11C.

As illustrated in FIG. 11A, when positioned on the commissure post 126A, the outflow marker 170 at position 173 is positioned at a circumferential location of a commissure 202 of the valve leaflets of the prosthetic valve 200. The outflow marker 170 (at location 175) is positioned on the axial strut 126B. The location 173 of the outflow marker 170 can be at sixty degrees counter-clockwise relative to the position of the location 175 of the outflow marker 170, e.g., the position of the commissure post 126A.

The one or more locations of the inflow markers 160 can be positioned circumferentially around the stent 102 as different rotational angles. For example, the location 168 of the inflow marker 160 can be at zero degrees clockwise and counter-clockwise relative to the location 173 of the outflow marker 170, e.g., the position of the commissure post 126A. Likewise, for example, the location 168 of the inflow marker 160 can be at sixty degrees clockwise and counter-clockwise relative to the location 173 of the outflow marker 170, e.g., the position of the commissure post 126A. Likewise, for example, the location 168 of the inflow marker 160 can be at one-hundred twenty degrees clockwise and counter-clockwise relative to the location 173 of the outflow marker 170, e.g., the position of the commissure post 126A. Likewise, for example, the location 168 of the inflow marker 160 can be at one-hundred eighty degrees clockwise and counter-clockwise relative to the location 173 of the outflow marker 170, e.g., the position of the commissure post 126A.

As illustrated in FIG. 11B and discussed in further detail below with reference to FIGS. 12A-12C, the outflow markers 170 can be utilized to align circumferential or rotational orientation of the transcatheter valve prosthesis 1000. More particularly, the outflow markers 170 can allow a physician to correctly interpret the circumferential orientation of the transcatheter valve prosthesis 1000 and to rotate the transcatheter valve prosthesis 1000 relative to the anatomy to correct the circumferential or rotational orientation, if necessary, to avoid blocking native anatomy at a deployment location of the transcatheter valve prosthesis 1000 (e.g., target site). For example, as illustrated in FIG. 11B, the outflow marker 170 that is at location 173 rotationally aligns the commissures 202 of the prosthetic valve 200 of the transcatheter valve prosthesis 1000 with the native valve commissures. Commissure to commissure alignment (prosthetic valve 200 commissure to native valve commissure) may improve transcatheter valve prosthesis 1000 hemodynamics and leaflet durability. In an embodiment, as illustrated in FIG. 11B, the outflow marker 170 that is at the location 173 can be utilized to align the commissure post 126A to a commissure of a left coronary cusp ("L") and non-coronary cusp ("N") of the native valve, and opposing a right coronary cusp ("R"). To align the transcatheter valve prosthesis 1000, the stent 102 can rotated, in situ, by a delivery system to be positioned in a desired circumferential or rotational alignment. Additionally, by aligning the commissure post 126A to left/non-coronary commissure of the left coronary cusp and the right coronary cusp, the commissure post 126A may avoid blocking the ostium of the left main coronary artery.

In embodiments, the inflow markers 160 and the outflow markers 170 at the location 173 and the location 175 can be utilized in orientation (e.g., axial alignment, tilt alignment, circumferential (rotational) alignment, etc.) of the transcatheter valve prosthesis 1000, in situ, during installation as described below with reference to FIGS. 12A-12C. FIGS. 12A-12C illustrate various views of a target site 300 e.g., an aortic heart valve, for the transcatheter valve prosthesis 1000. As illustrated in FIG. 12A, which is an annular view of the target site 300 taken perpendicular to an annulus 301, the target site 300 includes three valve cusps of the aortic root, the right coronary cusp 302, the left coronary cusp 304 and the non-coronary cusp 306. The region of the right coronary cusp 302 includes ostium of the right coronary artery 308. Likewise, the region of the left coronary cusp 304 includes ostium of the left main coronary artery 310.

When installing the transcatheter valve prosthesis 1000, it is desirable to properly align the stent 102 with the target site 300, as discussed above. For example, the transcatheter valve prosthesis 1000 needs to be properly aligned, axially, so that the transcatheter valve prosthesis 1000 properly engages the native tissue of the target site 300. Likewise, the transcatheter valve prosthesis 1000 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 may reduce the risk of blocking coronary access and may enhance hemodynamics and valve durability because of commissure-to-commissure alignment. As illustrated in FIG. 12A, the right coronary cusp 302, the left coronary cusp 304, and the non-coronary cusp 306 include commissure regions: right/left commissure 320, right/non-coronary commissure 322, and left/non-coronary commissure 324. FIG. 12B illustrates a 2-D side view of the target site 300 taken in an image plane 332 (represented as a line in FIG. 12A). The image plane 332 is approximately perpendicular to an image plane 330 (represented as a line in FIG. 12A) in an x-direction and y-direction, and the image plane 332 extends in the z-direction (a direction normal to the 2D view of FIG. 12A). FIG. 12C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

As illustrated in FIG. 12B, the inflow markers 160 can be utilized to axially align the stent 102 with features in the target site 300, e.g., basal plane 340 of the right coronary cusp 302, the left coronary cusp 304 and the non-coronary cusp 306. For example, as discussed above with reference to FIG. 3D, which is a three dimension view of the target site 300, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 1000, the stent 102, via a delivery system can be manipulated (e.g., advanced, retracted, etc.) until the inflow markers 160 align with the basal plane 340, as illustrated in FIG. 12B. As such, the transcatheter valve prosthesis 1000 can be positioned at a proper depth within the target site 300, thereby ensuring proper engagement with the native tissue.

Additionally, the inflow markers 160 can be utilized to align the tilt and/or rotation of the stent 102. For example, to align the transcatheter valve prosthesis 1000, the stent 102, via a delivery system can be manipulated (e.g., rotated, tilted, etc.) until the inflow markers 160 form a predetermined pattern visible in the image captured in the image plane 330 and/or 332, for example, as described above with reference to FIGS. 3A-3G. For example, as illustrated in FIG. 10B, the stent 102 may include six (6) inflow markers 160. As the stent 102 is rotated, different numbers of the inflow markers 160 may be visible in the 2D image, e.g., 6 markers in image plane 330 (FIG. 12C) and 3 markers in image plane 332 (FIG. 12B. In this example, to align the transcatheter valve prosthesis 1000, the delivery system can be manipulated (e.g., rotated, tilted, etc.) until all 6 of the inflow markers 160 form a predetermined pattern, e.g., only 3 inflow markers 160, that is visible in the image captured in the image plane 332. In other words, 3 of the inflow markers 160 overlap and obscure the other 3 of the inflow markers 160 in the 2D image. If the image plane 332 is aligned with the native anatomy as desired, the appearance of the predetermined pattern, e.g., only 3 inflow markers 160, indicates the transcatheter valve prosthesis 1000 is approximately perpendicular to image plane 332 indicating proper orientation (e.g., indicating proper tilt, proper rotation, etc.) of the transcatheter valve prosthesis 1000.

In embodiments, as described above with reference to FIGS. 3A-3C, the outflow marker 170 that is positioned at the location 173, alone, can be utilized to align circumferential or rotational orientation of the transcatheter valve prosthesis 1000. For example, the outflow marker 170 that is positioned at the location 173 can be aligned to the right/left commissure 320, right/non-coronary commissure 322, or left/non-coronary commissure 324, thereby aligning the commissure post 126A to the right/left commissure 320, right/non-coronary commissure 322, or left/non-coronary commissure 324, respectively. The outflow marker 170 that is positioned at the location 175, alone, can similarly be utilized to align circumferential or rotational orientation of the transcatheter valve prosthesis 1000. For example, the outflow marker 170 that is positioned at the location 175 can be aligned to the right/left commissure 320, right/non-coronary commissure 322, or left/non-coronary commissure 324, thereby aligning the axial strut 126B to the right/left commissure 320, right/non-coronary commissure 322, or left/non-coronary commissure 324, respectively. One skilled in the art will realize that the outflow markers 170 can be aligned to any feature at the target site 300.

In embodiments, the combination of the outflow marker 170 that is positioned at the location 173 and the outflow marker 170 that is positioned at the location 175 can be utilized to align circumferential or rotational orientation of the transcatheter valve prosthesis 1000. That is, the relative appearance and/or location in a 2D image can be utilized to align circumferential or rotational orientation of the transcatheter valve prosthesis 1000. In particular, the relative radial appearance in 2D image can indicate the relative positioning of the outflow marker 170 that is positioned at the location 173 and the outflow marker 170 that is positioned at the location 175, when an image plane is aligned to a desired feature at the target site 300.

Figure 12C:
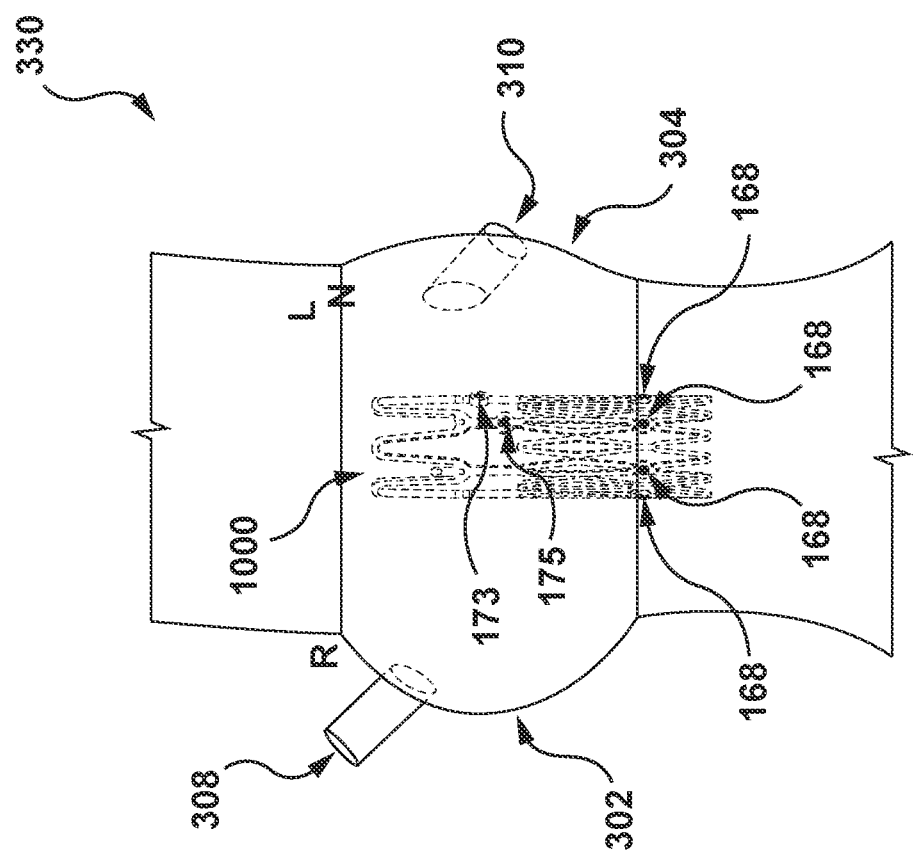

For example, to avoid blocking the ostium of the left main coronary artery 310, the commissure post 126A, containing the outflow marker 170 that is positioned at the location 173, can be aligned with the non-coronary/left commissure 320 of the non-coronary cusp 306 and the left coronary cusp 304, as illustrated in FIG. 12A. That is, because the outflow marker 170 that is positioned at the location 175 is adjacent to the outflow marker 170 that is positioned at the location 173, the axial strut 126B will be aligned near the non-coronary cusp 306. As illustrated in FIG. 12B, if viewed in the image plane 332, the outflow marker 170 that is positioned at the location 173 can be rotated until the outflow marker 170 is centered in the image (in the rear of the stent 102), thereby indicating alignment of the commissure post 126A, which has the outflow marker 170, with the left/non-coronary commissure 324. Likewise, for example, as illustrated in FIG. 12C, if viewed in the image plane 330, the outflow marker 170 that is positioned at the location 173 can be rotated until the outflow marker 170 appears in the right of the image, thereby indicating alignment with the left/non-coronary commissure 324. This alignment ensures that the commissure post 126A does not block the ostium of the left main coronary artery 310. Likewise, this alignment can allow other commissure posts 126A (i.e., those without the outflow marker 170) to be aligned with the right/left commissure 320 and the right/non-coronary commissure 322, respectively. While the above describes, the outflow markers 170 being aligned with the left/non-coronary commissure 324, the outflow marker 170 can be aligned with other structure at the target site 300, e.g., right/left commissure 320, right/non-coronary commissure 322, etc.

In embodiments, the outflow markers 170 can also be used as a guide to the front or rear location of the outflow markers 170 appearing in 2D image, as described above. The relative motion of the outflow markers 170, when rotated, can be used to indicate the front or rear location of the outflow markers 170 appearing in 2D image. In particular, the right or left location of the outflow markers 170, during rotation of the stent 102, can indicate the front or rear location. For example, the appearance, in an image, of the outflow marker 170 that is positioned at the location 175 to the left of the outflow marker 170 that is positioned at the location 173, during rotation, would indicate a rear location. Likewise, the appearance, in an image, of the outflow marker 170 that is positioned at the location 175 to the right of the outflow marker 170 that is positioned at the location 173 would indicate a front location. In other words, the right and left appearance, in an image during rotation, of the radial offset outflow markers 170 can be used to determine a front or rear orientation of the outflow markers 170. While the particular movement of the outflow markers 170 is discussed above in reference to transcatheter femoral approach over the aortic arch, one skilled in the art will realize that the relative movement of the outflow markers 170 may change based on a different approach.

Figure 13A:
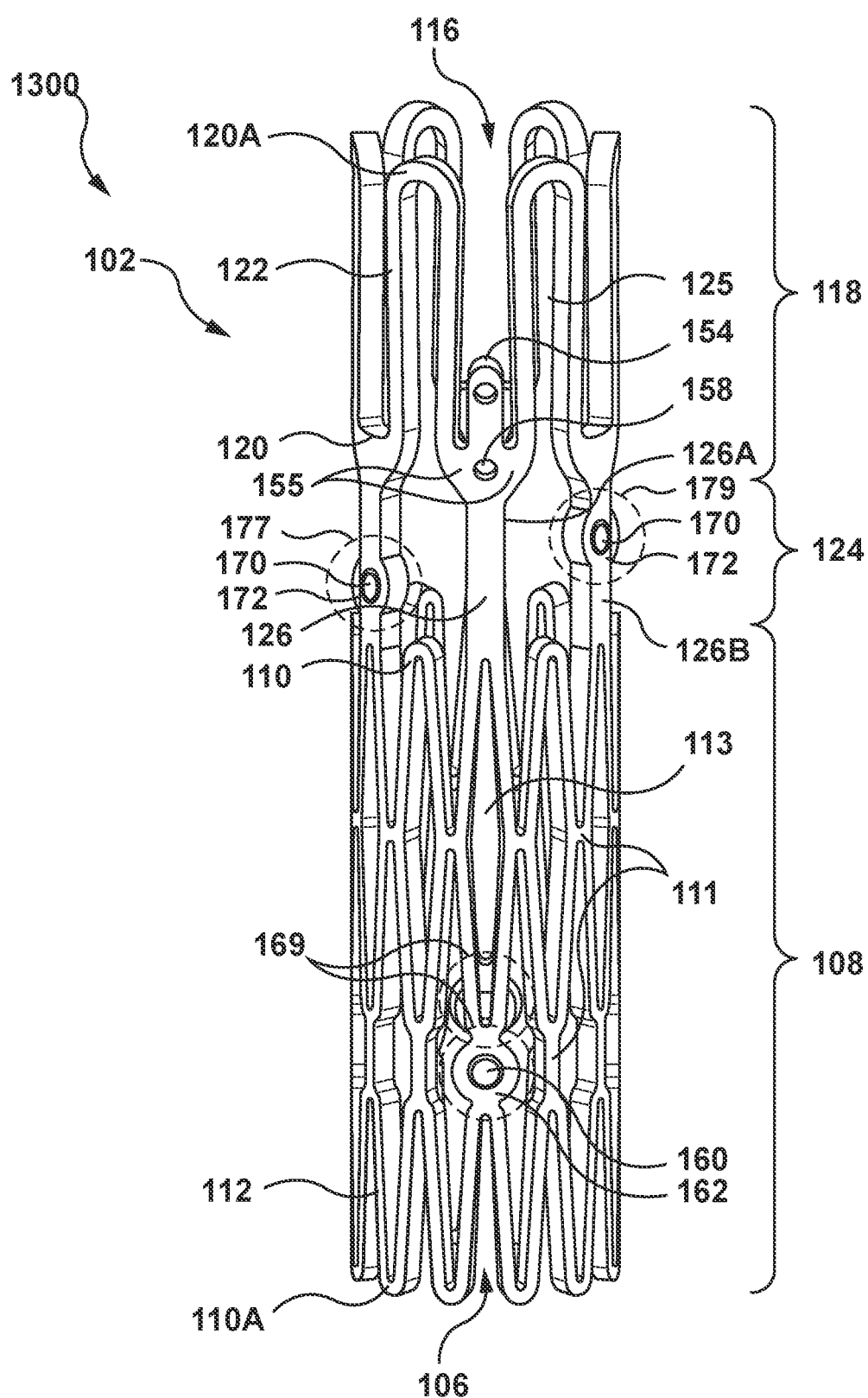
FIGS. 13A-13C illustrate several views of another transcatheter valve prosthesis in accordance with an embodiment hereof.
Figure 13B:
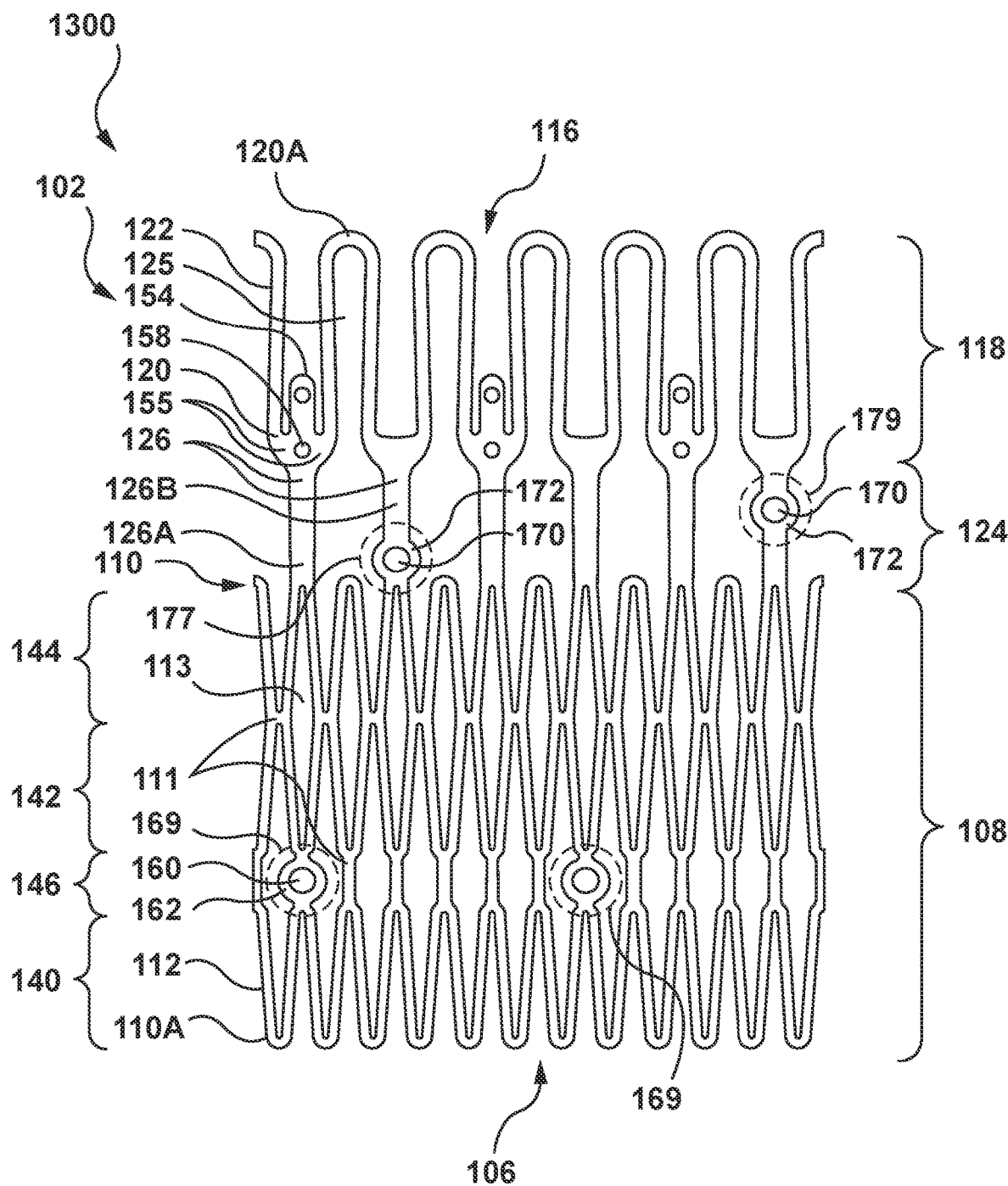
Figure 13C:
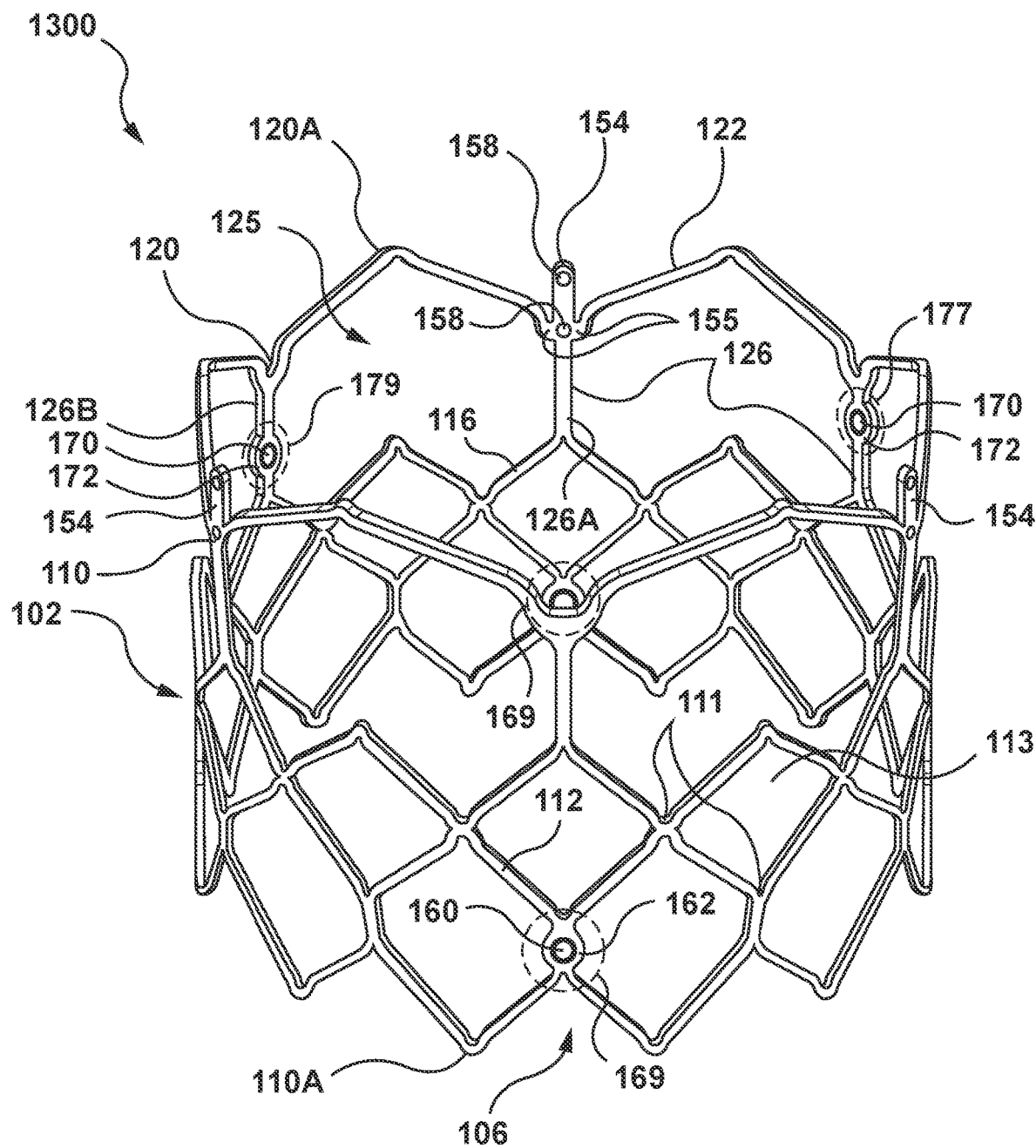

FIGS. 13A-13C illustrate a transcatheter valve prosthesis 1300 in which the radially-expandable stent 102 one or more inflow markers 160 that are positioned at one or more locations 169, one outflow marker 170 that is positioned at a location 177, and one outflow marker 170 that is positioned at a location 179, according to another embodiment hereof. In embodiments, the inflow markers 160 and the outflow markers 170 can be utilized in orientation (e.g., axial alignment, tilt alignment, circumferential (rotational) alignment, etc.) of the transcatheter valve prosthesis 1300, in situ, as discussed in detail below.

One skilled in the art will realize that FIGS. 13A-13C illustrate one example of an implantable medical device and that existing components illustrated in FIGS. 13A-13C may be removed and/or additional components may be added. Additionally, while the transcatheter valve prosthesis 1300 is described below as including the inflow markers 160 and the outflow markers 170, one skilled in the art will realize that the transcatheter valve prosthesis 1300 can include additional markers, for example, any of the markers described herein. Moreover, while examples of operations and advantages of the transcatheter valve prosthesis 1300, the inflow markers 160 and the outflow markers 170 are discussed below, one skilled in the art will realize any of the operations and processes described above can be performed using the transcatheter valve prosthesis 1300.

As discussed above, the stent 102 of the transcatheter valve prosthesis 1300 has a non-expanded or crimped, which is shown in a side view of FIG. 13A, and an expanded configuration, which is shown FIG. 13C. FIG. 13B shows an open, flat view of an example of the stent 102. As illustrated in FIGS. 13A-13C, the transcatheter valve prosthesis 1300 can include similar components to the transcatheter valve prosthesis 100, a description of which can be found above in the discussion of FIGS. 1A-1C.

In embodiments, to ensure the proper placement in the native anatomy of a subject, the transcatheter valve prosthesis 1300 can include the inflow markers 160 that are positioned at the locations 169 and two of the outflow markers 170 that are positioned at a location 177 and a location 179. The outflow markers 170 can operate to assist in rotational orientation of the stent 102, as described below. Additionally, the outflow markers 170 can operate as a guide for determining a front or rear location the outflow marker 170 in 2D image during implantation, as described below.

In embodiments, the location 177 of the outflow marker 170 can be positioned on one of the axial struts 126B, for example, in the outflow portion 118 or the transition portion 124. The location 179 of the outflow marker 170 can be positioned on another of the axial struts 126B, for example, in the outflow portion 118 or the transition portion 124. In embodiments, the location 179 of the outflow marker 170 can correspond to the location of the outflow marker described above with reference to FIGS. 10A-10C. In embodiments, the location 177 and the location 179 can be on axial struts 126B that are separate by a commissure post 126A. As illustrated in FIG. 13B, the location 179 of the outflow marker 170 is axially positioned closer to the outflow end 116 and the location 177 of the outflow marker 170 is axially positioned closer to the inflow end 116.

In any embodiment, the outflow markers 170 can be attached to the stent 102 within the containment member 172 formed in the axial strut 126B. A description of the containment member 172 can be found above in the discussion of FIGS. 1A-1C. Likewise, a description of a configuration of the outflow marker 170 (e.g., size, dimensions, shape, materials, etc.) can be found above in the discussion of FIGS. 1A-1C.

In an embodiment, the stent 102 includes two of the inflow markers 160 that are positioned at the locations 169. Either of the inflow markers 160 can be positioned towards the inflow end 106 of the stent 102 in the inflow portion 108. In an embodiment, as illustrated in FIG. 13B, the stent 102 can include three rows of the struts 112: a first row 140 of the struts 112 formed proximate to the inflow end 106, a second row 142 of the struts 112 formed between the first row 142 and a third row 144, and the third row 144 of struts 112 formed proximate to the transition portion 124. In embodiments, the locations 169 of the inflow markers 160 can be positioned at various locations, axially, in the inflow portion 108. The locations 169 of the inflow markers 160 can be at an intersection of the first row 140 and the second row 142. For example, as illustrated in FIG. 13B, the locations 169 of the inflow markers 160 can be positioned at the intersection 146 of a pair of the struts 112 of the first row 140 and the second row 142. In an embodiment, the locations 169 of the inflow markers 160 are circumferentially aligned with each other around a circumference of the stent 102.

In embodiments, the inflow marker 160 can be attached to the stent 102 within a containment member 162. A description of the containment member 162 can be found above in the discussion of FIGS. 1A-1C. Likewise, a description of a configuration of the inflow marker 160 (e.g., size, dimensions, shape, materials, etc.) can be found above in the discussion of FIGS. 1A-1C.

Figure 14B:
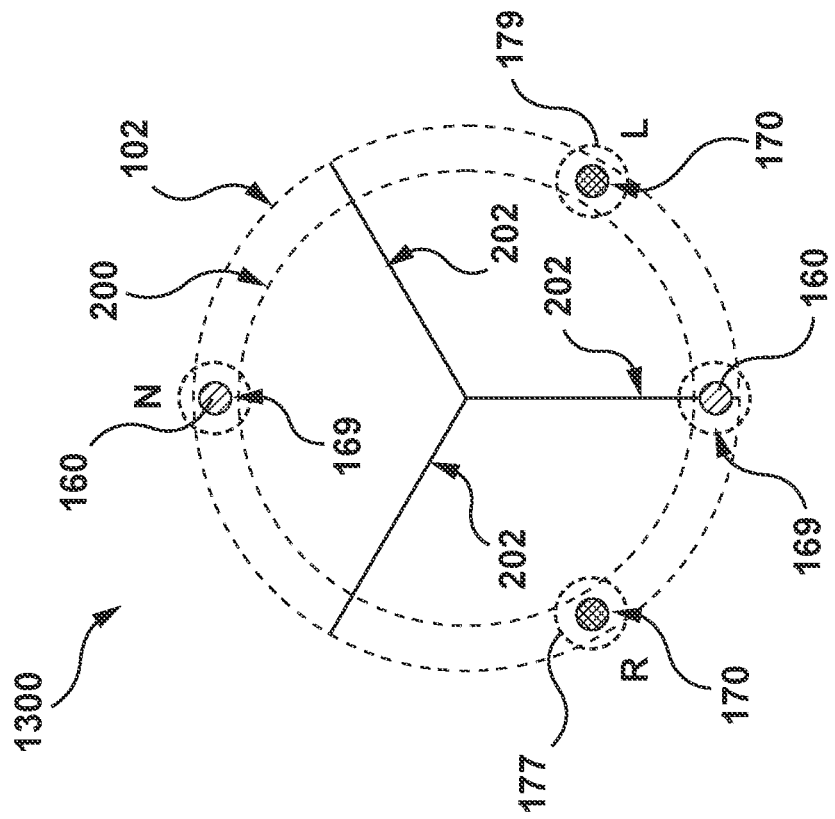
FIGS. 14A and 14B illustrate simplified top views of the transcatheter valve prosthesis of FIGS. 13A-13C in accordance with an embodiment hereof.
Figure 14A:
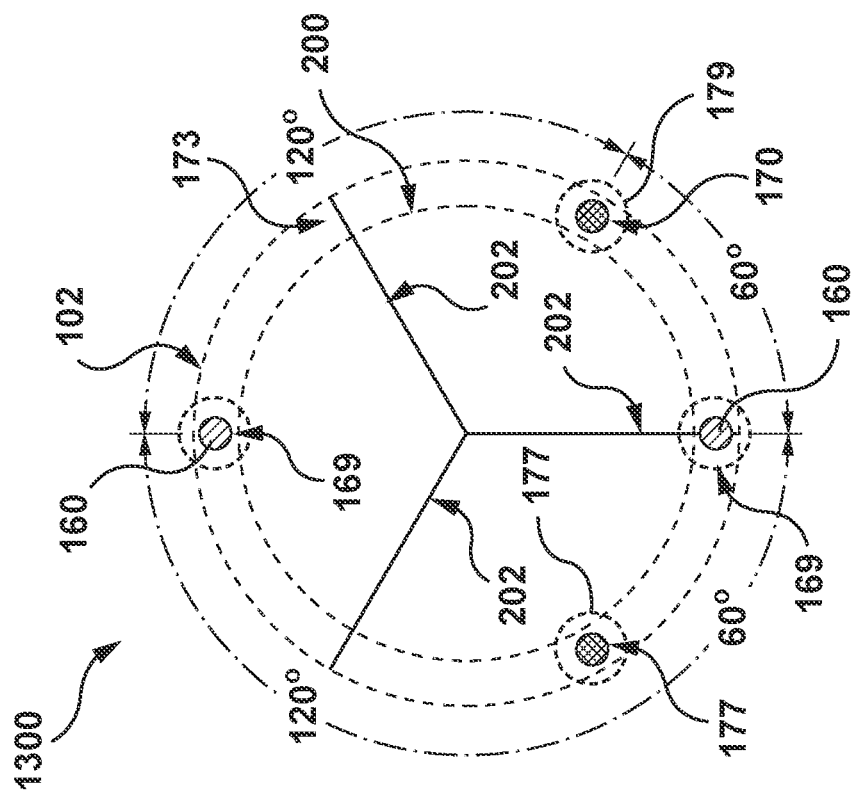

As discussed above, the stent 102 can include two of the outflow markers 170 and two of the inflow markers 160, which can be used to align the stent 102. FIGS. 14A and 14B illustrate a simplified top view of the stent 102 from the outflow end 116, which illustrates relative positioning of the locations 169 of the inflow markers 160 and the outflow markers 170 that are positioned at the locations 177 and 179. In particular, FIG. 14A illustrates the stent 102 (shown as dotted lines) that includes a prosthetic valve 200 having valve leaflets with commissures 202 positioned at the commissure posts 126A. Further, FIG. 14A illustrates the circumferential positioning of the outflow markers 170 at locations 177 and 179 on the stent 102 relative to the potential locations 169 of the inflow markers 160 on the stent 102. FIG. 14B illustrates a potential alignment of the stent 102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 15A-15C. One skilled in the art will realize that FIGS. 14A and 14B illustrate a simplified view of the transcatheter valve prosthesis 1300 and that the transcatheter valve prosthesis 1300 can include additional components, for example, components described with reference to FIGS. 13A-13C.

As illustrated in FIG. 14A, when positioned on the commissure post 126A, the outflow marker 170 at position 177 is positioned at a circumferential location of a commissure 202 of the valve leaflets of the prosthetic valve 200. The outflow marker 170 (at location 179) is positioned on the axial strut 126B. The location 179 of the outflow marker 170 can be at one-hundred twenty degrees counter-clockwise relative to the position of the location 177 of the outflow marker 170. As such, the outflow marker 170 (at location 179) aligns, circumferentially with another midpoint between the commissure 202 of valve leaflets of the prosthetic valve 200 of the transcatheter valve prosthesis 1300.

The one or more locations of the inflow markers 160 can be positioned circumferentially around the stent 102 as different rotational angles. For example, the location 169 of the inflow markers 160 can be at sixty degrees counter-clockwise and one-hundred twenty degrees clockwise relative to the location 177 of the outflow marker 170. Likewise, for example, the location 169 of the inflow marker 160 can be at sixty degrees clockwise and one-hundred twenty degrees counter-clockwise relative to the location 179 of the outflow marker 170.

Figure 15C:
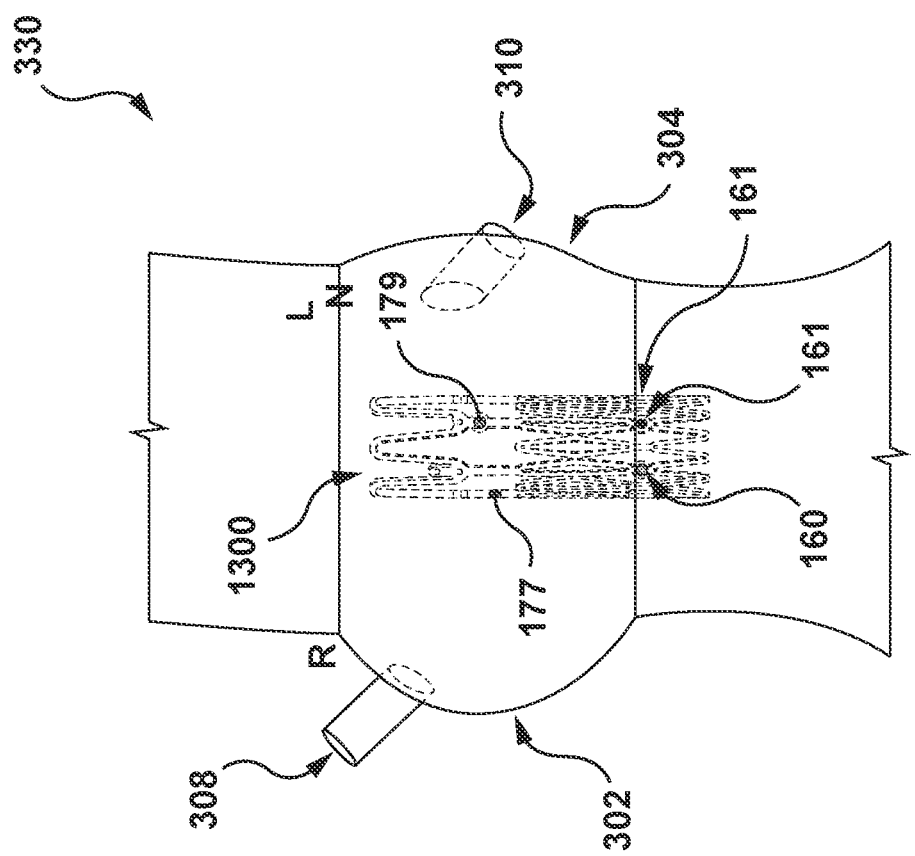

As illustrated in FIG. 14B and discussed in further detail below with reference to FIGS. 15A-15C, the outflow markers 170 can be utilized to align circumferential or rotational orientation of the transcatheter valve prosthesis 1300. More particularly, the outflow markers 170 can allow a physician to correctly interpret the circumferential orientation of the transcatheter valve prosthesis 1300 and to rotate the transcatheter valve prosthesis 1300 relative to the anatomy to correct the circumferential or rotational orientation, if necessary, to avoid blocking native anatomy at a deployment location of the transcatheter valve prosthesis 1300 (e.g., target site). For example, as illustrated in FIG. 14B, the outflow marker 170 that are positioned at locations 177 and 179 rotationally aligns the commissures 202 of the prosthetic valve 200 of the transcatheter valve prosthesis 1300 with the native valve commissures. Commissure to commissure alignment (prosthetic valve 200 commissure to native valve commissure) may improve transcatheter valve prosthesis 1300 hemodynamics and leaflet durability.

In an embodiment, as illustrated in FIG. 14B, the outflow marker 170 that is at the location 177 can be utilized to align the axial strut 126B to the right coronary ostium. The outflow marker 170 that is at the location 179 can be utilized to align the axial strut with the left coronary ostium. To align the transcatheter valve prosthesis 1300, the stent 102 can rotated, in situ, by a delivery system to be positioned in a desired circumferential or rotational alignment. The alignment of the outflow markers 170 at the locations 177 and 179 may operate as guides for future coronary interventions.

In embodiments, the inflow markers 160 and the outflow markers 170 can be utilized in orientation (e.g., axial alignment, tilt alignment, circumferential (rotational) alignment, etc.) of the transcatheter valve prosthesis 1300, in situ, during installation as described below with reference to FIGS. 15A-15C. FIGS. 15A-15C illustrate various views of a target site 300 e.g., an aortic heart valve, for the transcatheter valve prosthesis 1300. As illustrated in FIG. 15A, which is an annular view of the target site 300 taken perpendicular to an annulus 301, the target site 300 includes three valve cusps of the aortic root, the right coronary cusp 302, the left coronary cusp 304 and the non-coronary cusp 306. The region of the right coronary cusp 302 includes ostium of the right coronary artery 308. Likewise, the region of the left coronary cusp 304 includes ostium of the left main coronary artery 310.

When installing the transcatheter valve prosthesis 1300, it is desirable to properly align the stent 102 with the target site 300, as discussed above. For example, the transcatheter valve prosthesis 1300 needs to be properly aligned, axially, so that the transcatheter valve prosthesis 1300 properly engages the native tissue of the target site 300. Likewise, the transcatheter valve prosthesis 1300 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 may reduce the risk of blocking coronary access and may enhance hemodynamics and valve durability because of commissure-to-commissure alignment. As illustrated in FIG. 15A, the right coronary cusp 302, the left coronary cusp 304, and the non-coronary cusp 306 include commissure regions: right/left commissure 320, right/non-coronary commissure 322, and left/non-coronary commissure 324. FIG. 15B illustrates a 2-D side view of the target site 300 taken in an image plane 332 (represented as a line in FIG. 15A). The image plane 332 is approximately perpendicular to an image plane 330 (represented as a line in FIG. 15A) in an x-direction and y-direction, and the image plane 332 extends in the z-direction (a direction normal to the 2D view of FIG. 15A). FIG. 15C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

As illustrated in FIG. 12B, the inflow markers 160 can be utilized to axially align the stent 102 with features in the target site 300, e.g., basal plane 340 of the right coronary cusp 302, the left coronary cusp 304 and the non-coronary cusp 306. For example, as discussed above with reference to FIG. 3D, which is a three dimension view of the target site 300, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 1300, the stent 102, via a delivery system can be manipulated (e.g., advanced, retracted, etc.) until the inflow markers 160 align with the basal plane 340, as illustrated in FIG. 15B. As such, the transcatheter valve prosthesis 1300 can be positioned at a proper depth within the target site 300, thereby ensuring proper engagement with the native tissue.

In embodiments, as described above with reference to FIGS. 3A-3C, the outflow markers 170 that are positioned at the location 177 and 179, alone, can be utilized to align circumferential or rotational orientation of the transcatheter valve prosthesis 1300. For example, the outflow marker 170 that is at the location 177 can be utilized to align the axial strut 126B to the right coronary ostium. The outflow marker 170 that is at the location 179 can be utilized to align the axial strut with the left coronary ostium. One skilled in the art will realize that the outflow markers 170 can be aligned to any feature at the target site 300.

In embodiments, the combination of the outflow marker 170 that is positioned at the location 177 and the outflow marker 170 that is positioned at the location 179 can be utilized to align circumferential or rotational orientation of the transcatheter valve prosthesis 1300. That is, the relative appearance and/or location in a 2D image can be utilized to align circumferential or rotational orientation of the transcatheter valve prosthesis 1300. In particular, the relative radial appearance in 2D image can indicate the relative positioning of the outflow marker 170 that is positioned at the location 177 and the outflow marker 170 that is positioned at the location 179, when an image plane is aligned to a desired feature at the target site 300.

For example, to utilize the outflow markers 170 as guides to the ostium of the left main coronary artery 310 and the ostium of the right main coronary artery 308, the axial strut 126B, containing the outflow marker 170 that is positioned at the location 177, can be aligned with the right coronary cusp 302, and the axial strut 126B, containing the outflow marker 170 that is positioned at the location 179, can be aligned with the left coronary cusp 304, as illustrated in FIG. 15A. As illustrated in FIG. 15B, if viewed in the image plane 332, the stent 102 can be rotated the outflow marker 170 at the location 177 appears at the left of the image, thereby indicating alignment of the axial strut 126B with the right coronary cusp 302. Likewise, if viewed in the image plane 332, the stent 102 can be rotated until the outflow marker 170 that is at location 179 appears at the right of the image, thereby indicating alignment of the axial strut 126B with the left coronary cusp 304. The annular alignment of the outflow marker 170 (e.g., annular offset) can operate as a guide to which of the outflow markers 170 is at location 177 and location 179. For example, as illustrated in FIG. 15B, the outflow marker 170 appearing on the left of the image should be offset closer to the inflow end 106, and the outflow marker 170 appearing on the right of the image should appear offset closer to the outflow end 116.

In embodiments, the outflow markers 170 can also be used as a guide to the front or rear location of the outflow markers 170 appearing in 2D image, as described above. The relative motion of the outflow markers 170, when rotated, can be used to indicate the front or rear location of the outflow markers 170 appearing in 2D image. In particular, the right or left location of the outflow markers 170, during rotation of the stent 102, can indicate the front or rear location. For example, if the outflow marker 170 that is positioned at the location 177 is placed on an axial strut 126B to the left of outflow marker 170 that is positioned at the location 179, the appearance of the outflow marker 170 that is positioned at the location 177 to the left of the outflow marker 170 that is positioned at the location 179, during rotation, would indicate a front location. While the particular movement of the outflow markers 170 is discussed above in reference to transcatheter approach, one skilled in the art will realize that the relative movement of the outflow markers 170 may change based on a different approach.

In any embodiment described above, the inflow markers 160 and/or the outflow markers 170 can be formed as a directional marker that assists in the circumferential (rotational) orientation based on the shape of the directional marker. For example, the inflow markers 160 and/or the outflow markers 170 include formed in and/or can include an element that appears differently based on the rotational orientation, e.g., "C-shaped," "P-shaped," etc. The directional marker can assist a physician with correctly orienting the transcatheter valve prosthesis 100, 400, 700, 1000 and/or 1300, in situ. The directional marker can allow a physician to correctly interpret the circumferential orientation of the transcatheter valve prosthesis 100, 400, 700, 1000 and/or 1300 and to clock or rotate the transcatheter valve prosthesis 100, 400, 700, 1000 and/or 1300 relative to the anatomy to correct the circumferential or rotational orientation if necessary. As discussed above, when being positioned in situ, it is very important to avoid blocking the ostia of the right coronary artery and/or the left main coronary artery and attaining commissure-to-commissure alignment. Proper circumferential or rotational orientation within the native anatomy reduces the risk of blocking coronary access. The transcatheter valve prosthesis 100, 400, 700, 1000 and/or 1300 is rotatable, in situ, by the delivery system to be positioned in a desired orientation. When formed as a direction marker, the inflow markers 160 and/or the outflow markers 170 can further assist the physician to determine the orientation of the stent 102, in situ, and rotate the transcatheter valve prosthesis relative to the anatomy if needed to avoid blocking the coronary arteries and attaining commissure-to-commissure alignment.

For example, the inflow markers 160 and/or the outflow markers 170 can be formed as directional marker that includes a C-shaped feature. Because the C-shape of the directional marker looks different when viewed from a front view or position as compared to when viewed from a reverse view or position, the physician can determine whether a particular portion of the stent 102, a commissure post 126A, etc., is facing toward or away from the viewing direction. In other words, the C-shape of the directional marker can be an axially non-symmetrical element such that depending upon the location, in situ, the C-shape of the directional marker may be displayed to the physician as a "C" or may be displayed to the physician backwards or as a mirror image of a "C". Since the optimal circumferential or rotational orientation of the transcatheter valve prosthesis 100, 400, 700, 1000 and/or 1300 relative to the coronary arteries can be verified prior to releasing the transcatheter valve prosthesis 100, 400, 700, 1000 and/or 1300 from the delivery system, the physician can ensure that the transcatheter valve prosthesis 100, 400, 700, 1000 and/or 1300 is properly oriented in the native anatomy so as to not block the coronary arteries and commissure-to-commissure alignment. In embodiments, the inflow markers 160 and/or the outflow markers 170 can be formed as directional marker that is formed as or includes any letter, number, symbol, or shape that looks different when viewed from a front view or position as compared to when viewed from a reverse view or position, e.g., a letter "P," a letter "S," a number "7," etc.

Figure 16A:
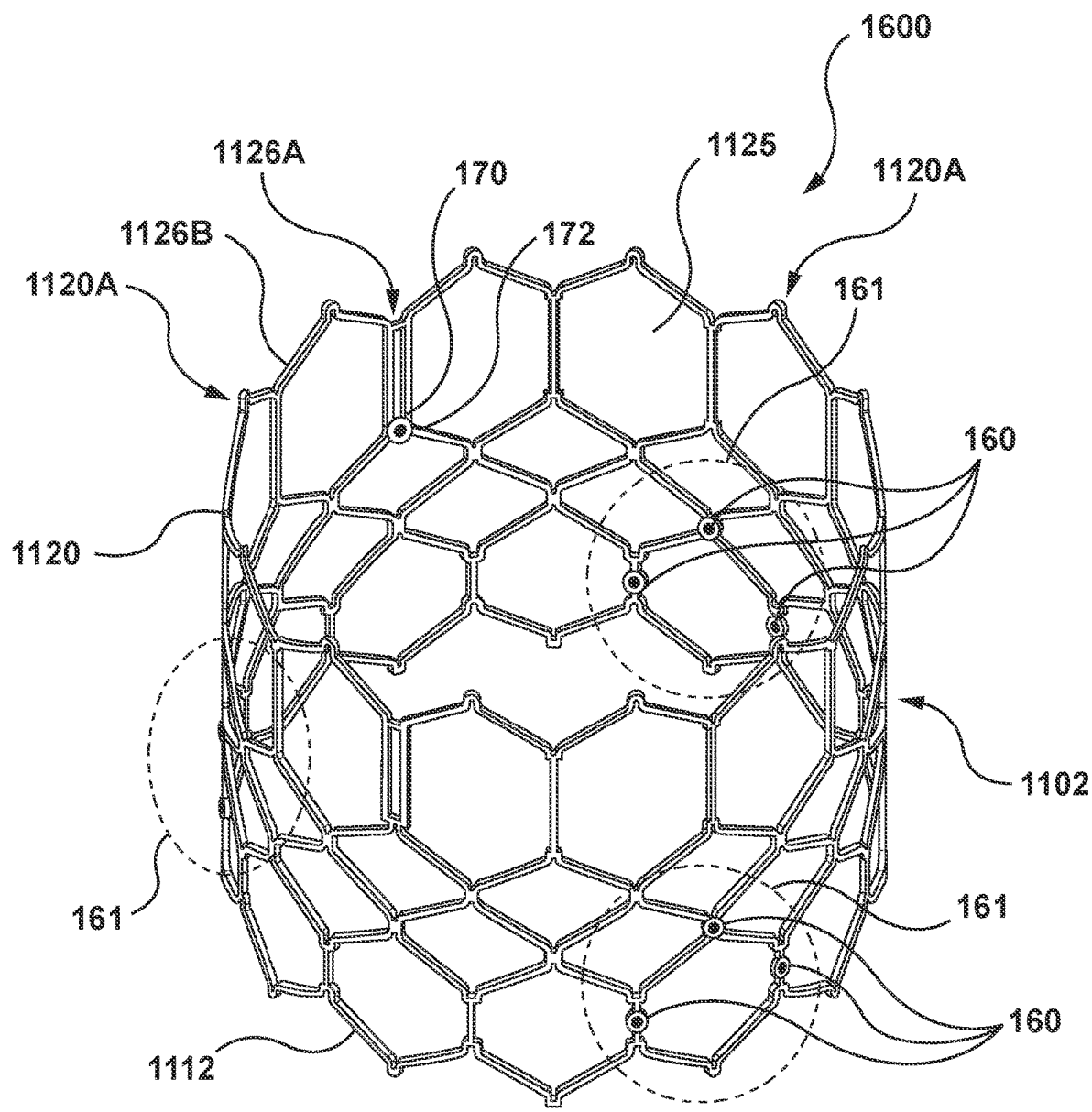
FIGS. 16A and 16B illustrate several views of another transcatheter valve prosthesis in accordance with an embodiment hereof.
Figure 16B:
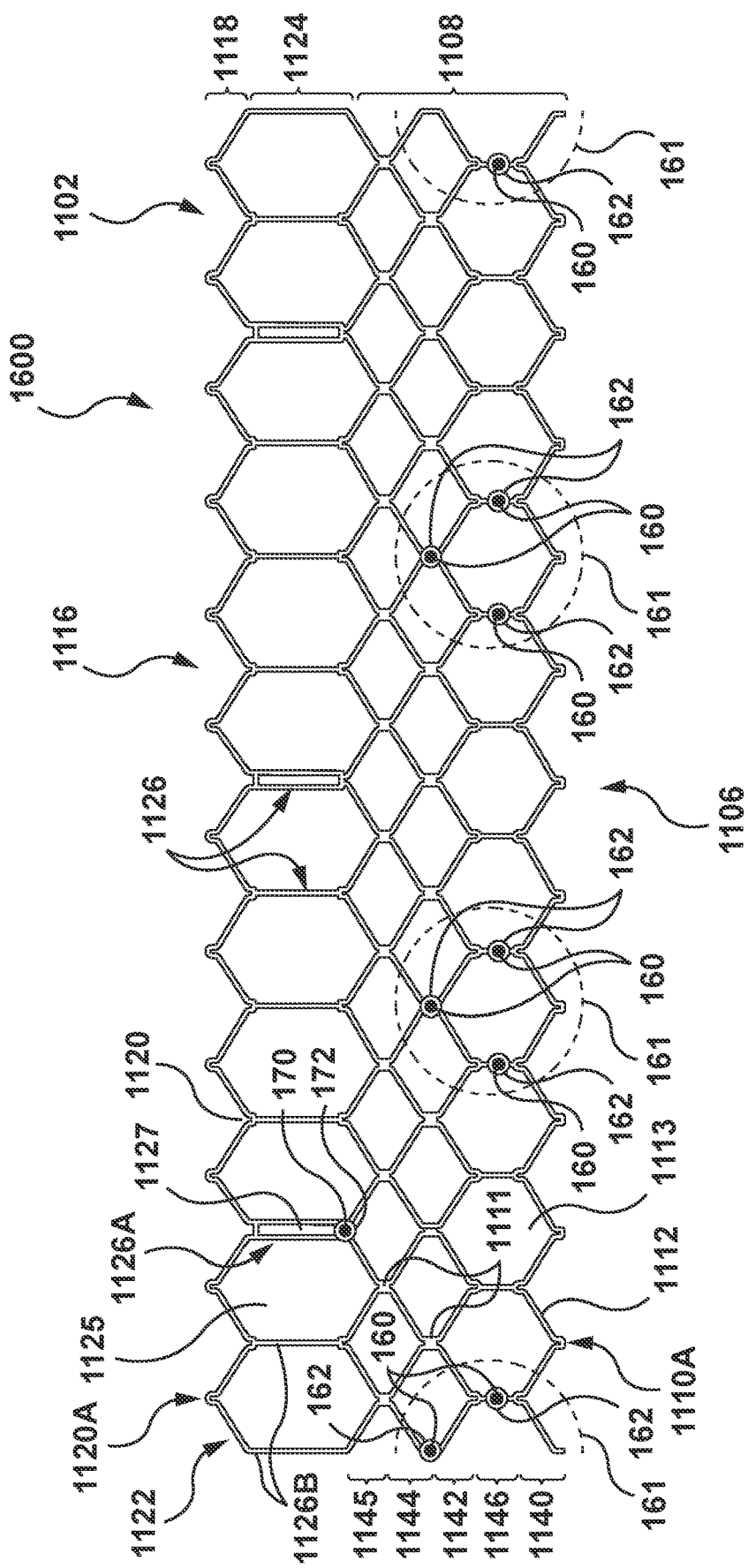

FIGS. 16A and 16B illustrate a valve prosthesis 1600 in which a radially-expandable stent 1102 thereof includes an inflow marker 160 that is located at one of several potential locations 161 and an outflow marker 170, according to embodiment hereof. In embodiments, the inflow marker 160 and the outflow marker 170 can be utilized in orientation (e.g., axial alignment, tilt alignment, circumferential (rotational) alignment, etc.) of the transcatheter valve prosthesis 1600, in situ, as discussed in detail below.

One skilled in the art will realize that FIGS. 16A and 16B illustrate one example of an implantable medical device and that existing components illustrated in FIGS. 16A and 16B may be removed and/or additional components may be added. Additionally, while the transcatheter valve prosthesis 1600 is described below as including the inflow marker 160 and the outflow marker 170, one skilled in the art will realize that the transcatheter valve prosthesis 1600 can include additional markers, for example, any of the markers described herein. Moreover, while examples of operations and advantages of the transcatheter valve prosthesis 1600, the inflow marker 160 and the outflow marker 170 are discussed below, one skilled in the art will realize any of the operations and processes described herein can be performed using the transcatheter valve prosthesis 1600.

The stent 1102 has an expanded configuration, which is shown FIG. 16A. The stent 1102 can be made from a plastically deformable material such that, when expanded, the stent 1102 maintains its radially expanded configuration. The stent 1102 can be formed from any of various suitable plastically-expandable materials (e.g., stainless steel, etc.) or self-expanding materials (e.g., Nitinol) as known in the art. For example, the stent 1102 can be formed from stainless steel or other suitable metal, such as platinum iridium, cobalt chromium alloys such as MP35N, or various types of polymers or other materials known to those skilled in the art, including said materials coated with various surface deposits to improve clinical functionality. In some embodiments, the stent 1102 can be self-expanding.

The stent 1102 can be formed from a unitary frame or scaffold having an inflow portion 1108, an outflow portion 1118, and a transition portion 1124 bridging, connecting, or otherwise extending between the inflow portion 1108 and the outflow portion 1118. The stent 1102 can be a generally tubular component defining a central lumen or passageway and can have an inflow or proximal end 1106 and an outflow or distal end 1116. In some embodiments, when expanded, a diameter of the inflow end 1106 of the stent 1102 can be the same as a diameter of the outflow end 1116 of the stent 1102. The stent 1102 can be formed by a laser-cut manufacturing method and/or another conventional stent forming method as would be understood by one of ordinary skill in the art. The cross-section of the stent 1102 can be trapezoidal, circular, ellipsoidal, rectangular, hexagonal, square, or other polygonal shape, although at present it is believed that trapezoidal, circular or ellipsoidal may be preferable when utilized with the replacement of an aortic valve. FIG. 16B shows an open, flat view of an example of the stent 1102.

The inflow portion 1108 can be formed proximate to the inflow end 1106 of the stent 1102. The inflow portion 1108 of the stent 1102 may be formed with crowns 1110, struts 1112, and nodes 1111 formed at an intersection of pairs of struts 1112. In some embodiments, the inflow end 106 of the stent 102 can include a total of twelve endmost inflow crowns 1110A. Pairs of the struts 1112, coupled at the nodes 1111, form a cell 1113 that define an open space in the stent 1102.

The outflow portion 1118 can be formed proximate to the outflow end 1116 of the stent 1102. The outflow portion 1118 can be configured in a shape that forms a central lumen or passageway, for example, a ring. The outflow portion 1118 can include a plurality of crowns 1120 and a plurality of struts 1122 with each crown 1120 being formed between a pair of opposing struts 1122. Each crown 1120 can be a curved segment or bend extending between opposing struts 1122. A series of endmost outflow crowns 1120A are formed at the outflow end 1116 of the stent 1102. In some embodiments, the outflow end 1116 of the stent 1102 can have a total of twelve endmost outflow crowns 1120A.

The transition portion 1124 bridges, connects, or otherwise extends between the inflow portion 1108 and the outflow portion 1118. In some embodiments, the transition portion 1124 can include a minimum of three axial frame members 1126, each axial frame member 1126 extending between an outflow crown 1120 of the outflow portion 1118 and a crown 1110 of the inflow portion 1108. Each axial frame member 1126 can be connected to a crown 1120 of the outflow portion 1118 and connected to a crown 1110 of the inflow portion 1108. The axial frame members 1126 can be substantially parallel to the central longitudinal axis of the stent 1102. Each axial frame member 1126 can be disposed approximately halfway between a pair of adjacent endmost outflow crowns 1120A. While the stent 1124 has been described as including a transition portion 1124, one skilled in the art will realize that the transition portion 1124 may form a portion of the inflow portion 108 and/or the outflow portion 1118

In an embodiment, the transition portion 1124 can include up to twelve axial frame members 1126, with three of the axial frame members 1126 being commissure posts 1126A and nine of the axial frame members 1126 being axial struts 1126B. The commissure posts 1126A and the axial struts 1126B can be being alternatingly positioned, as illustrated, for example, in FIG. 20B with three axial struts 1126B being positioned between two commissure posts 1126A. The commissure posts 1126A can be circumferentially spaced apart and aligned with and attached to a respective commissure of the three leaflets of the prosthetic valve, and the three axial struts 1126B can be disposed between adjacent commissure posts 1126A. The axial frame members 1126 may aid in valve alignment and coaptation. More particularly, the axial frame members 1126 reinforce or strengthen the commissure region of the prosthetic valve by shaping the leaflets and supporting the leaflets during opening and closing thereof, and thus provide more reliable leaflet coaptation. In addition, the axial frame members 1126 maximize symmetrical cell expansion.

In embodiments, each of the commissure posts 1126A includes a commissure window 1127. Each commissure post 1126A mounts a respective commissure of the leaflet structure of a replacement valve. Each axial frame members 1126 can be secured at its upper and lower ends to the adjacent rows of struts.

In an embodiment, the endmost outflow crowns 1120A are not connected to the axial frame members 1126 but rather may be considered to be free or unattached while the remaining outflow crowns 1120 of the outflow portion 1118 are connected to the axial frame members 1126 and disposed closer to the inflow end 1106 than the endmost outflow crowns 1120A. In the embodiment shown, the stent 1102 includes a single row of struts 1122 and crowns 1120 coupled to the axial frame members 1126 and defining the outflow end 1116 of the stent 1102. Further, in the embodiment shown, exactly two struts 1122 and a single crown 1120 of the outflow portion 118 are disposed between adjacent axial frame members 1126. Such an arrangement can provide a series of twelve endmost cells 1125 formed at the outflow portion 1118 of the stent 1102.

In embodiments, each endmost cell 1125 can define an open space in the stent 1102, which is formed in any type of shape, in the radially expanded configuration, for example, as shown in FIG. 16A. Each endmost cell 1125 can be defined by two adjacent struts 1122 of the outflow portion 1118, two adjacent struts 1112 of the inflow portion 1108, and two adjacent axial frame members 1126 of the transition portion 1124. The endmost cells 1125 of the outflow portion 1118 can be relatively larger than the cells 1113 of the inflow portion 1108 to improve access to the coronary arteries. More particularly, the endmost cells 1125 of the outflow portion 1118 can be configured to be of sufficient size to be easily crossed with a coronary guide catheter into either the right coronary artery or the left main coronary artery once the transcatheter valve prosthesis 1600 is deployed, in situ.

In embodiments, as illustrated in FIG. 16B, the inflow portion 1108 of the stent 1102 can include a first, lower row 1140 of struts 1112, which are angled, arranged end-to-end and extending circumferentially at the inflow portion 1108 of the stent 1102. The inflow portion 1108 of the stent 1102 can include a second row 1142 of struts 1112, which are angled, circumferentially extending at the inflow portion 1108 of the stent 1102. The inflow portion 1108 of the stent 1102 can include a third row 1144 of struts 1112, which are angled, circumferentially extending at the inflow portion 1108 of the stent 1102. The inflow portion 1108 of the stent 1102 can include a fourth row 1145 of struts 1112, which are angled, circumferentially extending at the inflow portion 1108 of the stent 1102. The inflow portion 1108 can also include a row 1146 of struts 1112, which are substantially straight axially. The struts 1112 of row 1146 can be used to interconnect the struts 1112 of the row 1140 with the struts of row 1142. In some embodiments, the struts 1112 of the rows 1140, 1142, 1144, 1145, and 1146 can be formed to the same length. In some embodiments, the struts 1112 of the rows 1140, 1142, 1144, 1145, and 1146 can be formed to the different lengths. For example, the struts 1112 of row 1146 may be formed to a different length compared to the struts 1112 of rows 1140, 1142, 1144, and 1145.

In embodiments, to ensure the proper placement in the native anatomy of a subject, the transcatheter valve prosthesis 1600 can include the inflow marker 160 that is located at one of the potential locations 161 and the outflow marker 170. The outflow marker 170 can operate to assist in rotational orientation of the stent 1102, as described below. Additionally, the outflow marker 170 can operate as a guide for determining a front or rear location the outflow marker 170 in 2D image during implantation, as described below. In embodiments, the outflow marker 170 can be positioned on one of the commissure post 126A, for example, in the outflow portion 1118 or the transition portion 1124.

As illustrated in FIG. 16B, in an embodiment, the outflow marker 170 can be position at a lower portion of the commissure post 126A, for example, at the connection of the commissure post 126A to a pair of struts 1112 in the inflow portion 1108. In any embodiment, the outflow marker 170 can be attached to the stent 1102 within a containment member 172 formed in a commissure post 1126A. The containment member 172 can be positioned at any location along the commissure post 1126A, for example, proximal to the outflow portion 1118, in the center of the commissure post 1126A, biased towards the inflow end 1106 (as illustrated in FIG. 16B), or at any location with the transition portion 1124, and the like.

In embodiments, the containment member 172 can be configured as a hollow structure or opening in the outflow portion 1118 which can receive the outflow marker 170. For example, as discussed above with reference to in FIGS. 1A-1F, if the outflow marker 170 has a circular cross-sectional shape, the containment member 172 can define a cavity that is circular, e.g., a hollow ring. In another embodiment (not shown), the outflow marker 170 can be attached to an exterior surface of the commissure post 1126A at a location that does not affect the operation of the transcatheter valve prosthesis 1600. For example, the outflow marker 170 can be attached to a top surface of the outflow portion 1118, e.g., on an endmost crown 1120A, proximal to the outflow end 1116. In this example, the outflow marker 170 can be configured not to extend beyond the exterior diameter of the stent 1102 or extend into the central lumen of the stent 1102, e.g., having a radial depth that is equal to or less than the radial depth of the outflow portion 1118.

In any embodiment, the containment member 172 can be configured in a shape that matches a shape of the outflow marker 170. For example, as illustrated in FIGS. 16A and 16B, if the outflow marker 170 has a circular cross-sectional shape, the containment member 172 can define a cavity that is circular, e.g., a hollow ring. In some embodiments, the containment member 172 need not extend from an exterior or an interior of the outflow portion 1118 and/or any location on the commissure post 1126A such that the containment member 172 includes a surface aligned with the exterior surface or interior surface of the stent 1102. In some embodiments, the containment member 172 may extend from an exterior or an interior surface of the outflow portion 1118 and/or any location on the commissure post 1126A. In some embodiments, the containment member 172 can be open to the interior and exterior of the stent 1102, thereby allowing the outflow marker 170 to be exposed to the interior and exterior of the stent 1102 and increasing visibility at multiple angles. In some embodiments, the containment member 172 can be open only to the interior or exterior of the stent 1102, thereby forming a cavity or depression in the outflow portion 1118.

In some embodiments, when placed in the containment member 172, the outflow marker 170 may be contained within the containment member 172 and may be recessed from an exterior and/or an interior surface of the outflow portion 1118 and/or any location on the commissure post 1126A. In some embodiments, when placed in the containment member 172, the outflow marker 170 may be contained within the containment member 172 and may be flush with an exterior and/or an interior surface of the outflow portion 1118 and/or any location on the commissure post 1126A. In some embodiments, when placed in the containment member 172, the outflow marker 170 may be extend from the containment member 172 and may be extend from an exterior and/or an interior surface of the outflow portion 1118 and/or any location on the commissure post 1126A.

In any embodiment, the outflow marker 170 can be attached to, positioned in, and/or formed in the containment member 172 utilizing any type of processes and/or procedure. In an embodiment, radiopaque beads or spheres (or lines of radiopaque beads or spheres) may be press fit, swaged, interference fit, etc. into the containment member 172. In any embodiment, the stent 1102 may not include a containment member 172. In this embodiment, the outflow marker 170 may be attached and/or applied to the outflow portion 1118 and/or any location on the commissure post 1126A. For example, the outflow marker 170 may comprise radiopaque bands that are attached to the outflow portion 1118 and/or any location on the commissure post 126A. Likewise, for example, the outflow marker 170 may be formed by applying radiopaque materials to the outflow portion 1118 and/or any location on the commissure post 1126A in any shape. One skilled in the art will realize that the outflow marker 170 may be attached to or formed on the stent 1102 utilizing any processes as required by the design of the stent 1102 and/or application of the transcatheter valve prosthesis 1600.

In any embodiment, the outflow marker 170 can be formed to dimensions such that the outflow marker 170 does not affect the operation of the transcatheter valve prosthesis 1600. For example, the outflow marker 170 can be formed to not extend beyond the exterior diameter of the stent 1102 or extend into the central lumen of the stent 1102, e.g., having a radial depth that is equal to or less than the radial depth of the commissure post 1126A. In an embodiment, the outflow marker 170 can have a circular cross-sectional shape with a diameter ranging between approximately 0.5 mm and 1.0 mm, for example, approximately 0.8 mm. In this embodiment, the containment member 172 can have a circular cross-sectional shape with a diameter ranging between approximately 0.5 mm and 1.0 mm, for example, approximately 0.8 mm. In another embodiment, the outflow marker 170 can have an elliptical cross-sectional shape with an axial diameter ranging between approximately 0.5 mm and 1.0 mm, for example, approximately 0.8 mm, and a circumferential diameter ranging between approximately 0.5 mm and 1.0 mm, for example, approximately 0.9 mm. In this embodiment, the containment member 172 can have an elliptical cross-sectional shape with an axial diameter ranging between approximately 0.5 mm and 1.0 mm, for example, approximately 0.8 mm, and a circumferential diameter ranging between approximately 0.5 mm and 1.0 mm, for example, approximately 0.9 mm.

In an embodiment, the stent 1102 includes a single inflow marker 160. The inflow marker 160 can be positioned towards the inflow end 1106 of the stent 102 in the inflow portion 108. In embodiment, as illustrated in FIGS. 16A and 16B, the inflow marker 160 can be positioned at one of the potential locations 161. In an embodiment, as illustrated in FIG. 16B, the stent 1102 can include four rows of the struts 1112. In embodiments, the potential locations 161 of the inflow marker 160 can be positioned at various locations, axially, in the inflow portion 108. The potential locations 161 of the inflow marker 160 can be at an intersection of the second row 1142 and the third row 1114. The potential locations 161 of the inflow marker 160 can be at on a strut 1112 in the row 1146 of struts. For example, the location 161 of the inflow marker 160 can correspond to the midpoint of the strut 1112 in the row 1146. The potential locations 161 of the inflow markers 160 can be circumferentially aligned with each other around a circumference of the stent 1102 and or offset annularly.

While FIGS. 16A and 16B illustrate one example of the positioning and number of inflow markers 160, one skilled in the art will realize that the stent 1102 can include any number of inflow markers 160, positioned at any location within the inflow portion 1108. For example, the inflow markers 160 can be positioned on the struts 1112. Likewise, for example, the inflow markers 160 can be asymmetrically aligned, circumferentially, around a circumference of the stent 1102, e.g., with different circumferential distances between the inflow markers 160. Additionally, for example, the inflow markers 160 can be positioned at different distances from the inflow end 1106. In any embodiment, the inflow marker 160 may be preferably located at a lengthwise location of the stent 1102 that is desired to be aligned with the annulus of the native heart valve when the transcatheter valve prosthesis 1600 is deployed at the native heart valve. For example, the inflow marker 160 allows for better depth positioning of the transcatheter valve prosthesis 1600, in a crimped or compressed configuration, such that it can be more accurately deployed and reduce the incidence rate of requiring a permanent pacemaker (PPM) post-implantation. While FIGS. 16A and 16B illustrate the stent 1102 including a single inflow marker 160, one skilled in the art will realize that the stent 1102 may include any number of the inflow markers 160, which are positioned at any of the potential locations 161.

As discussed above, the single inflow marker 160 can be positioned at one of the potential locations 161. FIGS. 17A and 17B illustrate a simplified top view of the stent 1102 from the outflow end 1116, which illustrates relative positioning of the inflow marker 160 and the outflow marker 170. In particular, FIG. 17A illustrates the stent 1102 (shown as dotted lines) that includes a prosthetic valve 200 having valve leaflets with commissures 202 positioned at the commissure posts 1126A. Further, FIG. 17A illustrates the circumferential positioning of the outflow marker 170 on the stent 1102 relative to the potential locations 161 of the inflow marker 160 on the stent 1102. FIG. 17B illustrates a potential alignment of the stent 1102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 18A-18C. One skilled in the art will realize that FIGS. 17A and 17B illustrate a simplified view of the transcatheter valve prosthesis 1600 and that the transcatheter valve prosthesis 1600 can include additional components, for example, components described with reference to FIGS. 16A and 16B.

Figure 21B:
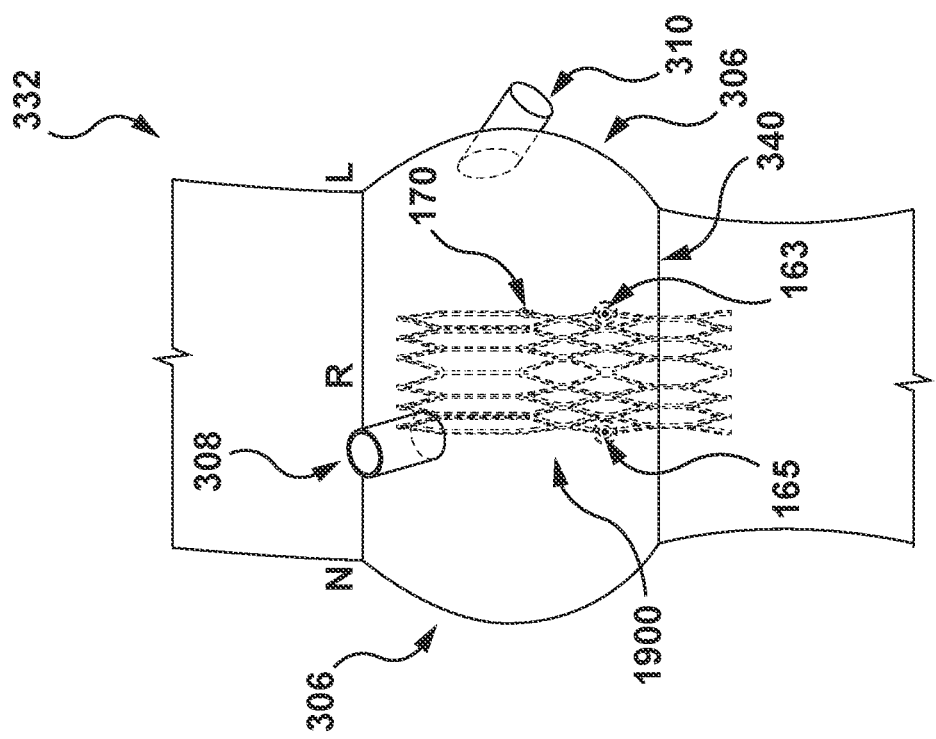
FIGS. 21A-21C illustrate various views of a target site for the valve prosthesis of FIGS. 19A and 19B in accordance with an embodiment hereof.
Figure 21A:
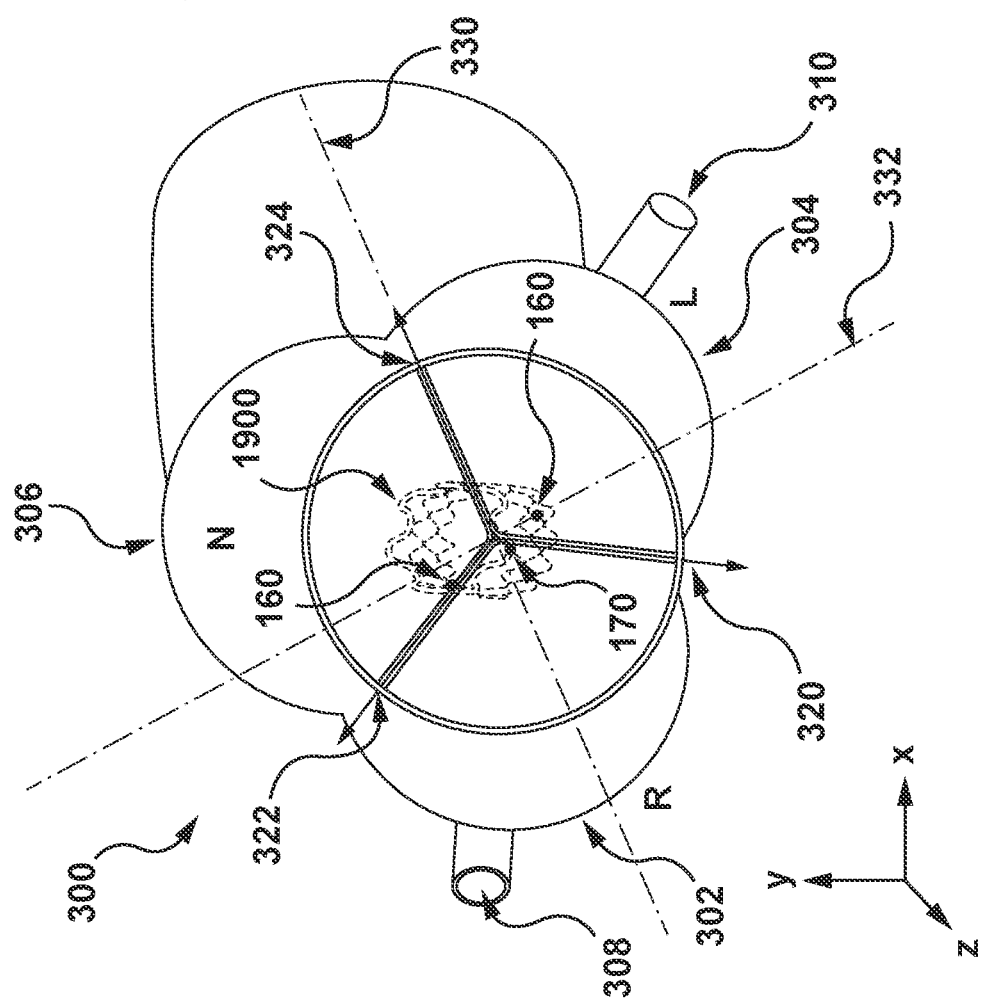

As illustrated in FIG. 21A, when positioned on the commissure post 1126A, the outflow marker 170 is positioned at a circumferential location of a commissure 202 of the valve leaflets of the prosthetic valve 200. The potential locations 161 of the inflow marker 160 can be positioned circumferentially around the stent 1102 as different rotational angles. For example, the potential locations 161 of the inflow marker 160 can be at sixty degrees clockwise, sixty degrees counter-clockwise, and one-hundred eighty degrees clockwise (or counter-clockwise), relative to the position of the outflow marker 170, e.g., the position of the commissure post 1126A.

Figure 18B:
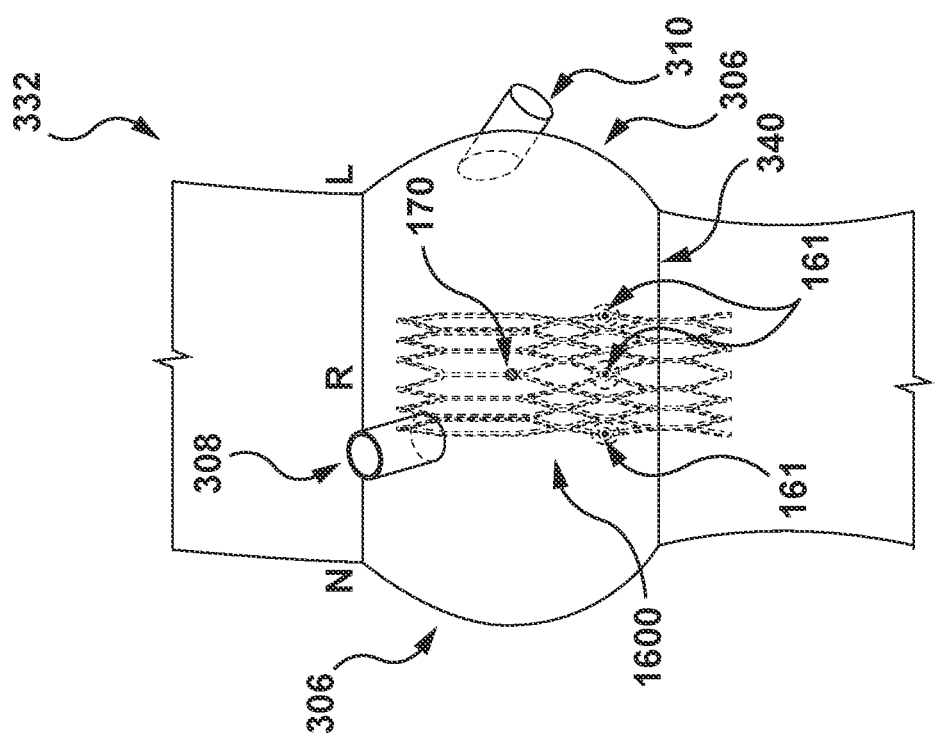
FIGS. 18A-18C illustrate various views of a target site for the valve prosthesis of FIGS. 16A and 16B in accordance with an embodiment hereof.

As illustrated in FIG. 17B and discussed in further detail below with reference to FIGS. 18A-18C, the outflow marker 170 can be utilized to align circumferential or rotational orientation of the transcatheter valve prosthesis 1600. More particularly, the outflow marker 170 can allow a physician to correctly interpret the circumferential orientation of the transcatheter valve prosthesis 1600 and to rotate the transcatheter valve prosthesis 1600 relative to the anatomy to correct the circumferential or rotational orientation, if necessary, to avoid blocking native anatomy at a deployment location of the transcatheter valve prosthesis 1600 (e.g., target site). For example, as illustrated in FIG. 17B, the outflow marker 170 rotationally aligns the commissures 202 of the prosthetic valve 200 of the transcatheter valve prosthesis 1600 with the native valve commissures. Commissure to commissure alignment (prosthetic valve 200 commissure to native valve commissure) may improve transcatheter valve prosthesis 1600 hemodynamics and leaflet durability. In an embodiment, as illustrated in FIG. 17B, the outflow marker can be utilized to align the commissure post 1126A to a commissure of a left coronary cusp ("L") and non-coronary cusp ("N") of the native valve, and opposing a right coronary cusp ("R"). To align the transcatheter valve prosthesis 1600, the stent 1102 can rotated, in situ, by a delivery system to be positioned in a desired circumferential or rotational alignment. Additionally, by aligning the commissure post 1126A to left/non-coronary commissure of the left coronary cusp and the non-coronary cusp, the commissure post 1126A may avoid blocking the ostium of the left main coronary artery.

Returning to FIGS. 16A and 16B, in embodiments, the inflow marker 160 can be attached to the stent 1102 within a containment member 162. The containment member 162 can be configured as a hollow structure or opening in the stent 1102 which can receive the inflow marker 160. In an embodiment, the containment member 162 can be open to the interior and exterior of the stent 1102, thereby allowing the inflow marker 160 to be exposed to the interior and exterior of the stent 1102 and increasing visibility at multiple angles. In some embodiments, the containment member 162 can be open only to the interior or exterior of the stent 1102, thereby forming a cavity or depression in the stent 102.

The containment member 162 can be configured in a shape that matches a shape of the inflow marker 160. For example, as illustrated in FIGS. 16A and 16B, if the inflow marker 160 have a circular cross-sectional shape, the containment member 162 can be define a cavity that is circular, e.g., a hollow ring. In some embodiments, the containment member 162 need not extend from an exterior or an interior of the stent 1102 such that the containment member 162 includes a surface aligned with the exterior surface or interior surface of the stent 1102. In some embodiments, the containment member 162 may extend from an exterior or an interior surface of the stent 1102.

In some embodiments, when placed in the containment member 162, the inflow marker 160 may be contained within the containment member 162 and may be recessed from an exterior and/or an interior surface of the stent 1102. In some embodiments, when placed in the containment member 162, the inflow marker 160 may be contained within the containment member 162 and may be flush with an exterior and/or an interior surface of the stent 1102. In some embodiments, when placed in the containment member 162, one or more the inflow marker 160 may be extend from the containment member 162 and may be extend from an exterior and/or an interior surface of the stent 1102.

In embodiments, the inflow marker 160 can be attached to, positioned in, and/or formed in the containment member 162 utilizing any type of processes and/or procedure. In an embodiment, radiopaque beads or spheres (or lines of radiopaque beads or spheres) may be press fit, swaged, interference fit, etc. into the containment member 162. In an embodiment, the stent 1102 may not include a containment member 162. In this embodiment, the inflow marker 160 may be attached and/or applied to the stent 1102. For example, the inflow marker 160 may comprise radiopaque bands that are attached to the stent 1102. Likewise, for example, the inflow marker 160 may be formed by applying radiopaque materials to the stent 1102 in any shape. One skilled in the art will realize that the inflow marker 160 may be attached to or formed on the stent 1102 utilizing any processes as required by the design of the stent 1102 and/or application of the transcatheter valve prosthesis 1600.

In embodiments, the inflow marker 160 can be formed to dimensions such that the inflow markers 160 do not affect the operation of the transcatheter valve prosthesis 1600. For example, the inflow marker 160 can be formed to not extend beyond the exterior diameter of the stent 1102 or extend into the central lumen of the stent 1102, e.g., having a radial depth that is equal to or less than the radial depth of the struts 1112. In an embodiment, the inflow marker 160 can have a circular cross-sectional shape with a diameter ranging between approximately 0.5 mm and 1.0 mm, for example, approximately 0.8 mm. In this embodiment, the containment member 162 can have a circular cross-sectional shape with a diameter ranging between approximately 0.5 mm and 1.0 mm, for example, approximately 0.8 mm. In another embodiment, the inflow marker 160 can have an elliptical cross-sectional shape with an axial diameter ranging between approximately 0.5 mm and 1.0 mm, for example, approximately 0.8 mm, and a circumferential diameter ranging between approximately 0.5 mm and 1.0 mm, for example, approximately 0.9 mm. In this embodiment, the containment member 162 can have an elliptical cross-sectional shape with an axial diameter ranging between approximately 0.5 mm and 1.0 mm, for example, approximately 0.8 mm, and a circumferential diameter ranging between approximately 0.5 mm and 1.0 mm, for example, approximately 0.9 mm.

In any embodiment, the inflow marker 160 and/or the outflow marker 170 can be formed in any shape to assist in the alignment of the transcatheter valve prosthesis 1600. In embodiments, as illustrated in FIGS. 16A and 16B, the inflow marker 160 or the outflow marker 170 can be formed having a circular cross-sectional shape. In other embodiments, the inflow marker 160 or the outflow marker 170 can be formed in any other 2D or 3D shape, which has any type of 2D or 3D cross-sectional shape, such as pins, dots, ovals, spheres, triangles, cones, squares, cubes, bars, crosses, bands, rings, letters, and combination thereof. One skilled in the art will realize that other configurations and shapes of the inflow marker 160 or the outflow marker 170 may be provided to provide a benefit for a given application.

In any embodiment, the inflow marker 160 and/or the outflow marker 170 includes radiopaque or other material that allow the inflow marker 160 and the outflow marker 170 to be detected and/or viewed during the installation of the transcatheter valve prosthesis 1600. Examples of radiopaque materials include metals, e.g., stainless steel, titanium, tungsten, tantalum, gold, platinum, platinum-iridium, and/or other polymeric materials, e.g., nylon, polyurethane, silicone, pebax, PET, polyethylene, that have been mixed or compounded with compounds of barium, bismuth and/or zirconium, e.g., barium sulfate, zirconium oxide, bismuth sub-carbonate, etc.

In embodiments, the inflow marker 160 and the outflow marker 170 can be utilized in orientation (e.g., axial alignment, tilt alignment, circumferential (rotational) alignment, etc.) of the transcatheter valve prosthesis 1600, in situ, during installation as described below with reference to FIGS. 18A-18C. FIGS. 18A-18C illustrate various views of a target site 300, e.g., an aortic heart valve, of the transcatheter valve prosthesis 1600. As illustrated in FIG. 18A, which is a 2-D annular view of the target site 300 taken normal to an annulus 301, the target site 300 includes three valve cusps of the aortic root, the right coronary cusp 302, the left coronary cusp 304 and the non-coronary cusp 306. The region of the right coronary cusp 302 includes ostium of the right coronary artery 308. Likewise, the region of the left coronary cusp 304 includes ostium of the left main coronary artery 310.

When installing the transcatheter valve prosthesis 1600, it is desirable to properly align the stent 1102 within the target site 300. For example, the transcatheter valve prosthesis 1600 needs to be properly aligned, axially, so that the transcatheter valve prosthesis 1600 properly engages the native leaflets/tissue of the target site 300, e.g., the aortic annulus without causing conduction blockages by implanting too deep or causing an embolization of the transcatheter valve prosthesis 1600 because it was implanted too high. Likewise, the transcatheter valve prosthesis 1600 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 reduces the risk of blocking coronary access.

Figure 18A:
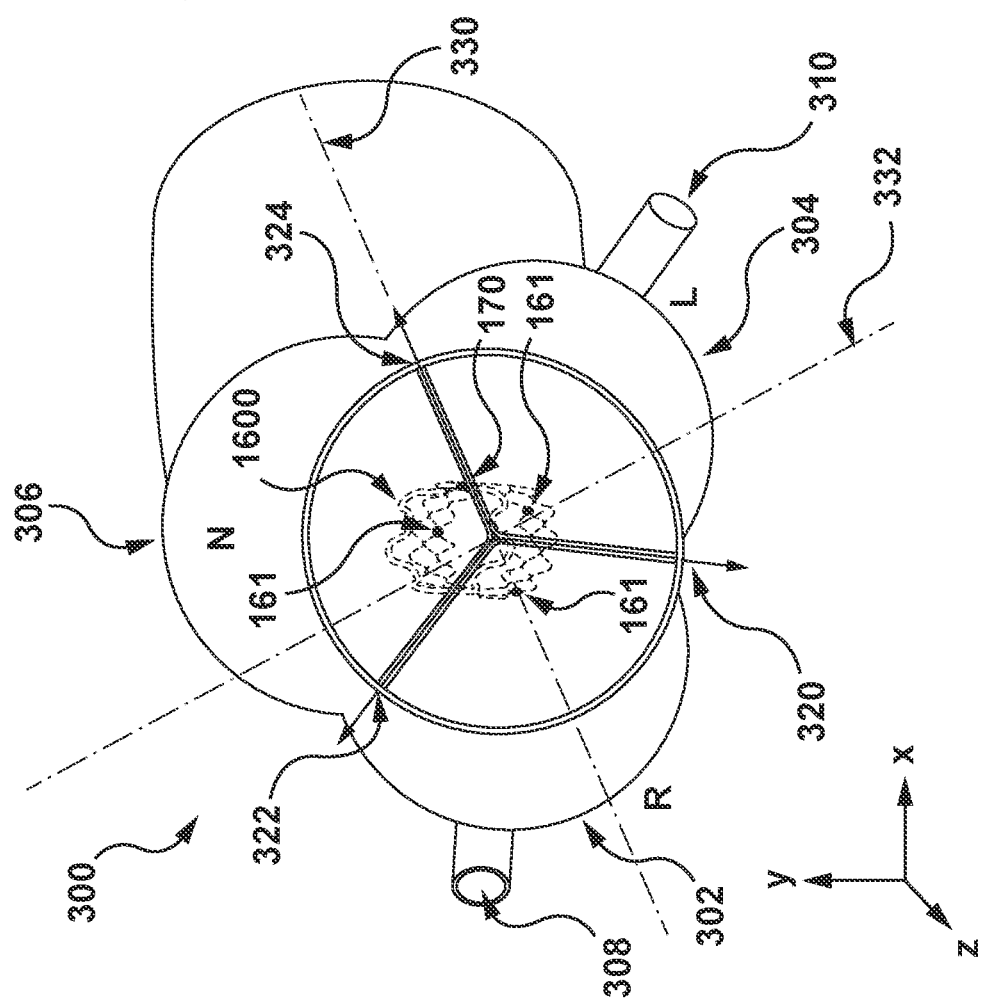
Figure 18C:
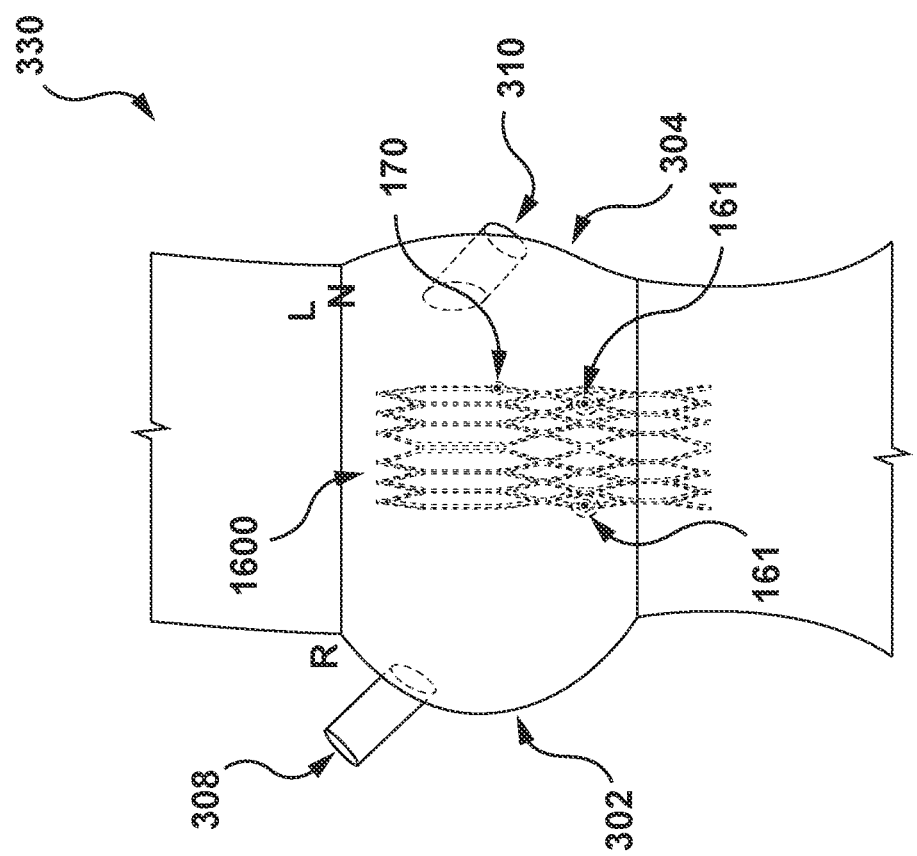

As illustrated in FIG. 18A, the right coronary cusp 302, the left coronary cusp 304, and the non-coronary cusp 306 include commissure regions: right/left commissure 320, right/non-coronary commissure 322, and left/non-coronary commissure 324. FIG. 18B illustrates a 2-D side view of the target site 300 taken in an image plane 332 (represented as a line in FIG. 18A). The image plane 332 is approximately perpendicular to an image plane 330 (represented as a line in FIG. 18A) in an x-direction and y-direction, and the image plane 332 extends in the z-direction (a direction normal to the 2D view of FIG. 18A). FIG. 18C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

As illustrated in FIG. 18B, the inflow marker 160 can be utilized to axially align the stent 1102 with features in the target site 300, e.g., basal plane 340 of the right coronary cusp 302, the left coronary cusp 304 and the non-coronary cusp 306. As described above with reference to FIG. 3D, which is a three dimension view of the target site 300, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 1600, the stent 1102, via a delivery system can be manipulated (e.g., advanced, retracted, etc.) until the inflow marker 160 align with the basal plane 340, as illustrated in FIG. 18B. As such, the transcatheter valve prosthesis 1600 can be positioned at a proper depth within the target site 300, thereby ensuring proper engagement with the native tissue.

In embodiments, the outflow marker 170 can be utilized to align circumferential or rotational orientation of the transcatheter valve prosthesis 1600. More particularly, the outflow marker 170 can allow a physician to correctly interpret the circumferential orientation of the transcatheter valve prosthesis 1600 and to clock or rotate the transcatheter valve prosthesis 1600 relative to the anatomy to correct the circumferential or rotational orientation, if necessary, to avoid blocking the ostia of the right coronary artery 308 and/or the left main coronary artery 310. In addition, the outflow marker 170 enables the commissures of the valve prosthesis 190 of the transcatheter valve prosthesis 1600 to be rotationally aligned with the native valve commissures. This alignment may improve transcatheter valve prosthesis 1600 hemodynamics and leaflet durability. To align the transcatheter valve prosthesis 1600, the stent 1102 can be rotated, in situ, by a delivery system to be positioned in a desired circumferential or rotational alignment.

For example, to avoid blocking the ostium of the left main coronary artery 310, the outflow marker 170 can be positioned on the stent 1102 such that for proper rotational orientation of the stent 1102, the outflow marker 170 is aligned with the left/non-coronary commissure 324 of the left coronary cusp 304 and the non-coronary cusp 306. As illustrated in FIG. 18B, if viewed in the image plane 332, the outflow marker 170 can be rotated until the outflow marker 170 is centered in the image (in the rear of the stent 1102), thereby indicating alignment of the commissure post 1126A, which has the outflow marker 170, with the left/non-coronary commissure 324. Likewise, for example, as illustrated in FIG. 18C, if viewed in the image plane 330, the outflow marker 170 can be rotated until the outflow marker 170 appears in the right of the image, thereby indicating alignment with the left/non-coronary commissure 324. This alignment ensures that the commissure post 1126A does not block the ostium of the left main coronary artery 310. Likewise, this alignment can allow other commissure posts 1126A (i.e., those without the outflow marker 170) to be aligned with the right/left commissure 320 and the right/non-coronary commissure 322, respectively. While the above describes, the outflow marker 170 being aligned with the left/non-coronary commissure 324, the outflow marker 170 can be aligned with other structure at the target site 300, e.g., right/left commissure 320, right/non-coronary commissure 322, etc.

In embodiments, the outflow marker 170 can also be used as a guide to a front or rear location of the outflow marker 170 appearing in 2D image. That is, the outflow marker 170 can be utilized to determine whether the outflow marker 170 is positioned on a side of the stent 102 closest to the imaging apparatus (front location) or positioned on a side of the stent 102 furthest from the imaging apparatus (rear location). As the stent 1102 is rotated, the outflow marker 170 moves right or left in the 2D images of the target site 300 depending on the front or rear location of the outflow marker 170 and the approach to the target site 300. For example, based on the transcatheter femoral approach over the aortic arch and to the target site 300, a tip of the delivery system may point in a direction opposite the direction of the handle used to rotate the stent 1102 (e.g., in a direction back towards the handle), thereby causing the stent 1102 to rotate in a direction opposite a direction of rotation of the handle, when viewed in a 2D image. In this example, as the handle is rotated clockwise (thereby rotating the stent 1102 counter-clockwise), the outflow marker 170 may move from right to left in 2D images taken in, for example, image plane 332 (FIG. 18B), thereby indicating that the outflow marker 170 is in the front (where an emitter of the imaging device is positioned on the front side of the stent 102 and the detector is on a back side of the stent 1102). As the handle is rotated clockwise (thereby rotating the stent 102 counter-clockwise), the outflow marker 170 moves from left to right in 2D images taken in the image plane 332, thereby indicating that the outflow marker 170 is in the rear (on the back side of the stent 1102 relative to positioning of the imaging device). If the handle is rotated counter-clockwise (thereby rotating the stent 1102 clockwise), the above movements would be reversed, e.g., left to right movement in the images would indicate front and right to left would indicate rear. While the particular movement of the outflow marker 170 is discussed above in reference to transcatheter femoral approach over the aortic arch, one skilled in the art will realize that the relative movement of the outflow marker 170 may change based on a different approach.

Figure 19A:
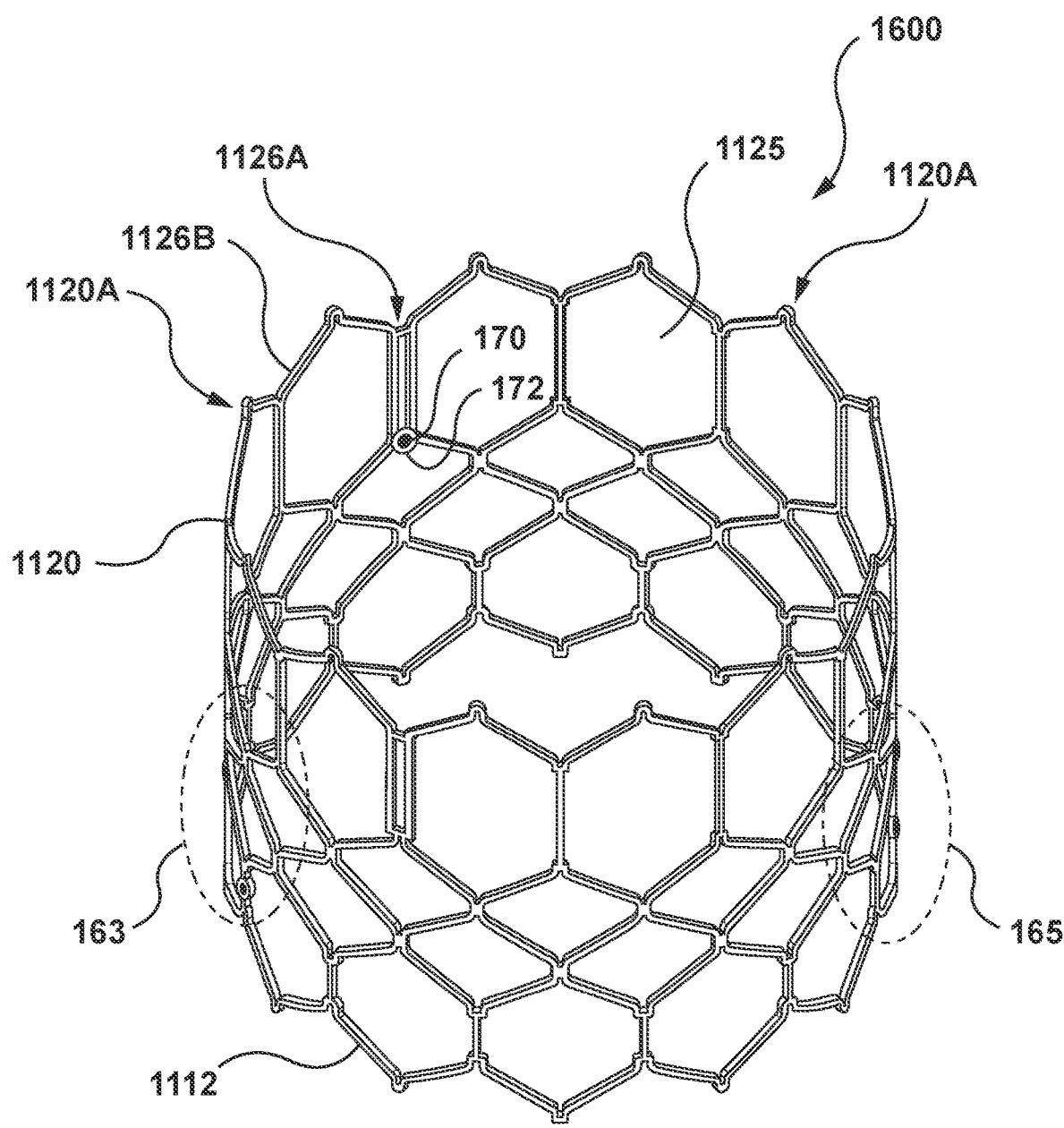
FIGS. 19A and 19B illustrate several views of another valve prosthesis in accordance with an embodiment hereof.
Figure 19B:
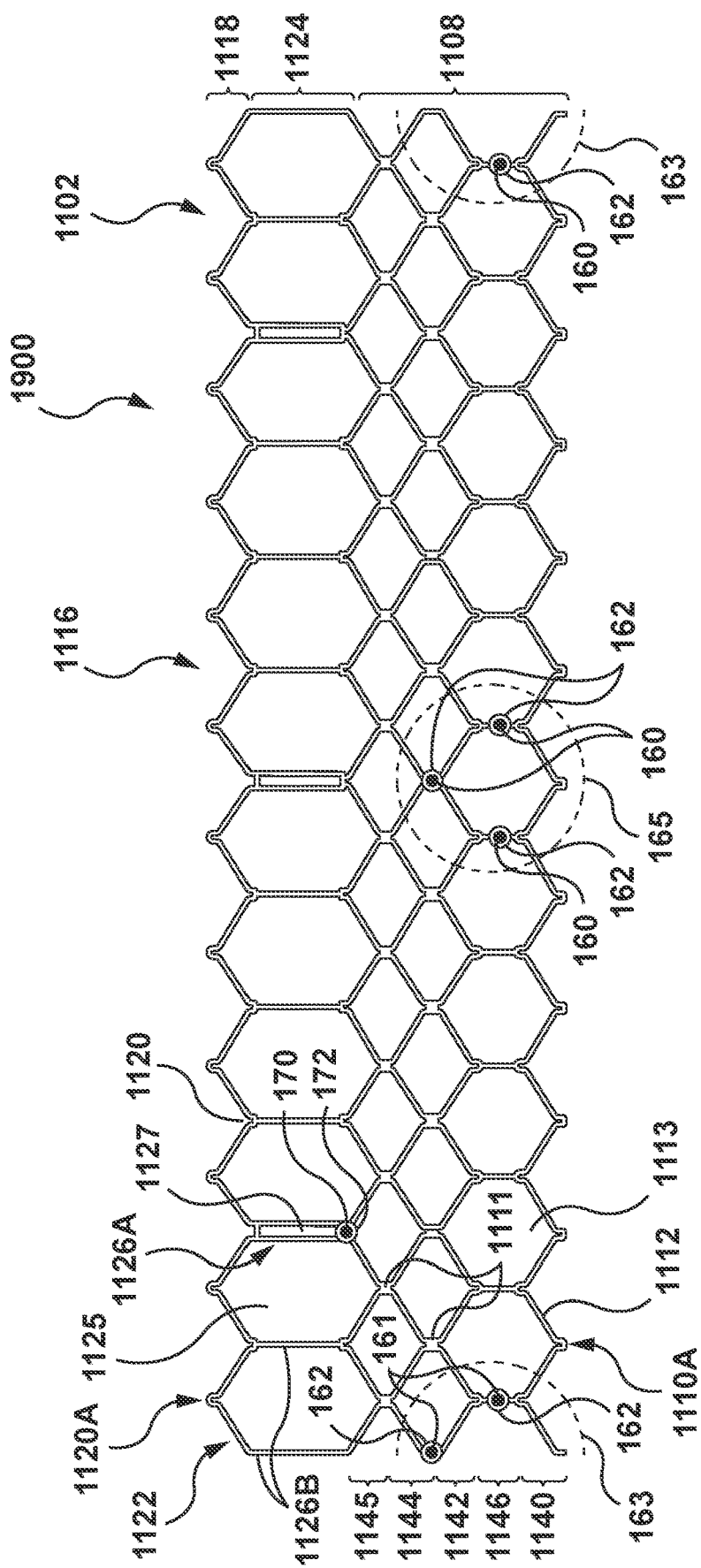

FIGS. 19A and 19B illustrate a transcatheter valve prosthesis 1900 in which the radially-expandable stent 1102 thereof incudes an inflow marker 160 positioned at a location 163, an inflow marker positioned at a location 165, and an outflow marker 170, according to another embodiment hereof. In embodiments, the inflow markers 160 and the outflow marker 170 can be utilized in orientation (e.g., axial alignment, tilt alignment, circumferential (rotational) alignment, etc.) of the transcatheter valve prosthesis 1900, in situ, as discussed in detail below.

One skilled in the art will realize that FIGS. 19A and 19B illustrate one example of an implantable medical device and that existing components illustrated in FIGS. 19A and 19B may be removed and/or additional components may be added. Additionally, while the transcatheter valve prosthesis 1900 is described below as including the inflow markers 160 and the outflow marker 170, one skilled in the art will realize that the transcatheter valve prosthesis 1900 can include additional markers, for example, any of the markers described herein. Moreover, while examples of operations and advantages of the transcatheter valve prosthesis 400, the inflow markers 160, and the outflow marker 170 are discussed below, one skilled in the art will realize any of the operations and processes described above can be performed using the transcatheter valve prosthesis 1900.

As discussed above, the stent 1102 of the transcatheter valve prosthesis 1900 has an expanded configuration, which is shown FIG. 19A. FIG. 19B shows an open, flat view of an example of the stent 1102. As illustrated in FIGS. 19A and 19B, the transcatheter valve prosthesis 1900 can include similar components to the transcatheter valve prosthesis 1900, a description of which can be found above in the discussion of FIGS. 16A and 16B.

In embodiments, to ensure the proper placement in the native anatomy of a subject, the transcatheter valve prosthesis 1900 can include the inflow marker 160 that is positioned at the locations 163, the inflow marker 160 that is positioned at the location 165, and the outflow marker 170. The outflow marker 170 can operate to assist in rotational orientation of the stent 1102, as described below. Additionally, the outflow marker 170 can operate as a guide for determining a front or rear location the outflow marker 170 in 2D image during implantation, as described below. In embodiments, the outflow marker 170 can be positioned on one of the commissure post 1126A, for example, in the outflow portion 1118 or the transition portion 1124.

In an embodiment, the outflow marker 170 can be positioned on the outflow portion 1118 of a commissure post 1126A in the outflow portion 1118. In another embodiment, the outflow marker 170 can be positioned on a commissure posts 1126A below the outflow portion 1118 of the commissure post 1126A. In any embodiment, the outflow marker 170 can be attached to the stent 1102 within the containment member 172 formed in a commissure post 1126A. A description of the containment member 172 can be found above in the discussion of FIGS. 16A and 16B. Likewise, a description of a configuration of the outflow marker 170 (e.g., size, dimensions, shape, materials, etc.) can be found above in the discussion of FIGS. 16A and 16B.

In an embodiment, the stent 1102 includes the inflow marker 160 that is positioned at the location 163 and the inflow marker 160 that is positioned at the location 165. Either of the inflow markers 160 can be positioned towards the inflow end 106 of the stent 1102 in the inflow portion 108. In an embodiment, as illustrated in FIG. 19B, the stent 1102 can include four rows of the struts 1112. In embodiments, the potential locations 161 of the inflow marker 160 can be positioned at various locations, axially, in the inflow portion 108. The potential locations 161 of the inflow marker 160 can be at an intersection of the second row 1142 and the third row 1114. The potential locations 161 of the inflow marker 160 can be at on a strut 1112 in the row 1146 of struts. For example, the location 161 of the inflow marker 160 can correspond to the midpoint of the strut 1112 in the row 1146. The potential locations 161 of the inflow markers 160 can be circumferentially aligned with each other around a circumference of the stent 1102 and or offset axially.

In embodiments, the inflow markers 160 can be attached to the stent 102 within containment members 162. A description of the containment members 162 can be found above in the discussion of FIGS. 16A and 16B. Likewise, a description of a configuration of the inflow marker 160 (e.g., size, dimensions, shape, materials, etc.) can be found above in the discussion of FIGS. 16A and 16B.

While FIGS. 19A and 19B illustrates one example of the positioning and number of inflow markers 160, one skilled in the art will realize that the stent 1102 can include any number of inflow markers 160, positioned at any location within the inflow portion 1108. For example, the inflow markers 160 can be positioned on the struts 1112. Likewise, for example, the inflow markers 160 can be asymmetrically aligned, circumferentially, around a circumference of the stent 1102, e.g., with different circumferential distances between the inflow markers 160. Additionally, for example, the inflow markers 160 can be positioned at different distances from the inflow end 106. In any embodiment, the inflow markers 160 may be preferably located at a lengthwise location of the stent 1102 that is desired to be aligned with the annulus of the native heart valve when the transcatheter valve prosthesis 1900 is deployed at the native heart valve. For example, the inflow markers 160 allow for better depth positioning of the transcatheter valve prosthesis 1900, in a crimped or compressed configuration, such that it can be more accurately deployed and reduce the incidence rate of requiring a permanent pacemaker (PPM) post-implantation. While FIGS. 19A and 19B illustrate the stent 1102 including two of the inflow markers 160, one skilled in the art will realize that the stent 1102 may include any number of the inflow markers 160, which are positioned at any location.

Figure 20B:
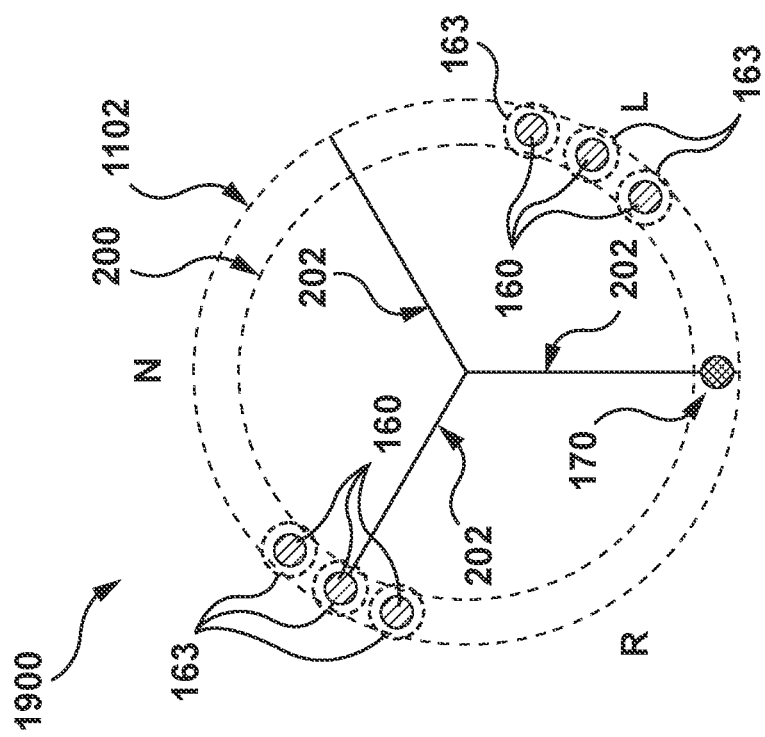
FIGS. 20A and 20B illustrate simplified top views of the valve prosthesis of FIGS. 19A and 19B in accordance with an embodiment hereof.
Figure 20A:
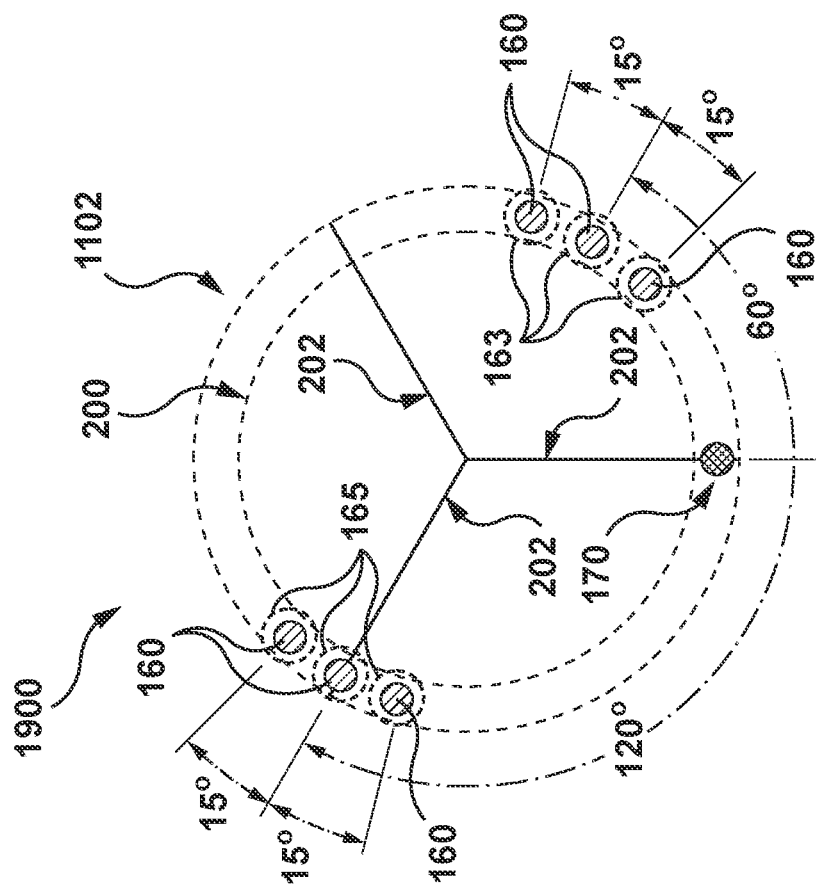

As discussed above, one of the inflow markers 160 can be positioned at the location 163, and one of the inflow markers 160 can be positioned at the location 165. FIGS. 20A and 20B illustrate a simplified top view of the stent 1102 from the outflow end 1116, which illustrates relative positioning of the location 163 and the location 165 of the inflow markers 160 and the outflow marker 170. In particular, FIG. 20A illustrates the stent 1102 (shown as dotted lines) that includes a prosthetic valve 200 having valve leaflets with commissures 202 positioned at the commissure posts 1126A. Further, FIG. 20A illustrates the circumferential positioning of the outflow marker 170 on the stent 1102 relative to the potential locations 163 and 165 of the inflow markers 160 on the stent 1102. FIG. 20B illustrates a potential alignment of the stent 1102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 21A-21C. One skilled in the art will realize that FIGS. 20A and 20B illustrate a simplified view of the transcatheter valve prosthesis 400 and that the transcatheter valve prosthesis 400 can include additional components, for example, components described with reference to FIGS. 19A and 19B.

As illustrated in FIG. 20A, when positioned on the commissure post 1126A, the outflow marker 170 is positioned at a circumferential location of a commissure 202 of the valve leaflets of the prosthetic valve 200. The location 163 and the location 165 of the inflow marker 160 can be positioned circumferentially around the stent 1102 as different rotational angles. For example, the location 163 of the inflow marker 160 can be at sixty degrees counter-clockwise relative to the position of the outflow marker 170, e.g., the position of the commissure post 1126A. Likewise, for example, the location 165 of the inflow marker 160 can be at one-hundred twenty degrees clockwise relative to the position of the outflow marker 170, e.g., the position of the commissure post 1126A.

Figure 21C:
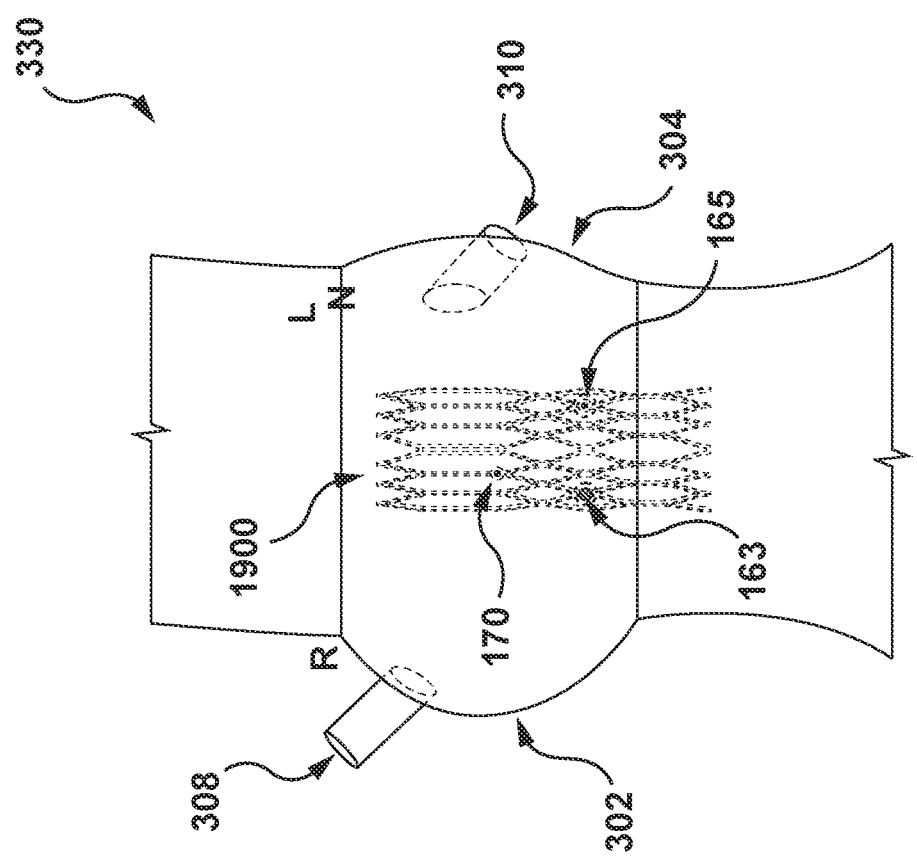

As illustrated in FIG. 20B and discussed in further detail below with reference to FIGS. 21A-21C, the outflow marker 170 can be utilized to align circumferential or rotational orientation of the transcatheter valve prosthesis 1900. More particularly, the outflow marker 170 can allow a physician to correctly interpret the circumferential orientation of the transcatheter valve prosthesis 1900 and to rotate the transcatheter valve prosthesis 1900 relative to the anatomy to correct the circumferential or rotational orientation, if necessary, to avoid blocking native anatomy at a deployment location of the transcatheter valve prosthesis 1900 (e.g., target site). For example, as illustrated in FIG. 20B, the outflow marker 170 rotationally aligns the commissures 202 of the prosthetic valve 200 of the transcatheter valve prosthesis 1900 with the native valve commissures. Commissure to commissure alignment (prosthetic valve 200 commissure to native valve commissure) may improve transcatheter valve prosthesis 1900 hemodynamics and leaflet durability. In an embodiment, as illustrated in FIG. 20B, the outflow marker can be utilized to align the commissure post 1126A to a commissure of a left coronary cusp ("L") and right coronary cusp ("R") of the native valve, and opposing a non-coronary cusp ("N"). To align the transcatheter valve prosthesis 1900, the stent 1102 can rotated, in situ, by a delivery system to be positioned in a desired circumferential or rotational alignment. Additionally, by aligning the commissure post 1126A to left/right commissure of the left coronary cusp and the right coronary cusp, the commissure post 1126A may avoid blocking the ostium of the left main coronary artery.

As discussed above, in embodiments, the inflow markers 160 and the outflow marker 170 can be utilized in orientation (e.g., axial alignment, tilt alignment, circumferential (rotational) alignment, etc.) of the transcatheter valve prosthesis 1900, in situ, during installation as described below with reference to FIGS. 21A-21C. FIGS. 21A-21C illustrate various views of a target site 300, e.g., an aortic heart valve, of the transcatheter valve prosthesis 1900. As illustrated in FIG. 21A, which is a 2-D annular view of the target site 300 taken normal to an annulus 301, the target site 300 includes three valve cusps of the aortic root, the right coronary cusp 302, the left coronary cusp 304 and the non-coronary cusp 306. The region of the right coronary cusp 302 includes ostium of the right coronary artery 308. Likewise, the region of the left coronary cusp 304 includes ostium of the left main coronary artery 310.

When installing the transcatheter valve prosthesis 400, it is desirable to properly align the stent 1102 within the target site 300. For example, the transcatheter valve prosthesis 1900 needs to be properly aligned, axially, so that the transcatheter valve prosthesis 1900 properly engages the native leaflets/tissue of the target site 300, e.g., the aortic annulus without causing conduction blockages by implanting too deep or causing an embolization of the transcatheter valve prosthesis 1900 because it was implanted too high. Likewise, the transcatheter valve prosthesis 1900 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 reduces the risk of blocking coronary access.

As illustrated in FIG. 21A, the right coronary cusp 302, the left coronary cusp 304, and the non-coronary cusp 306 include commissure regions: right/left commissure 320, right/non-coronary commissure 322, and left/non-coronary commissure 324. FIG. 21B illustrates a 2-D side view of the target site 300 taken in an image plane 332 (represented as a line in FIG. 21A). The image plane 332 is approximately perpendicular to an image plane 330 (represented as a line in FIG. 21A) in an x-direction and y-direction, and the image plane 332 extends in the z-direction (a direction normal to the 2D view of FIG. 21A). FIG. 21C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

As illustrated in FIG. 21B, the inflow markers 160 can be utilized to axially align the stent 1102 with features in the target site 300, e.g., basal plane 340 of the right coronary cusp 302, the left coronary cusp 304 and the non-coronary cusp 306. As discussed above with reference to FIG. 3D, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 1900, the stent 102, via a delivery system can be manipulated (e.g., advanced, retracted, etc.) until the inflow marker 160 align with the basal plane 340, as illustrated in FIG. 21B. As such, the transcatheter valve prosthesis 1900 can be positioned at a proper depth within the target site 300, thereby ensuring proper engagement with the native tissue.

In embodiments, the outflow marker 170 can be utilized to align circumferential or rotational orientation of the transcatheter valve prosthesis 1900. More particularly, the outflow marker 170 can allow a physician to correctly interpret the circumferential orientation of the transcatheter valve prosthesis 1900 and to clock or rotate the transcatheter valve prosthesis 1900 relative to the anatomy to correct the circumferential or rotational orientation, if necessary, to avoid blocking the ostia of the right coronary artery 308 and/or the left main coronary artery 310. In addition, the outflow marker 170 enables the commissures of the valve prosthesis 190 of the transcatheter valve prosthesis 1900 to be rotationally aligned with the native valve commissures. This alignment may improve transcatheter valve prosthesis 1900 hemodynamics and leaflet durability. To align the transcatheter valve prosthesis 1900, the stent 1102 can be rotated, in situ, by a delivery system to be positioned in a desired circumferential or rotational alignment.

In embodiments, the outflow marker 170, alone, can be utilized to align circumferential or rotational orientation of the transcatheter valve prosthesis 1900. For example, the outflow marker 170 can be aligned to the right/left commissure 320 thereby aligning the commissure post 1126A to the right/left commissure 320. Likewise, for example, the outflow marker 170 can be aligned to right/non-coronary commissure 322, or left/non-coronary commissure 324, thereby aligning the commissure post 1126A to the right/non-coronary commissure 322, or left/non-coronary commissure 324, respectively.

In embodiments, the combination of the outflow marker 170 and the inflow marker 160 that is positioned at the location 163 can be utilized to align circumferential or rotational orientation of the transcatheter valve prosthesis 400. That is, the relative appearance and/or location in a 2D image can be utilized to align circumferential or rotational orientation of the transcatheter valve prosthesis 1900. In particular, the relative radial appearance in 2D image can indicate the relative positioning of the outflow marker 170 when an image plane is aligned to a desired feature at the target site 300. For example, to avoid blocking the ostium of the left main coronary artery 310, the commissure post 1126A, containing the outflow marker 170, can be aligned with the right/left commissure 320 of the right coronary cusp 302 and the left coronary cusp 304, as illustrated in FIG. 21A. To ensure alignment, the outflow marker 170 and the inflow marker 160 that is positioned at the location 163 can be utilized in combination for circumferential or rotational alignment by setting up an image plane to be approximately parallel to the desired alignment feature and rotating the stent 1102 until the outflow marker 170 and the inflow marker 160 that is positioned at the location 163 appear with no radial offset. For example, when viewed in a 2D image form the image plane 332, the relative radial appearance of the outflow marker 170 and the inflow marker 160 that is positioned at the location 163 can be utilized to indicate proper alignment. That is, proper alignment can be indicated by both the outflow marker 170 and the inflow marker 160 that is positioned at the location 163 appearing on the right side of the image, as illustrated in FIG. 21B.

In embodiments, the outflow marker 170 can also be used as a guide to a front or rear location of the outflow marker 170 appearing in 2D image. That is, the outflow marker 170 can be utilized to determine whether the outflow marker 170 is positioned on a side of the stent 102 closest to the imaging apparatus (front location) or positioned on a side of the stent 102 furthest from the imaging apparatus (rear location). As the stent 1102 is rotated, the outflow marker 170 moves right or left in the 2D images of the target site 300 depending on the front or rear location of the outflow marker 170 and the approach to the target site 300. For example, based on the transcatheter approach to the target site 300, a tip of the delivery system may be point in a direction opposite the direction of the handle used to rotate the stent 1102 (e.g., in a direction back towards the handle), thereby causing the stent 1102 to rotate in a direction opposite a direction of rotation of the handle, when viewed in a 2D image. In this example, as the handle is rotated clockwise (thereby rotating the stent 102 counter-clockwise), the outflow marker 170 may move from right to left in 2D images taken in, for example, image plane 332 (FIG. 21B), thereby indicating that the outflow marker 170 is in the front (where an emitter of the imaging device is positioned on the front side of the stent 1102 and the detector being is on a back side of the stent 1102). As the handle is rotated clockwise (thereby rotating the stent 1102 counter-clockwise), the outflow marker 170 moves from left to right in 2D images taken in the image plane 332, thereby indicating that the outflow marker 170 is in the rear (on the back side of the stent 1102 relative to positioning of the imaging device). If the handle is rotated counter-clockwise (thereby rotating the stent 1102 clockwise), the above movements would be reversed, e.g., left to right movement in the images would indicate front and right to left would indicate rear. While the particular movement of the outflow marker 170 is discussed above in reference to transcatheter approach, one skilled in the art will realize that the relative movement of the outflow marker 170 may change based on a different approach.

FIGS. 22A-22D illustrate a transcatheter valve prosthesis 2200 in which the radially-expandable stent 1102 thereof incudes an outflow marker 170 positioned on a crown of the stent 102 and the inflow markers 160 that is positioned at a location 167, according to another embodiment hereof. In embodiments, the inflow markers 160 and the outflow marker 170 can be utilized in orientation (e.g., axial alignment, tilt alignment, circumferential (rotational) alignment, etc.) of the transcatheter valve prosthesis 2200, in situ, as discussed in detail below.

One skilled in the art will realize that FIGS. 22A-22D illustrate one example of an implantable medical device and that existing components illustrated in FIGS. 22A-22D may be removed and/or additional components may be added. Additionally, while the transcatheter valve prosthesis 2200 is described below as including the inflow markers 160 and the outflow marker 170, one skilled in the art will realize that the transcatheter valve prosthesis 2200 can include additional markers, for example, any of the markers described herein. Moreover, while examples of operations and advantages of the transcatheter valve prosthesis 2200, the inflow markers 160 and the outflow marker 170 are discussed below, one skilled in the art will realize any of the operations and processes described above can be performed using the transcatheter valve prosthesis 2200.

Figure 22A:
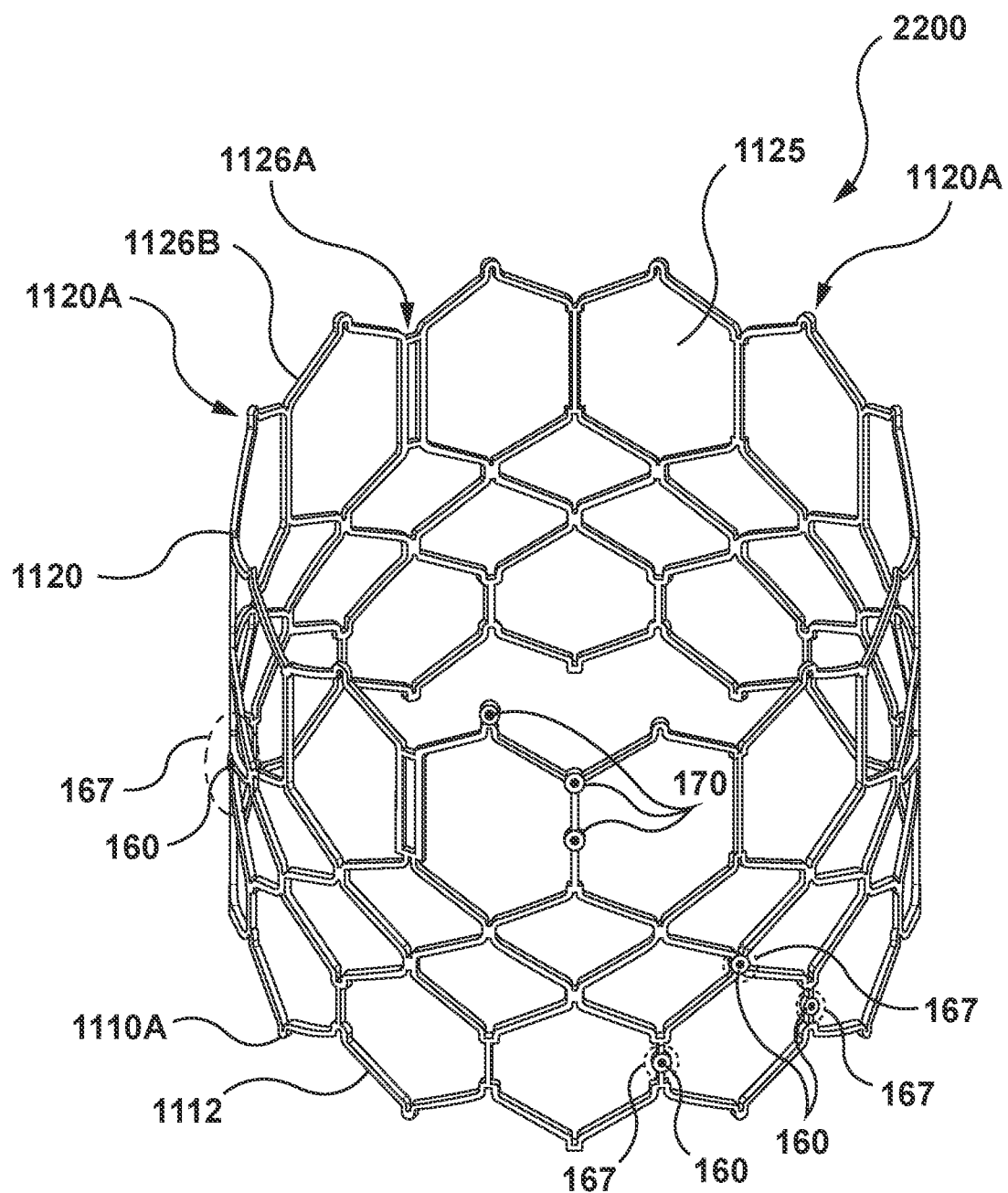
FIGS. 22A-22D illustrate several views of another valve prosthesis in accordance with an embodiment hereof.
Figure 22B:
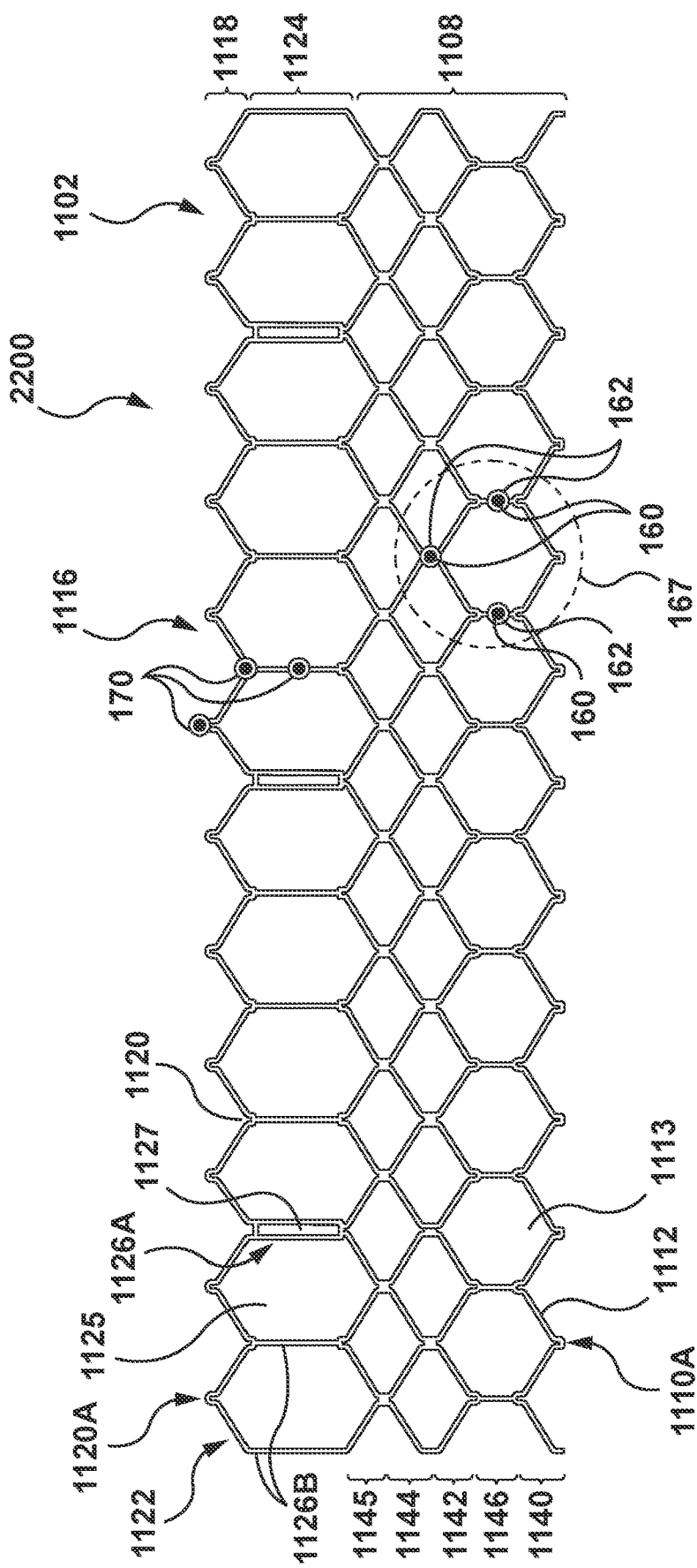

As discussed above, the stent 102 of the transcatheter valve prosthesis 700 has an expanded configuration, which is shown FIG. 22A. FIG. 22B shows an open, flat view of an example of the stent 102. As illustrated in FIGS. 22A and 22B, the transcatheter valve prosthesis 2200 can include similar components to the transcatheter valve prosthesis 1600, a description of which can be found above in the discussion of FIGS. 16A and 16B.

In embodiments, to ensure the proper placement in the native anatomy of a subject, the transcatheter valve prosthesis 2200 can include the outflow marker 170 and one or more inflow markers 160. The outflow marker 170 can operate to assist in rotational orientation of the stent 1102, as described below. Additionally, the outflow marker 170 can operate as a guide for determining a front or rear location of the outflow marker 170 in 2D image during implantation, as described below. In embodiments, the outflow marker 170 can be positioned on one of the endmost crowns 1120A in the outflow portion 1118. For example, as illustrated in FIG. 22A, the outflow marker 170 can be positioned on the endmost crown 1120A that is adjacent to one of the commissure posts 1126A.

To accommodate the outflow marker 170, the endmost crown 1120A can be constructed to include the containment member 172. In an embodiment, the containment member 172 can extend from the endmost crown 1120A in the direction of the outflow end 1116. The outflow marker 170 can be attached to the stent 1102 within the containment member 172 formed as an extension of the endmost crown 1120A. A description of the containment member 172 can be found above in the discussion of FIGS. 16A and 16B. Likewise, a description of a configuration of the outflow marker 170 (e.g., size, dimensions, shape, materials, etc.) can be found above in the discussion of FIGS. 16A and 16B.

Figure 22C:
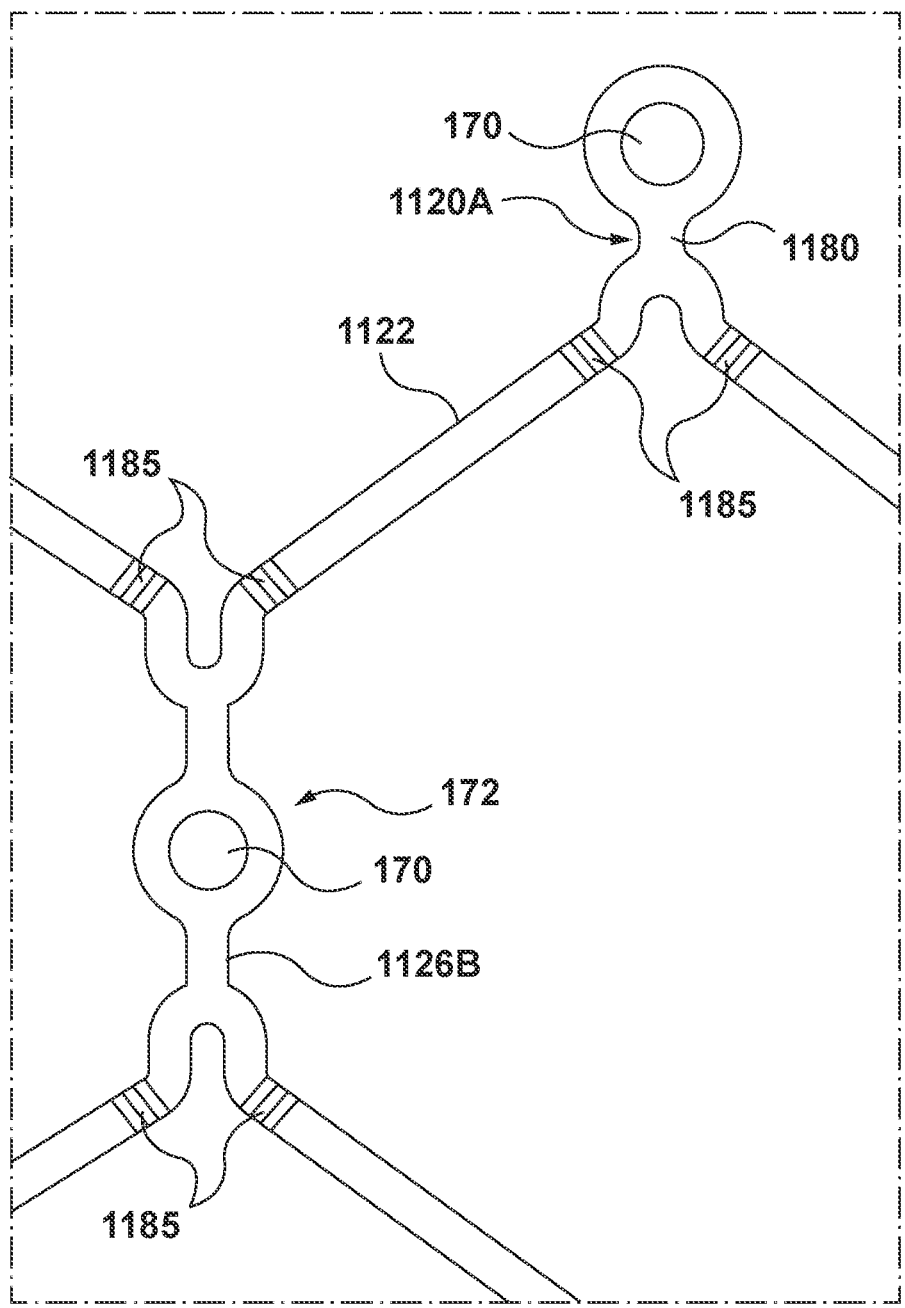
Figure 22D:
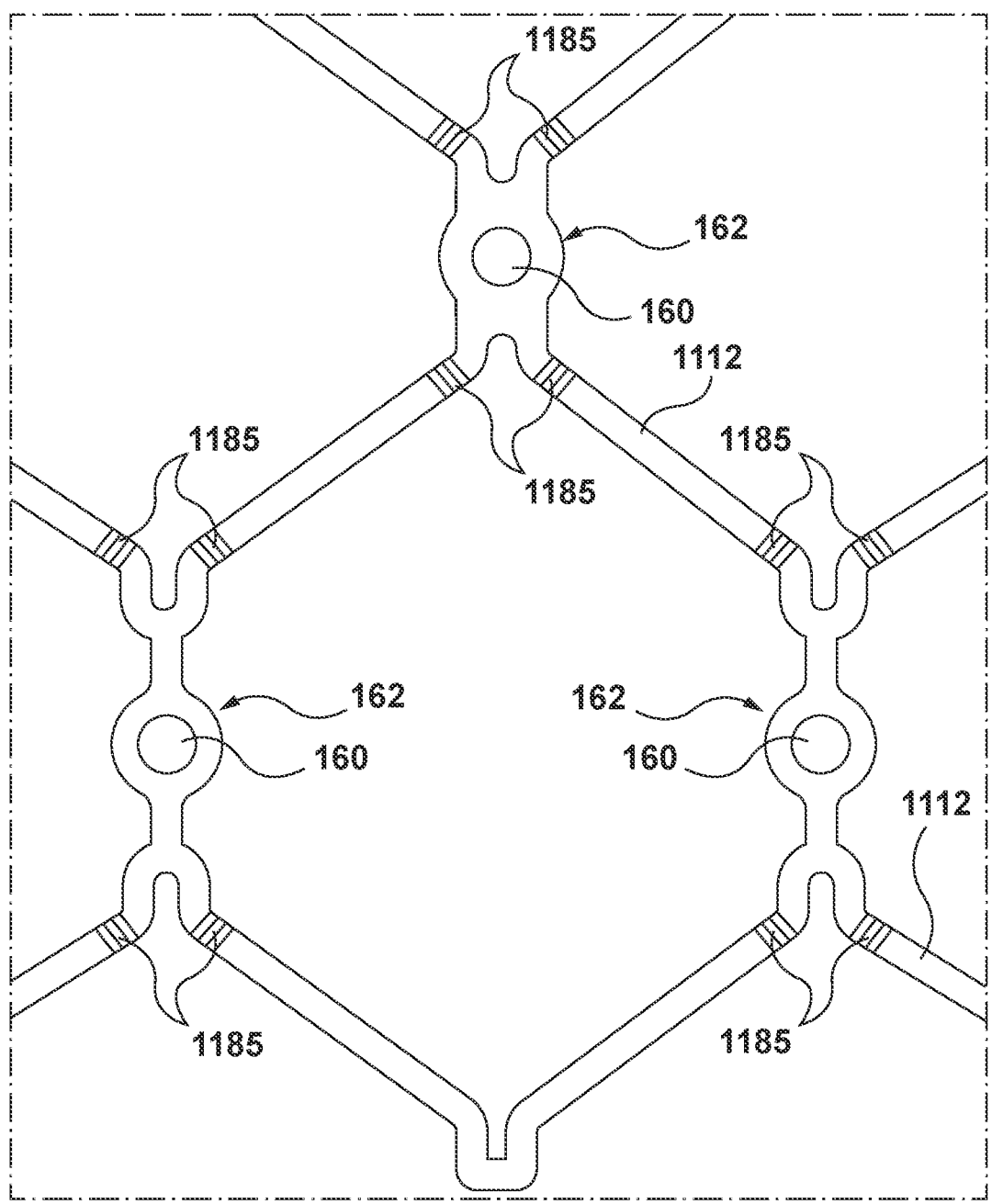

FIG. 22C illustrates an enlarged view of two of the containment members 172. As illustrated, the containment member 172 can be configured in a shape that matches a shape of the outflow marker 170. For example, if the outflow marker 170 has a circular cross-sectional shape, the containment member 172 can define a cavity that is circular, e.g., a hollow ring. The containment member 172 that extend from the endmost crown 1120A can be coupled to a bar 1180 that extend from the endmost crown 1120A.

As illustrated, any of the containment member 172 can be located a distance from regions 1185 of the stent 1102. Likewise, as illustrated in FIG. 22C, which illustrates an enlarged view of containment member 162, the containment members 162 can be located a distance from the regions 1185. The regions 1185 of the stent 1185 can be designed to plastically deform as the stent 1185 is compressed or expended. Because the containment members 162 and 172 are located a distance from the regions 1185, the stresses and strains that occur in regions 1185 from implantation and operations, (e.g., expansion and contraction of the stent 102) do not "transfer" to the outflow marker 170 and/or the inflow markers 160 thereby isolating the outflow marker 170 and/or the inflow markers 160 from stresses and strains occurring in the regions 1185. Therefore, the outflow marker 170 and/or the inflow markers 160 can be prevented from decoupling from the containment member 172 and/or containment members 162 and causing injury to a patient, e.g., embolization. While the above configuration and placement of the containment members has been described with reference to transcatheter valve prosthesis 2200, one skilled in the art will realize that the above configuration and placement can be applied to any transcatheter valve prosthesis described herein.

In an embodiment, the stent 1102 includes the inflow marker 160 that is positioned at the location 167. The inflow marker 160 can be positioned towards the inflow end 1106 of the stent 1102 in the inflow portion 1108. In an embodiment, as illustrated in FIG. 22B, the stent 1102 can include four rows of the struts 1112. In embodiments, the potential locations 161 of the inflow marker 160 can be positioned at various locations, axially, in the inflow portion 1108. The potential locations 161 of the inflow marker 160 can be at an intersection of the second row 1142 and the third row 1114. The potential locations 161 of the inflow marker 160 can be at on a strut 1112 in the row 1146 of struts. For example, the location 161 of the inflow marker 160 can correspond to the midpoint of the strut 1112 in the row 1146. The potential locations 161 of the inflow markers 160 can be circumferentially aligned with each other around a circumference of the stent 1102 and or offset axially. In an embodiment, as illustrated in FIG. 22B, the location 167 of the inflow marker 160 can be positioned at the intersection 146 of a pair of the struts 112 of the first row 140 and the second row 142. In this embodiment, the location 167 of the inflow marker 160 can be at the intersection 146 that is circumferentially adjacent to the endmost crown 1120A with the outflow marker 170, e.g., radially aligned with the axial strut 1126B that is adjacent to the endmost crown 1120A with the outflow marker 170.

In embodiments, the inflow markers 160 can be attached to the stent 1102 within containment members 162. A description of the containment members 162 can be found above in the discussion of FIGS. 16A and 16B. Likewise, a description of a configuration of the inflow markers 160 (e.g., size, dimensions, shape, materials, etc.) can be found above in the discussion of FIGS. 16A and 16B.

While FIGS. 22A and 22B illustrates one example of the positioning and number of inflow markers 160, one skilled in the art will realize that the stent 1102 can include any number of inflow markers 160, positioned at any location within the inflow portion 1108. For example, the inflow markers 160 can be positioned on the struts 1112. Likewise, for example, the inflow markers 160 can be asymmetrically aligned, circumferentially, around a circumference of the stent 1102, e.g., with different circumferential distances between the inflow markers 160. Additionally, for example, the inflow markers 160 can be positioned at different distances from the inflow end 1106. In any embodiment, the inflow markers 160 may be preferably located at a lengthwise location of the stent 1102 that is desired to be aligned with the annulus of the native heart valve when the transcatheter valve prosthesis 2200 is deployed at the native heart valve. For example, the inflow markers 160 allows for better depth positioning of the transcatheter valve prosthesis 2200, in a crimped or compressed configuration, such that it can be more accurately deployed and reduce the incidence rate of requiring a permanent pacemaker (PPM) post-implantation. While FIGS. 22A and 22B illustrate the stent 1102 including six the inflow markers 160, one skilled in the art will realize that the stent 1102 may include any number of the inflow markers 160, which are positioned at any location.

Figure 23B:
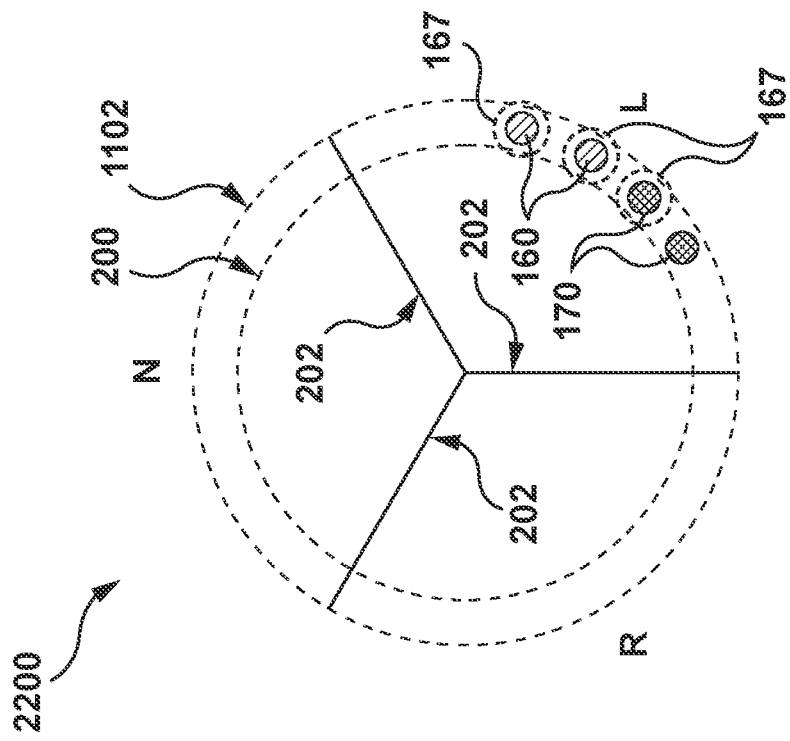
FIGS. 23A and 23B illustrate a simplified top view of the valve prosthesis of FIGS. 22A and 22B in accordance with an embodiment hereof.
Figure 23A:
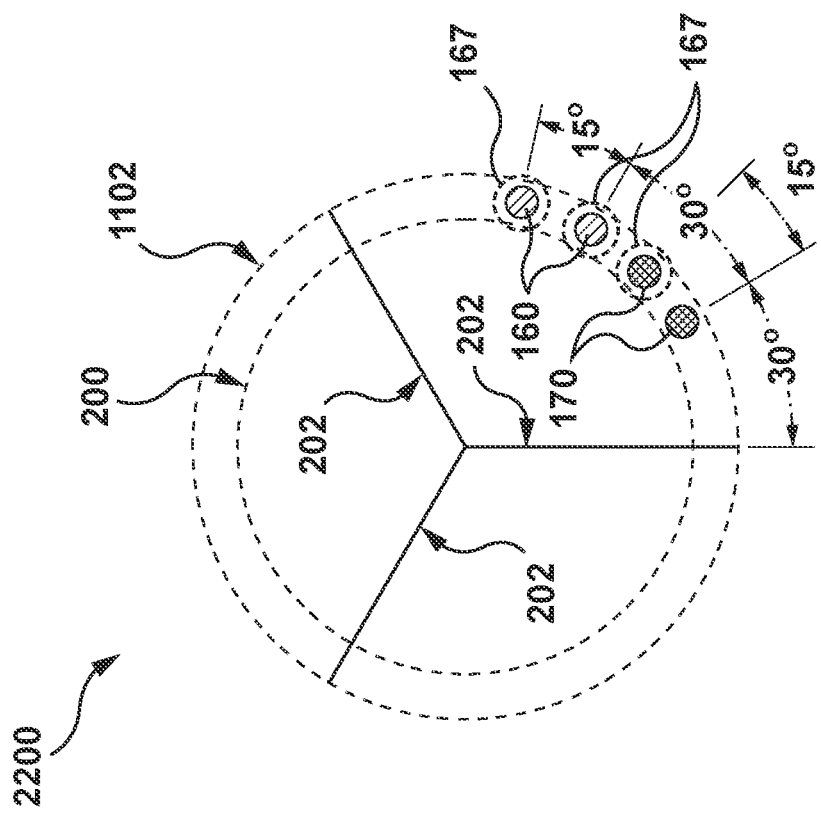

FIGS. 23A and 23B illustrate a simplified top view of the stent 1102 from the outflow end 1116, which illustrates relative positioning of the outflow marker 170 and the location 167 of the inflow marker 160. In particular, FIG. 23A illustrates the stent 1102 (shown as dotted lines) that includes a prosthetic valve 200 having valve leaflets with commissures 202 positioned at the commissure posts 1126A. Further, FIG. 23A illustrates the circumferential positioning of the outflow marker 170 on the stent 1102 relative to the potential locations 167 of the inflow markers 160 on the stent 1102. FIG. 23B illustrates a potential alignment of the stent 1102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 24A-24C. One skilled in the art will realize that FIGS. 23A and 23B illustrate a simplified view of the transcatheter valve prosthesis 2200 and that the transcatheter valve prosthesis 2200 can include additional components, for example, components described with reference to FIGS. 22A and 22B.

As illustrated in FIG. 23A, when positioned on the commissure post 1126A, the outflow marker 170 is positioned at a circumferential location of a commissure 202 of the valve leaflets of the prosthetic valve 200. That is, the outflow marker 170 can be displaced thirty degrees circumferentially from the commissure 202 of the valve leaflets. The location 167 of the inflow marker 160 can be positioned circumferentially around the stent 1102. For example, the location 167 of the inflow marker 160 can be at thirty degrees counter-clockwise relative to the position of the outflow marker 170, e.g., the approximate position of the commissure post 1126A.

As illustrated in FIG. 23B and discussed in further detail below with reference to FIGS. 24A-24C, the outflow marker 170 can be utilized to align circumferential or rotational orientation of the transcatheter valve prosthesis 2200. More particularly, the outflow marker 170 can allow a physician to correctly interpret the circumferential orientation of the transcatheter valve prosthesis 2200 and to rotate the transcatheter valve prosthesis 2200 relative to the anatomy to correct the circumferential or rotational orientation, if necessary, to avoid blocking native anatomy at a deployment location of the transcatheter valve prosthesis 2200 (e.g., target site). For example, as illustrated in FIG. 23B, the outflow marker 170 rotationally aligns the commissures 202 of the prosthetic valve 200 of the transcatheter valve prosthesis 2200 with the native valve commissures. Commissure to commissure alignment (prosthetic valve 200 commissure to native valve commissure) may improve transcatheter valve prosthesis 2200 hemodynamics and leaflet durability. In an embodiment, as illustrated in FIG. 23B, the outflow marker 170 can be utilized to align the commissure post 1126A to a commissure of a left coronary cusp ("L") and right coronary cusp ("R") of the native valve, and opposing a non-coronary cusp ("N"). To align the transcatheter valve prosthesis 2200, the stent 1102 can rotated, in situ, by a delivery system to be positioned in a desired circumferential or rotational alignment. Additionally, by aligning the commissure post 1126A to left/right commissure of the left coronary cusp and the right coronary cusp, the commissure post 1126A may avoid blocking the ostium of the left main coronary artery.

As discussed above, in embodiments, the inflow marker 160 and the outflow marker 170 can be utilized in orientation (e.g., axial alignment, tilt alignment, circumferential (rotational) alignment, etc.) of the transcatheter valve prosthesis 400, in situ, during installation as described below with reference to FIGS. 24A-24C. FIGS. 24A-24C illustrate various views of a target site 300, e.g., an aortic heart valve, of the transcatheter valve prosthesis 2200. As illustrated in FIG. 24A, which is a 2-D annular view of the target site 300 taken normal to an annulus 301, the target site 300 includes three valve cusps of the aortic root, the right coronary cusp 302, the left coronary cusp 304 and the non-coronary cusp 306. The region of the right coronary cusp 302 includes ostium of the right coronary artery 308. Likewise, the region of the left coronary cusp 304 includes ostium of the left main coronary artery 310.

When installing the transcatheter valve prosthesis 2200, it is desirable to properly align the stent 1102 within the target site 300. For example, the transcatheter valve prosthesis 2200 needs to be properly aligned, axially, so that the transcatheter valve prosthesis 2200 properly engages the native leaflets/tissue of the target site 300, e.g., the aortic annulus without causing conduction blockages by implanting too deep or causing an embolization of the transcatheter valve prosthesis 700 because it was implanted too high. Likewise, the transcatheter valve prosthesis 2200 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 reduces the risk of blocking coronary access.

Figure 24C:
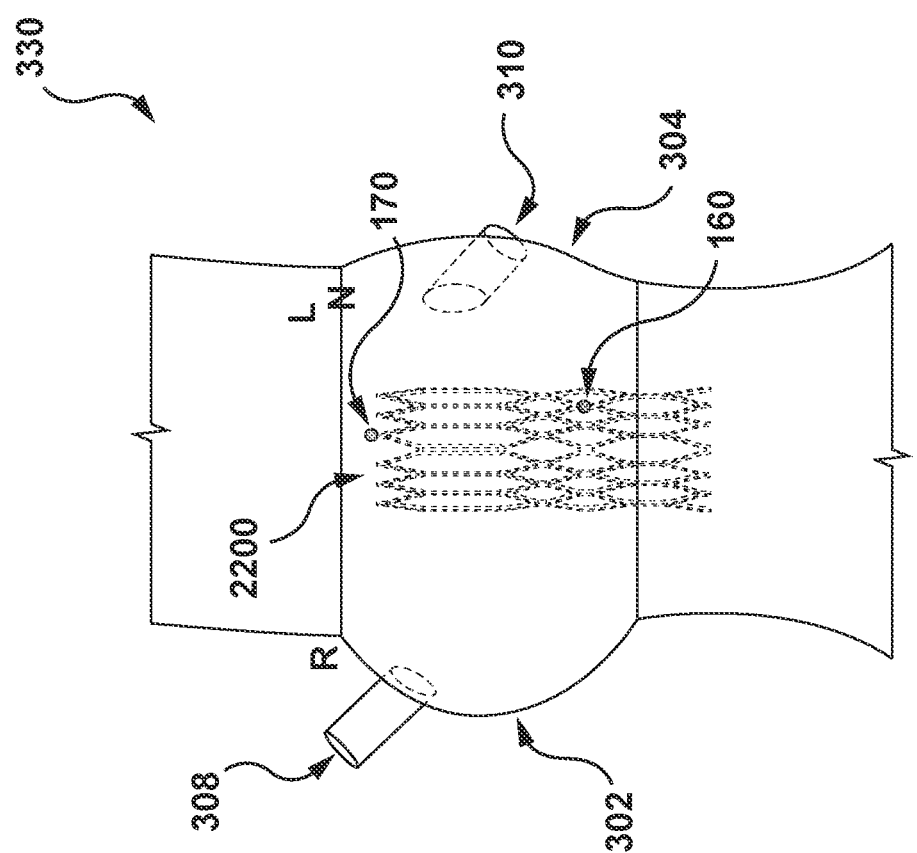

As illustrated in FIG. 24A, the right coronary cusp 302, the left coronary cusp 304, and the non-coronary cusp 306 include commissure regions: right/left commissure 320, right/non-coronary commissure 322, and left/non-coronary commissure 324. FIG. 24B illustrates a 2-D side view of the target site 300 taken in an image plane 332 (represented as a line in FIG. 24A). The image plane 332 is approximately perpendicular to an image plane 330 (represented as a line in FIG. 24A) in an x-direction and y-direction, and the image plane 332 extends in the z-direction (a direction normal to the 2D view of FIG. 24A). FIG. 24C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

As illustrated in FIG. 24B, the inflow marker 160 can be utilized to axially align the stent 1102 with features in the target site 300, e.g., left coronary ostia, basal plane 340 of the right coronary cusp 302, the left coronary cusp 304 and the non-coronary cusp 306. As discussed above with reference to FIG. 20D, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 2200, the stent 1102, via a delivery system can be manipulated (e.g., advanced, retracted, etc.) until the inflow marker 160 aligns with the basal plane 340, as illustrated in FIG. 24B. As such, the transcatheter valve prosthesis 2200 can be positioned at a proper depth within the target site 300, thereby ensuring proper engagement with the native tissue.

In embodiments, the outflow marker 170 can be utilized to align circumferential or rotational orientation of the transcatheter valve prosthesis 2200. More particularly, the outflow marker 170 can allow a physician to correctly interpret the circumferential orientation of the transcatheter valve prosthesis 2200 and to clock or rotate the transcatheter valve prosthesis 2200 relative to the anatomy to correct the circumferential or rotational orientation, if necessary, to avoid blocking the ostia of the right coronary artery 308 and/or the left main coronary artery 310. In addition, the outflow marker 170 enables the commissures of the valve prosthesis 190 of the transcatheter valve prosthesis 2200 to be rotationally aligned with the native valve commissures. This alignment may improve transcatheter valve prosthesis 2200 hemodynamics and leaflet durability. To align the transcatheter valve prosthesis 2200, the stent 1102 can be rotated, in situ, by a delivery system to be positioned in a desired circumferential or rotational alignment.

In embodiments, the outflow marker 170, alone, can be utilized to align circumferential or rotational orientation of the transcatheter valve prosthesis 2200. For example, the outflow marker 170 can be approximately aligned to the right/left commissure 320 thereby aligning the commissure post 1126A to the right/left commissure 320. Likewise, for example, the outflow marker 170 can be approximately aligned to right/non-coronary commissure 322, or left/non-coronary commissure 324, thereby aligning the commissure post 1126A to the right/non-coronary commissure 322, or left/non-coronary commissure 324, respectively.

In embodiments, the combination of the outflow marker 170 and the inflow marker 160 that is positioned at the location 167 can be utilized to align circumferential or rotational orientation of the transcatheter valve prosthesis 2200. That is, the relative appearance and/or location in a 2D image can be utilized to align circumferential or rotational orientation of the transcatheter valve prosthesis 2200. In particular, the relative radial appearance in 2D image can indicate the relative positioning of the outflow marker 170 and the inflow marker 160 that is positioned at the location 167 when an image plane is aligned to a desired feature at the target site 300. For example, to avoid blocking the ostium of the left main coronary artery 310, the commissure post 1126A, containing the outflow marker 170, can be aligned with the right/left commissure 320 of the right coronary cusp 302 and the left coronary cusp 304, as illustrated in FIG. 24A. To ensure alignment, the outflow marker 170 and the inflow marker 160 that is positioned at the location 167 can be utilized in combination for circumferential or rotational alignment by setting up an image plane to be approximately parallel to the desired alignment feature and rotating the stent 1102 until the outflow marker 170 and the inflow marker 160 that is positioned at the location 167 appear with no radial offset. For example, when viewed in a 2D image form the image plane 332, the relative radial appearance of the outflow marker 170 and the inflow marker 160 that is positioned at the location 163 can be utilized to indicate proper alignment. That is, proper alignment can be indicated by both the outflow marker 170 and the inflow marker 160 that is positioned at the location 167 appearing on the right side of the image, as illustrated in FIG. 24B.

In embodiments, the outflow marker 170 can also be used as a guide to a front or rear location of the outflow marker 170 appearing in 2D image. That is, the outflow marker 170 can be utilized to determine whether the outflow marker 170 is positioned on a side of the stent 102 closest to the imaging apparatus (front location) or positioned on a side of the stent 1102 furthest from the imaging apparatus (rear location). As the stent 102 is rotated, the outflow marker 170 moves right or left in the 2D images of the target site 300 depending on the front or rear location of the outflow marker 170 and the approach to the target site 300. For example, based on the transcatheter approach to the target site 300, a tip of the delivery system may be point in a direction opposite the direction of the handle used to rotate the stent 1102 (e.g., in a direction back towards the handle), thereby causing the stent 1102 to rotate in a direction opposite a direction of rotation of the handle, when viewed in a 2D image. In this example, as the handle is rotated clockwise (thereby rotating the stent 102 counter-clockwise), the outflow marker 170 may move from right to left in 2D images taken in, for example, image plane 332 (FIG. 24B), thereby indicating that the outflow marker 170 is in the front (where an emitter of the imaging device is positioned on the front side of the stent 102 and the detector being is on a back side of the stent 1102). As the handle is rotated clockwise (thereby rotating the stent 1102 counter-clockwise), the outflow marker 170 moves from left to right in 2D images taken in the image plane 332, thereby indicating that the outflow marker 170 is in the rear (on the back side of the stent 1102 relative to positioning of the imaging device). If the handle is rotated counter-clockwise (thereby rotating the stent 1102 clockwise), the above movements would be reversed, e.g., left to right movement in the images would indicate front and right to left would indicate rear. While the particular movement of the outflow marker 170 is discussed above in reference to transcatheter approach, one skilled in the art will realize that the relative movement of the outflow marker 170 may change based on a different approach.

Figure 25A:
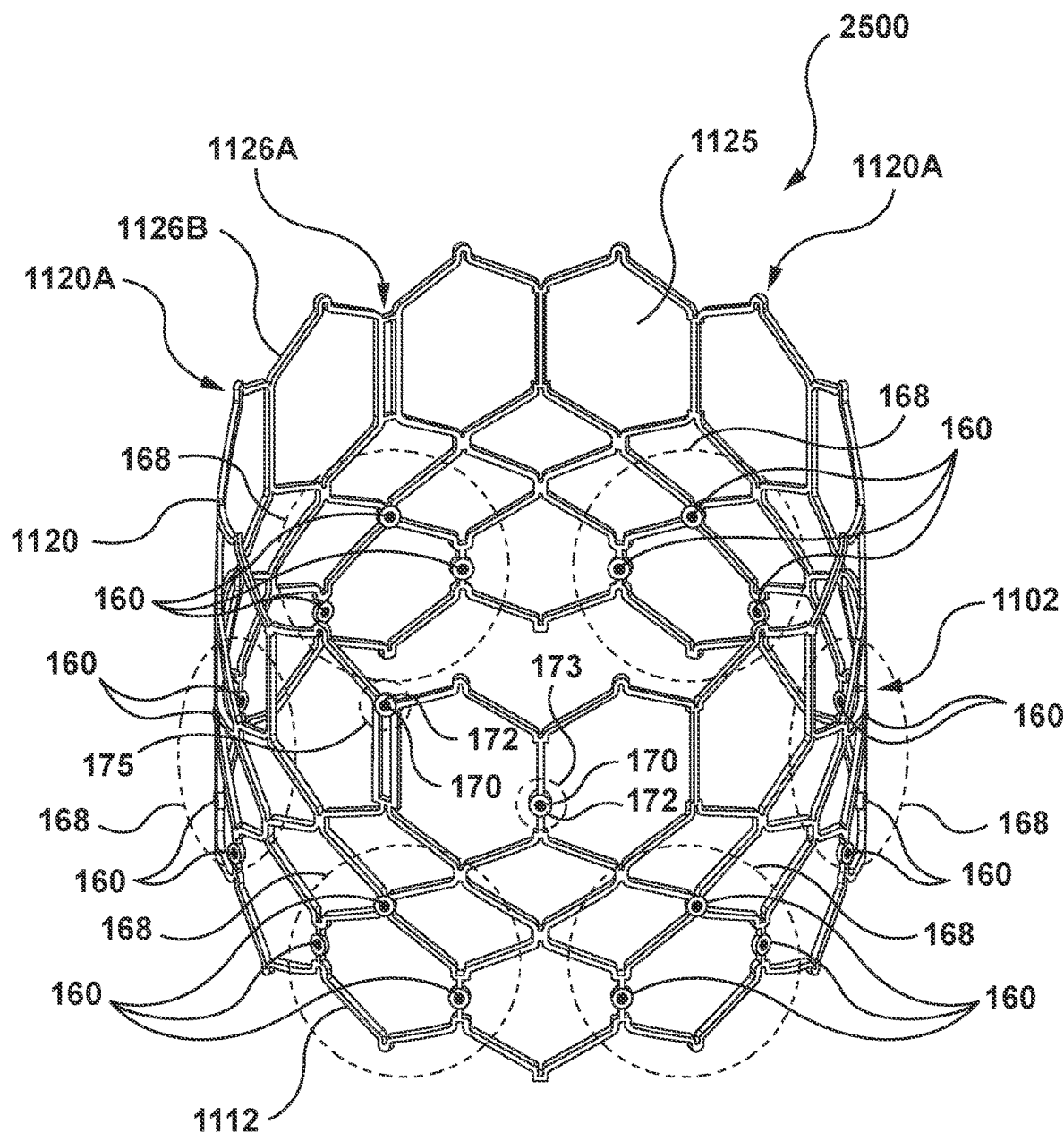
FIGS. 25A and 25B illustrate several views of another valve prosthesis in accordance with an embodiment hereof.
Figure 25B:
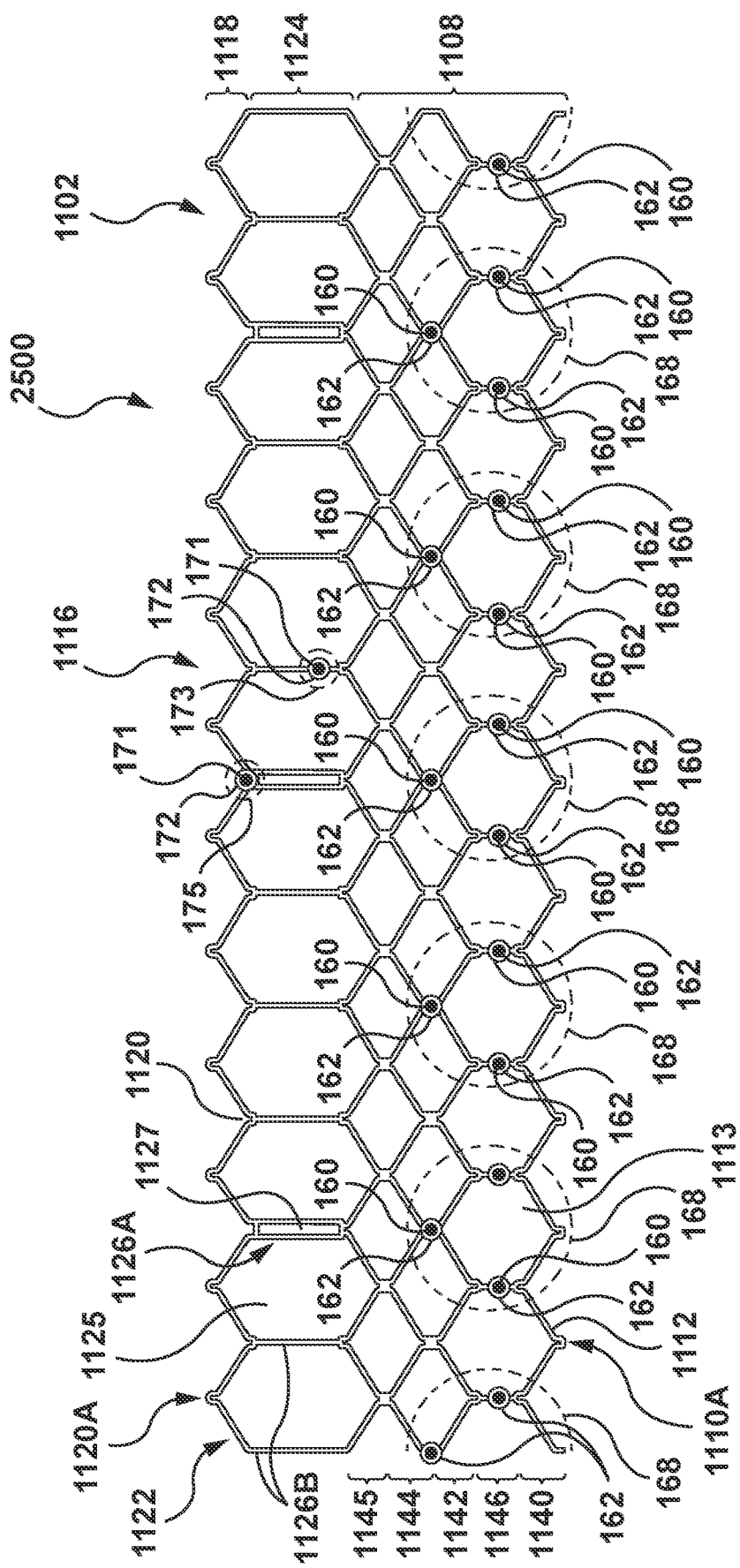

FIGS. 25A and 25B illustrate a transcatheter valve prosthesis 2500 in which the radially-expandable stent 102 one or more inflow markers 160 that are positioned at one or more locations 168, one outflow marker 170 that is positioned at a location 173, and one outflow marker 170 that is positioned at a location 175, according to another embodiment hereof. In embodiments, the inflow markers 160 and the outflow markers 170 can be utilized in orientation (e.g., axial alignment, tilt alignment, circumferential (rotational) alignment, etc.) of the transcatheter valve prosthesis 2500, in situ, as discussed in detail below.

One skilled in the art will realize that FIGS. 25A and 25B illustrate one example of an implantable medical device and that existing components illustrated in FIGS. 25A and 25B may be removed and/or additional components may be added. Additionally, while the transcatheter valve prosthesis 2500 is described below as including the inflow markers 160 and the outflow markers 170, one skilled in the art will realize that the transcatheter valve prosthesis 2500 can include additional markers, for example, any of the markers described herein. Moreover, while examples of operations and advantages of the transcatheter valve prosthesis 2500, the inflow markers 160 and the outflow markers 170 are discussed below, one skilled in the art will realize any of the operations and processes described above can be performed using the transcatheter valve prosthesis 2500.

As discussed above, the stent 1102 of the transcatheter valve prosthesis 2500 has an expanded configuration, which is shown FIG. 25A. FIG. 25B shows an open, flat view of an example of the stent 1102. As illustrated in FIGS. 25A and 25B, the transcatheter valve prosthesis 2500 can include similar components to the transcatheter valve prosthesis 1600, a description of which can be found above in the discussion of FIGS. 16A and 16B.

In embodiments, to ensure the proper placement in the native anatomy of a subject, the transcatheter valve prosthesis 2500 can include the inflow markers 160 that are positioned at the locations 168 and two of the outflow markers 170 that are positioned at a location 173 and a location 175. The outflow markers 170 can operate to assist in rotational orientation of the stent 1102, as described below. Additionally, the outflow markers 170 can operate as a guide for determining a front or rear location the outflow marker 170 in 2D image during implantation, as described below.

In embodiments, the location 173 of the outflow marker 170 can be positioned on one of the commissure post 1126A, for example, in the outflow portion 1108 or the transition portion 124. In embodiments, the location 173 of the outflow marker 170 can correspond to the location of the outflow marker described above with reference to FIGS. 16A and 16B. In an embodiment, the location 173 of the outflow marker 170 can be on the outflow portion 1118 of a commissure post 1126A in the outflow portion 1118. In another embodiment, the location 173 of the outflow marker 170 can be on a commissure posts 126A below the outflow portion 1118 of the commissure post 1126A.

In embodiments, the location 175 of the outflow marker 170 can be on an axial strut 1126B. In an embodiment, the location 175 of the outflow marker 170 can be positioned on an axial strut 1126B that is adjacent (e.g., adjacent in a clockwise direction or adjacent in a counter clockwise direction) to the commissure post 1126A containing the outflow marker 170 that is positioned at the location 173. As illustrated in FIG. 25B, the location 173 of the outflow marker 170 is axially positioned closer to the outflow end 1116 and the location 175 of the outflow marker 170 is axially positioned closer to the inflow end 116.

In any embodiment, the outflow markers 170 can be attached to the stent 1102 within the containment member 172 formed in a commissure post 126A and/or the axial strut 1126B. A description of the containment member 172 can be found above in the discussion of FIGS. 16A and 16B. Likewise, a description of a configuration of the outflow marker 170 (e.g., size, dimensions, shape, materials, etc.) can be found above in the discussion of FIGS. 16A and 16B.

In an embodiment, the stent 1102 includes one or more the inflow markers 160 that is positioned at one or more locations 168. The inflow markers 160 can be positioned towards the inflow end 1106 of the stent 1102 in the inflow portion 1108. In an embodiment, as illustrated in FIG. 25B, the stent 1102 can include four rows of the struts 1112. In embodiments, the potential locations 161 of the inflow marker 160 can be positioned at various locations, axially, in the inflow portion 108. The potential locations 161 of the inflow marker 160 can be at an intersection of the second row 1142 and the third row 1114. The potential locations 161 of the inflow marker 160 can be at on a strut 1112 in the row 1146 of struts. For example, the location 161 of the inflow marker 160 can correspond to the midpoint of the strut 1112 in the row 1146. The potential locations 161 of the inflow markers 160 can be circumferentially aligned with each other around a circumference of the stent 1102 and or offset axially. In an embodiment, the stent 102 can include six (6) of the inflow marker 160.

In embodiments, the inflow markers 160 can be attached to the stent 1102 within containment members 162. A description of the containment members 162 can be found above in the discussion of FIGS. 16A and 16B. Likewise, a description of a configuration of the inflow markers 160 (e.g., size, dimensions, shape, materials, etc.) can be found above in the discussion of FIGS. 16A and 16B.

While FIGS. 25A and 25B illustrates one example of the positioning and number of inflow markers 160, one skilled in the art will realize that the stent 1102 can include any number of inflow markers 160, positioned at any location within the inflow portion 1108. For example, the inflow markers 160 can be positioned on the struts 1112. Likewise, for example, the inflow markers 160 can be asymmetrically aligned, circumferentially, around a circumference of the stent 1102, e.g., with different circumferential distances between the inflow markers 160. Additionally, for example, the inflow markers 160 can be positioned at different distances from the inflow end 106. In any embodiment, the inflow markers 160 may be preferably located at a lengthwise location of the stent 1102 that is desired to be aligned with the annulus of the native heart valve when the transcatheter valve prosthesis 2500 is deployed at the native heart valve. For example, the inflow markers 160 allow for better depth positioning of the transcatheter valve prosthesis 2500, in a crimped or compressed configuration, such that it can be more accurately deployed and reduce the incidence rate of requiring a permanent pacemaker (PPM) post-implantation. While FIGS. 25A and 25B illustrate the stent 1102 including six of the inflow markers 160 at eighteen potential positions, one skilled in the art will realize that the stent 1102 may include any number of the inflow markers 160, which are positioned at any location.

As discussed above, the stent 1102 can include two of the outflow markers 170 and one or more inflow markers 160, which can be used to align the stent 1102. FIGS. 26A and 26B illustrate a simplified top view of the stent 1102 from the outflow end 1116, which illustrates relative positioning of the locations 168 of the inflow markers 160 and the outflow markers 170. In particular, FIG. 26A illustrates the stent 1102 (shown as dotted lines) that includes a prosthetic valve 200 having valve leaflets with commissures 202 positioned at the commissure posts 1126A. Further, FIG. 26A illustrates the circumferential positioning of the outflow markers 170 on the stent 1102 relative to the potential locations 168 of the inflow markers 160 on the stent 1102. FIG. 26B illustrates a potential alignment of the stent 1102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 27A-27C. One skilled in the art will realize that FIGS. 26A and 26B illustrate a simplified view of the transcatheter valve prosthesis 2500 and that the transcatheter valve prosthesis 2500 can include additional components, for example, components described with reference to FIGS. 25A and 25B.

As illustrated in FIG. 26A, when positioned on the commissure post 1126A, the outflow marker 170 at location 173 is positioned at a circumferential location of a commissure 202 of the valve leaflets of the prosthetic valve 200. The outflow marker 170 (at location 175) is positioned on the axial strut 1126B. The location 173 of the outflow marker 170 can be at thirty degrees counter-clockwise relative to the position of the location 175 of the outflow marker 170, e.g., the position of the commissure post 1126A.

The one or more locations of the inflow markers 160 can be positioned circumferentially around the stent 1102 as different rotational angles. For example, the location 168 of the inflow marker 160 can be at zero degrees clockwise and counter-clockwise relative to the location 173 of the outflow marker 170, e.g., the position of the commissure post 1126A. Likewise, for example, the location 168 of the inflow marker 160 can be at sixty degrees clockwise and counter-clockwise relative to the location 173 of the outflow marker 170, e.g., the position of the commissure post 126A. Likewise, for example, the location 168 of the inflow marker 160 can be at one-hundred twenty degrees clockwise and counter-clockwise relative to the location 173 of the outflow marker 170, e.g., the position of the commissure post 1126A. Likewise, for example, the location 168 of the inflow marker 160 can be at one-hundred eighty degrees clockwise and counter-clockwise relative to the location 173 of the outflow marker 170, e.g., the position of the commissure post 1126A.

As illustrated in FIG. 26B and discussed in further detail below with reference to FIGS. 27A-27C, the outflow markers 170 can be utilized to align circumferential or rotational orientation of the transcatheter valve prosthesis 2500. More particularly, the outflow markers 170 can allow a physician to correctly interpret the circumferential orientation of the transcatheter valve prosthesis 2500 and to rotate the transcatheter valve prosthesis 2500 relative to the anatomy to correct the circumferential or rotational orientation, if necessary, to avoid blocking native anatomy at a deployment location of the transcatheter valve prosthesis 2500 (e.g., target site). For example, as illustrated in FIG. 26B, the outflow marker 170 that is positioned at location 173 rotationally aligns the commissures 202 of the prosthetic valve 200 of the transcatheter valve prosthesis 2500 with the native valve commissures. Commissure to commissure alignment (prosthetic valve 200 commissure to native valve commissure) may improve transcatheter valve prosthesis 2500 hemodynamics and leaflet durability. In an embodiment, as illustrated in FIG. 26B, the outflow marker 170 that is at the location 173 can be utilized to align the commissure post 1126A to a commissure of a left coronary cusp ("L") and non-coronary cusp ("N") of the native valve, and opposing a right coronary cusp ("R"). To align the transcatheter valve prosthesis 2500, the stent 1102 can rotated, in situ, by a delivery system to be positioned in a desired circumferential or rotational alignment. Additionally, by aligning the commissure post 1126A to left/non-coronary commissure of the left coronary cusp and the right coronary cusp, the commissure post 1126A may avoid blocking the ostium of the left main coronary artery.

In embodiments, the inflow markers 160 and the outflow markers 170 at the location 173 and the location 175 can be utilized in orientation (e.g., axial alignment, tilt alignment, circumferential (rotational) alignment, etc.) of the transcatheter valve prosthesis 2500, in situ, during installation as described below with reference to FIGS. 27A-27C. FIGS. 27A-27C illustrate various views of a target site 300 e.g., an aortic heart valve, for the transcatheter valve prosthesis 2500. As illustrated in FIG. 27A, which is an annular view of the target site 300 taken perpendicular to an annulus 301, the target site 300 includes three valve cusps of the aortic root, the right coronary cusp 302, the left coronary cusp 304 and the non-coronary cusp 306. The region of the right coronary cusp 302 includes ostium of the right coronary artery 308. Likewise, the region of the left coronary cusp 304 includes ostium of the left main coronary artery 310.

When installing the transcatheter valve prosthesis 2500, it is desirable to properly align the stent 1102 with the target site 300, as discussed above. For example, the transcatheter valve prosthesis 2500 needs to be properly aligned, axially, so that the transcatheter valve prosthesis 2500 properly engages the native tissue of the target site 300. Likewise, the transcatheter valve prosthesis 2500 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 may reduce the risk of blocking coronary access and may enhance hemodynamics and valve durability because of commissure-to-commissure alignment. As illustrated in FIG. 27A, the right coronary cusp 302, the left coronary cusp 304, and the non-coronary cusp 306 include commissure regions: right/left commissure 320, right/non-coronary commissure 322, and left/non-coronary commissure 324. FIG. 27B illustrates a 2-D side view of the target site 300 taken in an image plane 332 (represented as a line in FIG. 131A). The image plane 332 is approximately perpendicular to an image plane 330 (represented as a line in FIG. 27A) in an x-direction and y-direction, and the image plane 332 extends in the z-direction (a direction normal to the 2D view of FIG. 27A). FIG. 27C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

Figure 27B:
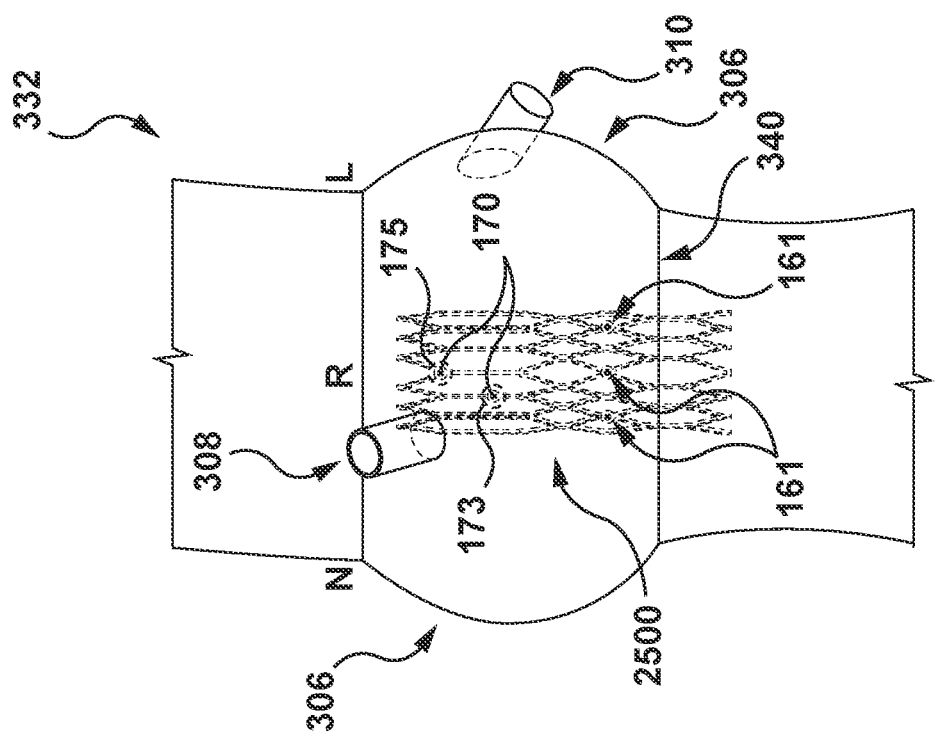
FIGS. 27A-27C illustrate various views of a target site for the valve prosthesis of FIGS. 25A and 25B in accordance with an embodiment hereof.

As illustrated in FIG. 27B, the inflow markers 160 can be utilized to axially align the stent 1102 with features in the target site 300, e.g., basal plane 340 of the right coronary cusp 302, the left coronary cusp 304 and the non-coronary cusp 306. For example, as discussed above with reference to FIG. 20D, which is a three dimension view of the target site 300, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 2500, the stent 1102, via a delivery system can be manipulated (e.g., advanced, retracted, etc.) until the inflow markers 160 align with the basal plane 340, as illustrated in FIG. 27B. As such, the transcatheter valve prosthesis 2500 can be positioned at a proper depth within the target site 300, thereby ensuring proper engagement with the native tissue.

Additionally, the inflow markers 160 can be utilized to align the tilt and/or rotation of the stent 1102. For example, to align the transcatheter valve prosthesis 2500, the stent 1102, via a delivery system can be manipulated (e.g., rotated, tilted, etc.) until the inflow markers 160 form a predetermined pattern visible in the image captured in the image plane 330 and/or 332, for example, as described above with reference to FIGS. 18A-18C. For example, as illustrated in FIG. 25B, the stent 1102 may include six (6) inflow markers 160. As the stent 1102 is rotated, different numbers of the inflow markers 160 may be visible in the 2D image, e.g., 6 markers in image plane 330 (FIG. 27C) and 3 markers in image plane 332 (FIG. 27B). In this example, to align the transcatheter valve prosthesis 2500, the delivery system can be manipulated (e.g., rotated, tilted, etc.) until all 6 of the inflow markers 160 form a predetermined pattern, e.g., only 3 inflow markers 160, that is visible in the image captured in the image plane 332. In other words, 3 of the inflow markers 160 overlap and obscure the other 3 of the inflow markers 160 in the 2D image. If the image plane 332 is aligned with the native anatomy as desired, the appearance of the predetermined pattern, e.g., only 3 inflow markers 160, indicates the transcatheter valve prosthesis 2500 is approximately perpendicular to image plane 332 indicating proper orientation (e.g., indicating proper tilt, proper rotation, etc.) of the transcatheter valve prosthesis 2500.

In embodiments, as described above with reference to FIGS. 20A-20C, the outflow marker 170 that is positioned at the location 173, alone, can be utilized to align circumferential or rotational orientation of the transcatheter valve prosthesis 2500. For example, the outflow marker 170 that is positioned at the location 173 can be aligned to the right/left commissure 320, right/non-coronary commissure 322, or left/non-coronary commissure 324, thereby aligning the commissure post 1126A to the right/left commissure 320, right/non-coronary commissure 322, or left/non-coronary commissure 324, respectively. The outflow marker 170 that is positioned at the location 175, alone, can similarly be utilized to align circumferential or rotational orientation of the transcatheter valve prosthesis 2500. For example, the outflow marker 170 that is positioned at the location 175 can be aligned to the right/left commissure 320, right/non-coronary commissure 322, or left/non-coronary commissure 324, thereby aligning the axial strut 1126B to the right/left commissure 320, right/non-coronary commissure 322, or left/non-coronary commissure 324, respectively. One skilled in the art will realize that the outflow markers 170 can be aligned to any feature at the target site 300.

In embodiments, the combination of the outflow marker 170 that is positioned at the location 173 and the outflow marker 170 that is positioned at the location 175 can be utilized to align circumferential or rotational orientation of the transcatheter valve prosthesis 2500. That is, the relative appearance and/or location in a 2D image can be utilized to align circumferential or rotational orientation of the transcatheter valve prosthesis 2500. In particular, the relative radial appearance in 2D image can indicate the relative positioning of the outflow marker 170 that is positioned at the location 173 and the outflow marker 170 that is positioned at the location 175, when an image plane is aligned to a desired feature at the target site 300.

Figure 27A:
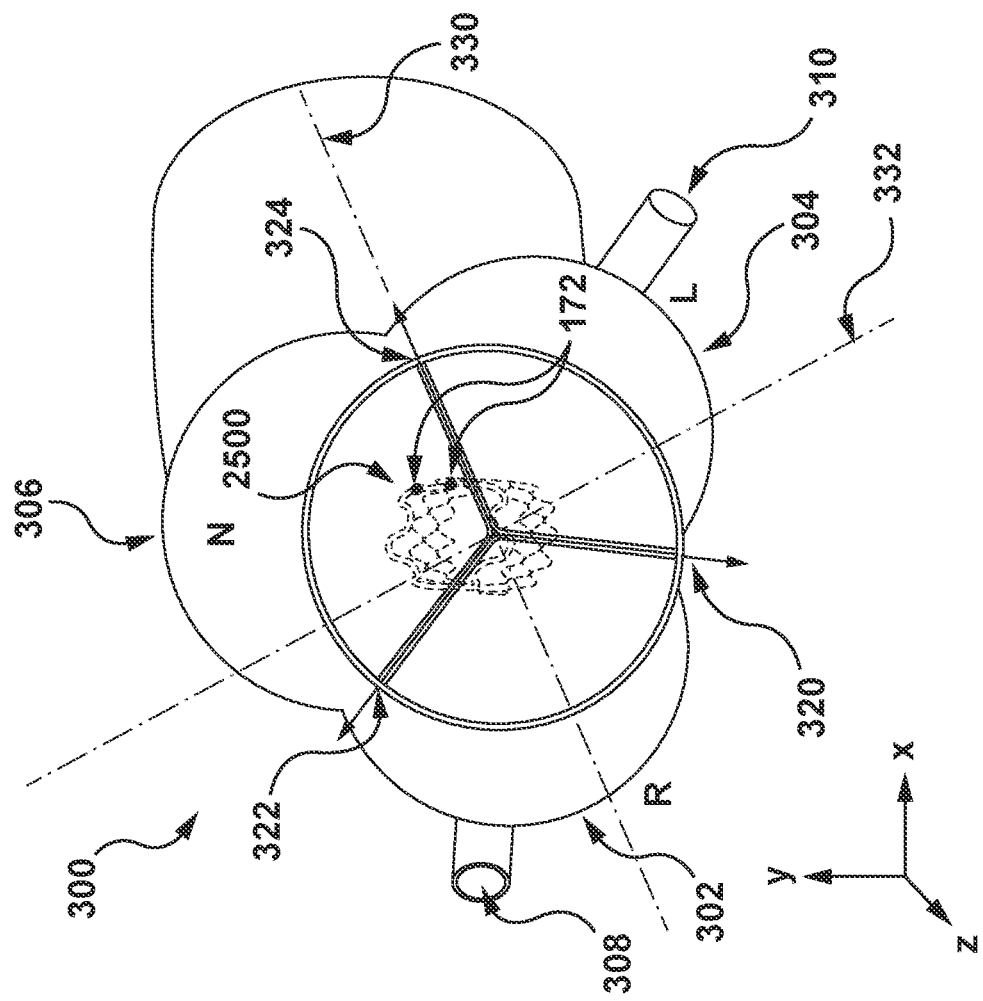
Figure 27C:
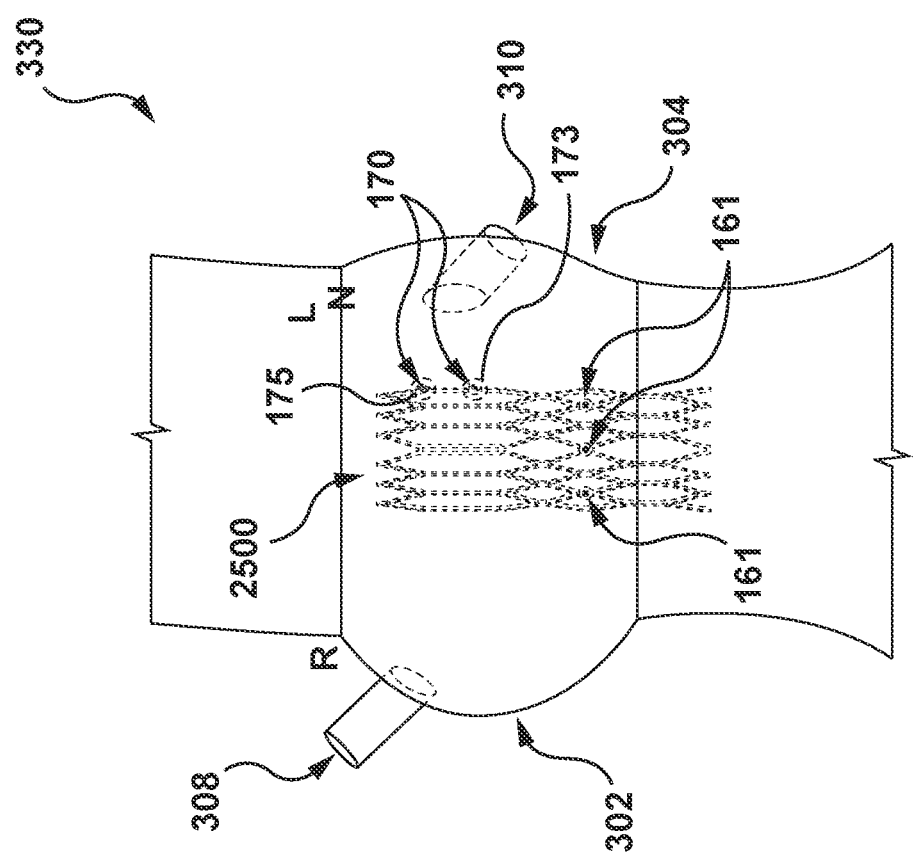

For example, to avoid blocking the ostium of the left main coronary artery 310, the commissure post 1126A, containing the outflow marker 170 that is positioned at the location 173, can be aligned with the non-coronary/left commissure 320 of the non-coronary cusp 306 and the left coronary cusp 304, as illustrated in FIG. 27A. That is, because the outflow marker 170 that is positioned at the location 175 is adjacent to the outflow marker 170 that is positioned at the location 173, the axial strut 1126B will be aligned near the non-coronary cusp 306. As illustrated in FIG. 27B, if viewed in the image plane 332, the outflow marker 170 that is positioned at the location 173 can be rotated until the outflow marker 170 is centered in the image (in the rear of the stent 1102), thereby indicating alignment of the commissure post 1126A, which has the outflow marker 170, with the left/non-coronary commissure 324. Likewise, for example, as illustrated in FIG. 27C, if viewed in the image plane 330, the outflow marker 170 that is positioned at the location 173 can be rotated until the outflow marker 170 appears in the right of the image, thereby indicating alignment with the left/non-coronary commissure 324. This alignment ensures that the commissure post 1126A does not block the ostium of the left main coronary artery 310. Likewise, this alignment can allow other commissure posts 1126A (i.e., those without the outflow marker 170) to be aligned with the right/left commissure 320 and the right/non-coronary commissure 322, respectively. While the above describes, the outflow markers 170 being aligned with the left/non-coronary commissure 324, the outflow marker 170 can be aligned with other structure at the target site 300, e.g., right/left commissure 320, right/non-coronary commissure 322, etc.

In embodiments, the outflow markers 170 can also be used as a guide to the front or rear location of the outflow markers 170 appearing in 2D image, as described above. The relative motion of the outflow markers 170, when rotated, can be used to indicate the front or rear location of the outflow markers 170 appearing in 2D image. In particular, the right or left location of the outflow markers 170, during rotation of the stent 1102, can indicate the front or rear location. For example, if the outflow marker 170 that is positioned at the location 175 is placed on an axial strut 1126B to the left of the commissure post 1126A containing the outflow marker 170, the appearance of the outflow marker 170 that is positioned at the location 175 to the left of the outflow marker 170 that is positioned at the location 173, during rotation, would indicate a front location. Likewise, the appearance of the outflow marker 170 that is positioned at the location 175 to the right of the outflow marker 170 that is positioned at the location 173 would indicate a rear location. While the particular movement of the outflow markers 170 is discussed above in reference to transcatheter femoral approach over the aortic arch, one skilled in the art will realize that the relative movement of the outflow markers 170 may change based on a different approach.

Figure 28A:
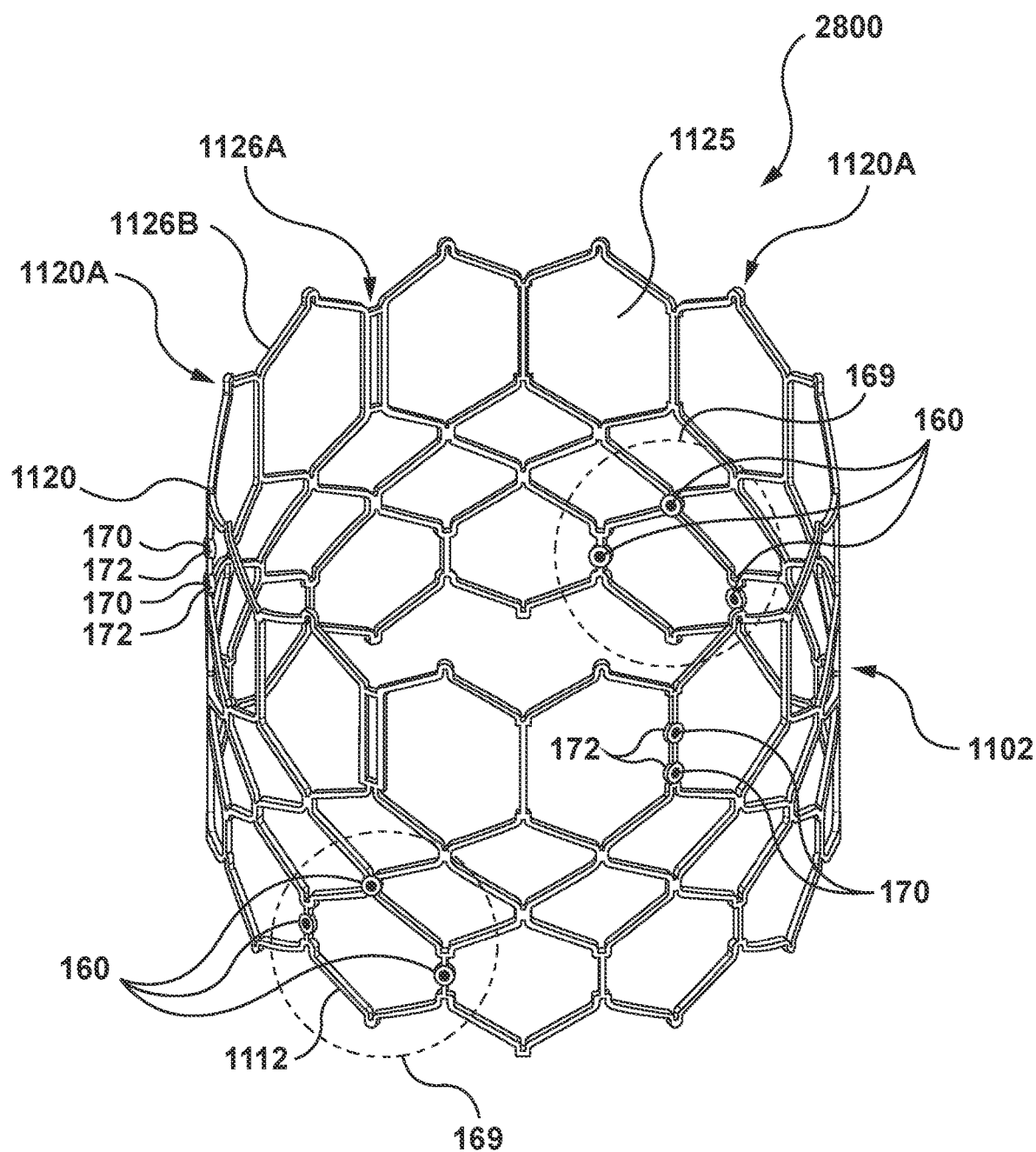
FIGS. 28A and 28B illustrate several views of another valve prosthesis in accordance with an embodiment hereof.
Figure 28B:
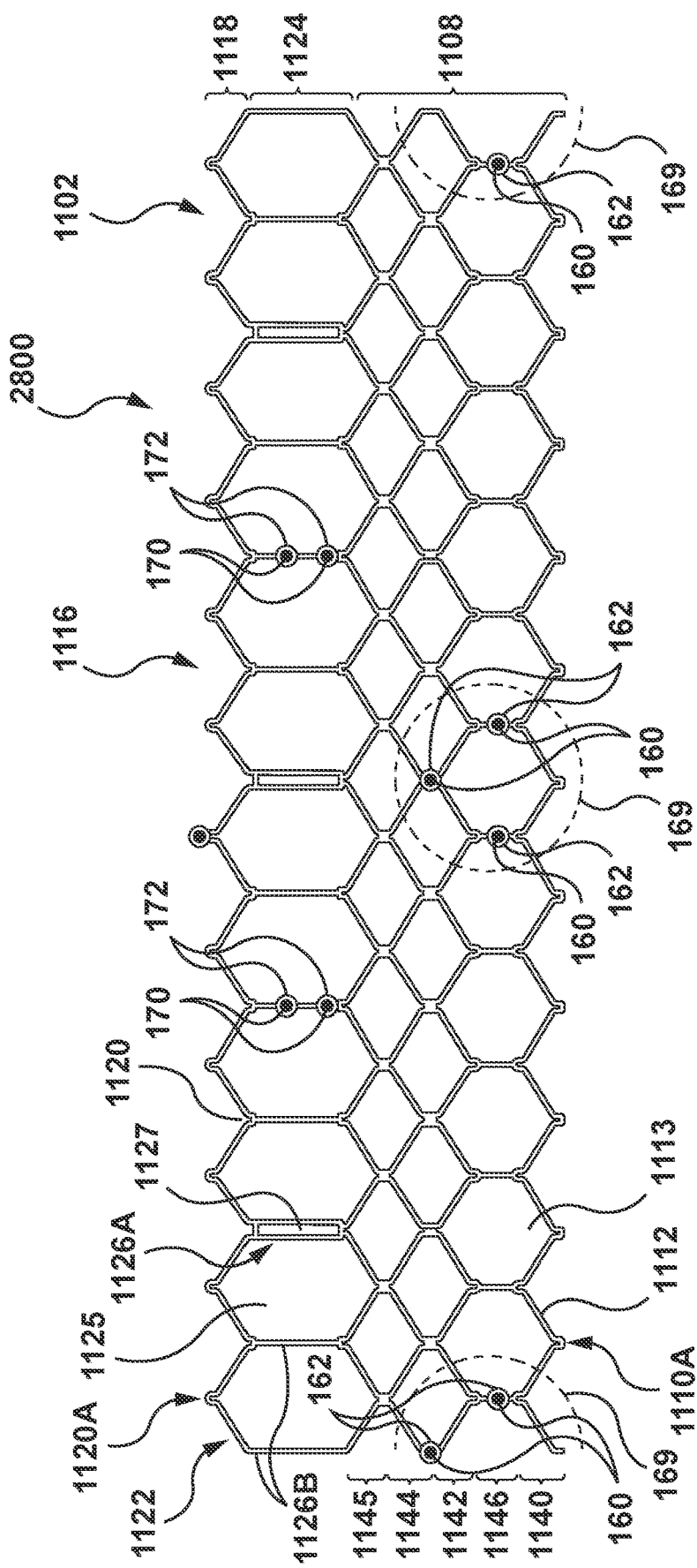

FIGS. 28A and 28B illustrate a transcatheter valve prosthesis 2800 in which the radially-expandable stent 1102 one or more inflow markers 160 that are positioned at one or more locations 169, one outflow marker 170 that is positioned at a location 177, and one outflow marker 170 that is positioned at a location 179, according to another embodiment hereof. In embodiments, the inflow markers 160 and the outflow markers 170 can be utilized in orientation (e.g., axial alignment, tilt alignment, circumferential (rotational) alignment, etc.) of the transcatheter valve prosthesis 1300, in situ, as discussed in detail below.

One skilled in the art will realize that FIGS. 28A and 28B illustrate one example of an implantable medical device and that existing components illustrated in FIGS. 28A and 28B may be removed and/or additional components may be added. Additionally, while the transcatheter valve prosthesis 2800 is described below as including the inflow markers 160 and the outflow markers 170, one skilled in the art will realize that the transcatheter valve prosthesis 2800 can include additional markers, for example, any of the markers described herein. Moreover, while examples of operations and advantages of the transcatheter valve prosthesis 2800, the inflow markers 160 and the outflow markers 170 are discussed below, one skilled in the art will realize any of the operations and processes described above can be performed using the transcatheter valve prosthesis 2800.

As discussed above, the stent 1102 of the transcatheter valve prosthesis 2800 has an expanded configuration, which is shown FIG. 28A. FIG. 28B shows an open, flat view of an example of the stent 1102. As illustrated in FIGS. 28A and 28B, the transcatheter valve prosthesis 2800 can include similar components to the transcatheter valve prosthesis 1600, a description of which can be found above in the discussion of FIGS. 16A and 16B.

In embodiments, to ensure the proper placement in the native anatomy of a subject, the transcatheter valve prosthesis 2800 can include the inflow markers 160 that are positioned at the locations 169 and two of the outflow markers 170 that are positioned at a location 177 and a location 179. The outflow markers 170 can operate to assist in rotational orientation of the stent 1102, as described below. Additionally, the outflow markers 170 can operate as a guide for determining a front or rear location the outflow marker 170 in 2D image during implantation, as described below.

In embodiments, the location 177 of the outflow marker 170 can be positioned on one of the axial struts 1126B, for example, in the outflow portion 1118 or the transition portion 1124. The location 179 of the outflow marker 170 can be positioned on another of the axial struts 1126B, for example, in the outflow portion 1118 or the transition portion 1124. In embodiments, the location 179 of the outflow marker 170 can correspond to the location of the outflow marker described above with reference to FIGS. 16A and 16B. In embodiments, the location 177 and the location 179 can be on axial struts 1126B that are separate by a commissure post 1126A. As illustrated in FIG. 28B, the location 179 of the outflow marker 170 is axially positioned closer to the outflow end 1116 and the location 177 of the outflow marker 170 is axially positioned closer to the inflow end 1116.

In any embodiment, the outflow markers 170 can be attached to the stent 1102 within the containment member 172 formed in the axial strut 1126B. A description of the containment member 172 can be found above in the discussion of FIGS. 16A and 16B. Likewise, a description of a configuration of the outflow marker 170 (e.g., size, dimensions, shape, materials, etc.) can be found above in the discussion of FIGS. 16A and 16B.

In an embodiment, the stent 1102 includes two of the inflow marker 160 that are positioned at the locations 169. Either of the inflow markers 160 can be positioned towards the inflow end 106 of the stent 102 in the inflow portion 108. In an embodiment, as illustrated in FIG. 28B, the stent 1102 can include four rows of the struts 1112. In embodiments, the potential locations 161 of the inflow marker 160 can be positioned at various locations, axially, in the inflow portion 108. The potential locations 161 of the inflow marker 160 can be at an intersection of the second row 1142 and the third row 1114. The potential locations 161 of the inflow marker 160 can be at on a strut 1112 in the row 1146 of struts. For example, the location 161 of the inflow marker 160 can correspond to the midpoint of the strut 1112 in the row 1146. The potential locations 161 of the inflow markers 160 can be circumferentially aligned with each other around a circumference of the stent 1102 and or offset axially.

In embodiments, the inflow marker 160 can be attached to the stent 1102 within a containment member 162. A description of the containment member 162 can be found above in the discussion of FIGS. 16A and 16B. Likewise, a description of a configuration of the inflow marker 160 (e.g., size, dimensions, shape, materials, etc.) can be found above in the discussion of FIGS. 16A and 16B.

As discussed above, the stent 1102 can include two of the outflow markers 170 and two of the inflow markers 160, which can be used to align the stent 1102. FIGS. 29A and 29B illustrate a simplified top view of the stent 1102 from the outflow end 1116, which illustrates relative positioning of the locations 169 of the inflow markers 160 and the outflow markers 170 that are positioned at the locations 177 and 179. In particular, FIG. 29A illustrates the stent 1102 (shown as dotted lines) that includes a prosthetic valve 200 having valve leaflets with commissures 202 positioned at the commissure posts 1126A. Further, FIG. 29A illustrates the circumferential positioning of the locations 177 and 179 of the outflow markers 170 on the stent 1102 relative to the potential locations 169 of the inflow markers 160 on the stent 1102. FIG. 29B illustrates a potential alignment of the stent 1102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 27A-27C. One skilled in the art will realize that FIGS. 29A and 29B illustrate a simplified view of the transcatheter valve prosthesis 2800 and that the transcatheter valve prosthesis 2800 can include additional components, for example, components described with reference to FIGS. 28A and 28B.

As illustrated in FIG. 29A, when positioned on the commissure post 1126A, the outflow marker 170 at location 177 is positioned at a circumferential location of a commissure 202 of the valve leaflets of the prosthetic valve 200. The outflow marker 170 (at location 179) is positioned on the axial strut 1126B. The location 179 of the outflow marker 170 can be at one-hundred twenty degrees counter-clockwise relative to the position of the location 177 of the outflow marker 170. As such, the outflow marker 170 (at location 179) aligns, circumferentially with another midpoint between the commissure 202 of valve leaflets of the prosthetic valve 200 of the transcatheter valve prosthesis 2800.

The one or more locations of the inflow markers 160 can be positioned circumferentially around the stent 1102 as different rotational angles. For example, the location 169 of the inflow markers 160 can be at sixty degrees counter-clockwise and one-hundred twenty degrees clockwise relative to the location 177 of the outflow marker 170. Likewise, for example, one location 169 of the inflow marker 160 can be at sixty degrees clockwise and one location 169 can be at one-hundred twenty degrees counter-clockwise relative to the location 179 of the outflow marker 170.

Figure 30C:
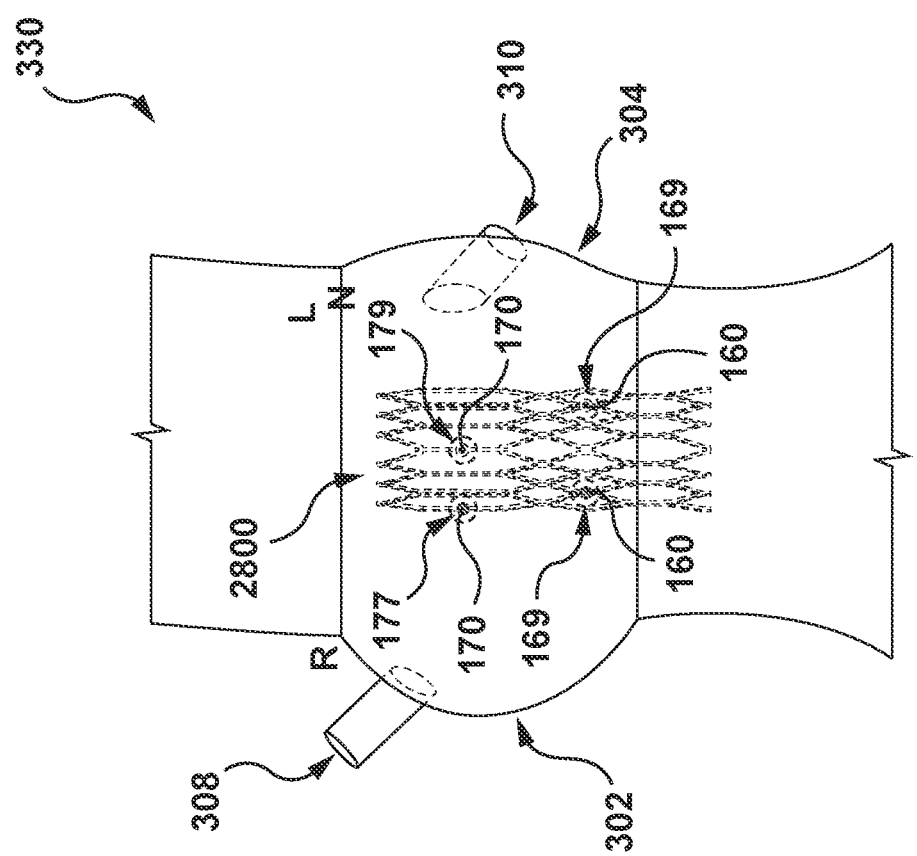

As illustrated in FIG. 29B and discussed in further detail below with reference to FIGS. 30A-30C, the outflow markers 170 can be utilized to align circumferential or rotational orientation of the transcatheter valve prosthesis 2800. More particularly, the outflow markers 170 can allow a physician to correctly interpret the circumferential orientation of the transcatheter valve prosthesis 2800 and to rotate the transcatheter valve prosthesis 2800 relative to the anatomy to correct the circumferential or rotational orientation, if necessary, to avoid blocking native anatomy at a deployment location of the transcatheter valve prosthesis 2800 (e.g., target site). For example, as illustrated in FIG. 29B, the outflow marker 170 that are positioned at locations 177 and 179 rotationally aligns the commissures 202 of the prosthetic valve 200 of the transcatheter valve prosthesis 100 with the native valve commissures. Commissure to commissure alignment (prosthetic valve 200 commissure to native valve commissure) may improve transcatheter valve prosthesis 2800 hemodynamics and leaflet durability.

In an embodiment, as illustrated in FIG. 29B, the outflow marker 170 that is at the location 177 can be utilized to align the axial strut 1126B to the right coronary cusp ("R"). The outflow marker 170 that is at the location 179 can be utilized to align the axial strut with the left coronary cusp ("L"). To align the transcatheter valve prosthesis 1300, the stent 1102 can rotated, in situ, by a delivery system to be positioned in a desired circumferential or rotational alignment. Additionally, by aligning the commissure post 1126A to left/non-coronary commissure of the left coronary cusp and the right coronary cusp, the commissure post 1126A may avoid blocking the ostium of the left main coronary artery. Additionally, because of the alignment of the outflow markers 170 at the right and left coronary cusps, the outflow markers 170 can be utilized as guides in location the right main coronary artery and the left main coronary artery.

In embodiments, the inflow markers 160 and the outflow markers 170 can be utilized in orientation (e.g., axial alignment, tilt alignment, circumferential (rotational) alignment, etc.) of the transcatheter valve prosthesis 2800, in situ, during installation as described below with reference to FIGS. 30A-30C. FIGS. 30A-30C illustrate various views of a target site 300 e.g., an aortic heart valve, for the transcatheter valve prosthesis 2800. As illustrated in FIG. 30A, which is an annular view of the target site 300 taken perpendicular to an annulus 301, the target site 300 includes three valve cusps of the aortic root, the right coronary cusp 302, the left coronary cusp 304 and the non-coronary cusp 306. The region of the right coronary cusp 302 includes ostium of the right coronary artery 308. Likewise, the region of the left coronary cusp 304 includes ostium of the left main coronary artery 310.

When installing the transcatheter valve prosthesis 2800, it is desirable to properly align the stent 1102 with the target site 300, as discussed above. For example, the transcatheter valve prosthesis 2800 needs to be properly aligned, axially, so that the transcatheter valve prosthesis 2800 properly engages the native tissue of the target site 300. Likewise, the transcatheter valve prosthesis 2800 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 may reduce the risk of blocking coronary access and may enhance hemodynamics and valve durability because of commissure-to-commissure alignment. As illustrated in FIG. 30A, the right coronary cusp 302, the left coronary cusp 304, and the non-coronary cusp 306 include commissure regions: right/left commissure 320, right/non-coronary commissure 322, and left/non-coronary commissure 324. FIG. 30B illustrates a 2-D side view of the target site 300 taken in an image plane 332 (represented as a line in FIG. 30A). The image plane 332 is approximately perpendicular to an image plane 330 (represented as a line in FIG. 30A) in an x-direction and y-direction, and the image plane 332 extends in the z-direction (a direction normal to the 2D view of FIG. 30A). FIG. 30C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

As illustrated in FIG. 30B, the inflow markers 160 can be utilized to axially align the stent 1102 with features in the target site 300, e.g., basal plane 340 of the right coronary cusp 302, the left coronary cusp 304 and the non-coronary cusp 306. For example, as discussed above with reference to FIG. 3D, which is a three dimension view of the target site 300, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 2800, the stent 102, via a delivery system can be manipulated (e.g., advanced, retracted, etc.) until the inflow markers 160 align with the basal plane 340, as illustrated in FIG. 30B. As such, the transcatheter valve prosthesis 2800 can be positioned at a proper depth within the target site 300, thereby ensuring proper engagement with the native tissue.

In embodiments, as described above with reference to FIGS. 18A-18C, the outflow markers 170 that are positioned at the location 177 and 179, alone, can be utilized to align circumferential or rotational orientation of the transcatheter valve prosthesis 2800. For example, the outflow marker 170 that is positioned at the location 177 can be aligned to the right coronary cusp 302. Likewise, for example, the outflow marker 170 that is positioned at the location 179 can be aligned to the left coronary cusp 302. One skilled in the art will realize that the outflow markers 170 can be aligned to any feature at the target site 300.

In embodiments, the combination of the outflow marker 170 that is positioned at the location 177 and the outflow marker 170 that is positioned at the location 179 can be utilized to align circumferential or rotational orientation of the transcatheter valve prosthesis 2800. That is, the relative appearance and/or location in a 2D image can be utilized to align circumferential or rotational orientation of the transcatheter valve prosthesis 2800. In particular, the relative radial appearance in 2D image can indicate the relative positioning of the outflow marker 170 that is positioned at the location 177 and the outflow marker 170 that is positioned at the location 179, when an image plane is aligned to a desired feature at the target site 300.

For example, to utilize the outflow markers 170 as guides to the ostium of the left main coronary artery 310 and the ostium of the right main coronary artery 308, the axial strut 1126B, containing the outflow marker 170 that is positioned at the location 177, can be aligned with the right coronary cusp 302, and the axial strut 1126B, containing the outflow marker 170 that is positioned at the location 179, can be aligned with the left coronary cusp 304, as illustrated in FIG. 30A. As illustrated in FIG. 30B, if viewed in the image plane 332, the stent 1102 can be rotated the outflow marker 170 at the location 177 appears at the left of the image, thereby indicating alignment of the axial strut 1126B with the right coronary cusp 302. Likewise, if viewed in the image plane 332, the stent 1102 can be rotated until the outflow marker 170 that is at location 179 appears at the right of the image, thereby indicating alignment of the axial strut 1126B with the left coronary cusp 304. The annular alignment of the outflow marker 170 (e.g., annular offset) can operate as a guide to which of the outflow markers 170 is at location 177 and location 179. For example, as illustrated in FIG. 30B, the outflow marker 170 appearing on the center of the image should be offset closer to the inflow end 106, and the outflow marker 170 appearing on the right of the image should appear offset closer to the outflow end 1116.

Figure 31A:
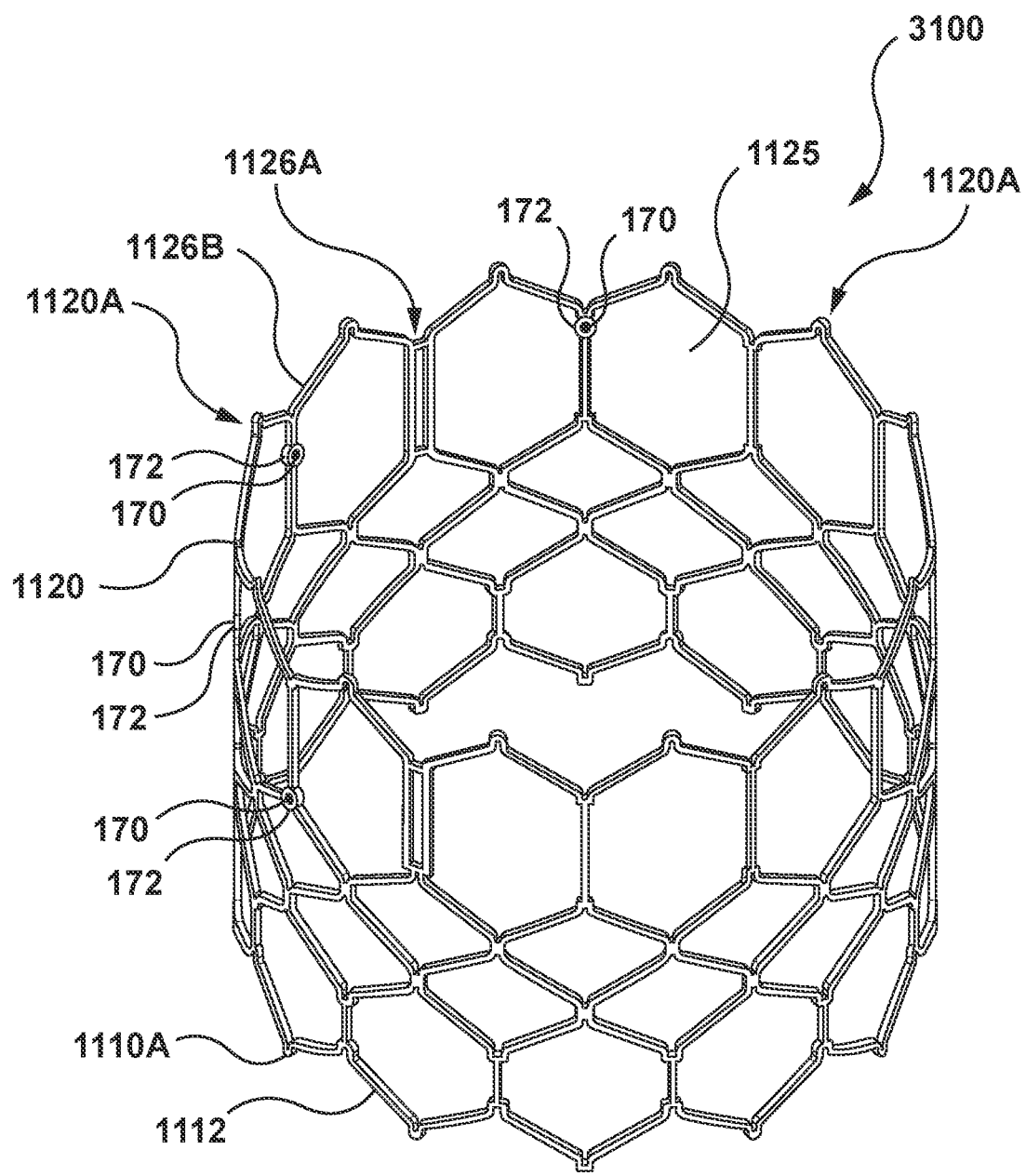
FIGS. 31A and 31B illustrate several views of another valve prosthesis in accordance with an embodiment hereof.
Figure 31B:
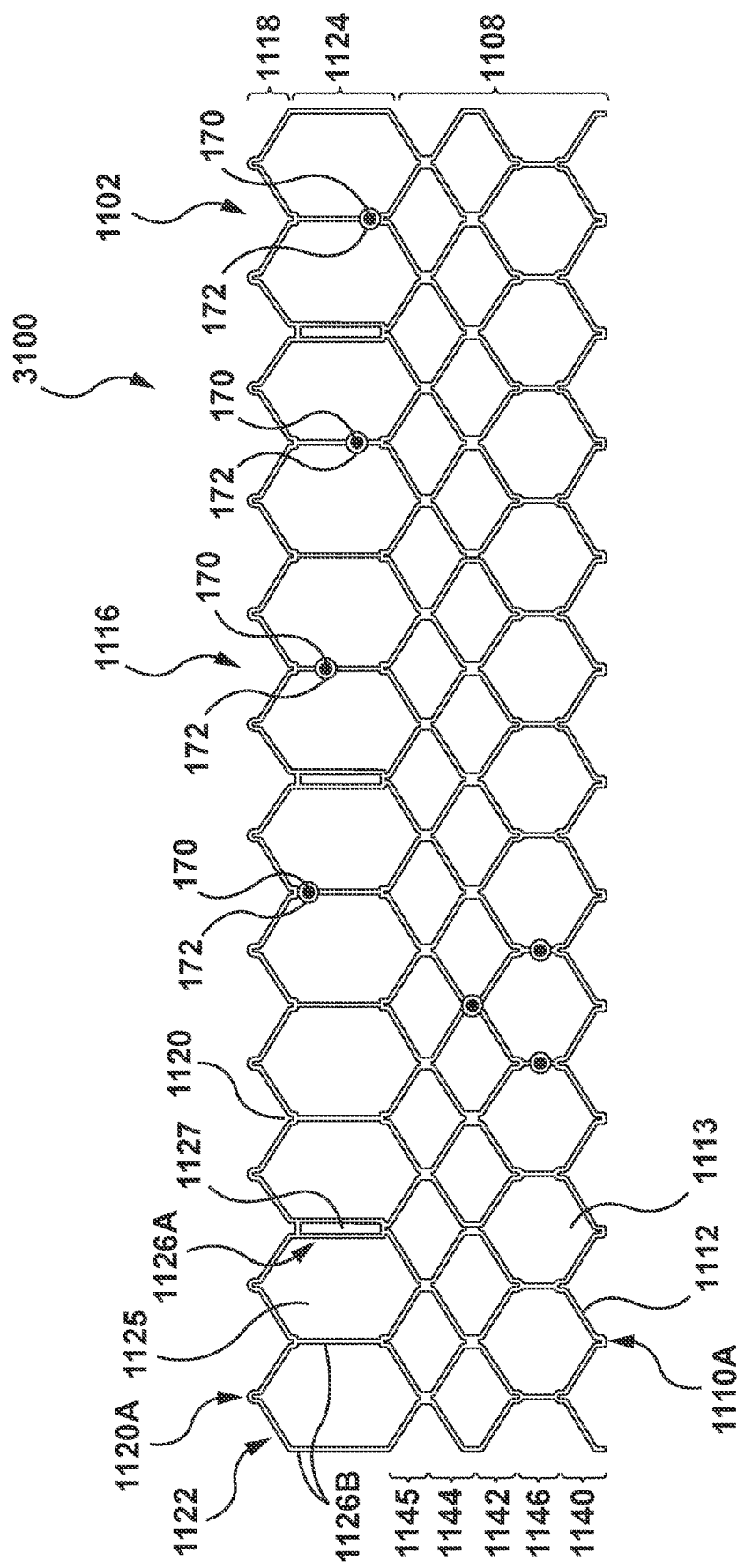

FIGS. 31A and 31B illustrate a transcatheter valve prosthesis 3100 in which the radially-expandable stent 1102 one or more inflow markers 160 and several outflow marker 170 that are positioned at different axial locations thereby forming a "stair-step" pattern, according to another embodiment hereof. In embodiments, the inflow markers 160 and the outflow markers 170 can be utilized in orientation (e.g., axial alignment, tilt alignment, circumferential (rotational) alignment, etc.) of the transcatheter valve prosthesis 1300, in situ, as discussed in detail below.

One skilled in the art will realize that FIGS. 31A and 32B illustrate one example of an implantable medical device and that existing components illustrated in FIGS. 31A and 31B may be removed and/or additional components may be added. Additionally, while the transcatheter valve prosthesis 3100 is described below as including the inflow markers 160 and the outflow markers 170, one skilled in the art will realize that the transcatheter valve prosthesis 3100 can include additional markers, for example, any of the markers described herein. Moreover, while examples of operations and advantages of the transcatheter valve prosthesis 3100, the inflow markers 160 and the outflow markers 170 are discussed below, one skilled in the art will realize any of the operations and processes described above can be performed using the transcatheter valve prosthesis 3100.

As discussed above, the stent 1102 of the transcatheter valve prosthesis 3100 has an expanded configuration, which is shown FIG. 31A. FIG. 31B shows an open, flat view of an example of the stent 1102. As illustrated in FIGS. 31A and 31B, the transcatheter valve prosthesis 3100 can include similar components to the transcatheter valve prosthesis 1600, a description of which can be found above in the discussion of FIGS. 16A and 16B.

In embodiments, to ensure the proper placement in the native anatomy of a subject, the transcatheter valve prosthesis 3100 can include one or more inflow markers 160 and four of the outflow markers 170 that are positioned in the "stair-step" pattern. The outflow markers 170 can operate to assist in rotational orientation of the stent 1102, as described below. Additionally, the outflow markers 170 can operate as a guide for determining a front or rear location the outflow marker 170 in 2D image during implantation, as described below.

In embodiments, each of the outflow markers 170 can be positioned on one of the axial struts 1126B with two of the outflow markers 170 being adjacent (right side and left side) to a commissure post 1126A, for example, in the outflow portion 1118 or the transition portion 1124. As illustrated in FIG. 28B, moving from left to right, each of the outflow markers 170 is axially positioned closer to the outflow end 1116, thereby forming the "stair-step" pattern.

In any embodiment, the outflow markers 170 can be attached to the stent 1102 within the containment member 172 formed in the axial strut 1126B. A description of the containment member 172 can be found above in the discussion of FIGS. 16A and 16B. Likewise, a description of a configuration of the outflow marker 170 (e.g., size, dimensions, shape, materials, etc.) can be found above in the discussion of FIGS. 16A and 16B.

In an embodiment, the stent 1102 includes one or more inflow marker 160. The inflow markers 160 can be positioned towards the inflow end 106 of the stent 102 in the inflow portion 108. In an embodiment, as illustrated in FIG. 28B, the stent 1102 can include four rows of the struts 1112. In embodiments, the potential locations of the inflow marker 160 can be positioned at various locations, axially, in the inflow portion 108. The potential locations of the inflow marker 160 can be at an intersection of the second row 1142 and the third row 1114. The potential locations of the inflow marker 160 can be at on a strut 1112 in the row 1146 of struts. For example, the location of the inflow marker 160 can correspond to the midpoint of the strut 1112 in the row 1146. The potential locations of the inflow markers 160 can be circumferentially aligned with each other around a circumference of the stent 1102 and or offset axially.

In embodiments, the inflow marker 160 can be attached to the stent 1102 within a containment member 162. A description of the containment member 162 can be found above in the discussion of FIGS. 16A and 16B. Likewise, a description of a configuration of the inflow marker 160 (e.g., size, dimensions, shape, materials, etc.) can be found above in the discussion of FIGS. 16A and 16B.

As discussed above, the stent 1102 can include four of the outflow markers 170 and one or more of the inflow markers 160, which can be used to align the stent 1102. FIGS. 32A and 32B illustrate a simplified top view of the stent 1102 from the outflow end 1116, which illustrates relative positioning of the inflow markers 160 and the outflow markers 170. In particular, FIG. 32A illustrates the stent 1102 (shown as dotted lines) that includes a prosthetic valve 200 having valve leaflets with commissures 202 positioned at the commissure posts 1126A. Further, FIG. 32A illustrates the circumferential positioning of the outflow markers 170 on the stent 1102 relative to the potential locations of the inflow markers 160 on the stent 1102. FIG. 32B illustrates a potential alignment of the stent 1102 relative to native anatomy of a target site, e.g., a native heart valve including a left coronary cusp ("L") and non-coronary cusp ("N") of the native valve, and opposing a right coronary cusp ("R"), as explained in further detail below with reference to FIGS. 33A-33C. One skilled in the art will realize that FIGS. 32A and 32B illustrate a simplified view of the transcatheter valve prosthesis 3100 and that the transcatheter valve prosthesis 3100 can include additional components, for example, components described with reference to FIGS. 31A and 31B.

As illustrated in FIG. 32A, when positioned on the axial struts 1126B in the "stair step" pattern, each of the outflow markers 170 is positioned to be sixty degrees clockwise apart relative to one another, a first of the outflow markers being thirty degrees from a commissures 202. The locations of the inflow markers 160 can be positioned circumferentially around the stent 1102 as different rotational angles. For example, the locations of the inflow markers 160 can be at fifteen degrees, thirty degrees, and forty-five degrees clockwise from an outflow marker 170 located at an end of the "stair-step" pattern.

Figure 33C:
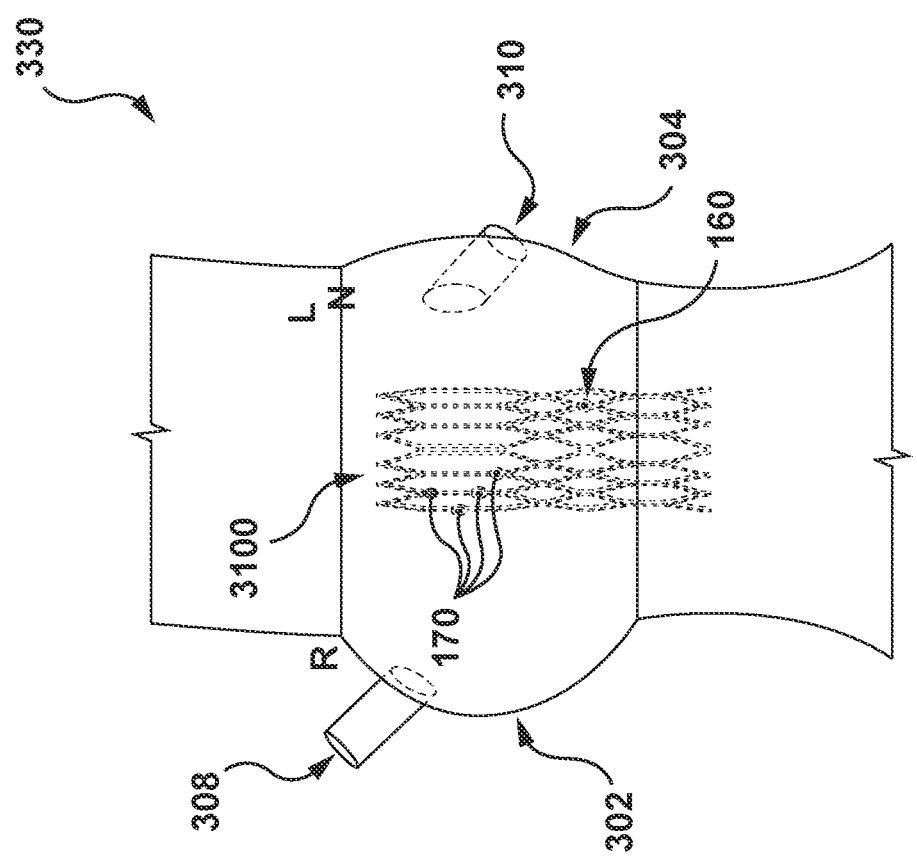

As illustrated in FIG. 32B and discussed in further detail below with reference to FIGS. 33A-33C, the outflow markers 170 can be utilized to align circumferential or rotational orientation of the transcatheter valve prosthesis 2800. More particularly, the outflow markers 170 can allow a physician to correctly interpret the circumferential orientation of the transcatheter valve prosthesis 3100 and to rotate the transcatheter valve prosthesis 3100 relative to the anatomy to correct the circumferential or rotational orientation, if necessary, to avoid blocking native anatomy at a deployment location of the transcatheter valve prosthesis 3100 (e.g., target site). For example, as illustrated in FIG. 32B, the outflow markers 170 rotationally aligns the commissures 202 of the prosthetic valve 200 of the transcatheter valve prosthesis 3100 with the native valve commissures. Commissure to commissure alignment (prosthetic valve 200 commissure to native valve commissure) may improve transcatheter valve prosthesis 3100 hemodynamics and leaflet durability. For example, the location of two of the outflow markers 170 being adjacent to a commissure post 1126A allows alignment with left/right commissure of the left coronary cusp and the right coronary cusp. To align the transcatheter valve prosthesis 3100, the stent 1102 can rotated, in situ, by a delivery system to be positioned in a desired circumferential or rotational alignment. Additionally, by aligning the commissure post 1126A to left/right commissure of the left coronary cusp and the right coronary cusp, the commissure post 1126A may avoid blocking the ostium of the left main coronary artery. Additionally, because of the alignment of the outflow markers 170 at the right and left coronary cusps, the outflow markers 170 can be utilized as guides in location the right main coronary artery and the left main coronary artery.

In embodiments, the inflow markers 160 and the outflow markers 170 can be utilized in orientation (e.g., axial alignment, tilt alignment, circumferential (rotational) alignment, etc.) of the transcatheter valve prosthesis 3100, in situ, during installation as described below with reference to FIGS. 33A-33C. FIGS. 33A-33C illustrate various views of a target site 300 e.g., an aortic heart valve, for the transcatheter valve prosthesis 3100. As illustrated in FIG. 33A, which is an annular view of the target site 300 taken perpendicular to an annulus 301, the target site 300 includes three valve cusps of the aortic root, the right coronary cusp 302, the left coronary cusp 304 and the non-coronary cusp 306. The region of the right coronary cusp 302 includes ostium of the right coronary artery 308. Likewise, the region of the left coronary cusp 304 includes ostium of the left main coronary artery 310.

When installing the transcatheter valve prosthesis 2800, it is desirable to properly align the stent 1102 with the target site 300, as discussed above. For example, the transcatheter valve prosthesis 3100 needs to be properly aligned, axially, so that the transcatheter valve prosthesis 3100 properly engages the native tissue of the target site 300. Likewise, the transcatheter valve prosthesis 3100 needs to be aligned circumferentially or rotationally. When being positioned, in situ, it is very important to avoid blocking the ostia of the right coronary artery 308 and/or the left main coronary artery 310. Proper circumferential or rotational orientation within the target site 300 may reduce the risk of blocking coronary access and may enhance hemodynamics and valve durability because of commissure-to-commissure alignment. As illustrated in FIG. 33A, the right coronary cusp 302, the left coronary cusp 304, and the non-coronary cusp 306 include commissure regions: right/left commissure 320, right/non-coronary commissure 322, and left/non-coronary commissure 324. FIG. 33B illustrates a 2-D side view of the target site 300 taken in an image plane 332 (represented as a line in FIG. 33A). The image plane 332 is approximately perpendicular to an image plane 330 (represented as a line in FIG. 33A) in an x-direction and y-direction, and the image plane 332 extends in the z-direction (a direction normal to the 2D view of FIG. 33A). FIG. 33C illustrates a 2-D side view of the target site 300 taken in the image plane 330. The image plane 330 approximately bisects the right coronary cusp 302 in the x-direction and y-direction (e.g., approximately perpendicular to the image plane 332) and extends in the z-direction.

As illustrated in FIG. 33B, the inflow markers 160 can be utilized to axially align the stent 1102 with features in the target site 300, e.g., basal plane 340 of the right coronary cusp 302, the left coronary cusp 304 and the non-coronary cusp 306. For example, as discussed above with reference to FIG. 3D, which is a three dimension view of the target site 300, the basal plane 340 can be defined as a plane that intersects a nadir 342 of the right coronary cusp 302, a nadir 344 of the left coronary cusp 304, and a nadir 346 of the non-coronary cusp 306. To align the transcatheter valve prosthesis 2800, the stent 102, via a delivery system can be manipulated (e.g., advanced, retracted, etc.) until the inflow markers 160 align with the basal plane 340, as illustrated in FIG. 33B. As such, the transcatheter valve prosthesis 3100 can be positioned at a proper depth within the target site 300, thereby ensuring proper engagement with the native tissue.

In embodiments, two of the outflow markers 170 that are located at the end of the "stair-step pattern", alone, can be utilized to align circumferential or rotational orientation of the transcatheter valve prosthesis 3100. For example, for example, the end most of the outflow markers 170 in the "stair-step" pattern can be aligned to the left coronary cusp 302 and the next adjacent one of the outflow markers 170 can be aligned to the right coronary cusp 302. One skilled in the art will realize that the outflow markers 170 can be aligned to any feature at the target site 300.

In embodiments, the combination of the outflow markers can be utilized to align circumferential or rotational orientation of the transcatheter valve prosthesis 3100. That is, the relative appearance and/or location in a 2D image can be utilized to align circumferential or rotational orientation of the transcatheter valve prosthesis 3100. In particular, the relative radial appearance in 2D image can indicate the relative positioning of the outflow markers 170, when an image plane is aligned to a desired feature at the target site 300. For example, to utilize the outflow markers 170 as guides to the ostium of the left main coronary artery 310 and the ostium of the right main coronary artery 308, one of the axial struts 1126B, containing the outflow marker 170, can be aligned with the right coronary cusp 302, and the one of the axial struts 1126B, containing the outflow marker 170 can be aligned with the left coronary cusp 304, as illustrated in FIG. 33B. As illustrated in FIG. 33B, if viewed in the image plane 332, the stent 1102 can be rotated the outflow markers 170 appears at the left of the image, thereby indicating alignment of the axial strut 1126B with the right coronary cusp 302. Likewise, if viewed in the image plane 332, the stent 1102 can be rotated until the outflow markers 170 (at the end positions in the "stair-step" pattern) appears at the right of the image, thereby indicating alignment of the axial strut 1126B with the left coronary cusp 304 (also illustrated in FIG. 33C). The annular alignment of the outflow markers 170 (e.g., annular offset) can operate as a guide to which of end of the "stair-step" pattern of the outflow markers 170 is being viewed. For example, as illustrated in FIG. 33B, the "stair-step" pattern of the outflow markers 170 should be visible with the outflow marker 170 being the closest to the inflow end located in the right of the image.

In embodiments, the outflow markers 170 can also be used as a guide to the front or rear location of the outflow markers 170 appearing in 2D image, as described above. The relative motion of the outflow markers 170, when rotated, can be used to indicate the front or rear location of the outflow markers 170 appearing in 2D image. In particular, the right or left location of the outflow markers 170, during rotation of the stent 1102, can indicate the front or rear location. For example, if the outflow marker 170 that is positioned at the location 177 is placed on an axial strut 1126B to the left of outflow marker 170 that is positioned at the location 179, the appearance of the outflow marker 170 that is positioned at the location 177 to the left of the outflow marker 170 that is positioned at the location 179, during rotation, would indicate a front location. While the particular movement of the outflow markers 170 is discussed above in reference to transcatheter approach, one skilled in the art will realize that the relative movement of the outflow markers 170 may change based on a different approach. That is, the different axial positioning of the outflow markers 170 can indicate front and back location in an image during rotation.

In any embodiment described above, the inflow markers 160 and/or the outflow markers 170 can be formed as a directional marker that assists in the circumferential (rotational) orientation based on the shape of the directional marker. For example, the inflow markers 160 and/or the outflow markers 170 include formed in and/or can include an element that appears differently based on the rotational orientation, e.g., "C-shaped," "P-shaped," etc. The directional marker can assist a physician with correctly orienting the transcatheter valve prosthesis 1600, 1900, 2200, 2500, 2800 and/or 3100, in situ. The directional marker can allow a physician to correctly interpret the circumferential orientation of the transcatheter valve prosthesis 1600, 1900, 2200, 2500, 2800 and/or 3100 and to clock or rotate the transcatheter valve prosthesis 1600, 1900, 2200, 2500, 2800 and/or 3100 relative to the anatomy to correct the circumferential or rotational orientation if necessary. As discussed above, when being positioned in situ, it is very important to avoid blocking the ostia of the right coronary artery and/or the left main coronary artery and attaining commissure-to-commissure alignment. Proper circumferential or rotational orientation within the native anatomy reduces the risk of blocking coronary access. The transcatheter valve prosthesis 1600, 1900, 2200, 2500, 2800 and/or 3100 is rotatable, in situ, by the delivery system to be positioned in a desired orientation. When formed as a direction marker, the inflow markers 160 and/or the outflow markers 170 can further assist the physician to determine the orientation of the stent 1102, in situ, and rotate the transcatheter valve prosthesis relative to the anatomy if needed to avoid blocking the coronary arteries and attaining commissure-to-commissure alignment.

For example, the inflow markers 160 and/or the outflow markers 170 can be formed as directional marker that includes a C-shaped feature. Because the C-shape of the directional marker looks different when viewed from a front view or position as compared to when viewed from a reverse view or position, the physician can determine whether a particular portion of the stent 1102, a commissure post 1126A, etc., is facing toward or away from the viewing direction. In other words, the C-shape of the directional marker can be an axially non-symmetrical element such that depending upon the location, in situ, the C-shape of the directional marker may be displayed to the physician as a "C" or may be displayed to the physician backwards or as a mirror image of a "C". Since the optimal circumferential or rotational orientation of the transcatheter valve prosthesis 1600, 1900, 2200, 2500, 2800 and/or 3100 relative to the coronary arteries can be verified prior to releasing the transcatheter valve prosthesis 1600, 1900, 2200, 2500, 2800 and/or 3100 from the delivery system, the physician can ensure that the transcatheter valve prosthesis 1600, 1900, 2200, 2500, 2800 and/or 3100 is properly oriented in the native anatomy so as to not block the coronary arteries and commissure-to-commissure alignment. In embodiments, the inflow markers 160 and/or the outflow markers 170 can be formed as directional marker that is formed as or includes any letter, number, symbol, or shape that looks different when viewed from a front view or position as compared to when viewed from a reverse view or position, e.g., a letter "P," a letter "S," a number "7," etc.

Figure 34:
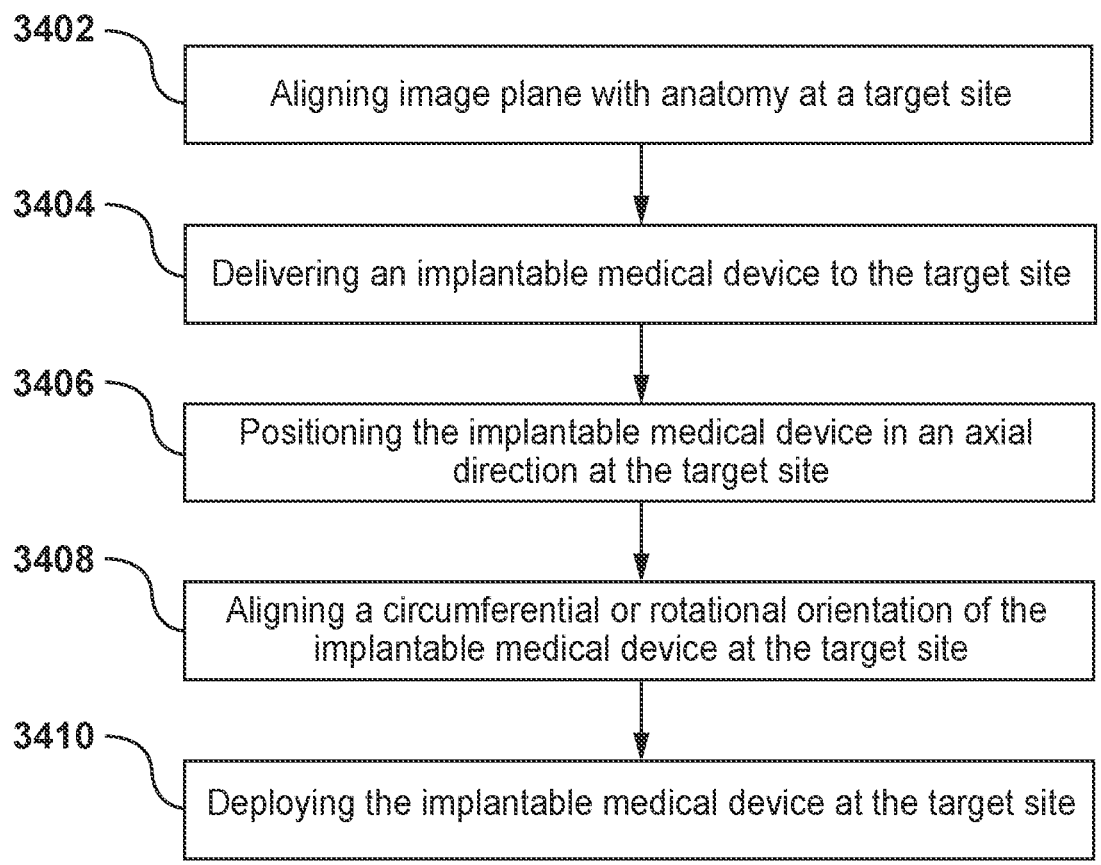
FIG. 34 depicts a flow of a method for operating of the delivery system of the delivery system with the transcatheter valve prosthesis in accordance with an embodiment hereof.

FIG. 34 illustrates a method 3400 of operating of the delivery system utilizing the inflow markers 160 and outflow markers 170 in accordance with an embodiment hereof. One skilled in the art will realize that FIG. 32 illustrates one example of steps that can be performed and that existing steps illustrated in FIG. 32 may be removed and/or additional steps may be added to the method 3400.

In step 3402, an image plane of an imaging device is aligned with anatomy at a target site. For example, as discussed above with reference to FIGS. 3A-3D, the imaging device, producing images, can be aligned with the anatomy of the patient (e.g., an annulus) to produce images in an image plane 330 and/or 332. One skilled in the art will realize that the images in the image plane 330 and/or 332 are examples and that the operations and procedures described herein can be performed using 2D image produced in any image plane of the target site and/or using 3D images of the target site.

In step 3404, an implantable medical device is delivered to the target site. In embodiments, the transcatheter valve prosthesis 100, 400, 700, 1000, 1300, 1600, 1900, 2200, 2500, 2800 and/or 3100 can be loaded onto the delivery system, which is then utilized to deliver the implantable medical device to the target site. Delivery of the transcatheter valve prosthesis 100, 400, 700, 1000, 1300, 1600, 1900, 2200, 2500, 2800 and/or 3100 can be accomplished via any type of procedure utilized to install medical devices in patients. For example, delivery of the transcatheter valve prosthesis 100, 400, 700, 1000, 1300, 1600, 1900, 2200, 2500, 2800 and/or 3100 by the delivery system can be accomplished via a percutaneous transfemoral approach or a transapical approach directly through the apex of the heart via a thoracotomy, or may be positioned within the desired area of the heart via different delivery methods known in the art for accessing heart valves. During delivery, the stent 102 or stent 1102 of the transcatheter valve prosthesis 100, 400, 700, 1000, 1300, 1600, 1900, 2200, 2500, 2800 and/or 3100 remains compressed (in a crimped configuration) until it reaches a target site, e.g., a diseased native heart valve.

In step 3406, the implantable medical device is positioned in an axial direction at the target site. In embodiments, the inflow markers 160 of the transcatheter valve prosthesis 100, 400, 700, 1000, 1300, 1600, 1900, 2200, 2500, 2800 and/or 3100 can be utilized to position the stent 102 or stent 1102 in the axial direction relative to native annulus. This may ensure a correct implant depth of the transcatheter valve prosthesis 100, 400, 700, 1000, 1300, 1600, 1900, 2200, 2500, 2800 and/or 3100.

For example, the inflow markers 160 can be utilized to axially align the stent 102 or stent 1102 with features in the target site 300, e.g., edge or terminus 340 of the right cusp 302, the left cusp 304 and the non-coronary cusp 306. For example, the inflow markers 860 can be aligned with the edge 340 of the right cusp 302, the left cusp 304 and the non-coronary cusp 306. To align the transcatheter valve prosthesis 100, 400, 700, 1000, 1300, 1600, 1900, 2200, 2500, 2800 and/or 3100, the stent 102 or stent 1102, via a delivery system (e.g., delivery system 100), can be manipulated (e.g., advanced, retracted, etc.) until the inflow markers 160 align with the edge 340 of the right coronary cusp 302, the left coronary cusp 304 and the non-coronary cusp 306.

In step 3408, a circumferential or rotational orientation of the implantable medical device is aligned at the target site. In embodiments, the outflow markers 170 operate solely or in combination to provide visual references to an orientation of the transcatheter valve prosthesis 100, 400, 700, 1000, 1300, 1600, 1900, 2200, 2500, 2800 and/or 3100 relative to the native structure of the target site of the transcatheter valve prosthesis 100, 400, 700, 1000, 1300, 1600, 1900, 2200, 2500, 2800 and/or 3100 is being installed.

For example, the outflow markers can be utilized to align circumferential or rotational orientation of the transcatheter valve prosthesis 100, 400, 700, 1000, 1300, 1600, 1900, 2200, 2500, 2800 and/or 3100. More particularly, the outflow markers can allow a physician to correctly interpret the circumferential orientation of the transcatheter valve prosthesis 100, 400, 700, 1000, 1300, 1600, 1900, 2200, 2500, 2800 and/or 3100 and to rotate the transcatheter valve prosthesis 100, 400, 700, 1000, 1300, 1600, 1900, 2200, 2500, 2800 and/or 3100 relative to the anatomy to correct the circumferential or rotational orientation, if necessary, to avoid blocking the ostia of the right coronary artery 308 and/or the left main coronary artery 310 and attain commissure-to-commissure alignment. To align the transcatheter valve prosthesis 100, 400, 700, 1000, 1300, 1600, 1900, 2200, 2500, 2800 and/or 3100, the stent 102 or stent 1102 can be rotated, in situ, by a delivery system (e.g., delivery system) to be positioned in a desired circumferential or rotational alignment using the outflow markers 170 as a visual reference, as described above.

In step 3410, the implantable medical device is deployed at the target site. In embodiments, the transcatheter valve prosthesis 100, 400, 700, 1000, 1300, 1600, 1900, 2200, 2500, 2800 and/or 3100 can be deployed. In embodiments, the transcatheter valve prosthesis 100, 400, 700, 1000, 1300, 1600, 1900, 2200, 2500, 2800 and/or 3100 can be deployed using an expansion device of the delivery system. For example, the operator of the delivery system can activate the expansion device (e.g., inflate a balloon, release tension in one or more sutures or bands, or manipulate one or more wires or rods) in order to radially expand the stent 102 or stent 1102, in situ. An inner shaft is then removed and the transcatheter valve prosthesis 100, 400, 700, 1000, 1300, 1600, 1900, 2200, 2500, 2800 and/or 3100 remains deployed within the native target heart valve.

In the method 3400 described above, one or more of the steps can be re-order, combined, and/or removed. For example, step 3206 and step 3208 can be reversed with step 3208 being performed first. Likewise, for example, step 3206 and step 3208 can be formed as a single step where the operations of step 3206 and step 3208 are performed in combination. Likewise, for example, step 3206 and step 3208 may be performed multiple times in differing orders.

In some embodiments, if the transcatheter valve prosthesis 100, 400, 700, 1000, 1300, 1600, 1900, 2200, 2500, 2800 and/or 3100 is a replacement heart valve, the transcatheter valve prosthesis 100, 400, 700, 1000, 1300, 1600, 1900, 2200, 2500, 2800 and/or 3100 is configured to block flow in one direction to regulate flow there-through via valve leaflets that may form a bicuspid or tricuspid replacement valve. When the transcatheter valve prosthesis 100, 400, 700, 1000, 1300, 1600, 1900, 2200, 2500, 2800 and/or 3100 is deployed within the valve annulus of a native heart valve, the stent 102 or stent 1102 of the transcatheter valve prosthesis 100, 400, 700, 1000, 1300, 1600, 1900, 2200, 2500, 2800 and/or 3100 is configured to be radially expanded within native valve leaflets of the defective valve, to thereby retain the native valve leaflets in a permanently open state. In some embodiments, the transcatheter valve prosthesis 100, 400, 700, 1000, 1300, 1600, 1900, 2200, 2500, 2800 and/or 3100 is configured for replacement for an aortic valve such that an inflow end of the transcatheter valve prosthesis 100, 400, 700, 1000, 1300, 1600, 1900, 2200, 2500, 2800 and/or 3100 extends into and anchors within the aortic annulus of a patient's left ventricle, while an outflow end of the transcatheter valve 100, 400, 700, 1000, 1300, 1600, 1900, 2200, 2500, 2800 and/or 3100 is positioned within the aortic sinuses.

It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single device or component for purposes of clarity, it should be understood that the techniques of this disclosure may be performed by a combination of devices or components associated with, for example, a medical device.

What is claimed is:

1. A transcatheter valve prosthesis comprising:
a stent having a crimped configuration for delivery within a vasculature and an expanded configuration for deployment within a native heart valve, wherein the stent comprises an inflow portion comprising a plurality of rows of angled struts, an outflow portion including at least one row of angled struts, a plurality of commissure posts extending between the inflow portion and the outflow portion, and a plurality of axial struts extending between the inflow portion and the outflow portion;
exactly two inflow markers positioned within the inflow portion of the stent, wherein the inflow portion of the stent has exactly two inflow markers positioned therein, wherein each of the two inflow markers are each spaced a first distance from an inflow end of the stent; and
a single outflow marker positioned on a first commissure post of the plurality of commissure posts, wherein the single outflow marker is the only outflow marker positioned on the plurality of commissure posts, the plurality of axial struts, and the outflow portion of the stent;
wherein the inflow markers and the single outflow marker are radiopaque markers configured to be visible relative to the stent in one or more images captured during installation at the native heart valve; and
a prosthetic valve disposed within and secured to the stent.

2. The transcatheter valve prosthesis of claim 1, wherein each of the two inflow markers are circumferentially offset from the single outflow marker such that neither of the two inflow markers is axially aligned with the single outflow marker.

3. The transcatheter valve prosthesis of claim 1, wherein the two inflow markers are circumferentially offset from each other by 180 degrees.

4. The transcatheter valve prosthesis of claim 3, wherein a first one of the two inflow markers is circumferentially offset from the single outflow marker by approximately sixty degrees.

5. The transcatheter valve prosthesis of claim 4, wherein a second one of the two inflow markers is circumferentially offset from the single outflow marker by approximately one hundred twenty degrees.

6. The transcatheter valve prosthesis of claim 5, wherein the stent, the two inflow markers, and the single outflow marker are arranged such that, wherein in a first image of the one or more images taken along an image plane approximately perpendicular to a plane bisecting the right coronary cusp of a native aortic valve, if the single outflow marker and the first inflow marker appear with no radial offset on a right portion of the first image, the transcatheter valve prosthesis is properly rotationally aligned.

7. The transcatheter valve prosthesis of claim 6, wherein in the first image, the second inflow marker appears on a left portion of the first image when the transcatheter valve prosthesis is properly rotationally aligned.

8. The transcatheter valve prosthesis of claim 1, wherein each of the two inflow markers is positioned between a first row of the plurality of rows of angled struts of the inflow portion adjacent the inflow end of the stent and a second row of the plurality of rows of angled struts of the inflow portion adjacent the first row, or between the second row and a third row of the plurality of rows of angled struts of the inflow portion adjacent the second row.

9. A transcatheter valve prosthesis comprising:
a stent having a crimped configuration for delivery within a vasculature and an expanded configuration for deployment within a native heart valve, wherein the stent comprises an inflow portion comprising a plurality of rows of angled struts, an outflow portion including at least one row of angled struts, a plurality of commissure posts extending between the inflow portion and the outflow portion, and a plurality of axial struts extending between the inflow portion and the outflow portion;
a single inflow marker positioned within the inflow portion of the stent, wherein the single inflow marker is the only marker positioned within the inflow portion of the stent; and
a single outflow marker positioned on a distal-most crown of the outflow portion, wherein the single outflow marker is the only marker positioned within the outflow portion of the stent, the plurality of commissure posts, and the plurality of axial struts;
wherein the single inflow marker and the single outflow marker are radiopaque markers configured to be visible relative to the stent in one or more images captured during installation at the native heart valve;
wherein the single inflow marker and the single outflow marker are circumferentially offset by approximately 30 degrees; and
a prosthetic valve disposed within and secured to the stent.

10. The transcatheter valve prosthesis of claim 9, wherein the single outflow marker is attached to the distal-most crown via a bar to mechanically isolate the single outflow marker from bending stresses on the stent.

11. The transcatheter valve prosthesis of claim 9, wherein the distal-most crown is disposed between a first one of the plurality of commissure posts and a first one of the plurality of axial struts.

12. The transcatheter valve prosthesis of claim 9, wherein the stent, the single inflow marker, and the single outflow marker are arranged such that, wherein in a first image of the one or more images taken along an image plane approximately perpendicular to a plane bisecting the right coronary cusp, if the single outflow marker and the single inflow marker appear with no radial offset on a right portion of the first image, the transcatheter valve prosthesis is properly rotationally aligned.

13. A transcatheter valve prosthesis comprising:
a stent having a crimped configuration for delivery within a vasculature and an expanded configuration for deployment within a native heart valve, the stent including
an inflow portion comprising a plurality of rows of angled struts and crowns with each crown being formed between a pair of angled struts,
an outflow portion including at least one row of angled struts and crowns with each crown being formed between a pair of angled struts,
a plurality of axial struts extending between the inflow portion and the outflow portion, and
a plurality of commissure posts extending between the inflow portion and into the outflow portion, a first end of each commissure post connected to and terminating at a distal-most crown of the crowns of the inflow portion, and an unattached second end of each commissure post disposed within the outflow portion such that a respective pair of struts of the outflow portion intersect each commissure post proximal of the second end of the commissure post;
a first outflow marker positioned on a first commissure post of the plurality of commissure posts;
three inflow markers aligned such that the three inflow markers are each spaced a first distance from an inflow end of the stent, wherein each of the three inflow markers are circumferentially offset from the first outflow marker such that none of the three inflow markers is axially aligned with the first outflow marker, wherein the first outflow marker and the three inflow markers are radiopaque markers configured to be visible relative to the stent in one or more images captured during installation at the native heart valve; and
a prosthetic valve disposed within and secured to the stent, the prosthetic valve secured to a distal portion of each commissure post distal of a location where the pair of struts of the outflow portion intersect the commissure post.

14. The transcatheter valve prosthesis of claim 13, wherein the unattached second end of each commissure post does not extend distal of a distal edge of the outflow portion of the stent.

15. A transcatheter valve prosthesis comprising:
a stent having a crimped configuration for delivery within a vasculature and an expanded configuration for deployment within a native heart valve, the stent including
an inflow portion comprising a plurality of rows of angled struts and crowns with each crown being formed between a pair of angled struts,
an outflow portion including at least one row of angled struts and crowns with each crown being formed between a pair of angled struts,
a plurality of axial struts extending between the inflow portion and the outflow portion, and
a plurality of commissure posts extending between the inflow portion and into the outflow portion, a first end of each commissure post connected to and terminating at a distal-most crown of the crowns of the inflow portion, and an unattached second end of each commissure post disposed within the outflow portion such that a respective pair of struts of the outflow portion intersect each commissure post proximal of the second end of the commissure post;
an inflow marker positioned within the inflow portion of the stent;
a first outflow marker positioned on a first commissure post of the plurality of commissure posts or a first axial strut of the plurality of axial struts, wherein the inflow marker and the first outflow marker are radiopaque markers configured to be visible relative to the stent in one or more images captured during installation at the native heart valve, wherein the inflow marker and the first outflow marker are circumferentially offset by a range of approximately forty-five degrees to approximately seventy-five degrees; and
a prosthetic valve disposed within and secured to the stent, the prosthetic valve secured to a distal portion of each commissure post distal of a location where the pair of struts of the outflow portion intersect the commissure post.

16. The transcatheter valve prosthesis of claim 15, wherein the first outflow marker is positioned on the first commissure post, and wherein the inflow marker and the first outflow marker are circumferentially offset by approximately sixty degrees.

* * * * *